(12) United States Patent
Taguchi et al.

(10) Patent No.: US 8,053,046 B2
(45) Date of Patent: Nov. 8, 2011

(54) INK FOR INKJET PRINTING, INK SET FOR INKJET PRINTING, INKJET RECORDING MATERIAL AND PRODUCING METHOD FOR INKJET RECORDING MATERIAL, AND INKJET RECORDING METHOD

(75) Inventors: Toshiki Taguchi, Shizuoka (JP); Kozo Nagata, Shizuoka (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 12/797,279

(22) Filed: Jun. 9, 2010

(65) Prior Publication Data

US 2010/0247816 A1      Sep. 30, 2010

Related U.S. Application Data

(62) Division of application No. 10/574,002, filed as application No. PCT/JP2004/014558 on Sep. 28, 2004, now abandoned.

(30) Foreign Application Priority Data

Sep. 29, 2003  (JP) ................. 2003-336992
Sep. 29, 2003  (JP) ................. 2003-337852

(51) Int. Cl.
    *B41M 5/50* (2006.01)
(52) U.S. Cl. ............. 428/32.29; 428/32.26; 428/32.3; 428/32.34
(58) Field of Classification Search .......... None
    See application file for complete search history.

(56) References Cited

U.S. PATENT DOCUMENTS

| | | | |
|---|---|---|---|
| 5,106,416 A | 4/1992 | Moffatt et al. | |
| 5,462,590 A | 10/1995 | Yui et al. | |
| 5,785,745 A | 7/1998 | Lauw et al. | |
| 5,973,026 A | 10/1999 | Burns et al. | |
| 6,306,204 B1 | 10/2001 | Lin | |
| 7,291,212 B2 | 11/2007 | Taguchi | |
| 2004/0080595 A1 | 4/2004 | Taguchi et al. | |
| 2004/0134381 A1 | 7/2004 | Taguchi et al. | |
| 2004/0189765 A1 | 9/2004 | Taguchi et al. | |
| 2005/0178288 A1 | 8/2005 | Taguchi | |

FOREIGN PATENT DOCUMENTS

| | | |
|---|---|---|
| EP | 0559324 A1 | 9/1993 |
| EP | 1236778 A1 | 9/2002 |
| EP | 1378550 A1 | 1/2004 |
| EP | 1473336 A1 | 11/2004 |
| JP | 55-43153 A | 3/1980 |
| JP | 57-57760 A | 4/1982 |
| JP | 5-132643 A | 5/1993 |
| JP | 05-194893 A | 8/1993 |
| JP | 6-136309 A | 5/1994 |
| JP | 7-150086 A | 6/1995 |
| JP | 8-302253 A | 11/1996 |
| JP | 9-111164 A | 4/1997 |
| JP | 9-151347 A | 6/1997 |
| JP | 9-151348 A | 6/1997 |
| JP | 10-119423 A | 5/1998 |
| JP | 10-217601 A | 8/1998 |
| JP | 2000-136335 A | 5/2000 |
| JP | 2000-273376 A | 10/2000 |
| JP | 2001-139854 A | 5/2001 |
| JP | 2001-207096 A | 7/2001 |
| JP | 2002-2098 A | 1/2002 |
| JP | 2002-179958 A | 6/2002 |
| JP | 2003-191607 A | 7/2003 |
| JP | 2003-220756 A | 8/2003 |
| JP | 2003-220758 A | 8/2003 |
| JP | 2003-238863 A | 8/2003 |
| JP | 2003-266663 A | 9/2003 |
| JP | 2003-276306 A | 9/2003 |
| WO | 03/066756 A1 | 8/2003 |

OTHER PUBLICATIONS

Japanese Office Action issued Jun. 1, 2010 in corresponding Japanese application No. 2006-515418.

*Primary Examiner* — Bruce H Hess
(74) *Attorney, Agent, or Firm* — Sughrue Mion, PLLC

(57) ABSTRACT

At least one of an ink for inkjet printing and an inkjet recording material contains a compound represented by formula (A):

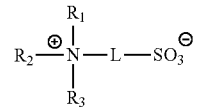

wherein R1, R2 and R3 each represents an alkyl group, an aryl group or a heterocyclic group, and at least two of R1, R2 and R3 are mutually connected to form a cyclic structure; L represents a divalent connecting group; and at least one of R1, R2, R3 and L is a group having 8 or more carbon atoms.

14 Claims, No Drawings

INK FOR INKJET PRINTING, INK SET FOR INKJET PRINTING, INKJET RECORDING MATERIAL AND PRODUCING METHOD FOR INKJET RECORDING MATERIAL, AND INKJET RECORDING METHOD

CROSS REFERENCE TO RELATED APPLICATIONS

This is a divisional of U.S. application Ser. No. 10/574,002, filed Nov. 8, 2006, which is a National Stage Entry of PCT/JP2004/014558, filed Sep. 28, 2004, the disclosures of which are hereby incorporated by reference.

TECHNICAL FIELD

The present invention relates to an ink for inkjet printing, capable of forming an image excellent in durability, and an ink set for inkjet printing.

The present invention also relates to a recording material to be employed for inkjet printing utilizing a liquid ink such as an aqueous ink (employing a dye or a pigment as a colorant) or an oily ink, or a solid ink which is solid at the normal temperature and is fused to a liquid state for use in printing, and more particularly to an inkjet recording material and an inkjet recording method capable of forming an image excellent in durability.

BACKGROUND ART

Recent rapid progress of information technology and industry has stimulated development of various information processing systems, and recording methods and recording apparatuses matching such information processing systems have also been developed and commercialized.

Among these recording methods, an inkjet recording method is utilized widely not only in offices but also in so-called home use, because of advantages of possibility of recording on various recording materials, inexpensiveness and compactness of hardware (apparatus), and excellent quietness of recording.

In the inkjet recording method, there are known a method of applying a pressure by a piezoelectric element thereby discharging a liquid droplet, a method of generating a bubble by heat thereby discharging a liquid droplet, a method utilizing ultrasonic wave, and a method of discharging a liquid droplet by attraction with an electrostatic forced. For these inkjet methods, there is employed an aqueous ink, an oily ink or a solid (fusible) ink. Among these, aqueous ink is used principally in consideration of manufacture, handling, smell, safety etc.

A colorant to be employed in such ink for inkjet printing is required to have a high solubility in a solvent, a high density in recording, a satisfactory hue, an excellent fastness to light, heat, air, water and chemicals, a satisfactory fixability to an image receiving material without blotting, an excellent storability in the ink, no toxicity, a high purity, and inexpensive availability. It is however extremely difficult to find a colorant meeting these requirements at a high level.

Various dyes and pigments have already been proposed for use in inkjet recording and are already used in practice, but in fact a colorant satisfying all these requirements have not been found. In already known dyes and pigments such as those represented by color index (C. I.) numbers, it is difficult to obtain a hue required for the ink for inkjet printing and a fastness at the same time. Dyes having a satisfactory hue and a fastness have been investigated and developed for a satisfactory colorant for inkjet printing. However such materials have been found to be significantly inferior in fastness to ozone and to light in comparison with the silver halide-based photograph.

On the other hand, with a recent progress of the inkjet printer toward a higher resolution, it has become possible to obtain so-called photo-like recording of high image quality, and various inkjet recording sheets are being developed, matching such progress in hardware (apparatus).

Properties required for such recording sheet for inkjet printing generally include (1) rapid drying (high ink absorbing speed), (2) appropriate and uniform ink dot diameter (no blotting), (3) satisfactory granularity, (4) high dot circularity, (5) high color density, (6) high saturation (not turbidity in color), (7) satisfactory resistance to water, light and ozone in printed part, (8) high whiteness of recording sheet, (9) satisfactory storability of recording sheet (no yellowing in prolonged storage and no image blotting in prolonged storage (satisfactory blotting resistance in time)), (10) satisfactory dimensional stability without deformation (sufficiently small curl), and (11) satisfactory running ability in hardware.

Also in photo glossy paper used for obtaining so-called photograph-like recording of high quality, there are required a luster, a surface smoothness and a photographic paper-like texture similar to a silver halide-based photograph, in addition to the foregoing properties.

Aiming at improvements in the aforementioned characteristics, an inkjet recording material having an ink receptive layer of a porous structure is recently developed and commercialized. Such inkjet recording material, owing to such porous structure, has a satisfactory ink receiving property (rapid drying property) and a high luster.

For example, JP-A-10-119423 and JP-A-10-217601 propose an inkjet recording material including, on a substrate, an ink receptive layer containing fine inorganic pigment particles and a water-soluble resin and having a high pore rate.

Such inkjet recording material, particularly an inkjet recording material having an ink receptive layer of a porous structure utilizing silica as the inorganic pigment particles, shows a satisfactory ink absorbing property by the structure thereof, thus providing a high ink receiving ability capable of forming an image of a high resolution and also a high luster.

However, trace gases in the air, particularly ozone, may constitute a cause of fading of the recorded image in time. The aforementioned recording material, having the ink receptive layer of the porous structure, is susceptible to fading of the recorded image by ozone gas in the air, because it contains many pores. Therefore, for the aforementioned recording material having the ink receptive layer of the porous structure, a resistance to ozone in the air (ozone resistance) is a very important property.

DISCLOSURE OF THE INVENTION

An object of the present invention is to provide an ink for inkjet printing, an ink set for inkjet, an inkjet recording material and a producing method therefor, and an inkjet recording method, allowing to form an image of excellent durability.

The present inventors have made intensive efforts for attaining the aforementioned object and have found that a betaine compound is effective, particularly a sulfobetaine compound described in the present invention.

More specifically, the object of the present invention are attained by an ink for inkjet printing, an ink set for inkjet, an inkjet recording material and a producing method therefor and an inkjet recording method described in following items 1 to 18:

1) An ink for inkjet printing, which comprising:
at least one of water and a water-miscible organic solvent;
a dye; and
a compound represented by formula (A):

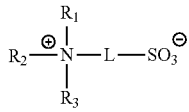

wherein $R_1$, $R_2$ and $R_3$ each represents an alkyl group, an aryl group or a heterocyclic group, and at least two of $R_1$, $R_2$ and $R_3$ are mutually connected to form a cyclic structure; L represents a divalent connecting group; and at least one of $R_1$, $R_2$, $R_3$ and L is a group having 8 or more carbon atoms.

2) The ink for inkjet printing according to item 1), wherein the dye is at least one selected from the group consisting of dyes represented by formulae (1) to (4):

formula (1):

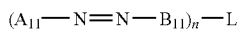

formula (2):

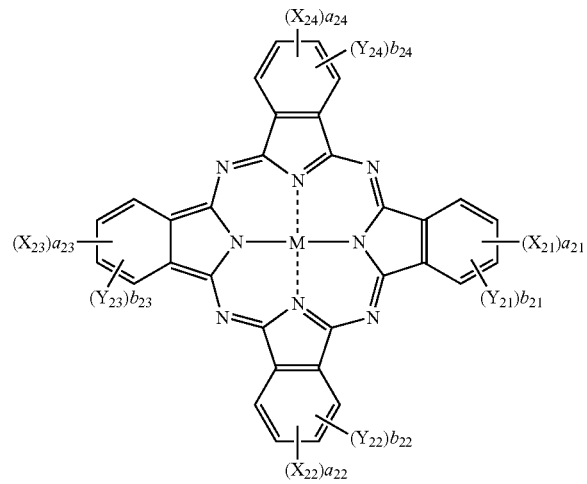

formula (3):

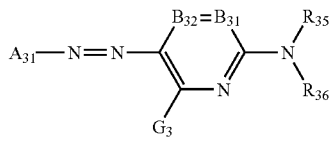

formula (4):

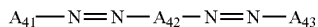

wherein in formula (1),
$A_{11}$ and $B_{11}$ each independently represents a heterocyclic group that may be substituted;
n represents 1 or 2; and
L represents a hydrogen atom, a monovalent substituent, a single bond or a divalent connecting group,
wherein when n is 1, L represents a hydrogen atom or a monovalent substituent and $A_{11}$ and $B_{11}$ are both monovalent heterocyclic groups; and
when n is 2, L represents a single bond or a divalent connecting group, $A_{11}$ represents a monovalent heterocyclic group and $B_{11}$ is a divalent heterocyclic group;

in formula (2),
$X_{21}$, $X_{22}$, $X_{23}$ and $X_{24}$ each independently represent —SO—$Z_2$, —$SO_2$—$Z_2$, —$SO_2NR_{21}R_{22}$, a sulfo group, —$CONR_{21}R_{22}$, or —$COOR_{21}$, wherein $Z_2$ independently represents an alkyl group, a cycloalkyl group, an alkenyl group, an aralkyl group, an aryl group or a heterocyclic group, each of which may be further substituted; and $R_{21}$ and $R_{22}$ each independently represents a hydrogen atom, an alkyl group, a cycloalkyl group, an alkenyl group, an aralkyl group, an aryl group or a heterocyclic group, each of which may be further substituted;
$Y_{21}$, $Y_{22}$, $Y_{23}$ and $Y_{24}$ each independently represents a monovalent substituent;
$a_{21}$, $a_{22}$, $a_{23}$ and $a_{24}$ represent the number of $X_{21}$'s, $X_{22}$'s, $X_{23}$'s and $X_{24}$'s, respectively, and each independently represents a number of 0 to 4, provided that all of $a_{21}$, $a_{22}$, $a_{23}$ and $a_{24}$ are not 0 at the same time, wherein when any of $a_{21}$, $a_{22}$, $a_{23}$ and $a_{24}$ is 2 or more, a plurality of $X_{21}$'s, $X_{22}$'s, $X_{23}$'s and $X_{24}$'s is mutually the same or different;
$b_{21}$, $b_{22}$, $b_{23}$ and $b_{24}$ represent the number of $Y_{21}$'s, $Y_{22}$'s, $Y_{23}$'s and $Y_{24}$'s, respectively, and each independently represents a number of 0 to 4, wherein when any of $b_{21}$, $b_{22}$, $b_{23}$ and $b_{24}$ is 2 or more, a plurality of $Y_{21}$'s, $Y_{22}$'s, $Y_{23}$'s and $Y_{24}$'s is mutually the same or different; and
M represents a hydrogen atom, a metal atom, a metal oxide, a metal hydroxide or a metal halide;

in formula (3),
$A_{31}$ represents a 5-membered heterocyclic ring;
$B_{31}$ and $B_{32}$ each represents =$CR_{31}$— or —$CR_{32}$=, or either one of $B_{31}$ and $B_{32}$ represents a nitrogen atom while the other one represents =$CR_{31}$— or —$CR_{32}$=;
$R_{35}$ and $R_{36}$ each independently represents a hydrogen atom, an aliphatic group, an aromatic group, a heterocyclic group, an acyl group, an alkoxycarbonyl group, an aryloxycarbonyl group, a carbamoyl group, an alkylsulfonyl group, an arylsulfonyl group, or a sulfamoyl group, each of which may further have a substituent;
$G_3$, $R_{31}$ and $R_{32}$ each independently represents a hydrogen atom, a halogen atom, an aliphatic group, an aromatic group, a heterocyclic group, a cyano group, a carboxyl group, a carbamoyl group, an alkoxycarbonyl group, an aryloxycarbonyl group, a heterocyclic oxycarbonyl group, an acyl group, a hydroxy group, an alkoxy group, an aryloxy group, a heterocyclic oxy group, a silyloxy group, an acyloxy group, a carbamoyloxy group, an alkoxycarbonyloxy group, an aryloxycarbonyloxy group, an amino group, an arylamino group, a heterocyclic amino group, an acylamino group, an ureido group, a sulfamoylamino group, an alkoxycarbonylamino group, an aryloxycarbonylamino group, an alkylsulfonylamino group, an arylsulfonylamino group, a heterocyclic sulfonylamino group, a nitro group, an alkylthio group, an arylthio group, an alkylsulfonyl group, an arylsulfonyl group, a heterocyclic sulfonyl group, an alkylsulfinyl group, an aryl sulfinyl group, a heterocyclic sulfinyl group, a sulfamoyl group, a sulfo group or a heterocyclic thio group, each of which may be further substituted; and
$R_{31}$ and $R_{35}$, or $R_{35}$ and $R_{36}$ may be bonded to form a 5- or 6-membered ring; and in formula (4),
$A_{41}$, $A_{42}$ and $A_{43}$ each independently represents an aromatic group or a heterocyclic group, each of which may be further substituted; $A_{41}$ and $A_{43}$ are monovalent groups, while $A_{42}$ is a divalent group.

Among the foregoing, a dye represented by formula (3) is preferred.

3) The ink for inkjet printing according to item 2), wherein the dye represented by formula (2) is a dye represented by formula (5):

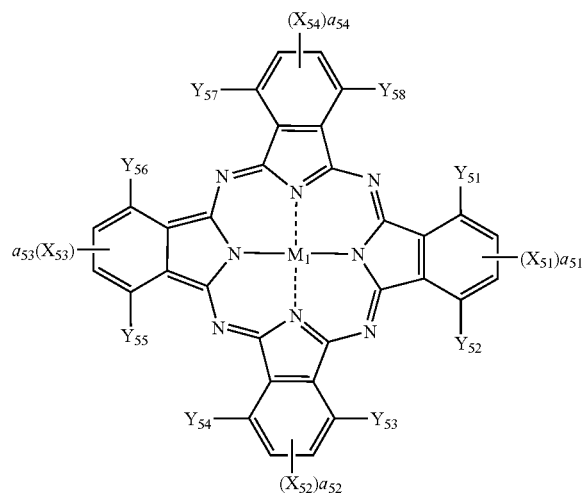

wherein $X_{51}, X_{52}, X_{53}, X_{54}$, and $M_1$ have the same meaning as $X_{21}, X_{22}, X_{23}, X_{24}$, and M in formula (2), respectively; $Y_{51}$ and $Y_{52}$ have the same meaning as $Y_{21}$ in formula (2); $Y_{53}$ and $Y_{54}$ have the same meaning as $Y_{22}$ in formula (2); $Y_{55}$ and $Y_{56}$ have the same meaning as $Y_{23}$ in formula (2); $Y_{57}$ and $Y_{58}$ have the same meaning as $Y_{24}$ in formula (2); and $a_{51}, a_{52}, a_{53}$ and $a_{54}$ each independently represents an integer 1 or 2.

4) An ink set for inkjet printing, which comprises an ink according to any one of items 1) to 3).

5) An inkjet recording material, which comprises: a substrate; and an ink receptive layer on the substrate, wherein the ink receptive layer includes a compound represented by formula (A):

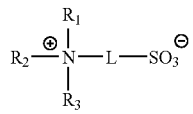

wherein $R_1$, $R_2$ and $R_3$ each represents an alkyl group, an aryl group or a heterocyclic group, and at least two of $R_1$, $R_2$ and $R_3$ are mutually connected to form a cyclic structure; L represents a divalent connecting group; and at least one of $R_1$, $R_2$, $R_3$ and L is a group having 8 or more carbon atoms.

6) The inkjet recording material according to item 5), wherein the ink receptive layer further contains a water-soluble resin.

7) The inkjet recording material according to item 6), wherein the water-soluble resin is at least one selected from the group consisting of a polyvinyl alcohol resin, a cellulose resin, a resin including an ether bond, a resin including a carbamoyl group, a resin including a carboxyl group, and a gelatin.

The water-soluble resin is preferably a polyvinyl alcohol resin.

8) The inkjet recording material according to item 6) or 7), wherein the ink receptive layer includes a crosslinking agent capable of crosslinking the water-soluble resin.

9) The inkjet recording material according to any one of items 5) to 8), wherein the ink receptive layer further includes a fine particle.

10) The inkjet recording material according to item 9), wherein the fine particle is at least one selected from the group consisting of a fine silica particle, a colloidal silica, a fine alumina particle and a pseudo-boehmite.

11) The inkjet recording material according to any one of items 5) to 10), wherein the ink receptive layer further includes a mordant agent.

12) The inkjet recording material according to any one of items 5) to 11), wherein the ink receptive layer is a cured layer formed by:

applying a first solution on a substrate to form a coating layer, the first solution containing a fine particle, a water-soluble resin, and a crosslinking agent; and applying a second solution on the coating layer, the second solution having a pH of 8 or more, so that the coating layer is cured by a crosslinking reaction to form the cured layer, wherein the appling of the second solution is performed one of:

(1) at the same time as the applying of the first solution; and (2) in the course of drying the coating layer and before the coating layer starts to show a falling drying rate.

13) An inkjet recording method, which comprises discharging a droplet of an ink according to any one of items 1) to 3) on an inkjet recording material, so as to form an image or a character.

14) An inkjet recording method, which comprises discharging a droplet of an ink on an inkjet recording material according to any one of items 5) to 12), so as to form an image or a character.

15) An inkjet recording method according to item 14), wherein at least one ink contains a betaine compound.

16) The inkjet recording method according to item 15), wherein the betaine compound is a compound represented by formula (A) according to item 5).

17) The inkjet recording method according to item 15), wherein at least one ink is an ink according to any one of items 1) to 3).

18) A method for producing an inkjet recording material, which comprises:

applying a first solution on a substrate to form a coating layer, the first solution containing a fine particle, a water-soluble resin, and a crosslinking agent; and applying a second solution on the coating layer, the second solution having a pH of 8 or more, so that the coating layer is cured by a crosslinking reaction to form a ink receptive layer, wherein the appling of the second solution is performed one of:

(1) at the same time as the applying of the first solution; and (2) in the course of drying the coating layer and before the coating layer starts to show a falling drying rate.

The present invention allows to obtain an image excellent in weather resistance, particularly in light fastness, heat resistance and ozone resistance.

The compound represented by formula (A), through an interaction with the dye, induces a change in a mordanted state or an electron state of the dye in the image receiving material, thereby exhibiting an evident effect for improving the weather resistance, particularly the ozone resistance.

DETAILED DESCRIPTION OF THE INVENTION

In the following, the present invention will be explained in detail.

The invention is characterized in that the compound represented by that the aforementioned formula (A) is included in at least one of an ink for inkjet printing and an inkjet recording material.

In addition to the compound represented by formula (A), a betaine compound other than the compound represented by formula (A) may also be contained, and, among the betaine compound, a compound containing a sulfo group is preferred.

In formula (A), $R_1$ to $R_3$ each represents an alkyl group (that may be substituted and preferably has 1 to 20 carbon atoms, such as a methyl group, an ethyl group, a propyl group, a butyl group, a hexyl group, an octyl group, a dodecyl group, a cetyl group, a stearyl group or an oleyl group), an aryl group (that may be substituted and preferably has 6 to 20 carbon atoms, such as a phenyl group, a tolyl group, a xylyl group, a naphthyl group, a cumyl group or a dodecylphenyl group), or a heterocyclic group (that may be substituted and preferably has 2 to 20 carbon atoms, such as a pyridyl group, or a quinolyl group) and may mutually be bonded to form a cyclic structure. Among these an alkyl group is particularly preferred. L represents a divalent connecting group, and preferably a divalent connecting group including an alkylene group or an arylene group as a basic constituting unit. It may also contain a hetero atom such as an oxygen atom, a sulfur atom or a nitrogen atom in a connecting main chain portion. $R_1$ to $R_3$ or L may have various substituents, for example an alkyl group (preferably with 1 to 20 carbon atoms, more preferably 1 to 12 carbon atoms and particularly preferably 1 to 8 carbon atoms, such as methyl, ethyl, iso-propyl, tert-butyl, n-octyl, n-decyl, n-hexadecyl, cyclopropyl, cyclopentyl or cyclohexyl), an alkenyl group (preferably with 2 to 20 carbon atoms, more preferably 2 to 12 carbon atoms and particularly preferably 2 to 8 carbon atoms, such as vinyl, allyl, 2-butenyl or 3-pentenyl), an alkinyl group (preferably with 2 to 20 carbon atoms, more preferably 2 to 12 carbon atoms and particularly preferably 2 to 8 carbon atoms, such as propalgyl or 3-pentinyl), an aryl group (preferably with 6 to 30 carbon atoms, more preferably 6 to 20 carbon atoms and particularly preferably 6 to 12 carbon atoms, such as phenyl, p-methylphenyl or naphthyl), an amino group (preferably with 0 to 20 carbon atoms, more preferably 0 to 12 carbon atoms and particularly preferably 0 to 6 carbon atoms, such as amino, methylamino, dimethylamino, diethylamino, diphenylamino or dibenzylamino), an alkoxy group (preferably with 1 to 20 carbon atoms, more preferably 1 to 12 carbon atoms and particularly preferably 1 to 8 carbon atoms, such as methoxy, ethoxy or butoxy), an aryloxy group (preferably with 6 to 20 carbon atoms, more preferably 6 to 16 carbon atoms and particularly preferably 6 to 12 carbon atoms, such as phenyloxy or 2-naphthyloxy), an acyl group (preferably with 1 to 20 carbon atoms, more preferably 1 to 16 carbon atoms and particularly preferably 1 to 12 carbon atoms, such as acetyl, benzoyl, formyl or pivaloyl), an alkoxycarbonyl group (preferably with 2 to 20 carbon atoms, more preferably 2 to 16 carbon atoms and particularly preferably 2 to 12 carbon atoms, such as methoxycarbonyl or ethoxycarbonyl), an aryloxycarbonyl group (preferably with 7 to 20 carbon atoms, more preferably 7 to 16 carbon atoms and particularly preferably 7 to 10 carbon atoms, such as phenyloxycarbonyl), an acyloxy group (preferably with 2 to 20 carbon atoms, more preferably 2 to 16 carbon atoms and particularly preferably 2 to 10 carbon atoms, such as acetoxy or benzoyloxy), an acylamino group (preferably with 2 to 20 carbon atoms, more preferably 2 to 16 carbon atoms and particularly preferably 2 to 10 carbon atoms, such as acetylamino or benzoylamino), an alkoxycarbonylamino group (preferably with 2 to 20 carbon atoms, more preferably 2 to 16 carbon atoms and particularly preferably 2 to 12 carbon atoms, such as methoxycarbonylamino), an aryloxycarbonylamino group (preferably with 7 to 20 carbon atoms, more preferably 7 to 16 carbon atoms and particularly preferably 7 to 12 carbon atoms, such as phenyloxycarbonylamino), a sulfonylamino group (preferably with 1 to 20 carbon atoms, more preferably 1 to 16 carbon atoms and particularly preferably 1 to 12 carbon atoms, such as methanesulfonylamino or benzenesulfonylamino), a sulfamoyl group (preferably with 0 to 20 carbon atoms, more preferably 0 to 16 carbon atoms and particularly preferably 0 to 12 carbon atoms, such as sulfamoyl, methylsulfamoyl, dimethylsulfamoyl or phenylsulfamoyl), a carbamoyl group (preferably with 1 to 20 carbon atoms, more preferably 1 to 16 carbon atoms and particularly preferably 1 to 12 carbon atoms, such as carbamoyl, methylcarbamoyl, diethylcarbamoyl or phenylcarbamoyl), an alkylthio group (preferably with 1 to 20 carbon atoms, more preferably 1 to 16 carbon atoms and particularly preferably 1 to 12 carbon atoms, such as methylthio or ethylthio), an arylthio group (preferably with 6 to 20 carbon atoms, more preferably 6 to 16 carbon atoms and particularly preferably 6 to 12 carbon atoms, such as phenylthio), a sulfonyl group (preferably with 1 to 20 carbon atoms, more preferably 1 to 16 carbon atoms and particularly preferably 1 to 12 carbon atoms, such as mesyl or tosyl), a sulfinyl group (preferably with 1 to 20 carbon atoms, more preferably 1 to 16 carbon atoms and particularly preferably 1 to 12 carbon atoms, such as methanesulfinyl or benzenesulfinyl), an ureido group (preferably with 1 to 20 carbon atoms, more preferably 1 to 16 carbon atoms and particularly preferably 1 to 12 carbon atoms, such as ureido, methylureido or phenylureido), a phosphate amide group (preferably with 1 to 20 carbon atoms, more preferably 1 to 16 carbon atoms and particularly preferably 1 to 12 carbon atoms, such as diethylphosphate amide or phenylphosphate amide), a hydroxy group, a mercapto group, a halogen atom (such as a fluorine atom, a chlorine atom, a bromine atom or an iodine atom), a cyano group, a sulfo group, a carboxyl group, a nitro group, a hydroxamic acid group, a sulfino group, a hydrazino group, an imino group, a heterocyclic group (preferably with 1 to 30 carbon atoms, and more preferably 1 to 12 carbon atoms, including for example a nitrogen atom, an oxygen atom or a sulfur atom as a hetero atom, such as imidazolyl, pyridyl, quinolyl, furyl, thienyl, piperidyl, morpholino, benzooxazolyl, benzoimidazolyl, benzothiazolyl, carbazolyl or azepinyl), or a silyl group (preferably with 3 to 40 carbon atoms, more preferably 3 to 30 carbon atoms and particularly preferably 3 to 24 carbon atoms, such as trimethylsilyl or triphenylsilyl). Such substituent may be further substituted. In case two or more substituents are present, they may be mutually the same or different. Also they may be mutually bonded to form a ring, in case such a structure is possible. Also plural betaine structures may be included through $R_1$ to $R_3$ or L.

The compound (A) (i.e., the compound represented by formula (A)) of the invention includes a group having 8 or more carbon atoms in at least one of $R_1$ to $R_3$ and L. In particular, a long-chain alkyl group with 8 or more carbon atoms is preferably included in at least one of $R_1$ to $R_3$. L is preferably a non-substituted alkylene group (preferably an alkylene group with 2 to 4 carbon atoms).

A preferred combination of $R_1$ to $R_3$ and L is that at least one of $R_1$ to $R_3$ is a long-chain alkyl group with 8 or more carbon atoms and L is a non-substituted alkylene group with 2 to 4 carbon atoms.

Preferred examples of the compound (A) of the invention are shown in the following, but the invention is naturally not limited to such examples.

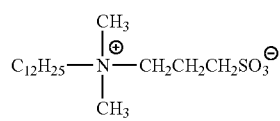
X-1

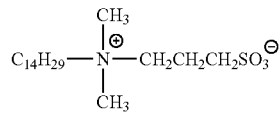
X-2

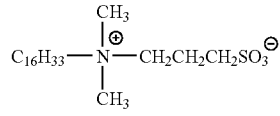
X-3

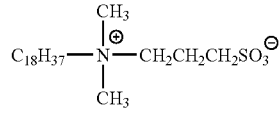
X-4

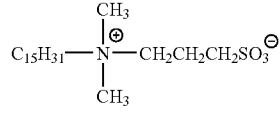
X-5

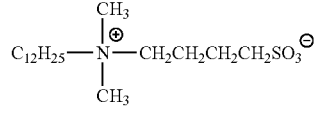
X-6

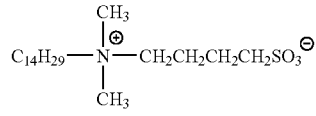
X-7

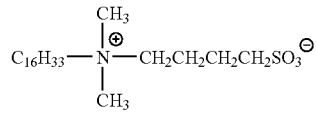
X-8

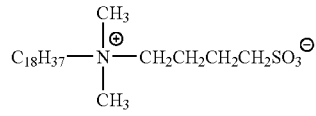
X-9

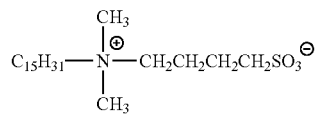
X-10

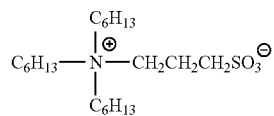
X-11

-continued

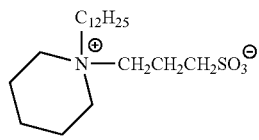
X-12

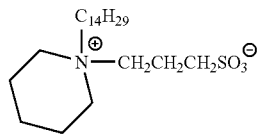
X-13

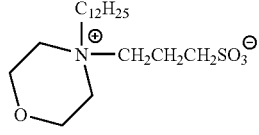
X-14

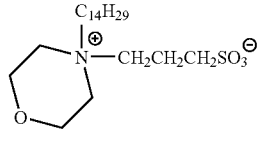
X-15

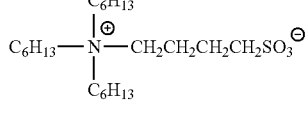
X-16

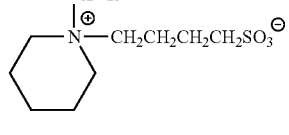
X-17

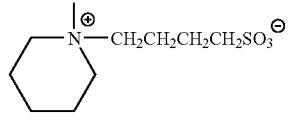
X-18

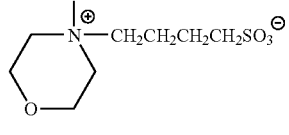
X-19

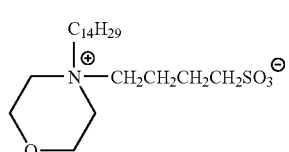
X-20

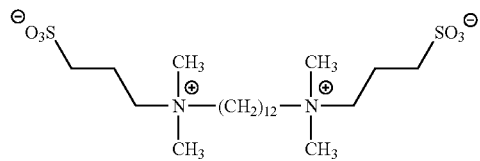
X-21

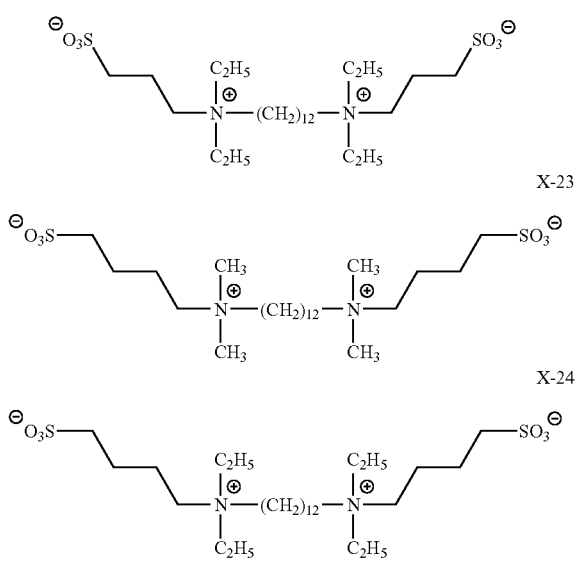

The compound (A) of the invention is contained preferably in an amount of 0.01 to 20 mass % in the ink, more preferably 0.1 to 10 mass % and further preferably 0.5 to 5 mass %.

An ink to be used in an ink set of the invention is preferably formed by dissolving a dye in water or an organic solvent. In particular it is preferably an ink of aqueous solution type utilizing a water-soluble dye.

The compound of formula (A) of the invention is contained, on an inkjet recording sheet (recording material), in an amount preferably of 0.0001 to 10 g/m², more preferably 0.001 to 5 g/m², and particularly preferably 0.01 to 2 g/m². In case of employing coating liquids for two layers for the preparation of the inkjet recording sheet, the compound may be added to either layer, but is preferably added in an uppermost layer in consideration of the coating property.

In case of including the compound of formula (A) of the invention in the ink receptive layer, it may be added in a state with an increased affinity to water by mixing a water-soluble organic solvent, for example an alcohol (such as methanol, ethanol, isopropyl alcohol, ethylene glycol, diethylene glycol, diethylene glycol monobutyl ether, polyethylene glycol, polypropylene glycol, glycerin, diglycerin, trimethylolpropane, or trimethylolbutane), an ether (such as tetrahydrofuran or dioxane), an amide (such as dimethylformamide, dimethylacetamide, or N-methylpyrrolidone), or a ketone (such as acetone).

In case the compound of formula (A) of the invention does not have a sufficient solubility in water, it is also possible to add a hydrophobic organic solvent, for example an ester (such as ethyl acetate, dioctyl adipate, butyl phthalate, methyl stearate, or tricresyl phosphate), an ether (such as anisole, hydroxyethoxybenzene, or hydroquinone dibutyl ether), a hydrocarbon (such as toluene, xylene, or diisopropylnaphthalene), an amide (such as N-butylbenzenesulfonamide, or stearylamide), an alcohol (such as 2-ethylhexyl alcohol, benzyl alcohol or phenethyl alcohol), a ketone (such as hydroxyacetophenone, benzophenone, or cyclohexanone), or the aforementioned water-soluble organic solvent in a mixture. The addition may be executed in a form of oil drops, latex, solid dispersion or polymer dispersion.

In the following, there will be given an explanation on a dye to be included in the ink for inkjet printing of the present invention.

The dye to be employed in the present invention, in consideration of fastness or fastness to ozone gas, preferably has an oxidation potential more higher than 1.0 V (vs. SCE), more preferably higher than 1.1 V (vs. SCE) and particularly preferably higher than 1.2 V (vs. SCE). As a type of the dye, an azo dye or a metal chelate dye such, as a phthalocyanine dye, satisfying the aforementioned conditions, is particularly preferred.

The oxidation potential ($E_{OX}$) can be easily measured by those skilled in the art. Method of such measurement is described for example by P. Delahay, "New Instrumental Methods in Electrochemistry" (Interscience Publishers, 1954), A. J. Bard et al., "Electrochemical Methods" (John Wiley & Sons, 1980), and Akira Fujishima et al., "*Denki Kagaku Sokuteiho*", (Gihodo-Shuppansha, 1984).

More specifically, the oxidation potential is measured by dissolving a measured sample by $1\times10^{-2}$ to $1\times10^{-6}$ mol/liter in a solvent such as dimethylformamide or acetonitrile containing a supporting electrolyte such as sodium perchlorate or tetrapropylammonium perchlorate and by cyclic voltammetry as a value to SCE (saturated calomel electrode). This value may be deviated by about several tens of millivolts by the influence of liquid-to-liquid potential difference or liquid resistance of sample solution, but the reproducibility of potential can be ensured by employing a standard sample (for example hydroquinone).

For defining the potential uniquely, the present invention defines the oxidation potential of dye by a measured value (vs. SCE) in dimethylformamide (with a dye concentration of 0.001 mol/dm³) containing tetrapropylammonium perchlorate as the supporting electrolyte at 0.1 mol/dm³.

The value $E_{OX}$ indicates ease of electron transfer from the sample to the electrode, and a larger value (more higher oxidation potential) means that the electron is more difficult to transfer from the sample to the electrode, or the sample is less likely to be oxidized. In relation to the structure of the compound, the oxidation potential becomes higher by the introduction of an electron attracting group, or lower by the introduction of an electron donating group. In the invention, in order to reduce reactivity with ozone which is an electron attracting agent, it is preferable to introduce an electron attracting group in the dye skeleton thereby realizing a higher oxidation potential.

Among the dyes employed in the present invention, one to be used for forming a color image is preferably satisfactory in fastness or in color hue, and preferably has a satisfactory cut-off of the absorption spectrum at the longer wavelength side. For this reason, with respect to $\lambda_{max}$ for example in case of a yellow dye, the dye preferably has $I(\lambda_{max}+70 \text{ nm})/I(\lambda_{max})$, namely a ratio of absorbance $I(\lambda_{max}+70 \text{ nm})$ at a wavelength of $\lambda_{max}+70$ nm to absorbance $I(\lambda_{max})$ at a wavelength of $\lambda_{max}$, of 0.2 or less, more preferably 0.1 or less.

On the other hand, a dye for forming a black image preferably covers an as wide spectral range as possible, and a dye with a half-peak range of 100 nm or larger is preferably employed.

(Yellow Dye)

In the following, a yellow dye useful in the invention will be explained in detail.

A yellow dye to be employed in the invention, in consideration of fastness or fastness to ozone gas, preferably has an oxidation potential higher than 1.0 V (vs. SCE), more preferably higher than 1.1 V (vs. SCE) and particularly preferably higher than 1.15 V (vs. SCE). As a type of the dye, an azo dye satisfying the aforementioned conditions is particularly preferred.

In the invention, in order to reduce reactivity with ozone which is an electron attracting agent, it is preferable to introduce an electron attracting group in the yellow dye skeleton thereby realizing a higher oxidation potential.

A dye to be used in the invention is preferably satisfactory in fastness or in color hue, and particularly preferably has a satisfactory cut-off of the absorption spectrum at the longer wavelength side. For this reason, a yellow dye preferably has $\lambda_{max}$ from 390 to 470 nm, and has $I(\lambda_{max}+70 \text{ nm})/I(\lambda_{max})$, namely a ratio of absorbance $I(\lambda_{max}+70 \text{ nm})$ at a wavelength of $\lambda_{max}+70$ nm to absorbance $I(\lambda_{max})$ at a wavelength of $\lambda_{max}$, of 0.20 or less, more preferably 0.15 or less and further preferably 0.10 or less. The absorption wavelength and the absorbance defined herein are values obtained in a solvent (water of ethyl acetate).

As a dye satisfying such oxidation potential and absorption characteristics, there is preferred a dye represented by the following formula (1):

$$(A_{11}\text{-}N\!=\!N\text{---}B_{11})_n\text{-}L$$

wherein $A_{11}$ and $B_{11}$ each independently represents a heterocyclic group that may be substituted. Such heterocycle is preferably a 5- or 6-membered heterocycle, may have a single ring structure or a poly-ring structure in which two or more rings are condensed, and may be an aromatic or non-aromatic heterocycle. A hetero atom constituting the heterocycle is preferably an N, O or S atom. n represents an integer selected from 1 and 2, preferably 2. L represents a hydrogen atom, a monovalent substituent, a single bond or a divalent connecting group. However, in case n represents 1, L represents a hydrogen atom or a monovalent substituent and $A_{11}$ and $B_{11}$ are both monovalent heterocyclic groups. In case n represents 2, L represents a mere single bond or a divalent connecting group, $A_{11}$ represents a monovalent heterocyclic group and $B_{11}$ is a divalent heterocyclic group.

In case L is a hydrogen atom or a monovalent substituent, L may be bonded to $A_{11}$ or $B_{11}$ at an arbitrary position. In case L is a single bond or a divalent connecting group, L may be bonded to $A_{11}$ or $B_{11}$ at an arbitrary position but preferably bonded to a carbon atom or a hetero atom (preferably a nitrogen atom) constituting the ring of the heterocyclic group $A_{11}$ or $B_{11}$.

In the foregoing formula (1), the heterocycle represented by $A_{11}$ is preferably 5-pyrazolone, pyrazole, triazole, oxazolone, isooxazolone, barbituric acid, pyridone, pyridine, rhodanine, pyrazolidinedion, pyrazolopyridone, Meldrum's acid or condensed heterocycles in which such heterocycle is condensed with an aromatic hydrocarbon ring or a heterocycle. Among these, 5-pyrazolone, 5-aminopyrazole, pyridone, 2,6-diaminopyridine or pirazoloazole is preferable, and 5-aminopyrazole, 2-hydroxy-6-pyridone, or pyrazolotriazole is particularly preferable.

The heterocycle represented by $B_{11}$ can be pyridine, pyradine, pyrimidine, pyridazine, triazine, quinoline, isoquinoline, quinazoline, cinnoline, phthalazine, quinoxaline, pyrole, indole, furan, benzofuran, thiophene, benzothiophene, pirazole, imidazole, benzimidazole, triazole, oxazole, isoxazole, benzoxazole, thiazole, benzothiazole, isothiazole, benzisothiazole, thiadiazole, benzisoxazole, pyrrolidine, piperidine, piperadine, imidazolidine, or thiazoline. Among these, preferred is pyridine, quinoline, thiophene, benzothiophene, pirazole, imidazole, benzimidazole, triazole, oxazole, isoxazole, benzoxazole, thiazole, benzothiazole, isothiazole, benzisothiazole, thiadiazole, or benzisoxazole, and more preferred is quinoline, thiophene, pirazole, thiazole, benzoxazole, benzisoxazole, isothiazole, imidazole, benzothiazole, or thiadiazole, and particularly preferred is pirazole, benzothiazole, benzoxale, imidazole, 1,2,4-thiadiazole or 1,3,4-thiadiazole.

Examples of a substituent on $A_{11}$ and $B_{11}$ include a halogen atom, an alkyl group, a cycloalkyl group, an aralkyl group, an alkenyl group, an alkinyl group, an aryl group, a heterocyclic group, a cyano group, a hydroxy group, a nitro group, an alkoxy group, an aryloxy group, a silyloxy group, a heterocyclic oxy group, an acyloxy group, a carbamoyloxy group, an alkoxycarbonyloxy group, an aryloxycarbonyloxy group, an amino group, an acylamino group, an aminocarbonylamino group, an alkoxycarbonylamino group, an aryloxycarbonylamino group, a sulfamoylamino group, an alkyl- or aryl-sulfonylamino group, a mercapto group, an alkylthio group, an arylthio group, a heterocyclic thio group, a sulfamoyl group, an alkyl- or aryl-sulfinyl group, an alkyl- or aryl-sulfonyl group, an acyl group, an aryloxycarbonyl group, an alkoxycarbonyl group, a carbamoyl group, an imido group, a phosphino group, a phosphinyl group, a phosphinyloxy group, a phosphinylamino group, a silyl group and a following ionic hydrophilic group.

A monovalent substituent represented by L can be the aforementioned substituent on $A_{11}$ and $B_{11}$ or the following ionic hydrophilic group. Also a divalent connecting group represented by L is an alkylene group, an arylene group, a heterocyclic residue, —CO—, —$SO_n$— (n being 0, 1 or 2), —NR— (R representing a hydrogen atom, an alkyl group or an aryl group), —O—, or a divalent group formed by combining these connecting groups, and such group may further have a substituent same as those for $A_{11}$ and $B_{11}$ or a following ionic hydrophilic group.

The dye of formula (1) preferably has an anionic dissociable group within the molecule, and the anionic dissociable group preferably includes at least an ionic hydrophilic group. Examples of the ionic hydrophilic group includes a sulfo group, a carboxyl group, a phosphono group and a quaternary ammonium group. The ionic hydrophilic group is preferably a carboxyl group, a phosphono group or a sulfo group, particularly a carboxyl group or a sulfo group. In particular, it is most preferable that at least one is a carboxyl group. The carboxyl group, phosphono group or sulfo group may be in a state of a salt, and a counter ion forming the salt can be, for example ammonium ion, an alkali metal ion (such as lithium ion, sodium ion, or potassium ion), or an organic ion (such as tetramethyl ammonium ion, tetramethyl guanidium ion, or tetramethyl phosphonium ion), among which most preferred is an alkali metal ion.

Among the dyes represented by formula (1), there is preferred a dye in which a portion $A_{11}$-N=N—$B_{11}$ corresponds to a formula (Y2), (Y3) or (Y4).

formula (Y2):

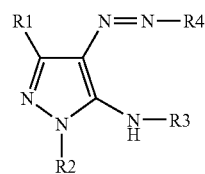

In formula (Y2), R1 and R3 each represents hydrogen atom, a cyano group, an alkyl group, a cycloalkyl group, an aralkyl group, an alkoxy group, an alkylthio group, an arylthio group, an aryl group or an ionic hydrophilic group; R2 represents a hydrogen atom, an alkyl group, a cycloalkyl group, an aralkyl group, a carbamoyl group, an acyl group, an aryl group or a heterocyclic group; and R4 represents a heterocyclic group.

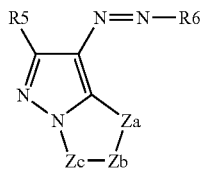

formula (Y3)

In formula (Y3), R5 represents a hydrogen atom, a cyano group, an alkyl group, a cycloalkyl group, an aralkyl group, an alkoxy group, an alkylthio group, an arylthio group, an aryl group or an ionic hydrophilic group; Za represents —N=, —NH—, or —C(R11)=; Zb and Zc each independently represents —N= or —C(R11)=; R11 represents a hydrogen atom or a non-metal substituent; and R6 represents a heterocyclic group.

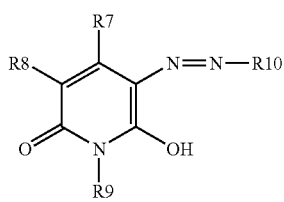

formula (Y4)

In formula (Y4), R7 and R9 each independently represents a hydrogen atom, a cyano group, an alkyl group, a cycloalkyl group, an aralkyl group, an aryl group, an alkylthio group, an arylthio group, an alkoxycarbonyl group, a carbamoyl group or an ionic hydrophilic group; R8 represents a hydrogen atom, a halogen atom, an alkyl group, an alkoxy group, an aryl group, an aryloxy group, a cyano group, an acylamino group, a sulfonylamino group, an alkoxycarbonylamino group, an ureido group, an alkylthio group, an arylthio group, an alkoxycarbonyl group, a carbamoyl group, a sulfamoyl group, a sulfonyl group, an acyl group, an amino group, a hydroxy group or an ionic hydrophilic group; and R10 represents a heterocyclic group.

In formulae (Y2), (Y3) and (Y4), the alkyl group represented by R1, R2, R3, R5, R7, R8 and R9 can be an alkyl group having a substituent or a non-substituted alkyl group. Such alkyl group is preferably an alkyl group with 1 to 20 carbon atoms. Examples of such substituent include a hydroxyl group, an alkoxy group, a cyano group, a halogen atom and an ionic hydrophilic group. Examples of the aforementioned alkyl group include methyl, ethyl, butyl, isopropyl, t-butyl, hydroxyethyl, methoxyethyl, cyanoethyl, trifluoromethyl, 3-sulfopropyl and 4-sulfobutyl.

The cycloalkyl group represented by R1, R2, R3, R5, R7, R8 and R9 can be a cycloalkyl group having a substituent and a non-substituted cycloalkyl group. Such cycloalkyl group is preferably a cycloalkyl group with 5 to 12 carbon atoms. Examples of such substituent include an ionic hydrophilic group. Examples of the cycloalkyl group include a cyclohexyl group.

The aralkyl group represented by R1, R2, R3, R5, R7, R8 and R9 can be an aralkyl group having a substituent or a non-substituted aralkyl group. Such aralkyl group is preferably an aralkyl group with 7 to 20 carbon atoms. Examples of such substituent include an ionic hydrophilic group. Examples of the aralkyl group include benzyl and 2-phenethyl.

The aryl group represented by R1, R2, R3, R5, R7, R8 and R9 can be an aryl group having a substituent or a non-substituted aryl group. Such aryl group is preferably an aryl group with 6 to 20 carbon atoms. Examples of such substituent include an alkyl group, an alkoxy group, a halogen atom, an alkylamino group, an ionic hydrophilic group. Examples of the aryl group include phenyl, p-tolyl, p-methoxyphenyl, o-chlorophenyl and m-(3-sulfopropylamino)phenyl.

The alkylthio group represented by R1, R2, R3, R5, R7, R8 and R9 can be an alkylthio group having a substituent or a non-substituted alkylthio group. Such alkylthio group is preferably an alkylthio group with 1 to 20 carbon atoms. Examples of such substituent include an ionic hydrophilic group. Examples of the alkylthio group include methylthio and ethylthio.

The arylthio group represented by R1, R2, R3, R5, R7, R8 and R9 can be an arylthio group having a substituent and a non-substituted arylthio group. Such arylthio group is preferably an arylthio group with 6 to 20 carbon atoms. Examples of such substituent include an alkyl group and an ionic hydrophilic group. Examples of the arylthio group include phenylthio and p-tolylthio.

The heterocyclic group represented by $R^2$ and by $R^{22}$ to be explained later is preferably a 5- or 6-membered heterocyclic group that may further have a condensed ring structure. A hetero atom constituting the heterocycle is preferably N, S or O. It may be an aromatic or non-aromatic heterocycle. The heterocycle may be further substituted, and examples of the substituent are same as those for the aforementioned aryl group. The heterocycle is preferably a 6-membered nitrogen-containing heterocycle, and particularly preferable examples include triazine, pyrimidine, and phthalazine.

The halogen atom represented by R8 can be a fluorine atom, a chlorine atom or a bromine atom.

The alkoxy group represented by R1, R3, R5 and R8 can be an alkoxy group having a substituent or a non-substituted alkoxy group. Such alkoxy group is preferably an alkoxy group with 1 to 20 carbon atoms. Examples of such substituent include a hydroxyl group and an ionic hydrophilic group. Examples of the alkoxy group include methoxy, ethoxy, isopropoxy, methoxyethoxy, hydroxyethoxy and 3-carboxypropoxy.

The aryloxy group represented by R8 can be an aryloxy group having a substituent or a non-substituted aryloxy group. Such aryloxy group is preferably an aryloxy group with 6 to 20 carbon atoms. Examples of such substituent include an alkoxy group, and an ionic hydrophilic group. Examples of the aryloxy group include phenoxy, p-methoxyphenoxy and o-methoxyphenoxy. The acylamino group represented by R8 can be an acylamino group having a substituent or a non-substituted acylamino group. Such acylamino group is preferably an acylamino group with 2 to 20 carbon atoms. Examples of such substituent include an ionic hydrophilic group. Examples of the acylamino group include acetamide, propionamide, benzamide and 3,5-disulfobenzamide.

The sulfonylamino group represented by R8 can be a sulfonylamino group having a substituent or a non-substituted sulfonylamino group. Such sulfonylamino group is preferably a sulfonylamino group with 1 to 20 carbon atoms. Examples of the sulfonylamino group include methylsulfonylamino, and ethylsulfonylamino.

The alkoxycarbonylamino group represented by R8 can be an alkoxycarbonylamino group having a substituent or a non-substituted alkoxycarbonylamino group. Such alkoxycarbonylamino group is preferably an alkoxycarbonylamino group with 2 to 20 carbon atoms. Examples of such substituent include an ionic hydrophilic group. Examples of the alkoxycarbonylamino group include ethoxycarbonylamino.

The ureido group represented by R8 can be an ureido group having a substituent or a non-substituted ureido group. Such ureido group is preferably an ureido group with 1 to 20 carbon atoms. Examples of such substituent include an alkyl group and an aryl group. Examples of the ureido group include 3-methylureido, 3,3-dimethylureido and 3-phenylureido.

The alkoxycarbonyl group represented by R7, R8 and R9 can be an alkoxycarbonyl group having a substituent or a non-substituted alkoxycarbonyl group. Such alkoxycarbonyl group is preferably an alkoxycarbonyl group with 2 to 20 carbon atoms. Examples of such substituent include an ionic hydrophilic group. Examples of the aforementioned alkoxycarbonyl group include methoxycarbonyl and ethoxycarbonyl.

The carbamoyl group represented by R2, R7, R8 and R9 can be a carbamoyl group having a substituent or a non-substituted carbamoyl group. Examples of such substituent include an alkyl group. Examples of the carbamoyl group include methylcarbamoyl and dimethylcarbamoyl.

The sulfamoyl group represented by R8 can be a sulfamoyl group having a substituent or a non-substituted sulfamoyl group. Examples of such substituent include an alkyl group. Examples of the sulfamoyl group include dimethylsulfamoyl and di-(2-hydroxyethyl)sulfamoyl.

The sulfonyl group represented by R8 can be an alkylsulfonyl group, an arylsulfonyl group or a heterocyclic sulfonyl group, which may further have a substituent. Examples of such substituent include an ionic hydrophilic group. Examples of the sulfonyl group include methylsulfonyl and phenylsulfonyl.

The acyl group represented by R2 and R8 can be an acyl group having a substituent or a non-substituted acyl group. Such acyl group is preferably an acyl group with 1 to 20 carbon atoms. Examples of such substituent include an ionic hydrophilic group. Examples of the acyl group include acetyl and benzoyl.

The amino group represented by R8 can be an amino group having a substituent or a non-substituted amino group. Examples of such substituent include an alkyl group, an aryl group and a heterocyclic group. Examples of the amino group include methylamino, diethylamino, anilino and 2-chloroanilino.

The heterocyclic group represented by R4, R6 and R10 can be same as the heterocyclic group $B_{11}$ that may be substituted in formula (1), and preferred examples, more preferred examples and particularly preferred examples are also same. Examples of the substituent include an alkyl group with 1 to 12 carbon atoms, an aryl group, an alkyl- or aryl-thio group, a halogen atom, a cyano group, a sulfamoyl group, a sulfonamino group, a carbamoyl group and an acylamino group, in which the alkyl group, aryl group etc. mentioned above may further have a substituent.

In the foregoing formula (Y3), Za represents —N═, —NH— or —C(R11)═, Zb and Zc each independently represents —N═ or —C(R11)═, and R11 represents a hydrogen atom or a non-metal substituent. A non-metal substituent represented by R11 is preferably a cyano group, a cycloalkyl group, an aralkyl group, an aryl group, an alkylthio group, an arylthio group or an ionic hydrophilic group. Each of the aforementioned substituents is similar to each substituent represented by R1, and preferred examples are also similar.

Examples of heterocycles formed by two 5-membered rings and contained in the aforementioned formula (Y3) are shown in the following.

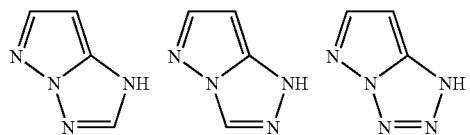

In the foregoing substituents which may further have a substituent, examples of such substituent can be those of the substituent that can be substituted on $A_{11}$ and $B_{11}$ in the foregoing formula (1).

The dye represented by formulae (Y2) to (Y4) preferably has at least an ionic hydrophilic group in the molecule. There are included dyes in which at least either of R1, R2, R3, R5, R7, R8 and R9 in formulae (Y2) to (Y4) is an ionic hydrophilic group, and dye in which R1 to R11 in formulae (Y2) to (Y4) have an ionic hydrophilic group as a substituent.

Among formulae (Y2), (Y3) and (Y4), formula (Y2) is preferred, and particularly preferred is a dye represented by a following formula (Y2-1).

formula (Y2-1):

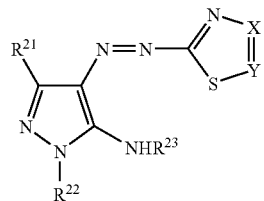

In formula (Y2-1), $R^{21}$ and $R^{23}$ each represents a hydrogen atom, an alkyl group, a cycloalkyl group, an aralkyl group, an alkoxy group or an aryl group; $R^{22}$ represents a hydrogen atom, an aryl group or a heterocyclic group; either of X and Y represents a nitrogen atom while the other represents —$CR^{24}$; $R^{24}$ represents a hydrogen atom, a halogen atom, a cyano group, an alkyl group, an alkylthio group, an alkylsulfonyl group, an alkylsulfinyl group, an alkyloxycarbonyl group, a carbamoyl group, an alkoxy group, an aryl group, an arylthio group, an arylsulfonyl group, an arylsulfinyl group, an aryloxy group or an acylamino group; and each substituent may be further substituted.

In formula (Y2-1), a dye having an ionic hydrophilic group is preferable.

The dye preferred in the present invention includes those described in Japanese patent Application Nos. 2002-229222, 2003-286844 (based on Japanese patent Application No. 2002-229222), 2002-211683, and 2002-124832, JP-A Nos. 2003-128953 and 2003-41160, and compounds shown in the following are particularly preferable. However, the dyes usable in the invention are not limited to these examples. These compounds can be synthesized by referring to Japanese patent Application Nos. 2002-229222, 2003-286844, 2002-211683, and 2002-124832, JP-A Nos. 2003-128953, 2003-41160, 2-24191 and 2001-279145.

Specific examples of the preferred dyes employed in the invention will be shown in the following, but the dyes usable in the present invention are not limited to the following specific examples.

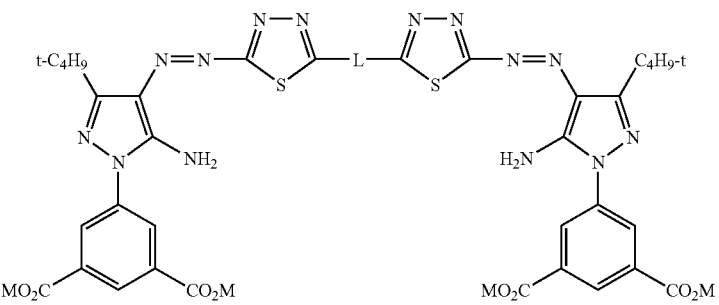
| Dye | L | M |
|---|---|---|
| 1 | —SCH₂CH₂S— | Na |
| 2 | —SCH₂CH₂S— | Li |
| 3 | —SCH₂CH₂CH₂S— | Na |
| 4 | —SCH₂CH₂CH₂S— | K |
| 5 | —SCH₂CH₂CH₂S— | Li |
| 6 | —SCH₂CH₂CH₂S— | NH₄ |
| 7 | —SCH₂CH₂CH₂S— | HN(Et)₃ |
| 8 | —SCH₂CH(CH₃)S— | Na |
| 9 | —SCH₂CH₂OCH₂CH₂S— | Na |
| 10 | —SCH₂CH(OH)CH₂S— | Na |
| 11 | —SCH₂CH(CH₂OH)S— | Na |
| 12 | —SCH₂CH(CO₂Na)S— | Na |
| 13 | *m*-phenylene | Na |
| 14 | -C₆H₄-NHCONH-C₆H₄- | Na |
| Dye | Ar | L | R |
|---|---|---|---|
| 15 | 4-methyl-1,2-bis(CO₂Na)phenyl | —SCH₂CH₂CH₂S— | t-C₄H₉— |

-continued
| | | | |
|---|---|---|---|
| 16 | 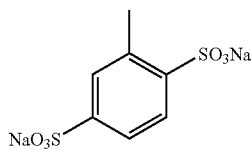 | —SCH$_2$CH$_2$CH$_2$S— | t-C$_4$H$_9$— |
| 17 | 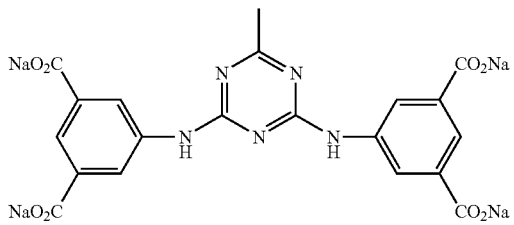 | —SCH$_2$CH$_2$CH$_2$S— | t-C$_4$H$_9$— |
| 18 | 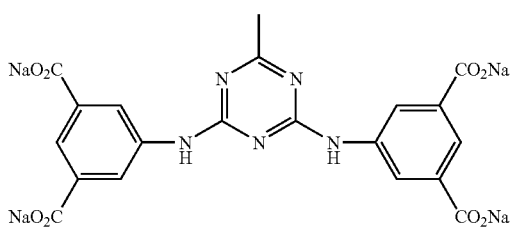 | —SCH$_2$CH$_2$S— | t-C$_4$H$_9$— |
| 19 | 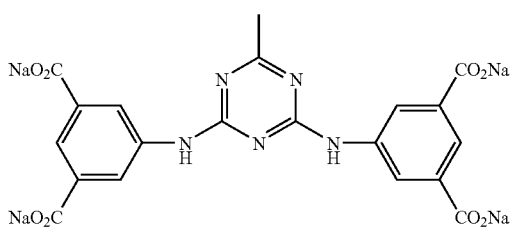 | —CH$_2$CH$_2$CH$_2$CH$_2$— | t-C$_4$H$_9$— |
| 20 | 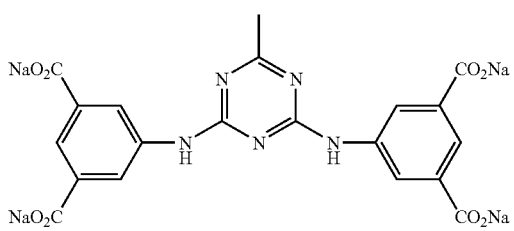 | 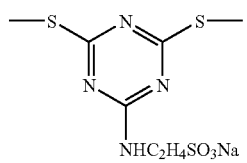 | t-C$_4$H$_9$— |
| 21 | 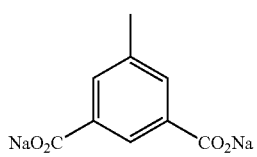 | —SCH$_2$CH$_2$CH$_2$S— | Ph |
| 22 | 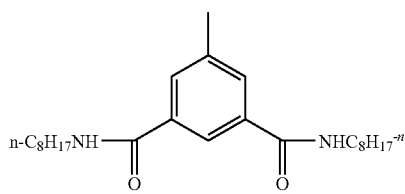 | —SCH$_2$CH$_2$CH$_2$S— | t-C$_4$H$_9$— |
| 23 | 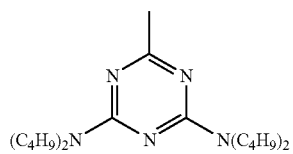 | —SCH$_2$CH$_2$S— | t-C$_4$H$_9$— |

-continued
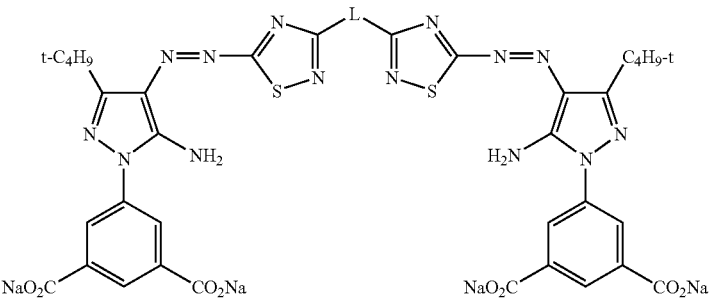
| Dye | L |
|---|---|
| 24 | —SCH$_2$CH$_2$CH$_2$S— |
| 25 | 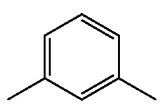 |
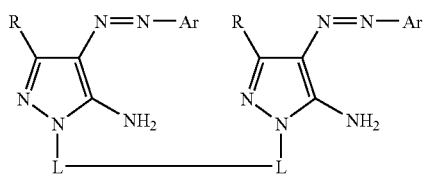
| Dye | Ar | L | R |
|---|---|---|---|
| 26 | 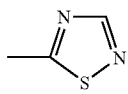 | 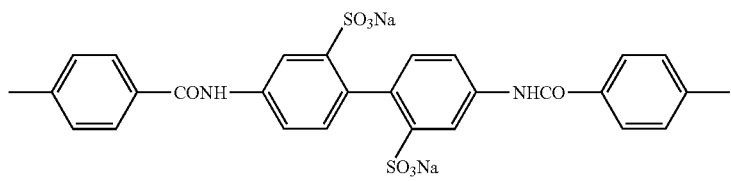 | t-C$_4$H$_9$— |
| 27 | 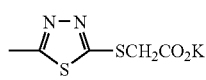 | 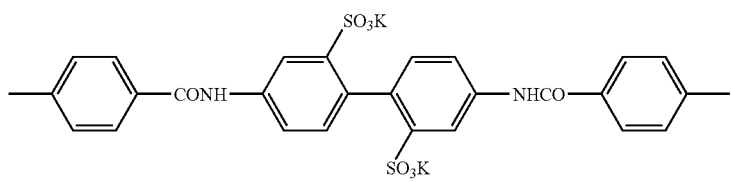 | t-C$_4$H$_9$— |
| 28 | 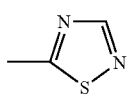 | 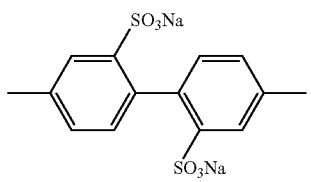 | t-C$_4$H$_9$— |

-continued

| | | | |
|---|---|---|---|
| 29 | 5-methyl-1,3,4-thiadiazole | stilbene-2,2'-disulfonate disodium with methyl substituents | t-C$_4$H$_9$— |
| 30 | 2-methylthio-5-methyl-1,3,4-thiadiazole | 4,4'-bis(4-methylbenzamido)biphenyl-2,2',4-trisulfonate tripotassium | t-C$_4$H$_9$— |
| 31 | 2-(n-hexylthio)-5-methyl-1,3,4-thiadiazole | 4,4'-dimethylbiphenyl | t-C$_4$H$_9$— |
| 32 | 2-methyl-1,3,4-thiadiazole | bis(dibutylamino-methyl-triazinyl)-ethylenediamine | t-C$_4$H$_9$— |
| 33 | 2-methyl-1,3,4-thiadiazole | bis[(3,5-dicarboxyphenylamino)-methyl-triazinyl]-ethylenediamine, tetrapotassium salt | t-C$_4$H$_9$— |
| 34 | 2-methylthio-5-methyl-1,3,4-thiadiazole | hexasodium salt of bis-triazinyl-benzene derivative | t-C$_4$H$_9$— |
| 35 | 2-methyl-1,3,4-thiadiazole | bis[bis(carboxymethyl)amino-methyl-triazinyl]-ethylenediamine, tetrasodium salt | t-C$_4$H$_9$— |

-continued
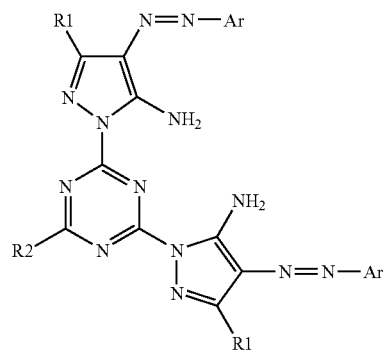
| Dye | Ar | R1 | R2 |
|---|---|---|---|
| 36 | 5-methyl-1,2,4-thiadiazol-3-yl | t-C$_4$H$_9$— | —NH-(3,5-di-CO$_2$K-phenyl) |
| 37 | 5-methyl-1,2,4-thiadiazol-3-yl, SC$_2$H$_4$CO$_2$Na | t-C$_4$H$_9$— | —NHC$_2$H$_4$SO$_3$Na |
| 38 | 5-methyl-1,3,4-thiadiazol-2-yl | Ph | —NHC$_{12}$H$_{25}$-$n$ |
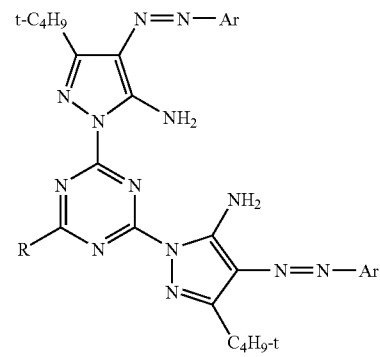
| Dye | Ar | R |
|---|---|---|
| 39 | 5-methyl-1,2,4-thiadiazol-3-yl | —NH-(3,5-di-SO$_3$Na-phenyl) |
| 40 | 5-methyl-3-phenyl-1,2,4-thiadiazol-... | —NH-(3,5-di-CO$_2$K-phenyl) |

-continued

| Dye | Ar | R |
|---|---|---|
| 41 | 5-methyl-1,3,4-thiadiazol-2-yl-S-CH$_2$CO$_2$Na | —NHC$_2$H$_4$SO$_3$Na |
| 42 | 2-methyl-4,5-dicyano-1-(CH$_2$CO$_2$Na)-imidazol-yl | —NHC$_2$H$_4$SO$_3$Na |
| 43 | 5-methyl-1,3,4-thiadiazol-2-yl-S-CH$_2$CO$_2$Na | —NH—(3,5-bis(CO$_2$Na)phenyl) |
| 44 | 5-methyl-1,3,4-thiadiazol-2-yl-S-CH(CO$_2$Na)-CH$_2$CO$_2$Na | —NH—(3,5-bis(CO$_2$Na)phenyl) |
| 45 | 3-phenyl-5-methyl-1,2,4-thiadiazol-yl | —N(CH$_2$CH(C$_2$H$_5$)C$_4$H$_9$-$n$)$_2$ |

Structure (Dyes 46–48):

t-C$_4$H$_9$—C(=N—N(Triazine))—C(N=N—Ar)=C(NH$_2$)— pyrazole with N1 attached to 4,6-di-R-1,3,5-triazin-2-yl

| Dye | Ar | R |
|---|---|---|
| 46 | 5-methyl-1,2,4-thiadiazol-3-yl | —NHC$_2$H$_4$SO$_3$Na |
| 47 | 5-methyl-1,2,4-thiadiazol-3-yl | —NH—(3,5-bis(CO$_2$K)phenyl) |
| 48 | 5-methyl-1,2,4-thiadiazol-3-yl | —NH—(2,5-bis(SO$_3$K)phenyl) |

-continued
| | | |
|---|---|---|
| 49 | 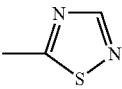 | —N(CH₂CO₂Na)₂ |
| 50 | 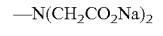 | 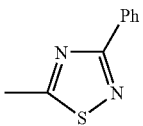 |
| 51 | 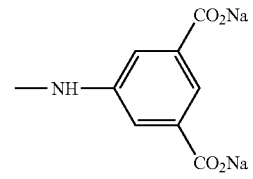 | 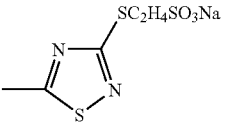 |
| 52 | 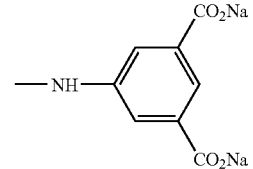 | 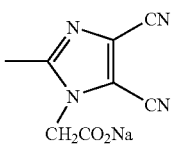 |
| 53 | 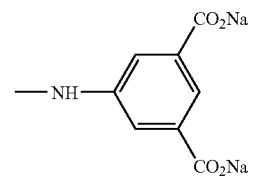 | 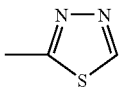 |
| 54 | 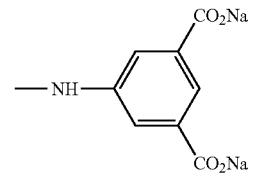 | 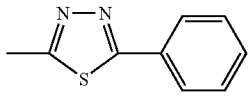 |
| 55 | 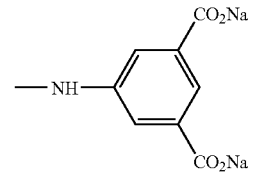 | 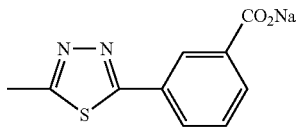 |
| 56 | 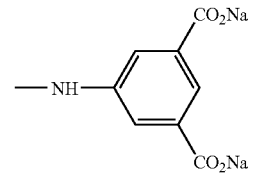 | 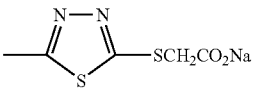 |
| 57 | 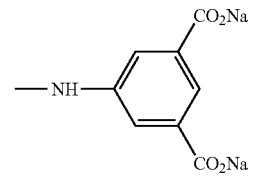 | 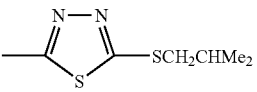 |

-continued
| | | | |
|---|---|---|---|
| 58 | 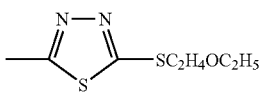 | 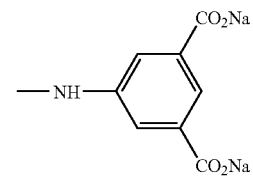 | |
| 59 | 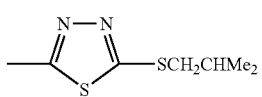 | 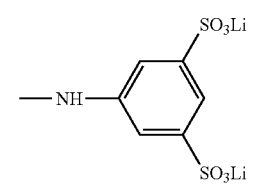 | |
| 60 | 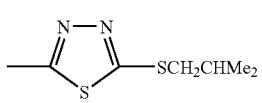 | 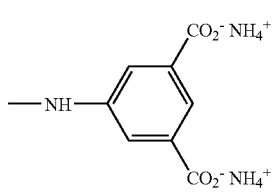 | |
| 61 | 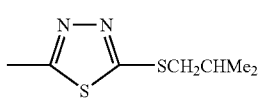 | —NHC$_8$H$_{17}$-n | |
| 62 | 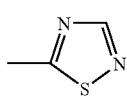 | 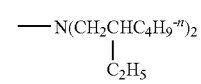 | |
| 63 | 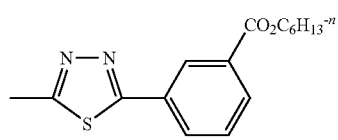 | —NHC$_6$H$_{13}$-$^n$ | |
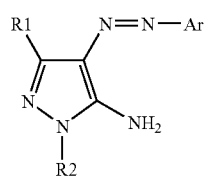
| Dye | Ar | R1 | R2 |
|---|---|---|---|
| 64 | 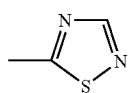 | t-C$_4$H$_9$— | 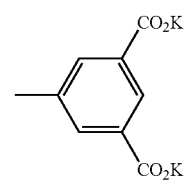 |

-continued
| | | | |
|---|---|---|---|
| 65 | 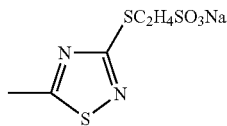 | 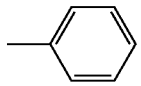 | 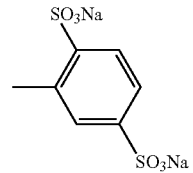 |
| 66 | 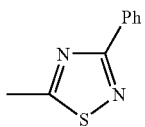 | t-C$_4$H$_9$— | 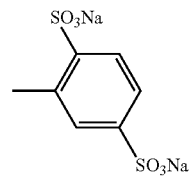 |
| 67 | 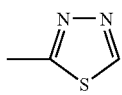 | t-C$_4$H$_9$— | 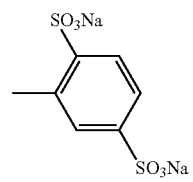 |
| 68 | 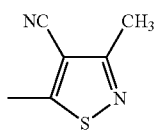 | t-C$_4$H$_9$— | 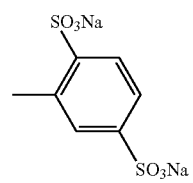 |
| 69 | 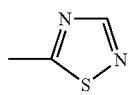 | t-C$_4$H$_9$— | 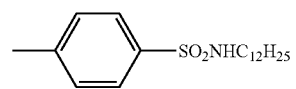 |
| 70 | 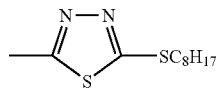 | t-C$_4$H$_9$— | 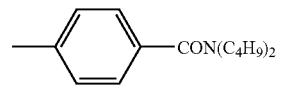 |
| 71 | 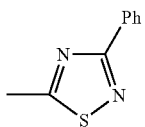 | t-C$_4$H$_9$— | 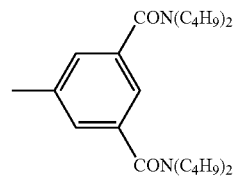 |
| 72 | 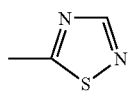 | t-C$_4$H$_9$— | 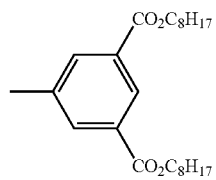 |

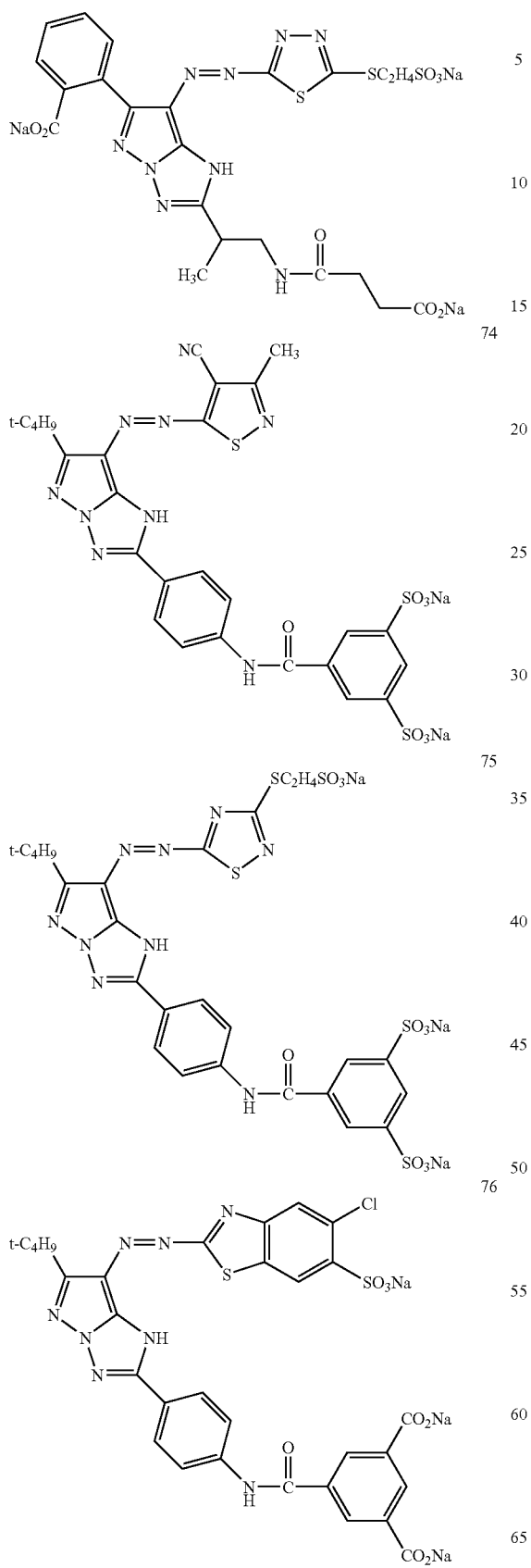
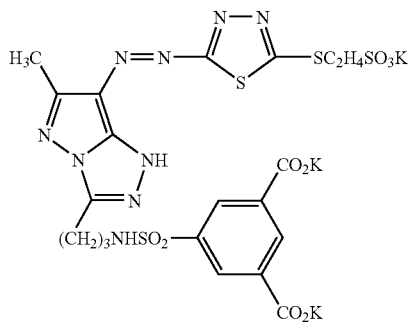
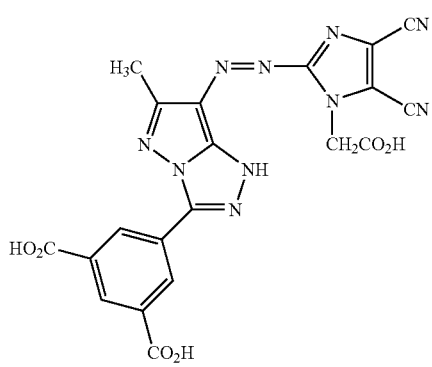
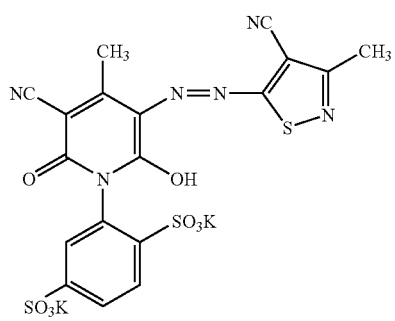
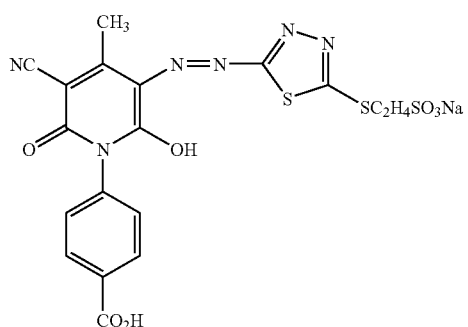
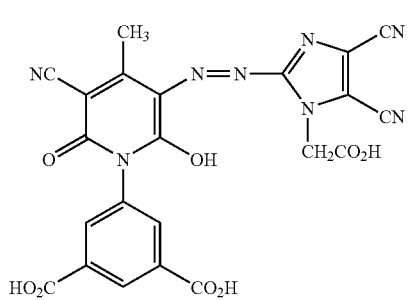

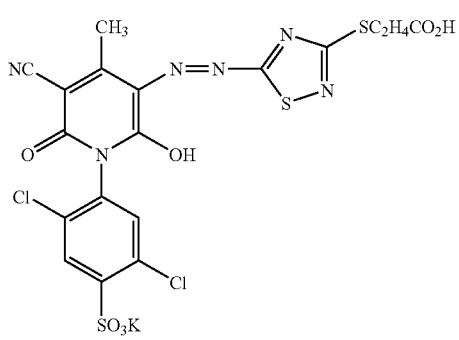

82

The ink for inkjet printing preferably contains the aforementioned yellow dye by 0.2 to 20 mass %, more preferably by 0.5 to 15 mass %.

(Cyan Dye)

A cyan dye to be used in the ink composition for inkjet printing of the present invention is a phthalocyanine dye, particularly preferably a dye represented by formula (2). The phthalocyanine dye is known as a fast dye, but is known to be inferior in the fastness to ozone gas in case it is used as a dye for inkjet printing. In the invention, it is preferable, in order to reduce reactivity with ozone which is an electron-attracting agent, to introduce an electron-attracting group into the phthalocyanine skeleton thereby obtaining an oxidation potential higher than 1.0 V (vs. SCE). The oxidation potential is preferably as high as possible, more preferably higher than 1.1 V (vs. SCE) and most preferably higher than 1.15 V (vs. SCE).

In the present invention, it is preferable, in order to reduce reactivity with ozone which is an electron-attracting agent, to introduce an electron-attracting group into the phthalocyanine skeleton thereby obtaining a higher oxidation potential. Therefore, utilizing the Hammett's substituent constant σp which is an index for an electron attracting property or an electron donating property of a substituent, it can be said that the oxidation potential can be made higher by an introduction of a substituent of a large σp value such as a sulfinyl group, a sulfonyl group or a sulfamoyl group.

For such potential regulation, it is particularly preferable, in the invention, to employ a phthalocyanine dye represented by formula (2).

In the following, the phthalocyanine dye represented by formula (2) will be explained in detail.

In formula (2), $X_{21}$, $X_{22}$, $X_{23}$ and $X_{24}$ each independently represents —SO—$Z_2$, —SO$_2$—$Z_2$, —SO$_2$NR$_{21}$R$_{22}$, a sulfo group, —CONR$_{21}$R$_{22}$, or —SO$_2$NR$_{21}$. Among these substituents, —SO—$Z_2$, —SO$_2$NR$_{21}$R$_{22}$ and —CONR$_{21}$R$_{22}$ are preferable, —SO$_2$—$Z_2$ and —SO$_2$NR$_{21}$R$_{22}$ are particularly preferable, and —SO$_2$—$Z_2$ is most preferable. In case any of $a_{21}$ to $a_{24}$ representing number of substituents is 2 or more, any of $X_{21}$ to $X_{24}$ present in plural units may be mutually the same or different, which each independently represents any of the aforementioned groups. Also $X_{21}$, $X_{22}$, $X_{23}$ and $X_{24}$ may all be the same substituents, or may be substituents of a common type but mutually different partially for example a case where $X_{21}$, $X_{22}$, $X_{23}$ and $X_{24}$ are all —SO$_2$—$Z_2$ but contain different $Z_2$, or may include mutually different substituents (for example —SO$_2$—$Z_2$ and —SO$_2$NR$_{21}$R$_{22}$).

$Z_2$ each independently represents an alkyl group, a cycloalkyl group, an alkenyl group, an aralkyl group, an aryl group, or a heterocyclic group, which may be further substituted. Preferably it is a substituted or non-substituted alkyl group, a substituted or non-substituted aryl group, or a substituted or non-substituted heterocyclic group, among which a substituted alkyl group, a substituted aryl group or a substituted heterocyclic group is most preferable.

$R_{21}$ and $R_{22}$ each independently represents a hydrogen atom, an alkyl group, a cycloalkyl group, an alkenyl group, an aralkyl group, an aryl group, or a heterocyclic group, which may be further substituted. Among these, a hydrogen atom, a substituted or non-substituted alkyl group, a substituted or non-substituted aryl group, or a substituted or non-substituted heterocyclic group is preferable, and a hydrogen atom, a substituted alkyl group, a substituted aryl group or a substituted heterocyclic group is further preferable. However, it is not preferable that $R_{21}$ and $R_{22}$ are both hydrogen atoms.

The substituted or non-substituted alkyl group represented by $R_{21}$, $R_{22}$ and $Z_2$ is preferably an alkyl group with 1 to 30 carbon atoms. In particular, for improving solubility of dye or stability of ink, a branched alkyl group is preferable, and a case including an asymmetric carbon (use of racemic body) is particularly preferable. Examples of the substituent are same as those of the substituent in case $Z_2$, $R_{21}$, $R_{22}$, $Y_{21}$, $Y_{22}$, $Y_{23}$ or $Y_{24}$ to be explained later can further have a substituent. In particular, a hydroxyl group, an ether group, an ester group, a cyano group, an amide group or a sulfonamide group is preferable for increasing association of the dye thereby improving the fastness. In addition, there may also be included a halogen atom or an ionic hydrophilic group. The number of carbon atoms of the alkyl group does not include the carbon atoms of the substituent, and it applies also to other groups.

The substituted or non-substituted cycloalkyl group represented by $R_{21}$, $R_{22}$ and $Z_2$ is preferably a cycloalkyl group with 5 to 30 carbon atoms. In particular, for improving solubility of dye and stability of ink, a case having an asymmetric carbon (use of racemic body) is particularly preferable. Examples of the substituent are same as those of the substituent in case $Z_2$, $R_{21}$, $R_{22}$, $Y_{21}$, $Y_{22}$, $Y_{23}$ or $Y_{24}$ to be explained later can further have a substituent. In particular, a hydroxyl group, an ether group, an ester group, a cyano group, an amide group or a sulfonamide group is preferable for increasing association of the dye thereby improving the fastness. In addition, there may also be included a halogen atom or an ionic hydrophilic group.

The substituted or non-substituted alkenyl group represented by $R_{21}$, $R_{22}$ and $Z_2$ is preferably an alkenyl group with 2 to 30 carbon atoms. In particular, for improving solubility of dye and stability of ink, a branched alkenyl group is preferable, and a case having an asymmetric carbon (use of racemic body) is particularly preferable. Examples of the substituent are same as those of the substituent in case $Z_2$, $R_{21}$, $R_{22}$, $Y_{21}$, $Y_{22}$, $Y_{23}$ or $Y_{24}$ to be explained later can further have a substituent. In particular, a hydroxyl group, an ether group, an ester group, a cyano group, an amide group or a sulfonamide group is preferable for increasing association of the dye thereby improving the fastness. In addition, there may also be included a halogen atom or an ionic hydrophilic group.

The substituted or non-substituted aralkyl group represented by $R_{21}$, $R_{22}$ and $Z_2$ is preferably an aralkyl group with 7 to 30 carbon atoms. In particular, for improving solubility of dye and stability of ink, a branched aralkyl group is preferable, and a case having an asymmetric carbon (use of racemic body) is particularly preferable. Examples of the substituent are same as those of the substituent in case $Z_2$, $R_{21}$, $R_{22}$, $Y_{21}$, $Y_{22}$, $Y_{23}$ or $Y_{24}$ to be explained later can further have a substituent. In particular, a hydroxyl group, an ether group, an ester group, a cyano group, an amide group or a sulfonamide group is preferable for increasing association of the dye thereby improving the fastness. In addition, there may also be included a halogen atom or an ionic hydrophilic group.

The substituted or non-substituted aryl group represented by $R_{21}$, $R_{22}$ and $Z_2$ is preferably an aryl group with 6 to 30 carbon atoms. Examples of the substituent are same as those of the substituent in case $Z_2$, $R_{21}$, $R_{22}$, $Y_{21}$, $Y_{22}$, $Y_{23}$ or $Y_{24}$ to be explained later can further have a substituent. In particular, an electron attracting group is preferable as it realizes a high oxidation potential of the dye thereby improving the fastness. The electron attracting group can be a substituent having a Hammett's substituent constant σp of a positive value. Among such substituent, there is further preferred a halogen atom, a heterocyclic group, a cyano group, a carboxyl group, an acylamino group, a sulfonamide group, a sulfamoyl group, a carbamoyl group, a sulfonyl group, an imide group, an acyl group, a sulfo group or a quaternary ammonium group, further preferably a cyano group, a carboxyl group, a sulfamoyl group, a carbamoyl group, a sulfonyl group, an imide group, an acyl group, a sulfo group or a quaternary ammonium group.

The heterocyclic group represented by $R_{21}$, $R_{22}$ and $Z_2$ is preferably a 5- or 6-membered heterocyclic group that may further have a condensed ring structure. It may be an aromatic or non-aromatic heterocycle. In the following examples of the heterocyclic group represented by $R_{21}$, $R_{22}$ and $Z_2$ are given in the form of heterocycle without indicating a substituting position, and the substituting position is not restricted and pyridine for example can substitute at 2-, 3- or 4-position. The examples include pyridine, pyradine, pyrimidine, pyridazine, triazine, quinoline, isoquinoline, quinazoline, cinnoline, phthalazine, quinoxaline, pyrrole, indole, furan, benzofuran, thiophene, benzothiophene, pyrazole, imidazole, benzimidazole, triazole, oxazole, benzoxazole, thiazole, benzothiazole, isothiazole, benzisothiazole, thiadiazole, isoxazole, benzisoxazole, pyrrolidine, piperidine, piperadine, imidazolidine, and thiazoline. Among these, an aromatic heterocycle is preferable, and preferred examples thereof, indicated in the same manner as above, include pyridine, pyradine, pyrimidine, pyridazine, triazine, pyrazole, imidazole, benzimidazole, triazole, thiazole, benzothiazole, isothiazole, benzisothiazole, and thiadiazole. These may have a substituent, and examples of the substituent are same as those of the substituent in case $Z_2$, $R_{21}$, $R_{22}$, $Y_{21}$, $Y_{22}$, $Y_{23}$ or $Y_{24}$ to be explained later can further have a substituent. Preferable substituents are same as the aforementioned preferable substituents for the aryl group, and more preferable substituents are same as the more preferable substituents for the aryl group.

$Y_{21}$, $Y_{22}$, $Y_{23}$ and $Y_{24}$ each independently represents a hydrogen atom, a halogen atom, an alkyl group, a cycloalkyl group, an alkenyl group, an aralkyl group, an aryl group, a heterocyclic group, a cyano group, a hydroxyl group, a nitro group, an amino group, an alkylamino group, an alkoxy group, an aryloxy group, an acylamino group, an arylamino group, an ureido group, a sulfamoylamino group, an alkylthio group, an arylthio group, an alkoxycarbonylamino group, a sulfonamide group, a carbamoyl group, a sulfamoyl group, a sulfonyl group, an alkoxycarbonyl group, a heterocyclic oxy group, an azo group, an acyloxy group, a carbamoyloxy group, a silyloxy group, an aryloxycarbonyl group, an aryloxycarbonylamino group, an imide group, a heterocyclic thio group, a phosphoryl group, an acyl group, a carboxyl group, or a sulfo group, each of which may further have a substituent.

Among these, a hydrogen atom, a halogen atom, an alkyl group, an aryl group, a cyano group, an alkoxy group, an amide group, an ureido group, a sulfonamide group, a carbamoyl group, a sulfamoyl group, an alkoxycarbonyl group, a carboxyl group, or a sulfo group is preferred, a hydrogen atom, a halogen atom, a cyano group, a carboxyl group or a sulfo group is particularly preferred, and a hydrogen atom is most preferred.

$Z_2$, $R_{21}$, $R_{22}$, $Y_{21}$, $Y_{22}$, $Y_{23}$ or $Y_{24}$, in case representing a group that can further have a substituent, may further have a following substituent.

Examples include a linear or branched alkyl group with 1 to 12 carbon atoms, a linear or branched aralkyl group with 7 to 18 carbon atoms, a linear or branched alkenyl group with 2 to 12 carbon atoms, a linear or branched alkinyl group with 2 to 12 carbon atoms, a linear or branched cycloalkyl group with 3 to 12 carbon atoms, and a linear or branched cycloalkenyl group with 3 to 12 carbon atoms (foregoing groups preferably having a branched chain for improvements in solubility of dye and stability of ink, and particularly preferably having an asymmetric carbon; and specific examples of the foregoing groups including methyl, ethyl, propyl, isopropyl, sec-butyl, t-butyl, 2-ethylhexyl, 2-methylsulfonylethyl, 3-phenoxypropyl, trifluoromethyl, and cyclopentyl), a halogen atom (such as a chlorine atom or a bromine atom), an aryl group (such as phenyl, 4-t-butylphenyl, or 2,4-di-t-amylphenyl), a heterocyclic group (such as imidazolyl, pyrazolyl, triazolyl, 2-furyl, 2-thienyl, 2-pyrimidinyl or 2-benzothiazolyl), a cyano group, a hydroxyl group, a nitro group, a carboxy group, an amino group, an alkyloxy group (such as methoxy, ethoxy, 2-methoxyethoxy, or 2-methanesulfonylethoxy), an aryloxy group (such as phenoxy, 2-methylphenoxy, 4-t-butylphenoxy, 3-nitrophenoxy, 3-t-butyloxycarbamoylphenoxy, or 3-methoxycarbamoyl), an acylamino group (such as acetamide, benzamide, or 4-(3-t-butyl-4-hydroxyphenoxy)butanamide), an alkylamino group (such as methylamino, butylamino, diethylamino, or methylbutylamino), an anilino group (such as phenylamino or 2-chloroanilino), an ureido group (such as phenylureido, methylureido or N,N-dibutylureido), a sulfamoylamino group (such as N,N-dipropylsulfamoylamino), an alkylthio group (such as methylthio, octylthio, or 2-phenoxyethylthio), an arylthio group (such as phenylthio, 2-butoxy-t-octylphenylthio or 2-carboxyphenylthio), an alkyloxycarbonylamino group (such as methoxycarbonylamino), a sulfonamide group (such as methanesulfonamide, benzenesulfonamide, or p-toluenesulfoneamide), a carbamoyl group (such as N-ethylcarbamoyl, or N,N-dibutylcarbamoyl), a sulfamoyl group (such as N-ethylsulfamoyl, N,N-dipropylsulfamoyl, or N-phenylsulfamoyl), a sulfonyl group (such as methanesulfonyl, octanesulfonyl, benzenesulfonyl or toluenesulfonyl), an alkyloxycarbonyl group (such as methoxycarbonyl, or butyloxycarbonyl), a heterocyclic oxy group (such as 1-phenyltetrazol-5-oxy, or 2-tetrahydropyranyloxy), an azo group (such as phenylazo, 4-methoxyphenylazo, 4-pivaloylaminophenylazo, or 2-hydroxy-4-propanoylphenylazo), an acyloxy group (such as acetoxy), a carbamoyloxy group (such as N-methylcarbamoyloxy, or N-phenylcarbamoyloxy), a silyloxy group (such as trimethylsilyloxy or dibutylmethylsilyloxy), an aryloxycarbonylamino group (such as phenoxycarbonylamino), an imide group (such as N-succinimide, or N-phthalimide), a heterocyclic thio group (such as 2-benzothiazolylthio, 2,4-diphenoxy-1,3,5-triazole-6-thio, or 2-pyridylthio), a sulfinyl group (such as 3-phenoxypropylsulfinyl), a phosphonyl group (such as phenoxyphosphonyl, octyloxyphosphonyl, or phenylphosphonyl), an aryloxycarbonyl group (such as phenoxycarbonyl), an acyl group (such as acetyl, 3-phenylpropanoyl or benzoyl), and an ionic hydrophilic group (such as a carboxyl group, a sulfo group, a phosphono group or a quaternary ammonium group).

In case the phthalocyanine dye represented by the foregoing formula (2) is water-soluble, it preferably has an ionic hydrophilic group. The ionic hydrophilic group includes a sulfo group, a carboxyl group, a phosphono group and a quaternary ammonium group. The ionic hydrophilic group is preferably a carboxyl group, a phosphono group or a sulfo group, and particularly preferably a carboxyl group or a sulfo group. The carboxyl group, phosphono group or sulfo group may be in a salt state, and a counter ion constituting the salt includes an ammonium ion, an alkali metal ion (such as lithium ion, sodium ion or potassium ion), and an organic cation (such as tetramethylammonium ion, tetramethylguanidium ion or tetramethylphosphonium). Among such counter ions, an alkali metal ion is preferred, and lithium ion is particularly preferred in improving solubility of the dye and stability of the ink. A most preferable ionic hydrophilic group is a lithium salt of a sulfo group.

As to the number of the ionic hydrophilic group, the phthalocyanine dye preferably includes at least two such groups within a molecule, and more preferably includes at least two sulfo and/or carboxyl groups.

In formula (2), $a_{21}$ to $a_{24}$ and $b_{21}$ to $b_{24}$ respectively represent the number of the substituents $X_{21}$ to $X_{24}$ and $Y_{21}$ to $Y_{24}$. $a_{21}$ to $a_{24}$ each independently represents an integer from 0 to 4, but all do not assume 0 at the same time. $b_{21}$ to $b_{24}$ each independently represents an integer from 0 to 4. In case any of $a_{21}$ to $a_{24}$ and $b_{21}$ to $b_{24}$ represents an integer equal to or larger than 2, any of $X_{21}$ to $X_{24}$ and $Y_{21}$ to $Y_{24}$ is present in plural units, which may be mutually the same or different.

$a_{21}$ and $b_{21}$ satisfy a relation $a_{21}+b_{21}=4$, in which particularly preferred is a combination where $a_{21}$ represents 1 or 2 and $b_{21}$ represents 3 or 2, and most preferred is a combination where $a_{21}$ represents 1 and $b_{21}$ represents 3.

Combinations of $a_{22}$ and $b_{22}$, $a_{23}$ and $b_{23}$, and $a_{24}$ and $b_{24}$ have common relations as in the combination of $a_{21}$ and $b_{21}$, and preferred combinations are also similar.

M represents a hydrogen atom, a metal element, an metal oxide, a metal hydroxide or a metal halide.

M is preferably a hydrogen atom, a metal element such as Li, Na, K, Mg, Ti, Zr, V, Nb, Ta, Cr, Mo, W, Mn, Fe, Co, Ni, Ru, Rh, Pd, Os, Ir, Pt, Cu, Ag, Au, Zn, Cd, Hg, Al, Ga, In, Si, Ge, Sn, Pb, Sb, or Bi, or an oxide such as VO or GeO.

Preferred examples of hydroxide include $Si(OH)_2$, $Cr(OH)_2$ and $Sn(OH)_2$.

Also examples of halide include AlCl, $SiCl_2$, VCl, $VCl_2$, VOCl, FeCl, GaCl and ZrCl.

Among these, Cu, Ni, Zn, Al etc. are preferable, and Cu is most preferable.

Also in the phthalocyanine dye represented by formula (2), the phthalocyanine ring (Pc) may form, through L (divalent connecting group), a dimer (for example Pc-M-L-M-Pc) or a trimer, and Ms in such case may be mutually the same or different.

In such case, the divalent connecting group represented by L is preferably an oxy group —O—, a thio group —S—, a carbonyl group —CO—, a sulfonyl group —$SO_2$—, an imino group —NH—, a methylene group —$CH_2$— or a group formed by combining these groups.

As to a preferred combination of the substituents in the compound represented by formula (2), there is preferred a compound in which at least one of the various substituents is the aforementioned preferable group, more preferably a compound in which a larger number of the various substituents are the aforementioned preferable groups, and most preferably a compound in which all the substituents are the aforementioned preferable groups.

Among the phthalocyanine dye represented by formula (2), a phthalocyanine dye of a structure represented by the foregoing formula (5) is more preferable. In the following, the phthalocyanine dye represented by formula (5) will be explained in detail.

In formula (5), $X_{51}$ to $X_{54}$ respectively have the same meanings as $X_{21}$ to $X_{24}$ in formula (2), and have same preferable examples. $Y_{51}$ and $Y_{52}$ have the same meaning as $Y_{21}$ in formula (2), and have same preferable examples. $Y_{53}$ and $Y_{54}$ have the same meaning as $Y_{22}$ in formula (2), and have same preferable examples. $Y_{55}$ and $Y_{56}$ have the same meaning as $Y_{23}$ in formula (2), and have same preferable examples. $Y_{57}$ and $Y_{58}$ have the same meaning as $Y_{24}$ in formula (2), and have same preferable examples. Also $M_1$ same a same meaning as M in formula (2), and has same preferable examples.

In formula (5), $a_{51}$ to $a_{54}$ each independently represents an integer 1 or 2, preferably satisfy a relation $4 \leq a_{51}+a_{52}+a_{53}+a_{54} \leq 6$, particularly preferably satisfy a relation $a_{51}=a_{52}=a_{53}=a_{54}=1$.

$X_{51}, X_{52}, X_{53}$ and $X_{54}$ may all be the same substituents, or may be substituents of a common type but partially mutually different for example as in a case where $X_{51}, X_{52}, X_{53}$ and $X_{54}$ are all —$SO_2$—$Z_5$ but different in $Z_5$, or may include substitutes of mutually different types, such as —$SO_2$—$Z_5$ and —$SO_2NR_{51}R_{52}$.

Within the phthalocyanine dye represented by formula (5), a particularly preferable combination of substituents is as follows.

$X_{51}$ to $X_{54}$ each independently and preferably represents —SO—$Z_5$, —$SO_2$—$Z_5$, —$SO_2NR_{51}R_{52}$ or —$CONR_{51}R_{52}$, and particularly preferably —$SO_2$—$Z_5$ or —$SO_2NR_{51}R_{52}$, and most preferably —$SO_2$—$Z_5$.

$Z_5$ preferably represents a substituted or non-substituted alkyl group, a substituted or non-substituted aryl group, or a substituted or non-substituted heterocyclic group, among which a substituted alkyl group, a substituted aryl group or a substituted heterocyclic group is most preferable. In particular, for improving solubility of the dye and stability of the ink, a case having an asymmetric carbon in the substituent (use of racemic body) is particularly preferable. Also for increasing association of the dye thereby improving the fastness, a case of having a hydroxyl group, an ether group, an ester group, a cyano group, an amide group or a sulfonamide group in the substituent is preferable.

$R_{51}$ and $R_{52}$ each independently and preferably represents a hydrogen atom, a substituted or non-substituted alkyl group, a substituted or non-substituted aryl group, or a substituted or non-substituted heterocyclic group is preferable, and more preferably a hydrogen atom, a substituted alkyl group, a substituted aryl group or a substituted heterocyclic group. However, it is not preferable that $R_{51}$ and $R_{52}$ both represent hydrogen atoms. In particular, for improving solubility of the dye and stability of the ink, a case of having an asymmetric carbon in the substituent (use of racemic body) is particularly preferable. Also for increasing association of the dye thereby improving the fastness, a case of having a hydroxyl group, an ether group, an ester group, a cyano group, an amide group or a sulfonamide group in the substituent is preferable.

$Y_{51}$ to $Y_{58}$ each independently and preferably represents a hydrogen atom, a halogen atom, an alkyl group, an aryl group, a cyano group, an alkoxy group, an amide group, an ureido group, a sulfonamide group, a carbamoyl group, a sulfamoyl group, an alkoxycarbonyl group, a carboxyl group, or a sulfo group, particularly preferably a hydrogen atom, a halogen atom, a cyano group, a carboxyl group or a sulfo group, and most preferably a hydrogen atom.

$a_{51}$ to $a_{54}$ each independently and preferably represents 1 or 2, and particularly preferably are all 1.

$M_1$ represents a hydrogen atom, a metal element, an metal oxide, a metal hydroxide or a metal halide, preferably Cu, Ni, Zn or Al and particularly preferably Cu.

In case the phthalocyanine dye represented by formula (5) is water-soluble, it preferably has an ionic hydrophilic group. The ionic hydrophilic group includes a sulfo group, a carboxyl group, a phosphono group and a quaternary ammonium group. The ionic hydrophilic group is preferably a carboxyl group, a phosphono group or a sulfo group, and particularly preferably a carboxyl group or a sulfo group. The carboxyl group, phosphono group or sulfo group may be in a salt state, and a counter ion constituting the salt includes an ammonium ion, an alkali metal ion (such as lithium ion, sodium ion or potassium ion), and an organic cation (such as tetramethylammonium ion, tetramethylguanidium ion or tetramethylphosphonium). Among such counter ions, an alkali metal ion is preferred, and lithium ion is particularly preferred in improving solubility of the dye and stability of the ink. A most preferable ionic hydrophilic group is a lithium salt of a sulfo group.

As to the number of the ionic hydrophilic group, the phthalocyanine dye preferably includes at least two such groups within a molecule, and more preferably includes at least two sulfo and/or carboxyl groups.

As to a preferred combination of the substituents in the compound represented by formula (5), there is preferred a compound in which at least one of the various substituents is the aforementioned preferable group, more preferably a compound in which a larger number of the various substituents are the aforementioned preferable groups, and most preferably a compound in which all the substituents are the aforementioned preferable groups.

As to the chemical structure of the compound represented by formula (5), it is preferable to introduce at least an electron attracting group such as a sulfinyl group, a sulfonyl group or a sulfamoyl group in each of four benzene rings of phthalocyanine, in such a manner that a total σp value of the substituents of the entire phthalocyanine skeleton becomes 1.6 or higher.

Now an explanation will be given on the Hammett's substituent constant σp. The Hammett's rule is an empirical rule proposed by L. P. Hammett in 1935 in order to quantitatively discuss the influence of a substituent on a reaction or an equilibrium of a benzene derivative, and is now recognized as widely plausible. The substituent constants based on the Hammett's rule include σp and σm, which are described in various references for example J. A. Dean, "Lange's Handbook of Chemistry", 12th edition, 1979 (McGraw-Hill), and "*Kagaku no Ryoiki*", *Zoukan*, 122, pp. 96-103, 1979 (Nankodo). In the present invention, each substituent is defined or described by the Hammett's substituent constant σp, but such description is not limited to the substituents of which the constants are known in the aforementioned references but naturally covers substituents of which the constants, even if not described in the references, will fall in the desired range in a measurement according to the Hammett's rule. Also the dyes employed in the invention include those which are not derivatives of benzene, but the σp is used as an index indicating an electron efficiency of a substituent, regardless of the substituting position. In the present invention, σp is used in the meaning explained above.

The phthalocyanine dye represented by formula (2) is generally a mixture of analogs in which substituents Xn (n=21 to 24) and Ym (m=21 to 24) are inevitably different in the positions and numbers of introduction by a synthesizing method thereof, and formula often represents the mixture of such analogs in statistical average. The present invention is based on a finding that, by classifying the mixture of such analogs into following three types, a specified mixture is particularly preferable. More specifically, the mixture of analogs of the phthalocyanine dye represented by formulae (2) and (5) is classified into following three types depending on substituting positions, in which $Y_{51}, Y_{52}, Y_{53}, Y_{54}, Y_{55}, Y_{56}, Y_{57}$ and $Y_{58}$ are respectively defined as 1-, 4-, 5-, 8-, 9-, 12-, 13- and 16-positions.

(1) β-position substitution type: A phthalocyanine dye having specified substituents in 2- and/or 3-position, 6- and/or 7-position, 10- and/or 11-position, and 14- and/or 15-position.

(2) α-position substitution type: A phthalocyanine dye having specified substituents in 1- and/or 4-position, 5- and/or 8-position, 9- and/or 12-position, and 13- and/or 16-position.

(3) α,β-position substitution type: A phthalocyanine dye having specified substituents in 1- to 16-positions without regularity.

In the present description, the β-position substitution type, the α-position substitution type, and the α,β-position substitution type mentioned above will be used in explaining derivatives of the phthalocyanine dye, different in structure (particularly different in substituting position).

The phthalocyanine dye employed in the invention can be synthesized by combining methods described or cited for example in Shirai and Kobayashi, "Phthalocyanine-Chemistry and Function-", published by IPC Co., (pp. 1-62), and C. C. Leznoff and A. B. P. Lever, "Phthalocyanines-Properties and Applications", published by VCH (pp. 1-54) or similar methods.

The phthalocyanine compound represented by formula (2) can be synthesized, as described in WO Nos. 00/17275, 00/08103, 00/08101 and 98/41853, and JP-A No. 10-36471, by a sulfonation reaction, a sulfonylchlorination reaction and an amidation reaction of a non-substituted phthalocyanine compound. In this case, the sulfonation may take place in any position of the phthalocyanine nucleus and the number of sulfonation is also difficult to control. Therefore, sulfo group introduction under such reaction condition is unable to specify the position and the number of the introduced sulfo groups, and inevitably provides a mixture of analogs different in the number or the substituting positions of the substituents. Therefore, in a synthesis utilizing such mixture as a raw material, it is not possible to specify the number or the substituting position of the sulfamoyl groups on the heterocycle and the resulting phthalocyanine dye is obtained as an α,β-position mixed substitution type containing certain compounds different in the number and the substituting position of the substituents.

As described in the foregoing, an introduction of an electron attracting group such as a sulfamoyl group by a large number into the phthalocyanine nucleus provides a higher oxidation potential, thereby improving the resistance to ozone. In the aforementioned synthesis, it is not possible to avoid presence of phthalocyanine dyes with a fewer number of the introduced electron attracting groups, namely of a lower oxidation potential. Therefore, in order to improve the resistance to ozone, it is more preferable to employ a synthesis capable of suppressing generation of compounds with a lower oxidation potential.

The phthalocyanine compound represented by formula (5) of the invention can be derived from a tetrasulfophthalocyanine compound obtained by reacting a phthalonitrile derivative (compound P) represented by a following formula and/or a diiminoisoindoline derivative (compound Q) with a metal derivative represented by a formula (6), or by reacting a 4-sulfophthalonitrile derivative (compound R) represented by a following formula with the metal derivative represented by formula (6).

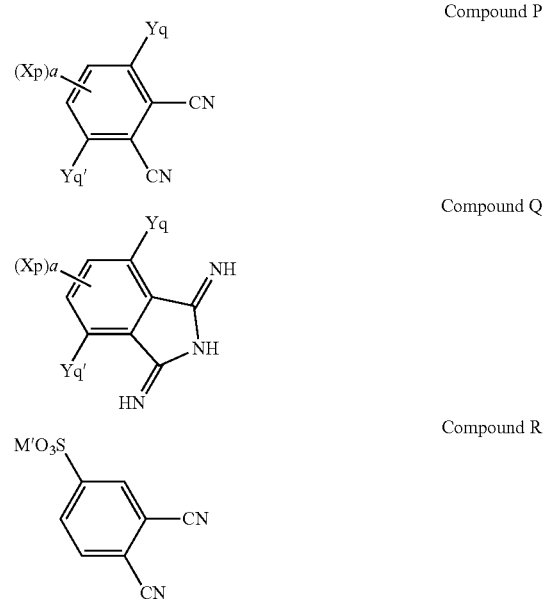

In these formulae, $X_p$ corresponds to $X_{51}, X_{52}, X_{53}$ or $X_{54}$ in formula (5); $Y_q$ and $Y_q'$ each corresponds to $Y_{51}, Y_{52}, Y_{53}, Y_{54}, Y_{55}, Y_{56}, Y_{57}$ or $Y_{58}$ in formula (5); and M' in the compound R represents a cation.

A cation represented by M' can be an alkali metal ion such as Li, Na or K, or an organic cation such as triethylammonium ion or a pyridinium ion.

M-(Y)$_d$     formula (6)

In formula (6), M has the same meaning as M in formula (2) or M$_1$ in formula (5); Y represents a monovalent or divalent ligand such as a halogen atom, an acetate anion, acetylacetonate or oxygen; and d represents an integer from 1 to 4.

The above-mentioned synthesis allows to introduce a desired substituent by a specified number. Such synthesis is far superior to the method explained in the foregoing for synthesizing the phthalocyanine compound of formula (2), in case of introducing a large number of electron attracting groups in order to obtain a high oxidation potential as in the invention.

The thus obtained phthalocyanine compound represented by formula (5) is normally a mixture of compounds represented by following formulae (a)-1 to (a)-4 which are isomers in the substituting positions Xp, namely a β-position substitution type.

formula (a)-1

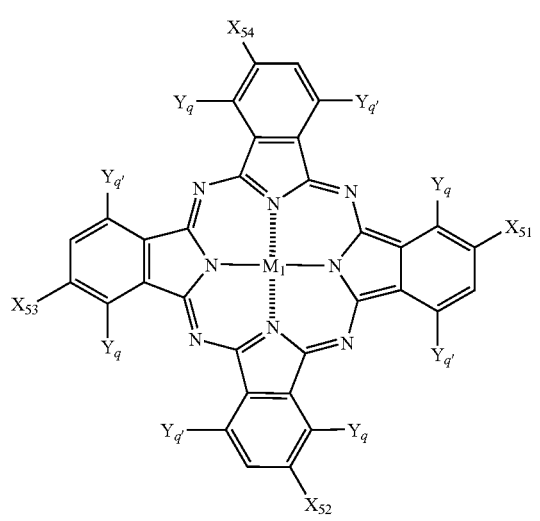

formula (a)-2

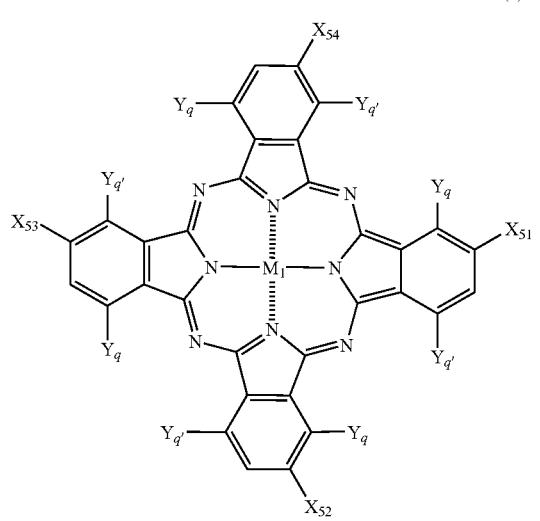

formula (a)-3

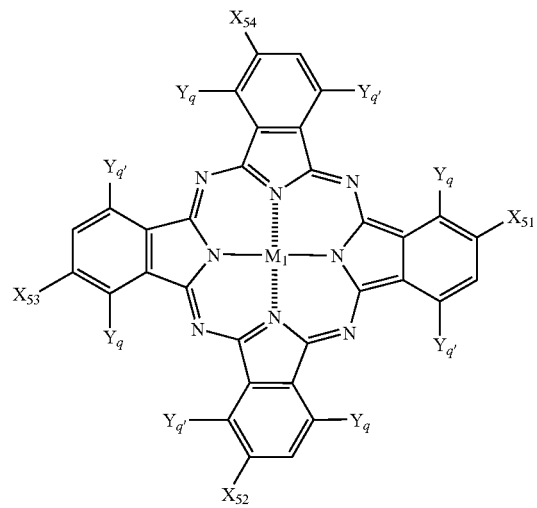

formula (a)-4

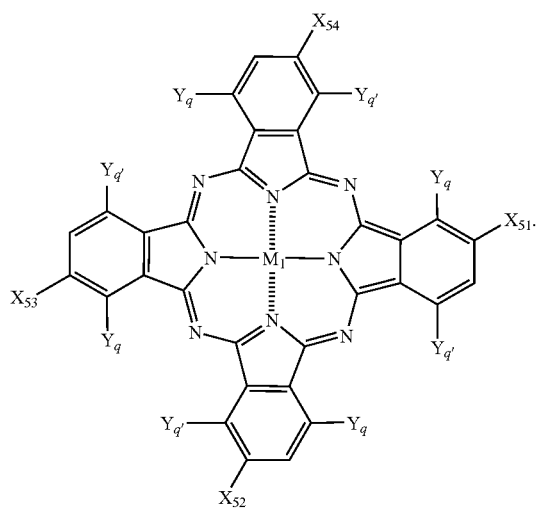

In the aforementioned synthesis, a β-position substituted phthalocyanine dye with identical substituents in X$_{51}$, X$_{52}$, X$_{53}$ and X$_{54}$ can be obtained by employing all same X$_p$s. On the other hand, by employing different X$_p$s in combination, it is possible to synthesize a dye having substituents which are of a common type but are partially different mutually, or a dye having substituents which are of different types. Among the dyes represented by formula (5), such dye having mutually different electron attracting substituents is particularly preferable as it allows to regulate a solubility or an association property of the dye and a stability in time of the ink.

In the invention, it is found, in any substitution type, that an oxidation potential higher than 1.0 V (vs. SCE) is very important for improving the fastness, and the magnitude of such effect is totally unpredictable from the aforementioned prior technologies. Also, though the detailed reason is still unclear, the β-position substitution type is evidently superior to the α,β-position mixed substitution type in the color hue, light fastness and ozone resistance.

Specific examples of the phthalocyanine dye represented by formulae (2) and (5) are shown in the following (example compound I-1 to 1-12 and 101-190), but the phthalocyanine dyes to be employed in the invention are not limited to such examples.

(I-1)
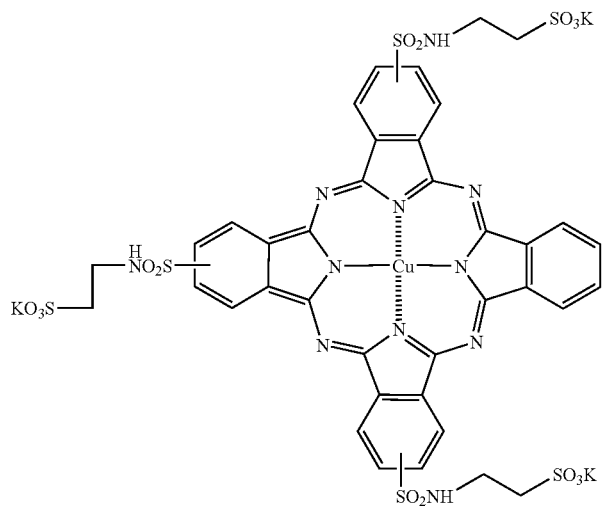
(I-2)
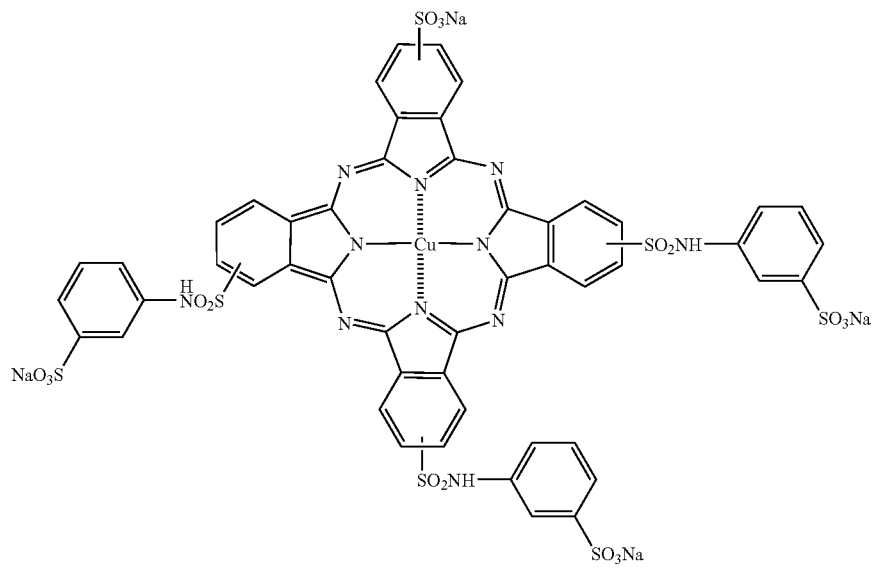
(I-3)
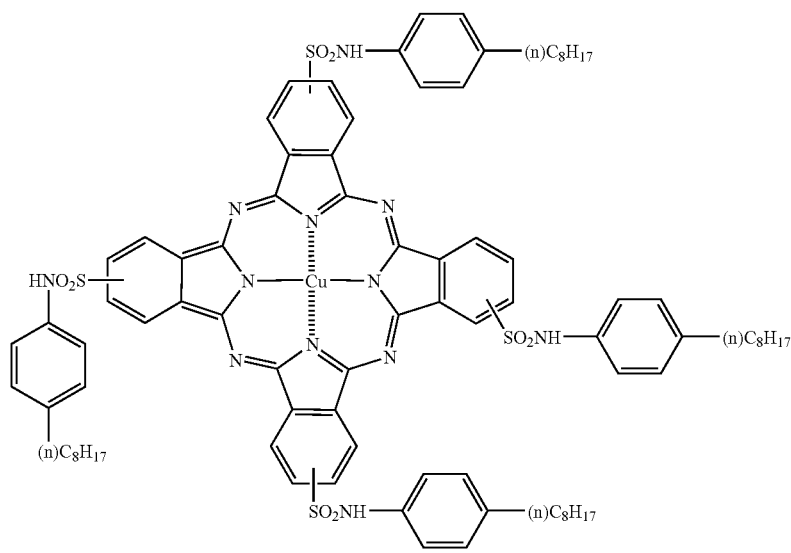

-continued
(I-4)
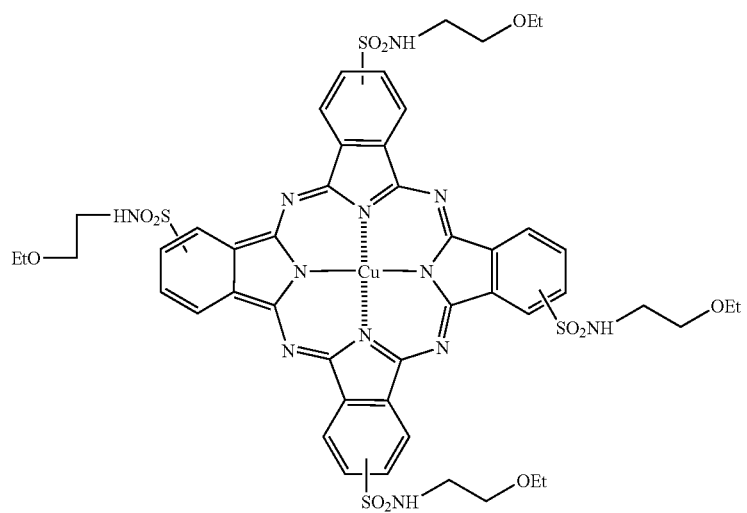
(I-5)
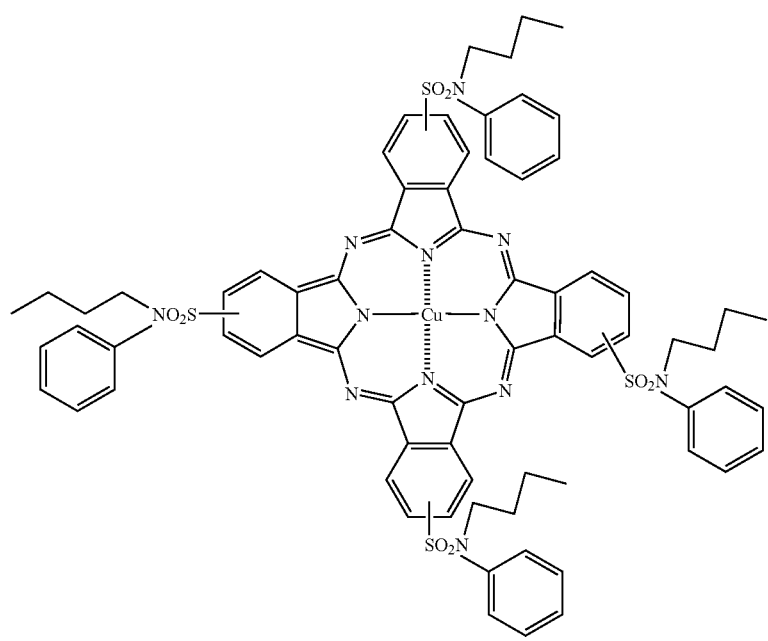

(I-6)
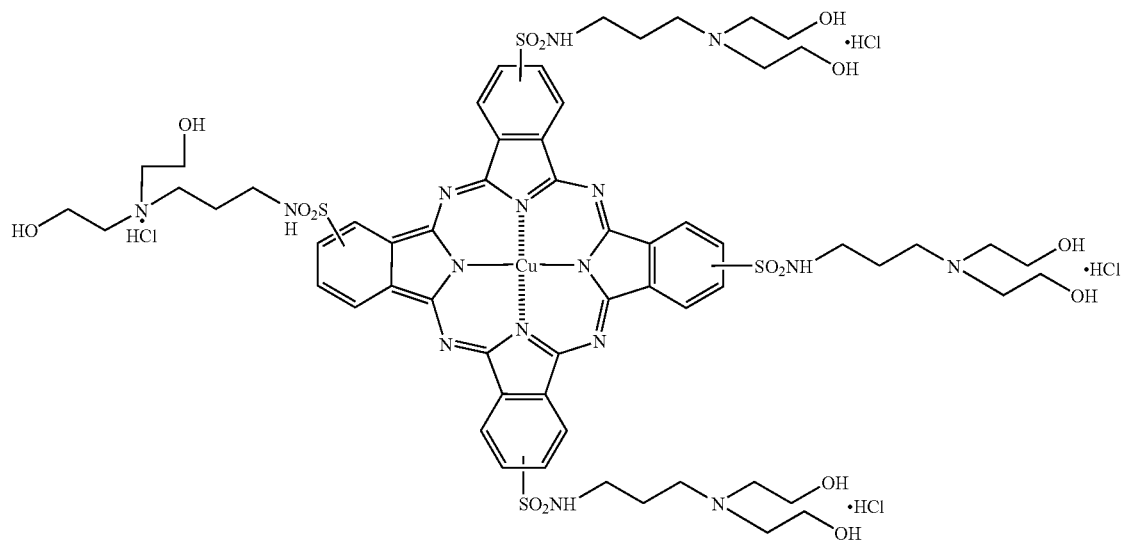
(I-7)
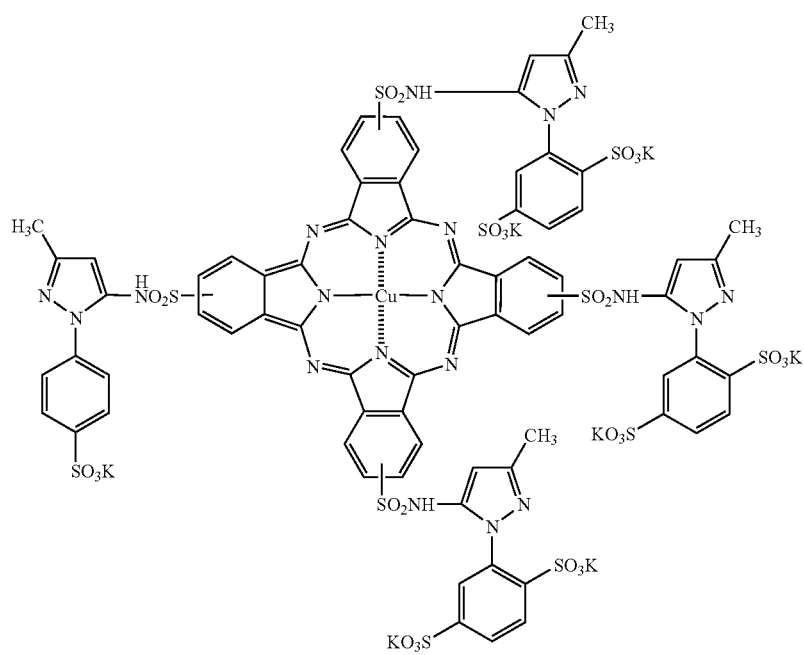

(I-8)
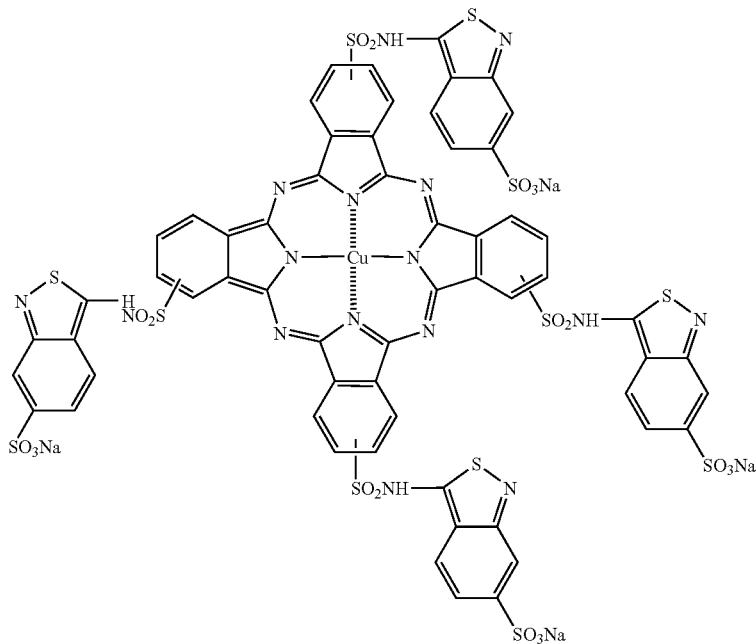
(I-9)
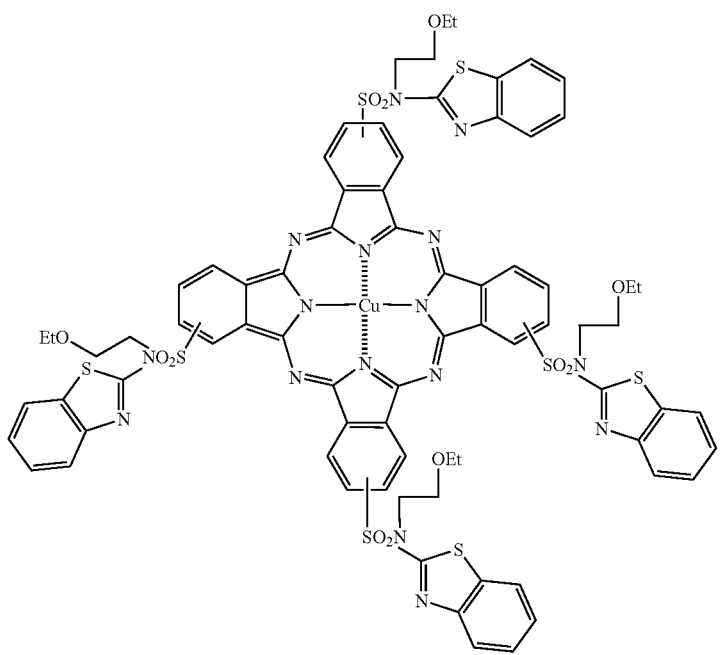

-continued
(I-10)
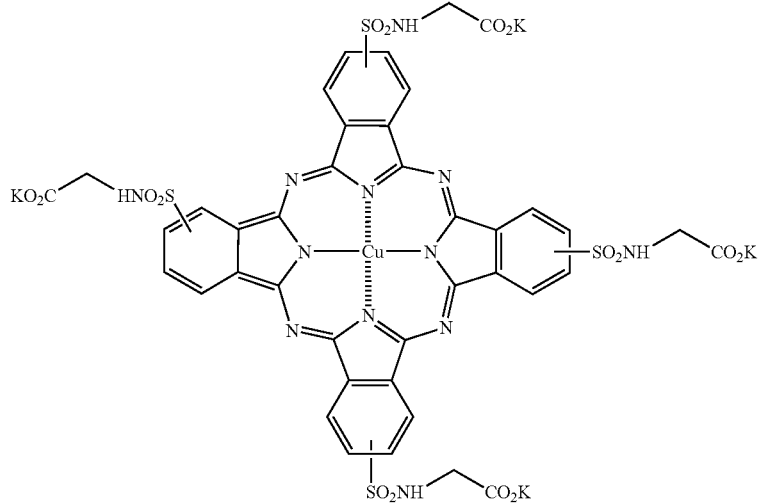
(I-11)
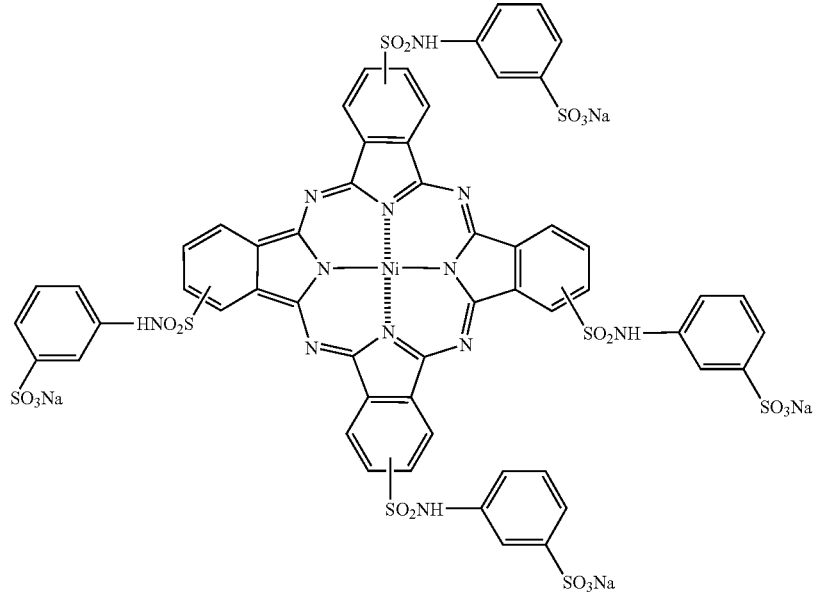
(I-12)
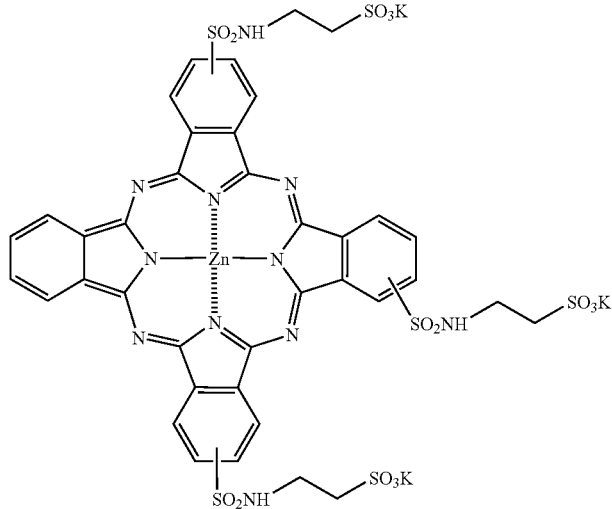

59

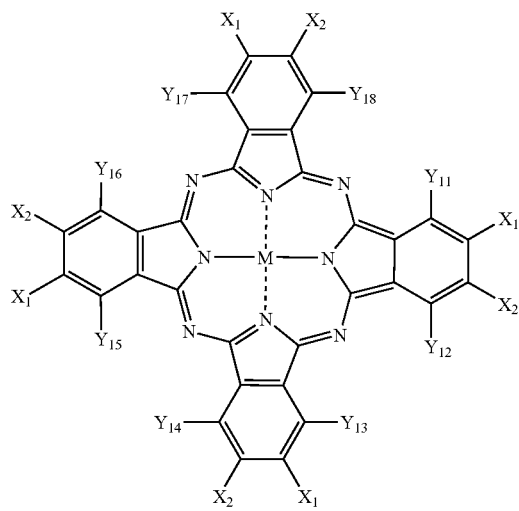

In the following table, specific examples are shown in random order independently in each of sets $(X_1, X_2)$, $(Y_{11}, Y_{12})$, $(Y_{13}, Y_{14})$, $(Y_{15}, Y_{16})$ and $(Y_{17}, Y_{18})$.

60

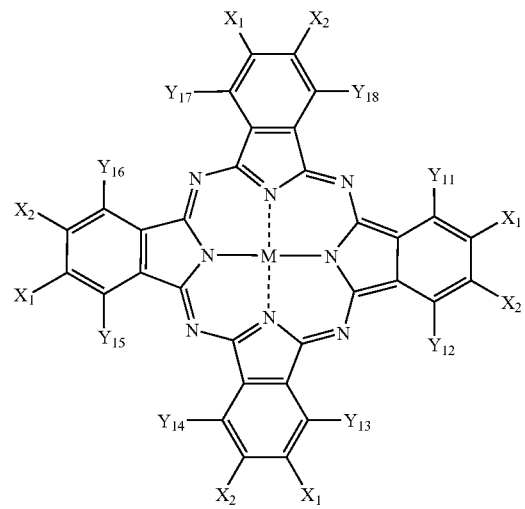

In the following table, specific examples are shown in random order independently in each of sets $(X_1, X_2)$, $(Y_{11}, Y_{12})$, $(Y_{13}, Y_{14})$, $(Y_{15}, Y_{16})$ and $(Y_{17}, Y_{18})$.

| Compound No. | M | $X_1$ | $X_2$ | $Y_{11}, Y_{12}$ | $Y_{13}, Y_{14}$ | $Y_{15}, Y_{16}$ | $Y_{17}, Y_{18}$ |
|---|---|---|---|---|---|---|---|
| 101 | Cu | —SO$_2$—NH—CH$_2$—CH$_2$—SO$_3$Li | —H | —H, —H | —H, —H | —H, —H | —H, —H |
| 102 | Cu | —SO$_2$—NH—CH$_2$—CH(OH)—CO—NH—CH$_2$CH$_2$—SO$_3$Na | —H | —Cl, —H | —Cl, —H | —Cl, —H | —Cl, —H |
| 103 | Cu | —SO$_2$—NH—CH$_2$—CH$_2$—CH$_2$—SO$_2$NH—CH$_2$CH(OH)—SO$_3$Li | —H | —H, —H | —H, —H | —H, —H | —H, —H |
| 104 | Cu | —SO$_2$—NH—C$_6$H$_4$—SO$_2$NH—CH$_2$CH$_2$—SO$_3$Li | —H | —H, —H | —H, —H | —H, —H | —H, —H |
| 105 | Ni | —SO$_2$—NH—CH$_2$—CH$_2$—CO—NH—CH(CH$_2$—COONa)—COONa | —H | —Cl, —H | —Cl, —H | —Cl, —H | —Cl, —H |
| 106 | Cu | —SO$_2$—NH—CH$_2$—CH$_2$—SO$_2$—NH—CH$_2$—COONa | —CN | —H, —H | —H, —H | —H, —H | —H, —H |
| 107 | Cu | —SO$_2$—CH$_2$—CH$_2$—CH$_2$—SO$_2$—NH—CH(CH$_2$—OH)—COOLi | —H | —H, —H | —H, —H | —H, —H | —H, —H |
| 108 | Cu | —SO$_2$—CH$_2$—CH$_2$—CH$_2$—SO$_3$Li | —H | —H, —H | —H, —H | —H, —H | —H, —H |
| 109 | Cu | —SO$_2$—CH$_2$—CH$_2$—CH$_2$—SO$_3$K | —H | —H, —H | —H, —H | —H, —H | —H, —H |
| 110 | Cu | —SO$_2$—(CH$_2$)$_5$—CO$_2$K | —H | —H, —H | —H, —H | —H, —H | —H, —H |

| Compound No. | M | X₁ | X₂ | Y₁₁,Y₁₂ | Y₁₃,Y₁₄ | Y₁₅,Y₁₆ | Y₁₇,Y₁₈ |
|---|---|---|---|---|---|---|---|
| 111 | Cu | —SO₂—NH—CH₂—CH₂—CH₂—SO₂—NH—CH₂CH(OH)—CH₂—SO₃Li | —H | —H, —H | —H, —H | —H, —H | —H, —H |
| 112 | Cu | —SO₂—NH—CH₂—CH₂—CH₂—SO₂NH—CH₂—CH(OH)—CH₃ | —SO₃Li | —H, —H | —H, —H | —H, —H | —H, —H |
| 113 | Cu | —SO₂—CH₂—CH(OH)—CH₂SO₃K | —H | —H, —H | —H, —H | —H, —H | —H, —H |
| 114 | Cu | —SO₂—CH₂—CH(OH)—CH₃ | —SO₃Li | —H, —H | —H, —H | —H, —H | —H, —H |
| 115 | Cu | —SO₂NH(CH₂)₃N⁺(CH₂CH₂OH)₂·CH₃—C₆H₄—SO₃⁻ | —H | —H, —H | —H, —H | —H, —H | —H, —H |
| 116 | Cu | —CO—NH—CH₂—CH(OH)—CH₂SO₃K | —H | —H, —H | —H, —H | —H, —H | —H, —H |
| 117 | Cu | —CO—NH—CH(COOLi)—CH₂CH₂SO₃Li | —H | —H, —H | —H, —H | —H, —H | —H, —H |

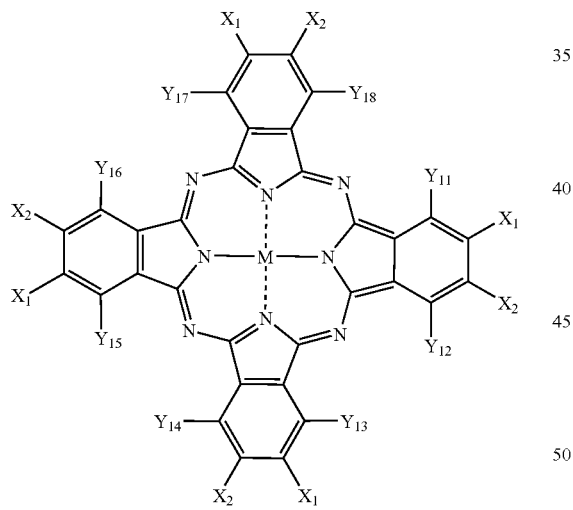

In the following table, specific examples are shown in random order independently in each of sets $(X_1, X_2)$, $(Y_{11}, Y_{12})$, $(Y_{13}, Y_{14})$, $(Y_{15}, Y_{16})$ and $(Y_{17}, Y_{18})$.

| Compound No. | M | X₁ | X₂ | Y₁₁,Y₁₂ | Y₁₃,Y₁₄ | Y₁₅,Y₁₆ | Y₁₇,Y₁₈ |
|---|---|---|---|---|---|---|---|
| 118 | Cu | —SO₂CH₂CH₂CH(CH₃)(SO₃Li) | —H | —H, —H | —H, —H | —H, —H | —H, —H |

-continued

| Compound No. | M | X₁ | X₂ | Y₁₁, Y₁₂ | Y₁₃, Y₁₄ | Y₁₅, Y₁₆ | Y₁₇, Y₁₈ |
|---|---|---|---|---|---|---|---|
| 119 | Cu | —SO₂—CH₂—CH(OH)—CH₂—SO₃Na | —H | —H, —H | —H, —H | —H, —H | —H, —H |
| 120 | Cu | —SO₂—CH₂—CH₂—CH(CH₃)—COOLi | —H | —H, —H | —H, —H | —H, —H | —H, —H |
| 121 | Cu | —SO₂(CH₂)₃SO₂NHCH₂—CH(OH)—CH₂—SO₃Li | —H | —H, —H | —H, —H | —H, —H | —H, —H |
| 122 | Cu | —CO₂CH₂CH₂CH₂SO₂—NH—CH₂—CH(OH)—CH₂—SO₃Li | —H | —H, —H | —H, —H | —H, —H | —H, —H |
| 123 | Cu | —SO₂NH—C₈H₁₇(t) | —H | —H, —H | —H, —H | —H, —H | —H, —H |
| 124 | Cu | —SO₂—NH—CH₂—CH(CH₂CH₃)—CH₂CHCH₂—CH₃ | —H | —H, —H | —H, —H | —H, —H | —H, —H |

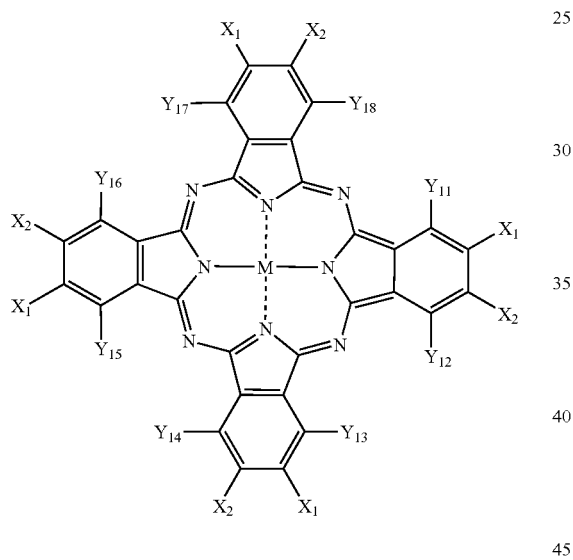

In the following table, specific examples are shown in random order independently in each of sets (X₁, X₂), (Y₁₁, Y₁₂), (Y₁₃, Y₁₄), (Y₁₅, Y₁₆) and (Y₁₇, Y₁₈).

| Compound No. | M | X₁ | X₂ | Y₁₁, Y₁₂ | Y₁₃, Y₁₄ | Y₁₅, Y₁₆ | Y₁₇, Y₁₈ |
|---|---|---|---|---|---|---|---|
| 125 | Cu | —SO₂CH₂CH₂CH₂SO₂—NH—CH₂—CH(CH₃)—CH₂—CH₃ | —H | —H, —H | —H, —H | —H, —H | —H, —H |
| 126 | Cu | —SO₂—CH₂—CH₂—CH₂—CO₂—CH(CH₃)—CH₂—O—CH₃ | —H | —H, —H | —H, —H | —H, —H | —H, —H |
| 127 | Cu | —SO₂CH₂CH₂CH₂SO₂NHCH₂CH₂CH₂O—CH(CH₃)(CH₃) | —H | —H, —H | —H, —H | —H, —H | —H, —H |

-continued

| Compound No. | M | X₁ | X₂ | $Y_{11}, Y_{12}$ | $Y_{13}, Y_{14}$ | $Y_{15}, Y_{16}$ | $Y_{17}, Y_{18}$ |
|---|---|---|---|---|---|---|---|
| 128 | Zn | —SO₂—CH₂—CH(O—CH₃)—CH₂—O—CH₂ | —CN | —H, —H | —H, —H | —H, —H | —H, —H |
| 129 | Cu | —CO—NH—CH₂—CH(CH₂CH₃)—CH₂—CH₂—CH₂CH₃ | —H | —Cl, —H | —Cl, —H | —Cl, —H | —Cl, —H |
| 130 | Cu | —CO₂—CH(CH₃)—CH₂—O—C₄H₉(t) | —H | —H, —H | —H, —H | —H, —H | —H, —H |
| 131 | Cu | —SO₂—CH₂—CH₂—CH(CH₃)—SO₂—NH—(2,5-di-SO₃Li-phenyl) | —H | —H, —H | —H, —H | —H, —H | —H, —H |

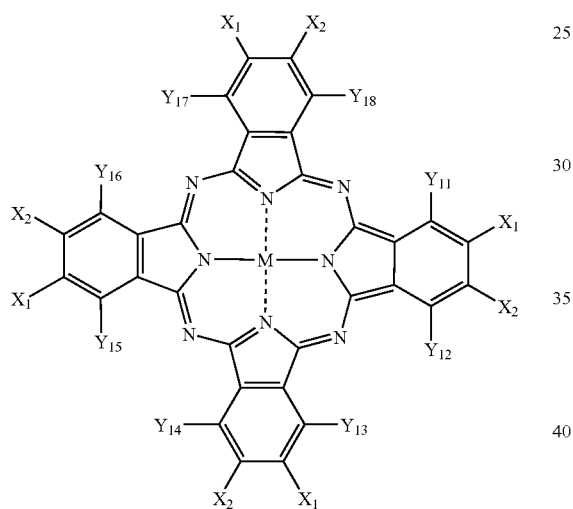

In the following table, specific examples are shown in random order independently in each of sets $(X_1, X_2)$, $(Y_{11}, Y_{12})$, $(Y_{13}, Y_{14})$, $(Y_{15}, Y_{16})$ and $(Y_{17}, Y_{18})$.

| Compound No. | M | X₁ | X₂ | $Y_{11}, Y_{12}$ | $Y_{13}, Y_{14}$ | $Y_{15}, Y_{16}$ | $Y_{17}, Y_{18}$ |
|---|---|---|---|---|---|---|---|
| 132 | Cu | —SO₂NH—(3,5-di-CO₂C₆H₁₃(n)-phenyl) | —H | —H, —H | —H, —H | —H, —H | —H, —H |
| 133 | Cu | —SO₂NH—[4-OCH₂CH₂OCH₃-3-(SO₂NHCH₂CH(C₄H₉)₂)-phenyl] | —H | —H, —H | —H, —H | —H, —H | —H, —H |

-continued
| Compound No. | M | X₁ | X₂ | $Y_{11}, Y_{12}$ | $Y_{13}, Y_{14}$ | $Y_{15}, Y_{16}$ | $Y_{17}, Y_{18}$ |
|---|---|---|---|---|---|---|---|
| 134 | Cu | 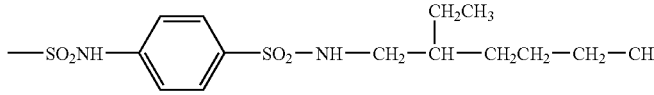 | —H | —H, —H | —H, —H | —H, —H | —H, —H |
| 135 | Cu | 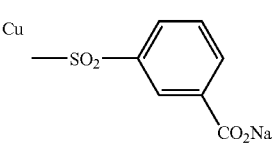 | —H | —H, —H | —H, —H | —H, —H | —H, —H |
| 136 | Cu | 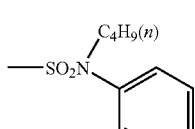 | —H | —H, —H | —H, —H | —H, —H | —H, —H |
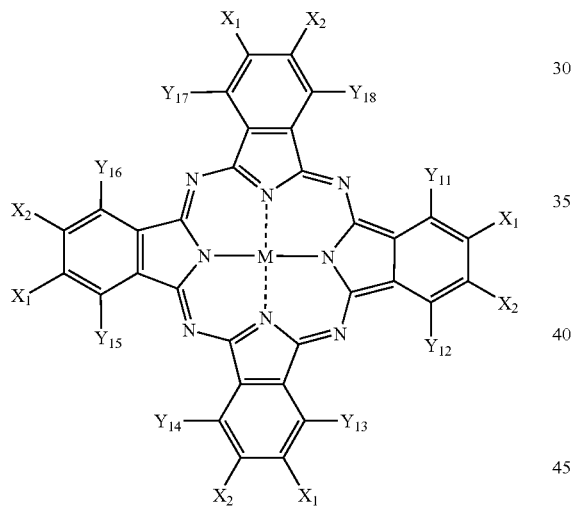
In the following table, specific examples are shown in random order independently in each of sets $(X_1, X_2)$, $(Y_{11}, Y_{12})$, $(Y_{13}, Y_{14})$, $(Y_{15}, Y_{16})$ and $(Y_{17}, Y_{18})$.
| Compound No. | M | X₁ | X₂ | $Y_{11}, Y_{12}$ | $Y_{13}, Y_{14}$ | $Y_{15}, Y_{16}$ | $Y_{17}, Y_{18}$ |
|---|---|---|---|---|---|---|---|
| 137 | Cu | 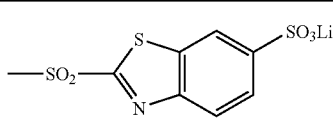 | —H | —H, —H | —H, —H | —H, —H | —H, —H |

-continued

| Compound No. | M | X₁ | X₂ | $Y_{11}, Y_{12}$ | $Y_{13}, Y_{14}$ | $Y_{15}, Y_{16}$ | $Y_{17}, Y_{18}$ |
|---|---|---|---|---|---|---|---|
| 138 | Cu | ![pyrazole with SO₂NH, CH₃, and phenyl bearing SO₃Li and LiO₃S groups] | —H | —H, —H | —H, —H | —H, —H | —H, —H |
| 139 | Cu | —SO₂(CH₂)₃—NH—C(=O)— phenyl with CO₂Li, CO₂Li | —Cl | —H, —H | —H, —H | —H, —H | —H, —H |
| 140 | Cu | —CO₂—CH₂CH₂CH₂—NH— triazine with two NH—CH₂—CH₂—CH(CH₃)—SO₃Li substituents | —H | —H, —H | —H, —H | —H, —H | —H, —H |

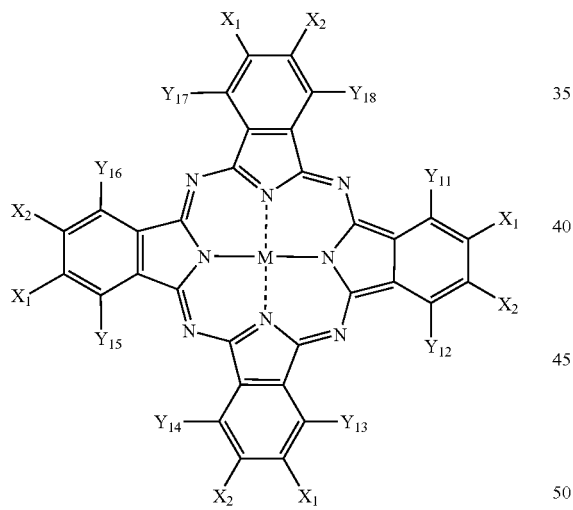

In the following table, specific examples are shown in random order independently in each of sets $(X_1, X_2)$, $(Y_{11}, Y_{12})$, $(Y_{13}, Y_{14})$, $(Y_{15}, Y_{16})$ and $(Y_{17}, Y_{18})$.

| Compound No. | M | X₁ | X₂ | $Y_{11}, Y_{12}$ | $Y_{13}, Y_{14}$ | $Y_{15}, Y_{16}$ | $Y_{17}, Y_{18}$ |
|---|---|---|---|---|---|---|---|
| 141 | Cu | —SO₂NH—CH(COONa)—CH₂—CO—N—(CH₂CH₂OH)₂ | —H | —H, —H | —H, —H | —H, —H | —H, —H |

-continued

| Compound No. | M | $X_1$ | $X_2$ | $Y_{11}, Y_{12}$ | $Y_{13}, Y_{14}$ | $Y_{15}, Y_{16}$ | $Y_{17}, Y_{18}$ |
|---|---|---|---|---|---|---|---|
| 142 | Cu | —SO$_2$NH—(3-position phenyl)—NHC(O)—(3-SO$_3$Li phenyl) | —H | —H, —H | —H, —H | —H, —H | —H, —H |
| 143 | Cu | —CO—NH—CH$_2$—CH(OH)—CO—NH—CH(COOK)—CH$_2$CH$_2$—SO$_3$K | —H | —H, —H | —H, —H | —H, —H | —H, —H |
| 144 | Cu | —SO$_2$—CH$_2$CH$_2$CH$_2$—NH—CO—(phenyl)—CO—NH—CH(COOLi)—CH$_2$—COOLi | —H | —H, —H | —H, —H | —H, —H | —H, —H |
| 145 | Cu | —SO$_2$CH$_2$CH$_2$OCH$_2$CH$_2$OCH$_2$CH$_2$SO$_3$Li | —H | —H, —H | —H, —H | —H, —H | —H, —H |

M-Pc(Xp$_1$)$_m$(Xp$_2$)$_n$ In the following table, substituents (Xp$_1$) and (Xp$_2$) are random in the order of introducing positions in β-position substituent.

| Compound No. | M | $R_1$ | m |
|---|---|---|---|
| 146 | Cu | —SO$_2$—NH—CH$_2$—CH(CH$_3$)—SO$_3$Li | 3 |
| 147 | Cu | —SO$_2$—NH—CH$_2$—CH$_2$SO$_3$Li | 3 |
| 148 | Cu | —SO$_2$—NH—CH$_2$—CH(CH$_3$)—SO$_3$Li | 3 |
| 149 | Cu | —SO$_2$—NH—CH$_2$—CH(CH$_3$)—SO$_3$Li | 2 |
| 150 | Cu | —SO$_2$—NH—CH$_2$—CH$_2$—SO$_2$—NH—CH$_2$CH$_2$—COONa | 3 |
| 151 | Cu | —SO$_2$—NH—(4-OH phenyl)—SO$_2$NH—CH$_2$—CH(OH)—SO$_3$Li | 3 |
| 152 | Cu | —SO$_2$—CH$_2$—CH$_2$—CH(CH$_3$)—SO$_3$Li | 2.5 |
| 153 | Cu | —SO$_2$—CH$_2$—CH$_2$—CH(CH$_3$)—SO$_3$Na | 2 |
| 154 | Cu | —SO$_2$—CH$_2$—CH$_2$—CH$_2$—SO$_3$Li | 3 |
| 155 | Cu | —SO$_2$—CH$_2$—CH$_2$—CH$_2$—COOK | 2 |
| 156 | Cu | —SO$_2$—CH$_2$—CH$_2$—CH$_2$—SO$_3$Li | 3 |
| 157 | Cu | —SO$_2$—CH$_2$—CH$_2$—O—CH$_2$—CH$_2$—SO$_3$Li | 2 |

| Compound No. | $R_2$ | n |
|---|---|---|
| 146 | —SO$_2$—NH—CH$_2$—CH(OH)—CH$_3$ | 1 |

-continued

| | | |
|---|---|---|
| 147 | —SO$_2$—NH—CH$_2$—CH$_2$—CH$_2$—SO$_2$—NH—CH$_2$—CH(OH)—CH$_3$ | 1 |
| 148 | —SO$_2$NH—CH$_2$—CH$_2$—CH$_2$—SO$_2$—NH—CH$_2$—CH$_2$—O—CH$_2$—CH$_2$—OH | 1 |
| 149 | —SO$_2$—NH—CH$_2$—CH$_2$—CH$_2$—CO—N-(CH$_2$—CH$_2$—OH)$_2$ | 2 |
| 150 | —SO$_2$NH—CH(CH$_3$)—CH$_2$OH | 1 |
| 151 | —SO$_2$NH—CH$_2$—CH$_2$—O—CH$_2$—CH$_2$—OH | 1 |
| 152 | —SO$_2$—CH$_2$—CH$_2$—O—CH$_2$—CH$_2$—OH | 1.5 |
| 153 | —SO$_2$—CH$_2$—CH$_2$—CH$_2$—CO—N-(CH$_2$—CH$_2$—OH)$_2$ | 2 |
| 154 | —SO$_2$—CH$_2$—CH$_2$—CH$_2$—SO$_2$—NH—CH$_2$—CH(OH)—CH$_3$ | 1 |
| 155 | —SO$_2$—CH$_2$—CH$_2$—CH$_2$—SO$_2$—NH—CH$_2$—CH(OH)—CH$_2$—COOK | 2 |
| 156 | —SO$_2$—CH$_2$—CH(OH)—CH$_2$—SO$_3$Li | 1 |
| 157 | —SO$_2$—CH$_2$—CH$_2$—CH$_2$—CO$_2$—CH$_2$—CH$_2$—CH(OH)—CH$_2$—COOK | 2 |

$$M\text{-}Pc(Xp_1)_m(Xp_2)_n \quad (30)$$

In the following table, substituents (Xp$_1$) and (Xp$_2$) are random in the order of introducing positions in β-position substituent.

| Compound No. | M | R$_1$ | m |
|---|---|---|---|
| 158 | Cu | —SO$_2$—CH$_2$—CH(OH)—CH$_2$—SO$_3$Li | 3 |
| 159 | Cu | —SO$_2$NHCH$_2$CH$_2$—SO$_3$Li | 3 |
| 160 | Cu | —SO$_2$—CH$_2$—CH$_2$—O—CH$_2$—CH$_2$—O—CH$_2$—CH$_2$—SO$_3$Na | 3 |
| 161 | Cu | —SO$_2$CH$_2$CH$_2$CH$_2$SO$_3$Li | 3 |
| 162 | Cu | —SO$_2$CH$_2$CH$_2$CH$_2$SO$_3$Li | 2 |
| 163 | Cu | —SO$_2$CH$_2$CH$_2$CH$_2$SO$_3$K | 3 |
| 164 | Cu | —SO$_2$CH$_2$CH$_2$CH$_2$SO$_3$Li | 2 |
| 165 | Cu | —CO—NH—CH$_2$—CH$_2$—SO$_3$K | 3 |
| 166 | Cu | —CO—NH—CH$_2$—CH$_2$—SO$_2$—NH—CH$_2$—CH$_2$—COONa | 3 |
| 167 | Cu | —SO$_2$(CH$_2$)$_3$SO$_2$NHCH$_2$—CH(OH)—CH$_2$CO$_2$Li | 2.5 |
| 168 | Cu | —CO$_2$—CH$_2$—CH$_2$—CH(CH$_3$)—SO$_3$Na | 2 |
| 169 | Cu | —CO$_2$—CH$_2$—CH$_2$—CH$_2$—SO$_3$Li | 3 |
| 170 | Cu | —CO$_2$—CH$_2$—CH$_2$—CH$_2$COOK | 2 |

| Compound No. | R$_2$ | n |
|---|---|---|
| 158 | —SO$_2$—CH$_2$—C$_6$H$_4$—SO$_2$NH—CH$_2$—CH(OH)—CH$_2$—OH | 1 |

-continued

| No. | Structure | |
|---|---|---|
| 159 | —SO$_2$—CH$_2$—CH$_2$—CH$_2$—SO$_2$—NH—CH$_2$—CH(OH)—CH$_3$ | 1 |
| 160 | —SO$_2$—CH$_2$—CH$_2$—CH$_2$—CO—N(CH$_2$—CH$_2$—COONa)(CH$_2$—COONa) | 1 |
| 161 | —SO$_2$CH$_2$CH$_2$CH$_2$SO$_2$NHCH$_2$—CH(OH)—CH$_2$SO$_3$Li | 1 |
| 162 | —SO$_2$CH$_2$CH$_2$OCH$_2$CH$_2$OCH$_2$CH$_2$OH | 2 |
| 163 | —SO$_2$CH$_2$CH$_2$CH$_2$SO$_2$NH—CH(CH$_3$)—CH$_2$—OH | 1 |
| 164 | —SO$_2$CH$_2$CH$_2$CH$_2$SO$_2$N(CH$_2$CH$_2$OH)$_2$ | 2 |
| 165 | —CO—NH—CH$_2$—CH$_2$—O—CH$_2$—CH$_2$—OH | 1 |
| 166 | —CO—NH—CH$_2$—CH(OH)—CH$_3$ | 1 |
| 167 | —CO—NH—CH$_2$—CH$_2$—CH$_2$—CO—N(—CH$_2$—CH$_2$—OH)$_2$ | 1.5 |
| 168 | —CO—CH$_2$—CH$_2$—CH$_2$—CO—N(—CH$_2$—CH$_2$—OH)$_2$ | 2 |
| 169 | —CO$_2$—CH$_2$—CH$_2$—CH$_2$—SO$_2$—NH—CH$_2$—CH(OH)—CH$_3$ | 1 |
| 170 | —CO$_2$—CH$_2$—CH$_2$—CH$_2$—SO$_2$—NH—CH$_2$—CH(OH)—CH$_2$—COOK | 2 |

M-Pc(Xp$_1$)$_m$(Xp$_2$)$_n$ In the following table, substituents (Xp$_1$) and (Xp$_2$) are random in the order of introducing positions in β-position substituent.

| Compound No. | M | R$_1$ | m |
|---|---|---|---|
| 171 | Cu | —CO$_2$—CH$_2$—CH$_2$—O—CH$_2$—CH$_2$—O—CH$_2$—CH$_2$—SO$_3$Na | 3 |
| 172 | Cu | —SO$_2$CH$_2$CH$_2$OCH$_2$CH$_2$O—CH$_2$CH$_2$SO$_3$K | 2 |
| 173 | Cu | —SO$_2$(CH$_2$)$_3$SO$_2$NHCH$_2$CH(OH)CH$_2$OH | 2 |
| 174 | Cu | —SO$_2$(CH$_2$)$_3$SO$_2$NHCH$_2$—CH(OH)—CH$_2$SO$_3$K | 3 |
| 175 | Cu | —SO$_2$(CH$_2$)$_3$SO$_2$NH(CH$_2$)$_3$N(CH$_2$CH$_2$OH)$_2$ | 2 |
| 176 | Cu | —SO$_2$—CH$_2$—CH$_2$—CH$_2$—SO$_2$—NH—CH$_2$—CH(OH)—CH$_3$ | 3 |
| 177 | Cu | —SO$_2$—CH$_2$—CH$_2$—O—CH$_2$—CH$_2$—O—CH$_3$ | 2 |
| 178 | Cu | —SO$_2$—CH$_2$—CH$_2$—O—CH$_2$—CH$_2$—O—CH$_2$—CH$_2$—OH | 3 |
| 179 | Cu | —SO$_2$—CH$_2$—CH(CH$_2$CH$_3$)—CH$_2$CH$_2$—CH$_2$CH$_3$ | 2 |
| 180 | Cu | —SO$_2$—CH$_2$—CH$_2$—CH$_2$—SO$_2$—NH—CH$_2$—CH(O—CH$_3$)—CH$_3$ | 3 |

-continued

| Compound No. | | R₂ | | n |
|---|---|---|---|---|
| 181 | Cu | —SO₂—CH₂—CH₂—CH₂—CO₂—NH—CH(CH₃)—CH₂—CH₃ | | 3 |
| 182 | Cu | —SO₂—CH₂—CH₂—CH₂—SO₂NH—CH₂—CH(OH)—CH₃ | | 2.5 |

| Compound No. | R₂ | n |
|---|---|---|
| 171 | —CO₂—CH₂—C₆H₄—SO₂NH—CH₂—CH(OH)—CH₂—OH | 1 |
| 172 | —CO₂—CH₂—CH₂—CH₂—CO₂—CH₂—CH₂—CH(OH)—CH₂—COOK | 2 |
| 173 | —CO₂—CH₂—CH(OH)—CH₂—SO₃Li | 2 |
| 174 | —CO₂—CH₂—CH₂—CH₂—SO₂—NH—CH₂—CH(OH)—CH₃ | 1 |
| 175 | —CO₂—CH₂—CH₂—CH₂—CO—N(CH₂—CH₂—COOLi)(CH₂—COOLi) | 2 |
| 176 | —SO₂—CH₂—CH₂—CH₂—SO₂—NH—CH₂—CH(CH₂CH₃)—CH₂CH₂—CH₂CH₃ | 1 |
| 177 | —SO₂—CH₂—CH₂—CH₂—SO₂—NH—CH₂—CH(OH)—CH₃ | 1 |
| 178 | —SO₂—CH₂—CH₂—CH₂—CO₂—CH₂—CH(CH₂CH₃)—CH₂CH₂—CH₂CH₃ | 1 |
| 179 | —SO₂—CH₂—CH₂—CH₂—SO₂—NH—CH₂—CH(O—CH₃)—CH₃ | 2 |
| 180 | —SO₂NH—CH₂—CH₂—SO₂NH—CH₂—CH₂—O—CH₂—CH₂—OH | 1 |
| 181 | —SO₂—CH₂—CH₂—CH₂—SO₂—NH—CH(CH₃)₂ | 1 |
| 182 | —SO₂—CH₂—CH₂—CH₂—CO₂—NH—CH(CH₃)—CH₂—CH₃ | 1.5 |

M-Pc(Xp₁)ₘ(Xp₂)ₙ In the following table, substituents (Xp₁) and (Xp₂) are random in the order of introducing positions in β-position substituent.

| Compound No. | M | R₁ | m | R₂ | n |
|---|---|---|---|---|---|
| 183 | Cu | —SO₂—CH₂—CH₂—CH₂—CO₂—NH—CH(CH₃)—CH₂—CH₃ | 2 | —SO₂—CH₂—CH₂—CH₂—SO₂—NH—(CH₂)₃—CH₂—O—CH₂CH₂—OH | 2 |
| 184 | Cu | —SO₂—CH₂—CH₂—CH₂—SO₂—NH—CH₂—CH(OH)—CH₃ | 3 | —SO₂—CH₂—CH₂—O—CH₂—CH₂—O—CH₃ | 1 |

-continued

| Compound No. | M | $R_1$ | m | $R_2$ | n |
|---|---|---|---|---|---|
| 185 | Cu | —$SO_2$—$CH_2$—$CH_2$—$CH_2$—$SO_2$—NH—$CH_2$—CH(OH)—$CH_3$ | 3 | —$SO_2$—$CH_2$—$CH_2$—O—$CH_2$—$CH_2$—O—$CH_2$—$CH_2$—O—$CH_3$ | 1 |
| 186 | Cu | —$SO_2$—$CH_2$—$CH_2$—$CH_2$—$CO_2$—NH—CH($CH_3$)—$CH_2$—$CH_3$ | 3 | —$SO_2$—$CH_2$—$CH_2$—O—$CH_2$—$CH_2$—O—$CH_2$—$CH_2$—OH | 1 |
| 187 | Cu | —$SO_2$—$CH_2$—$CH_2$—$CH_2$—$SO_2$—NH—CH—$(CH_3)_2$ | 3 | —$CO_2$—$CH_2$—CH($CH_2CH_3$)—$CH_2$—$CH_2$—$CH_2CH_3$ | 1 |
| 188 | Cu | —$CO_2$—$CH_2$—$CH_2$—$CH_2$—$CO_2$—NH—CH($CH_3$)—$CH_2$—$CH_3$ | 3 | —$CO_2$—$CH_2$—$CH_2$—O—$CH_2$—$CH_2$—O—$CH_3$ | 1 |
| 189 | Cu | —CO—NH—$CH_2$—$CH_2$—$SO_2$—NH—CH—$(CH_3)_2$ | 3 | —$SO_2$—NH—$CH_2$—CH($CH_2CH_3$)—$CH_2$—$CH_2$—$CH_2$—$CH_3$ | 1 |
| 190 | Cu | —CO—NH—$CH_2$—CH($CH_2CH_3$)—$CH_2$—$CH_2$—$CH_2CH_3$ | 3 | —CO—NH—$CH_2$—$CH_2$—O—$CH_2$—$CH_2$—O—$CH_3$ | 1 |

The phthalocyanine compounds, indicated by M-Pc$(Xp_1)_m(Xp_2)_n$, of compound Nos. 146-190 have a following structure.

wherein each independently $X_{p1}$=$X_{p1}$ or $X_{p2}$.

The phthalocyanine dye represented by formula (2) can be synthesized according to the aforementioned patent references. Also the phthalocyanine dye represented by formula (5) can be synthesized, in addition to the aforementioned synthesizing methods, by methods described in JP-A Nos. 2001-226275, 2001-96610, 2001-47013 and 2001-193638. A starting material, a dye intermediate and a synthesizing route are not restricted to those described in the foregoing.

In the invention, the phthalocyanine dye represented by formula (2) may be used singly, or may be used in combination with another dye, particularly another phthalocyanine dye. Such combined use can be realized by mixing the dye of the invention with another phthalocyanine dye, but it is also possible, at the synthesis of the dye of formula (5), to prepare a phthalocyanine by mixing an analog compound without the substituent Xp with the phthalonitrile derivative (compound P) and the diiminoisoindoline derivative (compound Q), thereby obtaining a mixture at such synthesis.

The phthalocyanine dye represented by formula (2) preferably has a content in the ink of 0.2 to 20 mass %, more preferably 0.5 to 15 mass %.

(Magenta Dye)

A magenta dye to be employed in the invention is preferably an azo dye having an absorption maximum within a spectral range of 500 to 580 nm in an aqueous medium and having an oxidation potential higher than 1.0 V (vs. SCE). As explained in the foregoing, the oxidation potential is preferably as high as possible, more preferably higher than 1.1 V (vs. SCE) and further preferably higher than 1.15 V (vs. SCE).

Such azo dye serving as the magenta dye has, as a first preferred feature of dye structure, a chromophore represented by a formula: (heterocycle A)-N=N-(heterocycle B). In this case, the heterocycle A and heterocycle B may have the same structure. Each of the heterocycle A and the heterocycle B is a 5- or 6-membered heterocycle selected from pyrazole, imidazole, triazole, oxazole, thiazole, selenazole, pyrridone, pyradine, pyrimidine and pyridine. Specific examples are described for example in Japanese Patent Applications Nos. 2000-15853 and 2001-15614, JP-A No. 2002-309116 and Japanese Patent Application No. 2001-195014.

Further, a second preferred structural feature of the azo dye is that the azo group is directly connected, at least at an end thereof, with an aromatic nitrogen-containing 6-membered heterocycle as a coupling component, and specific examples are described in Japanese Patent Application No. 2001-110457.

A third preferred structural feature is that an auxochrome has a structure of an aromatic cyclic amino group or a heterocyclic amino group, more specifically an anilino group or a heterylamino group.

A fourth preferred structural feature is the presence of a steric structure, which is more specifically described in Japanese Patent Application No. 2002-12015.

Providing the azo dye with the aforementioned structural features allows to increase the oxidation potential of the dye and to improve the ozone resistance. Means for increasing the oxidation potential can be an elimination of an α-hydrogen of the azo dye. The azo dye of formula (3) is also preferable from the standpoint of increasing the oxidation potential. Means for increasing the oxidation potential of the azo dye is described in Japanese Patent Application No. 2001-254878.

The magenta ink of the invention, utilizing the azo dye having the aforementioned features, preferably has λmax (wavelength of absorption maximum) within a range of 500 to 580 nm in terms of color hue, and has a small half-peak width at the longer wavelength side and the shorter wavelength side of the absorption maximum, namely a sharp absorption. A specific description is given in Japanese Patent Application No. 2002-309133. It is also possible to obtain a sharper absorption by employing the azo dye of formula (3) and introducing a methyl group in the α-position thereof.

Also a magenta gas utilizing such azo dye preferably has a forced fading rate constant to ozone gas of $5.0 \times 10^{-2}$ [hour$^{-1}$] or less, more preferably $3.0 \times 10^{-2}$ [hour$^{-1}$] or less, and particularly preferably $1.5 \times 10^{-2}$ [hour$^{-1}$] or less.

In the measurement of the forced fading rate constant to ozone gas, a colored area of a color of a main spectral absorption range of the magenta ink in an image, obtained by printing the magenta ink only on a reflective image receiving medium, and having a reflective density of 0.90 to 1.10 measured through a status A filter, is selected as an initial density point, and such initial density is taken as a starting density (=100%). This image is subjected to a fading in an ozone facing tester which constantly maintains an ozone concentration of 5 mg/L to measure a time required for reaching a density corresponding to 80% of the initial density, and a reciprocal [hour$^{-1}$] of such time is determined and taken as the fading rate constant on an assumption that the faded density and the time follow a first-order reaction rate equation.

A print patch for testing can be a patch printed with black square marks according to JIS code 2223, a stepped color patch of Macbeth chart, or an arbitrary stepped density patch capable of providing an area for measurement.

A reflective density of the reflective density (stepped color patch) printed for measurement is a density determined through a status A filter in a densitometer meeting the international standard ISO5-4 (geometrical condition for reflective density).

A test chamber for the measurement of the forced fading rate constant to ozone gas is provided with an ozone generating apparatus (for example of a high-voltage discharge type for applying an AC voltage to dry air), capable of maintaining the internal ozone gas concentration constantly at 5 mg/L, and an exposure temperature is maintained at 25° C.

The forced fading rate constant is an index of susceptibility to oxidation by an oxidative atmosphere in the environment such as photochemical smog, automotive exhaust gas, organic vapor from a coated surface of furniture or a carpet, gas generated in a picture frame in a sunny room etc., in which such oxidative atmosphere is represented by ozone gas.

The magenta dye having the aforementioned features and advantageously employed in the invention is an azo dye including a 5-membered heterocycle and an aromatic nitrogen-containing 6-membered heterocycle, and is preferably a dye represented by formula (3). In the following, the dye represented by formula (3) will be explained.

In formula (3), $A_{31}$ represents a 5-membered heterocyclic group.

$B_{31}$ and $B_{32}$ each represents =CR$_{31}$— or —CR$_{32}$=, or either one represents a nitrogen atom while the other represents =CR$_{31}$— or =CR$_{32}$=.

$R_{35}$ and $R_{36}$ each independently represents a hydrogen atom or a substituent, which represents an aliphatic group, an aromatic group, a heterocyclic group, an acyl group, an alkoxycarbonyl group, an aryloxycarbonyl group, a carbamoyl group, an alkylsulfonyl group, an arylsulfonyl group, or a sulfamoyl group, and a hydrogen atom in each substituent may be substituted.

$G_3$, $R_{31}$ and $R_{32}$ each independently represents a hydrogen atom or a substituent, which represents a halogen atom, an aliphatic group, an aromatic group, a heterocyclic group, a cyano group, a carboxyl group, a carbamoyl group, an alkoxycarbonyl group, an aryloxycarbonyl group, a heterocyclic oxycarbonyl group, an acyl group, a hydroxy group, an alkoxy group, an aryloxy group, a heterocyclic oxy group, a silyloxy group, an acyloxy group, a carbamoyloxy group, an alkoxycarbonyloxy group, an aryloxycarbonyloxy group, an amino group, an acylamino group, an ureido group, a sulfamoylamino group, an alkoxycarbonylamino group, an aryloxycarbonylamino group, an alkylsulfonylamino group, an arylsulfonylamino group, a heterocyclic sulfonylamino group, a nitro group, an alkylthio group, an arylthio group, a heterocyclic thio group, an alkylsulfonyl group, an arylsulfonyl group, a heterocyclic sulfonyl group, an alkylsulfinyl group, an arylsulfinyl group, a heterocyclic sulfinyl group, a sulfamoyl group, or a sulfo group, and a hydrogen atom of each substituent may be further substituted.

$R_{31}$ and $R_{35}$, or $R_{35}$ and $R_{36}$ may be bonded to form a 5- or 6-membered ring.

In formula (3), $A_{31}$ represents a 5-membered heterocyclic group, and a hetero atom thereof can be N, O or S. It is preferably a nitrogen-containing 5-membered heterocycle, to which an aliphatic ring, an aromatic ring or another heterocycle may be condensed. Preferred examples of the heterocycle $A_{31}$ include a pyrazole ring, an imidazole ring, a thiazole ring, an isothiazole ring, a thiadiazole ring, a benzothiazole ring, a benzoxazole ring, and a benzisothiazole ring. Each heterocyclic ring may further have a substituent. Among these, there are preferred a pyrazole ring, an imidazole ring, an isothiazole ring, a thiadiazole ring and a benzothiazole ring represented by following formulae (a) to (g).

In the following formulae (a) to (g), $R_{307}$ to $R_{322}$ represent substituents same as $G_3$, $R_{31}$ and $R_{32}$ in formula (3).

Among formulae (a) to (g), a pyrazole ring and an isothiazole ring represented by formulae (a) and (b) are preferred, and a pyrazole ring represented by formula (a) is most preferred.

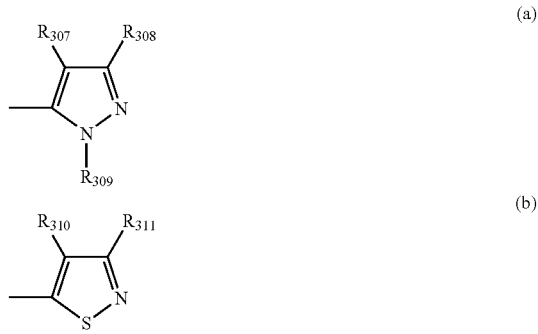

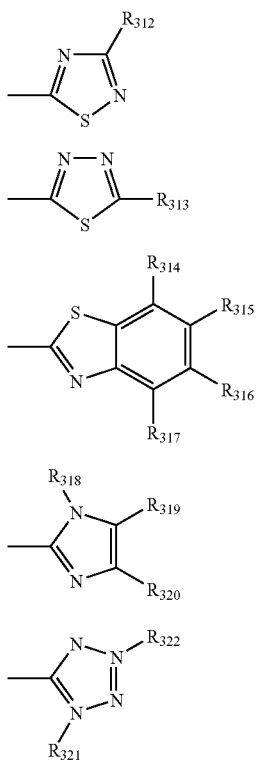

(c)

(d)

(e)

(f)

(g)

In formula (3), $B_{31}$ and $B_{32}$ each represents $=CR_{31}-$ or $-CR_{32}=$, or either one represents a nitrogen atom while the other represents $=CR_{31}-$ or $-CR_{32}=$, but there is more, preferred a case where each represents $=CR_{31}-$ or $-CR_{32}=$.

$R_{35}$ and $R_{36}$ each can preferably be a hydrogen atom, an aliphatic group, an aromatic group, a heterocyclic group, an acyl group, an alkyl- or aryl-sulfonyl group. More preferably it is a hydrogen atom, an aromatic group, a heterocyclic group, an acyl group, an alkyl- or aryl-sulfonyl group. Most preferably it is a hydrogen atom, an aryl group, or a heterocyclic group. A hydrogen atom of such substituent may be substituted. However, $R_{35}$ and $R_{36}$ do not become hydrogen atoms at the same time.

$G_3$ is preferably a hydrogen atom, a halogen atom, an aliphatic group, an aromatic group, a hydroxy group, an alkoxy group, an aryloxy group, an acyloxy group, a heterocyclic oxy group, an amino group, an acylamino group, an ureido group, a sulfamoylamino group, an alkoxycarbonylamino group, an aryloxycarbonylamino group, an alkylthio group, an arylthio group, or a heterocyclic thio group, more preferably a hydrogen atom, a halogen atom, an alkyl group, a hydroxy group, an alkoxy group, an aryloxy group, an acyloxy group, an amino group, or an acylamino group, and most preferably a hydrogen atom, an amino group (preferably an anilino group) or an acylamino group. A hydrogen atom of each substituent may be substituted.

Each of $R_{31}$ and $R_{32}$ can preferably be a hydrogen atom, an alkyl group, a halogen atom, an alkoxycarbonyl group, a carboxyl group, a carbamoyl group, a hydroxyl group, an alkoxy group, or a cyano group. A hydrogen atom of each substituent may be substituted.

Also $R_{31}$ and $R_{32}$, or $R_{35}$ and $R_{36}$ may be bonded to form a 5- or 6-membered ring.

In case A has a substituent, or a substituent of $R_{31}$, $R_{32}$, $R_{35}$, $R_{36}$ or $G_3$ further has a substituent, such substituent can be that cited for $G_3$, $R_{31}$ and $R_{32}$ in the foregoing.

In case the dye represented by formula (3) is a water-soluble dye, it preferably further has an ionic hydrophilic group as a substituent in any position on $G_3$, $R_{31}$, $R_{32}$, $R_{35}$, $R_{36}$ or $G_3$. The ionic hydrophilic group as a substituent can be a sulfo group, a carboxyl group, a phosphono group or a quaternary ammonium group. The ionic hydrophilic group is preferably a carboxyl group, a phosphono group or a sulfo group, particularly preferably a carboxyl group or a sulfo group. The carboxyl group, the phosphono group or the sulfo group may be in a state of a salt, and a counter ion forming the salt can be an ammonium ion, an alkali metal ion (such as lithium ion, sodium ion, or potassium ion), or an organic cation (such as tetramethylammonium ion, tetramethylguanidium ion or tetramethylphosphonium).

Now, there will be given an explanation of a term "substituent" used in the explanation of formula (3). Such term is same in formula (3) and a formula (3-A) to be explained later.

A halogen atom includes a fluorine atom, a chlorine atom and a bromine atom.

An aliphatic group means an alkyl group, a substituted alkyl group, an alkenyl group, a substituted alkenyl group, an akinyl group, a substituted alkinyl group, an aralkyl group or a substituted aralkyl group. A term "substituted" used for example in "substituted alkyl group" or the like means that a hydrogen atom present in the "alkyl group" or the like is substituted with a substituent cited for $G_3$, $R_{31}$ and $R_{32}$ in the foregoing.

The aliphatic group may be branched or may form a ring. The aliphatic group preferably has 1 to 20 carbon atoms, further preferably 1 to 16 carbon atoms. An aryl portion of the aralkyl group or the substituted aralkyl group is preferably a phenyl group or a naphthyl group, particularly preferably a phenyl group. Examples of the aliphatic group include a methyl group, an ethyl group, a butyl group, an isopropyl group, a t-butyl group, a hydroxyethyl group, a methoxyethyl group, a cyanoethyl group, a trifluoromethyl group, a 3-sulfopropyl group, a 4-sulfobutyl group, a cyclohexyl group, a benzyl group, a 2-phenethyl group, a vinyl group and an allyl group.

The aromatic group means an aryl group and a substituted aryl group. The aryl group is preferably a phenyl group or a naphthyl group, particularly preferably a phenyl group. The aromatic group preferably has 6 to 20 carbon atoms, further preferably 6 to 16 carbon atoms.

Examples of the aromatic group include a phenyl group, a p-tolyl group, a p-methoxyphenyl group, an o-chlorophenyl group and a m-(3-sulfopropylamino)phenyl group.

The heterocyclic group includes a substituted heterocyclic group. The heterocyclic group may have a heterocyclic structure to which an aliphatic ring, an aromatic ring or another heterocycle is condensed. The heterocyclic group is preferably a 5- or 6-membered heterocyclic group. Examples of the substituent include an aliphatic group, a halogen atom, an alkylsulfonyl group, an arylsulfonyl group, an acyl group, an acylamino group, a sulfamoyl group, a carbamoyl group, and an ionic hydrophilic group. Examples of the heterocyclic group include a 2-pyridyl group, a 2-thienyl group, a 2-thiazolyl group, a 2-benzothiazolyl group, a 2-benzoxazolyl group and a 2-furyl group.

The carbamoyl group includes a substituted carbamoyl group. Examples of the substituent include an alkyl group. Also examples of the carbamoyl group include a methylcarbamoyl group and a dimethylcarbamoyl group.

The alkoxycarbonyl group includes a substituted alkoxycarbonyl group. The alkoxycarbonyl group preferably has 2 to 20 carbon atoms. Examples of the substituent include an ionic hydrophilic group. Examples of the alkoxycarbonyl group include a methoxycarbonyl group and an ethoxycarbonyl group.

The aryloxycarbonyl group includes a substituted aryloxycarbonyl group. The aryloxycarbonyl group preferably has 7 to 20 carbon atoms. Examples of the substituent include an ionic hydrophilic group. Examples of the aryloxycarbonyl group include a phenoxycarbonyl group.

The heterocyclic oxycarbonyl group includes a substituted heterocyclic oxycarbonyl group. The heterocycle can be the heterocycles cited for the heterocyclic group. The heterocyclic oxycarbonyl group preferably has 2 to 20 carbon atoms. Examples of the substituent include an ionic hydrophilic group. Examples of the heterocyclic oxycarbonyl group include a 2-pyridyl oxycarbonyl group.

The acyl group includes a substituted acyl group. The acyl group preferably has 1 to 20 carbon atoms. Examples of the substituent include an ionic hydrophilic group. Examples of the acyl group include an acetyl group and a benzoyl group.

The alkoxy group includes a substituted alkoxy group. The alkoxy group preferably has 1 to 20 carbon atoms. Examples of the substituent include an alkoxy group, a hydroxyl group and an ionic hydrophilic group. Examples of the alkoxy group include a methoxy group, an ethoxy group, an isopropoxy group, a methoxyethoxy group, a hydroxyethoxy group and a 3-carboxypropoxy group.

The aryloxy group includes a substituted aryloxy group. The aryloxy group preferably has 6 to 20 carbon atoms. Examples of the substituent include an alkoxy group, and an ionic hydrophilic group. Examples of the aryloxy group include a phenoxy group, a p-methoxyphenoxy group and an o-methoxyphenoxy group.

The heterocyclic oxy group includes a substituted heterocyclic oxy group. The heterocycle can be those cited for the heterocyclic group in the foregoing. The heterocyclic oxy group preferably has 2 to 20 carbon atoms. Examples of the substituent include an alkyl group, an alkoxy group, and an ionic hydrophilic group. Examples of the heterocyclic oxy group include a 3-pyridyloxy group, and a 3-thienyloxy group.

The silyloxy group is preferably a silyloxy group substituted with an aliphatic group with 1 to 20 carbon atoms or with an aromatic group. Examples of such silyloxy group includes a trimethylsilyloxy group and a diphenylmethylsilyloxy group.

The acyloxy group includes a substituted acyloxy group. The acyloxy group preferably has 1 to 20 carbon atoms. Examples of the substituent include an ionic hydrophilic group. Examples of the acyloxy group include an acetoxy group and a benzoyloxy group.

The carbamoyloxy group includes a substituted carbamoyloxy group. Examples of the substituent include an alkyl group. Examples of the carbamoyloxy group include an N-methylcarbamoyl group.

The alkoxycarbonyloxy group includes a substituted alkoxycarbonyloxy group. The alkoxycarbonyloxy group preferably has 2 to 20 carbon atoms. Examples of the alkoxycarbonyloxy group include a methoxycarbonyloxy group, and an isopropoxycarbonyloxy group.

The aryloxycarbonyloxy group includes a substituted aryloxycarbonyloxy group. The aryloxycarbonyloxy group preferably has 7 to 20 carbon atoms. Examples of the aryloxycarbonyloxy group include a phenoxycarbonyloxy group.

The amino group includes a substituted amino group. The substituent can be an alkyl group, an aryl group or a heterocyclic group, and the alkyl group, the aryl group or the heterocyclic group may further have a substituent. The alkylamino group includes a substituted alkylamino group. The alkylamino group preferably has 1 to 20 carbon atoms. Examples of the substituent include an ionic hydrophilic group. Examples of the alkylamino group include a methylamino group and a diethylamino group.

The arylamino group includes a substituted arylamino group. The arylamino group preferably has 6 to 20 carbon atoms. Examples of the substituent include a halogen atom, and an ionic hydrophilic group. Examples of the arylamino group include a phenylamino group and a 2-chlorophenylamino group.

The heterocyclic amino group includes a substituted heterocyclic amino group. The heterocycle can be those cited for the heterocyclic group in the foregoing. The heterocyclic amino group preferably has 2 to 20 carbon atoms. Examples of the substituent include an alkyl group, a halogen atom and an ionic hydrophilic group.

The acylamino group includes a substituted acylamino group. The acylamino group preferably has 2 to 20 carbon atoms. Examples of the substituent include an ionic hydrophilic group. Examples of the acylamino group include an acetylamino group, a propionylamino group, a benzoylamino group, an N-phenylacetylamino group and a 3,5-disulfobenzoylamino group.

The ureido group includes a substituted ureido group. The ureido group preferably has 1 to 20 carbon atoms. Examples of the substituent include an alkyl group and an aryl group. Examples of the ureido group include a 3-methylureido group, a 3,3-dimethylureido group and 3-phenylureido group.

The sulfamoylamino group includes a substituted sulfamoylamino group. Examples of the substituent include an alkyl group. Examples of the sulfamoylamino group include an N,N-dipropylsulfamoylamino group.

The alkoxycarbonylamino group includes a substituted alkoxycarbonylamino group. The alkoxycarbonylamino group preferably has 2 to 20 carbon atoms. Examples of the substituent include an ionic hydrophilic group. Examples of the alkoxycarbonylamino group include an ethoxycarbonylamino group.

The aryloxycarbonylamino group includes a substituted aryloxycarbonylamino group. The aryloxycarbonylamino group preferably has 7 to 20 carbon atoms. Examples of the substituent include an ionic hydrophilic group. Examples of the aryloxycarbonylamino group include a phenoxycarbonylamino group.

The alkylsulfonylamino group and the arylsulfonylamino group include a substituted alkylsulfonylamino group and a substituted arylsulfonylamino group. The alkylsulfonylamino group and the arylsulfonylamino group preferably have 1 to 20 carbon atoms. Examples of the substituent include an ionic hydrophilic group. Examples of the alkylsulfonylamino group and the arylsulfonylamino group include a methylsulfonylamino group, an N-phenyl-methylsulfonylamino group, a phenylsulfonylamino group, and a 3-carboxyphenylsulfonylamino group.

The heterocyclic sulfonylamino group includes a substituted heterocyclic sulfonylamino group. The heterocycle can be those cited for the heterocyclic group in the foregoing. The heterocyclic sulfonylamino group preferably has 1 to 12 carbon atoms. Examples of the substituent include an ionic hydrophilic group. Examples of the heterocyclic sulfonylamino group include a 2-thienylsulfonylamino group, and a 3-pyridylsulfonylamino group.

The alkylthio group, the arylthio group and the heterocyclic thio group includes a substituted alkylthio group, a substituted arylthio group and a substituted heterocyclic thio group. The heterocycle can be those cited for the heterocyclic group in the foregoing. The alkylthio group, the arylthio group and the heterocyclic thio group preferably has 1 to 20 carbon atoms. Examples of the substituent include an ionic hydrophilic group. Examples of the alkylthio group, the arylthio group and the heterocyclic thio group include a methylthio group, a phenylthio group, and a 2-pyridylthio group.

The alkylsulfonyl group and the arylsulfonyl group include a substituted alkylsulfonyl group and a substituted arylsulfonyl group. Examples of the alkylsulfonyl group and the arylsulfonyl group respectively include a methylsulfonyl group, and a phenylsulfonyl group.

The heterocyclic sulfonyl group includes a substituted heterocyclic sulfonyl group. The heterocyclic sulfonyl group preferably has 1 to 20 carbon atoms. Examples of the substituent include an ionic hydrophilic group. Examples of the heterocyclic sulfonyl group include a 2-thienylsulfonyl group, and a 3-pyridylsulfonyl group.

The alkylsulfinyl group and the arylsulfinyl group include a substituted alkylsulfinyl group and a substituted arylsulfinyl group. Examples of the alkylsulfinyl group and the arylsulfinyl group respectively include a methylsulfinyl group and a phenylsulfinyl group.

The heterocyclic sulfinyl group includes a substituted heterocyclic sulfinyl group. The heterocycle can be those cited for the heterocyclic group in the foregoing. The heterocyclic sulfinyl group preferably has 1 to 20 carbon atoms. Examples of the substituent include an ionic hydrophilic group. Examples of the heterocyclic sulfinyl group include a 4-pyridylsulfinyl group.

The sulfamoyl group includes a substituted sulfamoyl group. Examples of the substituent include an alkyl group. Examples of the sulfamoyl group include a dimethylsulfamoyl group, and a di-(2-hydroxyethyl)sulfamoyl group.

In formula (3), a particularly preferable structured is represented by formula (3-A):

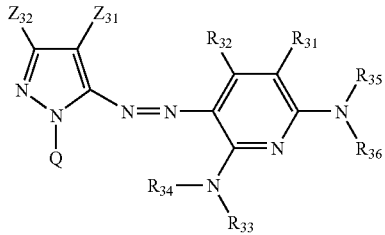

wherein, $R_{31}$, $R_{32}$, $R_{35}$ and $R_{36}$ have the same meaning as in formula (3).

$R_{33}$ and $R_{34}$ each independently represents a hydrogen atom or a substituent, which can be an aliphatic group, an aromatic group, a heterocyclic group, an acyl group, an alkoxycarbonyl group, an aryloxycarbonyl group, a carbamoyl group, an alkylsulfonyl group, an arylsulfonyl group, or a sulfamoyl group. Among these, a hydrogen atom, an aromatic group, a heterocyclic group, an acyl group, an alkylsulfonyl group or an arylsulfonyl group is preferable, and a hydrogen atom, an aromatic group, or a heterocyclic group is particularly preferable.

$Z_{31}$ represents an electron attracting group with Hammett's substituent constant σp of 0.20 or higher. $Z_{31}$ is preferably an electron attracting group with σp of 0.30 or higher, more preferably an electron attracting group with σp of 0.45 or higher, particularly preferably an electron attracting group with σp of 0.60 or higher, but σp preferably does not exceed 1.0.

More specifically, examples of the electron attracting group with Hammett's substituent constant σp of 0.60 or higher include a cyano group, a nitro group, an alkylsulfonyl group (such as methylsulfonyl group) or an arylsulfonyl group (such as phenylsulfonyl group).

Examples of the electron attracting group with Hammett's substituent constant σp of 0.45 or higher include, in addition to those in the foregoing, an acyl group (such as acetyl group), an alkoxycarbonyl group (such as dodecyloxycarbonyl group), an aryloxycarbonyl group (such as m-chlorophenoxycarbonyl), an alkylsulfinyl group (such as n-propysulfinyl), an arylsulfinyl group (such as phenylsulfinyl), a sulfamoyl group (such as N-ethylsulfamoyl or N,N-dimethylsulfamoyl), and a halogenated alkyl group (such as trifluoromethyl).

Examples of the electron attracting group with Hammett's substituent constant σp of 0.30 or higher include, in addition to those in the foregoing, an acyloxy group (such as acetoxy), a carbamoyl group (such as N-ethylcarbamoyl or N,N-dibutylcarbamoyl), a halogenated alkoxy group (such as trifluoromethyloxy), a halogenated aryloxy group (such as pentafluorophenyloxy), a sulfonyloxy group (such as methylsulfonyloxy group), a halogenated alkylthio group (such as difluoromethylthio), an aryl group substituted with two or more electron attracting groups with σp of 0.15 or higher (such as 2,4-dinitrophenyl, or pentachlorophenyl), and a heterocycle (such as 2-benzoxazolyl, 2-benzothiazolyl or 1-phenyl-2-benzimidazolyl).

Examples of the electron attracting group with Hammett's substituent constant σp of 0.20 or higher include, in addition to those in the foregoing, a halogen atom.

$Z_{31}$ is preferably, among those in the foregoing, an acyl group with 2 to 20 carbon atoms, an alkyloxycarbonyl group with 2 to 20 carbon atoms, a nitro group, a cyano group, an alkylsulfonyl group with 1 to 20 carbon atoms, an arylsulfonyl group with 6 to 20 carbon atoms, a carbamoyl group with 1 to 20 carbon atoms or a halogenated alkyl group with 1 to 20 carbon atoms. It is particularly preferably a cyano group, an alkylsulfonyl group with 1 to 20 carbon atoms or an arylsulfonyl group with 6 to 20 carbon atoms, and most preferably a cyano group.

$Z_{32}$ represents a hydrogen atom or a substituent, which can be an aliphatic group, an aromatic group or a heterocyclic group. $Z_{32}$ is preferably an aliphatic group, more preferably an alkyl group with 1 to 6 carbon atoms.

Q represents a hydrogen atom or a substituent, which can be an aliphatic group, an aromatic group or a heterocyclic group. Among these, Q is preferably a non-metal atom group required for forming 5- to 8-membered ring. Such 5- to 8-membered ring may be substituted or saturated, or may include an unsaturated bond. Among these, an aromatic group or a heterocyclic group is particularly preferred. A preferred non-metal atom can be a nitrogen atom, an oxygen atom, a sulfur atom or a carbon atom. Specific examples of such ring structure include a benzene ring, a cyclopentane ring, a cyclohexane ring, a cycloheptane ring, a cyclooctane ring, a cyclohexene ring, a pyridine ring, a pyrimidine ring, a pyrazine ring, a pyridazine ring, a triazine ring, an imidazole ring, a benzimidazole ring, an oxazole ring, a benzoxazole ring, a thiazole ring, a benzothiazole ring, an oxane ring, a sulfolane ring, and a thiane ring.

A hydrogen atom of each substituent explained with formula (3-A) may be substituted. Such substituent can be those explained in formula (3), groups cited for $G_3$, $R_{31}$ and $R_{32}$, and an ionic hydrophilic group.

As a particularly preferable combination of the substituents in the azo represented by formula (3), $R_{35}$ and $R_{36}$ each is preferably a hydrogen atom, an alkyl group, an aryl group, a heterocyclic group, a sulfonyl group or an acyl group, more preferably a hydrogen atom, an aryl group, a heterocyclic group, or a sulfonyl group, and most preferably a hydrogen atom, an aryl group, or a heterocyclic group. However, $R_{35}$ and $R_{36}$ do not become hydrogen atoms at the same time.

$G_3$ is preferably a hydrogen atom, a halogen atom, an alkyl group, a hydroxyl group, an amino group or an acylamino group, more preferably a hydrogen atom, a halogen atom, an amino group or an acylamino group, and most preferably a hydrogen atom, an amino group or an acylamino group.

A is preferably a pyrazole ring, an imidazole ring, an isothiazole ring, a thiadiazole ring, or a benzothiazole ring, more preferably a pyrazole ring, or an isothiazole ring, and most preferably a pyrazole ring.

$B_{31}$ and $B_{32}$ each is $=CR_{31}-$ or $-CR_{32}=$, and $R_{31}$ and $R_{32}$ each is preferably a hydrogen atom, an alkyl group, a halogen atom, a cyano group, a carbamoyl group, a carboxyl group, a hydroxyl group, an alkoxy group, or an alkoxycarbonyl group, more preferably a hydrogen atom, an alkyl group, a carboxyl group, a cyano group or a carbamoyl group.

As to a preferred combination of the substituents in the compound represented by formula (3), there is preferred a compound in which at least one of the various substituents is the aforementioned preferable group, more preferably a compound in which a larger number of the various substituents are the aforementioned preferable groups, and most preferably a compound in which all the substituents are the aforementioned preferable groups.

Specific examples of the azo dye represented by formula (3) are shown in the following, but the present invention is not limited by such examples.

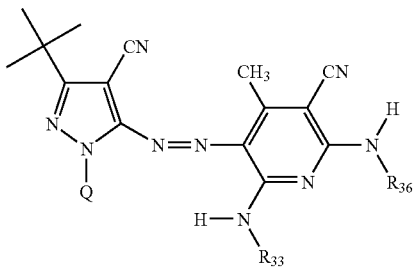

| Dye | Q | $R_{33}$ | $R_{36}$ |
|---|---|---|---|
| a-1 | 2-benzothiazolyl | 4-$C_8H_{17}$-phenyl | 4-$C_8H_{17}$-phenyl |
| a-2 | 5-Cl-2-benzothiazolyl | 4-$C_8H_{17}$-phenyl | 2,4,6-tri-$CH_3$-phenyl |
| a-3 | 6-Cl-2-benzothiazolyl | 2,4,6-tri-$CH_3$-phenyl | 4-$C_8H_{17}$-phenyl |
| a-4 | 2-benzothiazolyl | 2-$OC_8H_{17}$-phenyl | 4-$C_8H_{17}$-phenyl |
| a-5 | 5-$NO_2$-2-benzothiazolyl | 2,4-di-$CH_3$-phenyl | 2,4-di-$CH_3$-phenyl |

-continued
| Dye | | | | |
|---|---|---|---|---|
| a-6 | 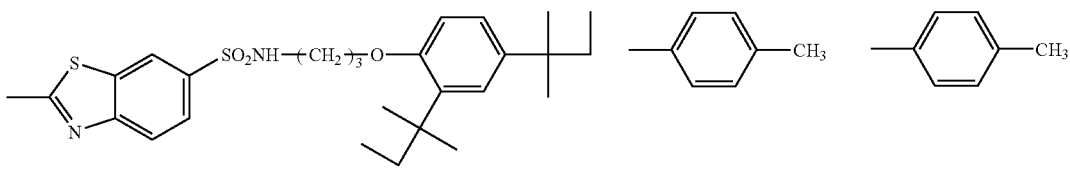 | | 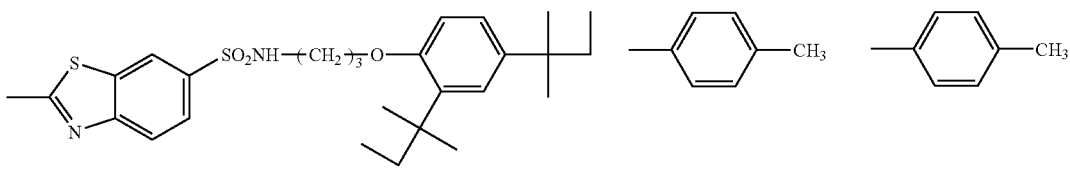 | |
| a-7 | 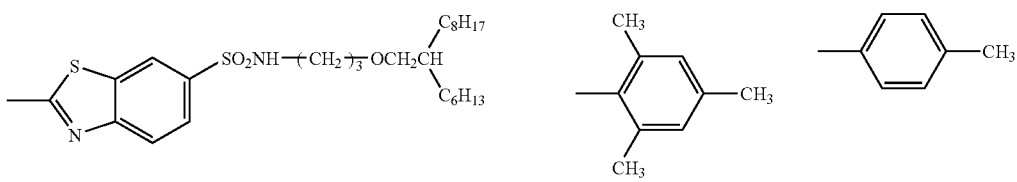 | | | |
| a-8 | 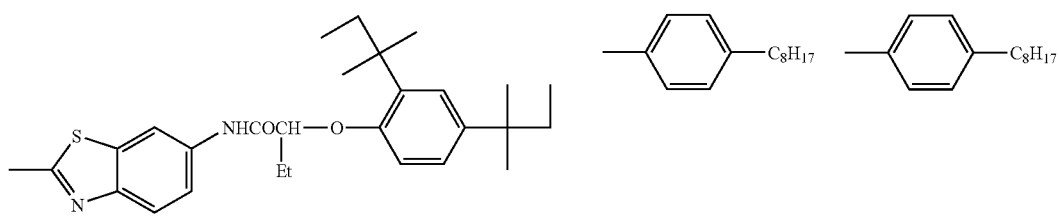 | | | |
| a-9 | 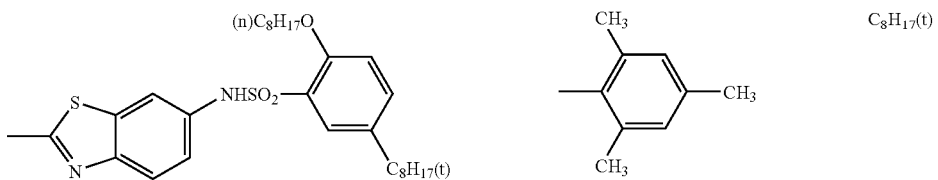 | | | |
| a-10 |  | | | |
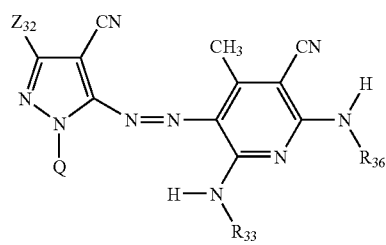
| Dye | $Z_{32}$ | Q | $R_{33}$ | $R_{36}$ |
|---|---|---|---|---|
| a-11 | | 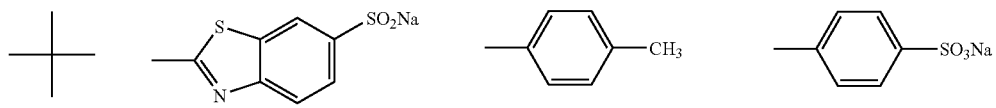 | | |
| a-12 | | 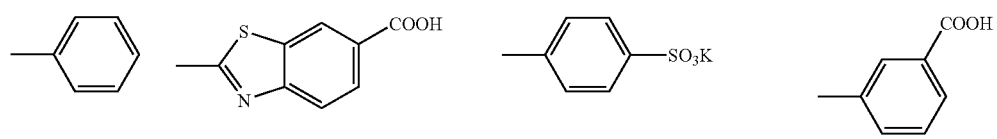 | | |
| a-13 | | 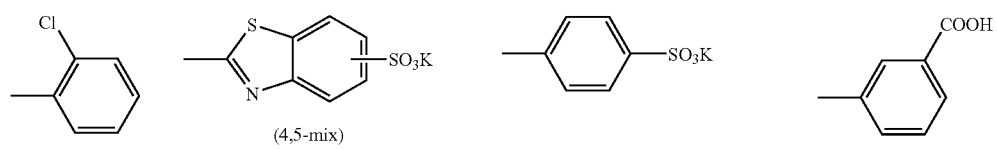 | | |

-continued
| Dye | | | | |
|---|---|---|---|---|
| a-14 | 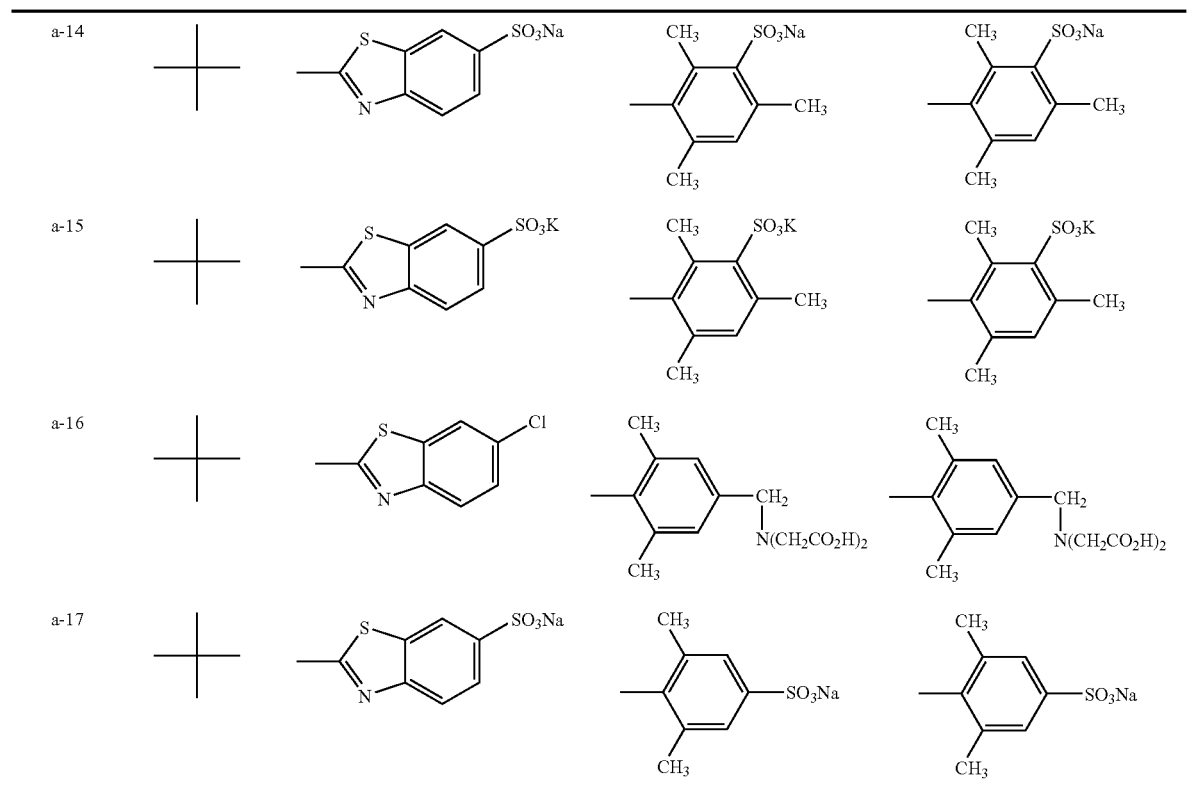 | | | |
| a-15 | | | | |
| a-16 | | | | |
| a-17 | | | | |
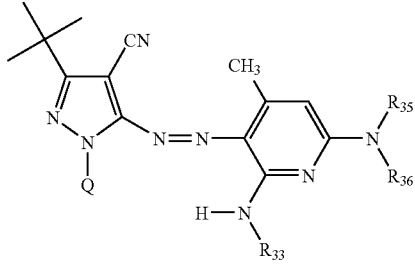
| Dye | Q | $R_{35}$ |
|---|---|---|
| a-18 | 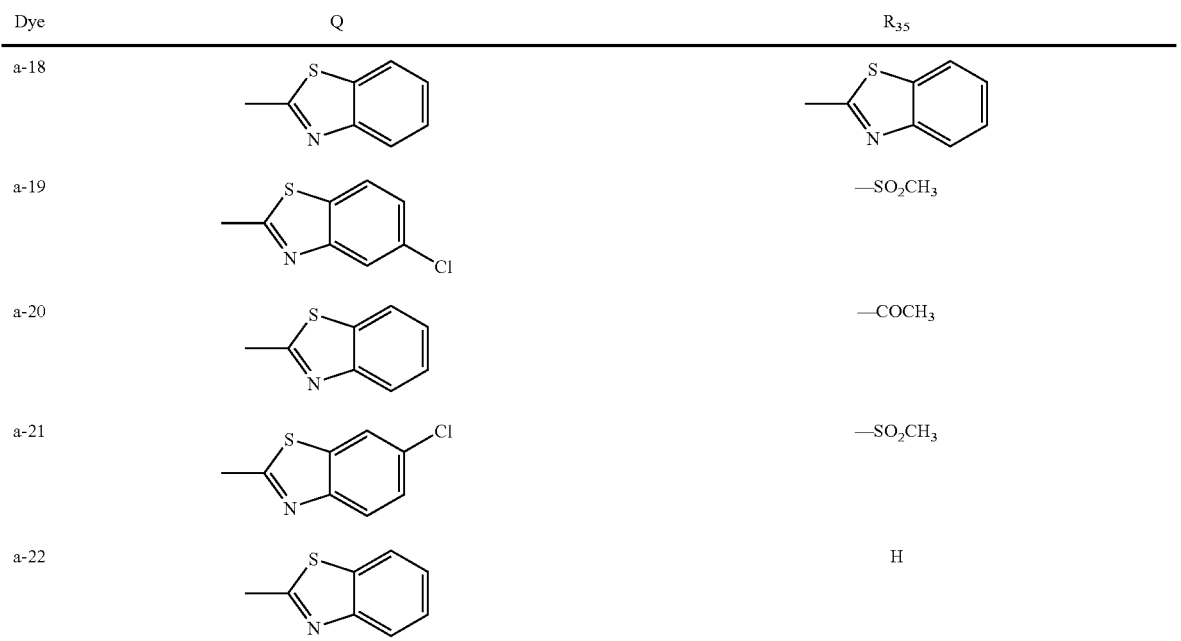 | |
| a-19 | | —SO$_2$CH$_3$ |
| a-20 | | —COCH$_3$ |
| a-21 | | —SO$_2$CH$_3$ |
| a-22 | | H |

| | | |
|---|---|---|
| a-23 | 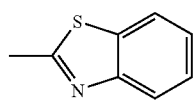 | H |
| a-24 | 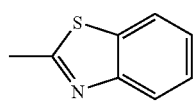 | H |
| a-25 | 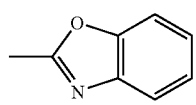 | 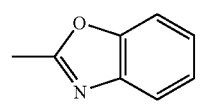 |
| a-26 | 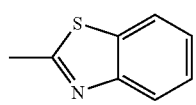 | 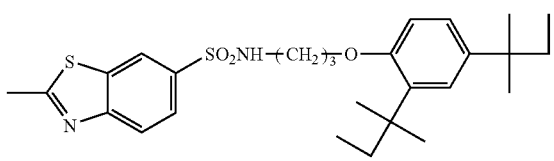 |
| a-27 | 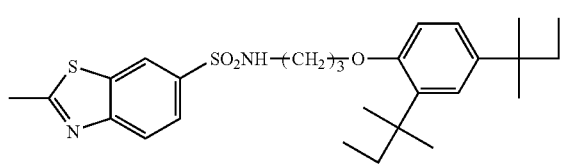 | 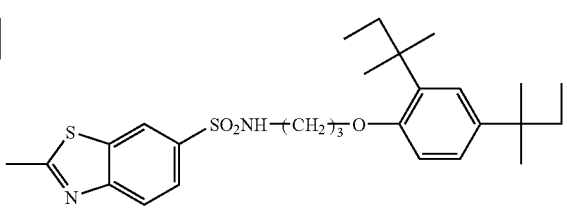 |
| a-28 | 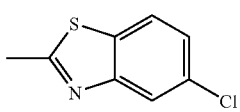 | 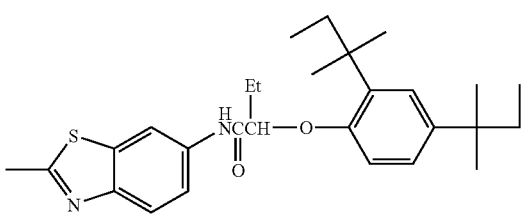 |
| a-29 | 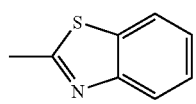 | 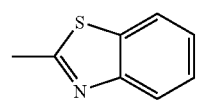 |
| a-30 | 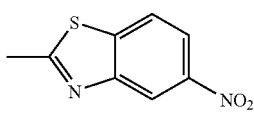 | 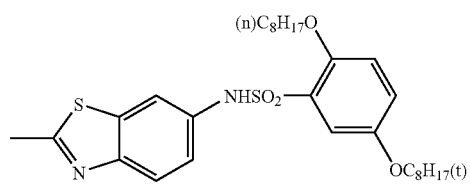 |
| a-31 | 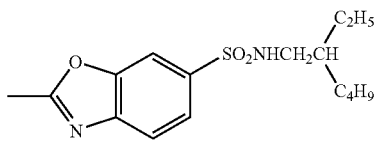 | 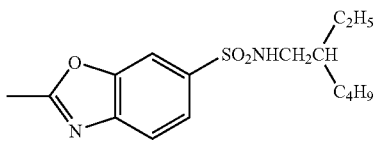 |
| a-32 | 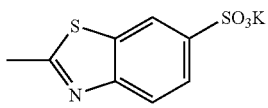 | 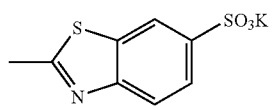 |

-continued
a-33 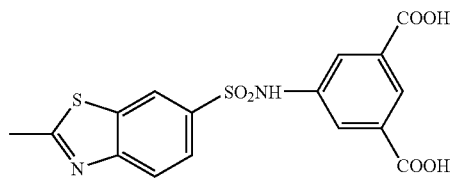 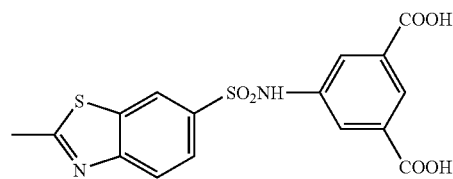
a-34 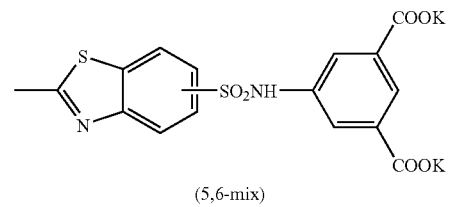 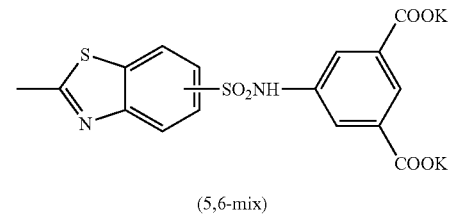
(5,6-mix) (5,6-mix)
a-35 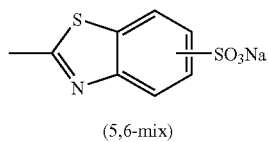 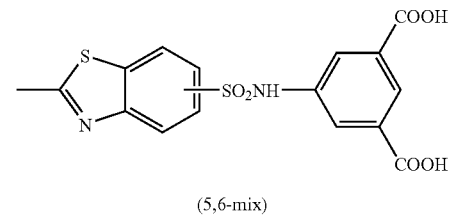
(5,6-mix) (5,6-mix)
a-36 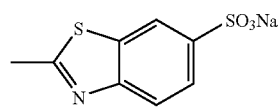 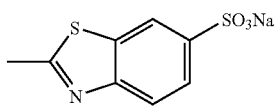
a-37 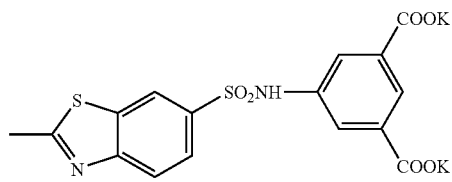 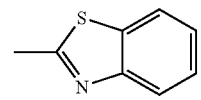
a-38 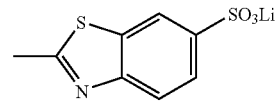 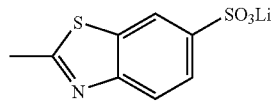
a-39 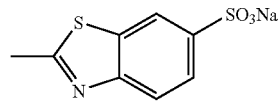 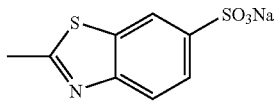
a-40 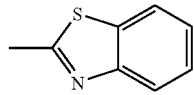 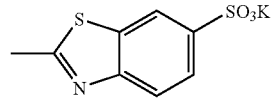
| Dye | $R_{36}$ | $R_{33}$ |
|---|---|---|
| a-18 | 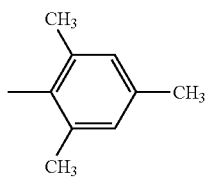 | 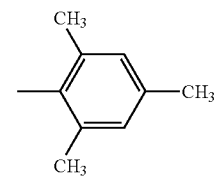 |

-continued
| | | |
|---|---|---|
| a-19 | 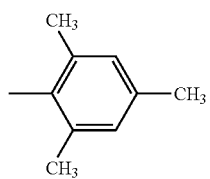 | 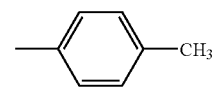 |
| a-20 | C$_8$H$_{17}$(t) | C$_8$H$_{17}$(t) |
| a-21 | 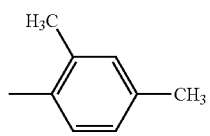 | C$_8$H$_{17}$(t) |
| a-22 | 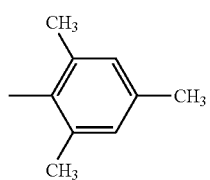 | 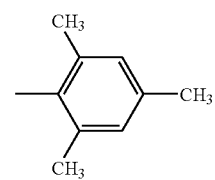 |
| a-23 | 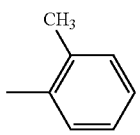 | 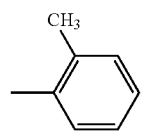 |
| a-24 | 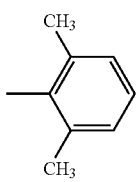 | 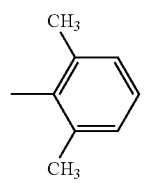 |
| a-25 | 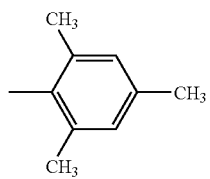 | 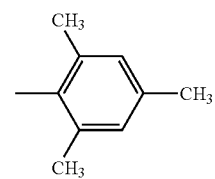 |
| a-26 | 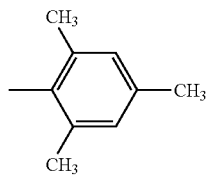 | 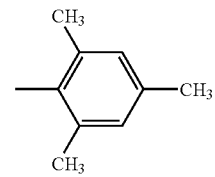 |
| a-27 | 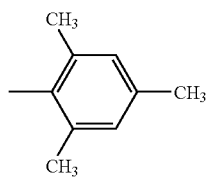 | 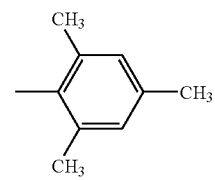 |
| a-28 | 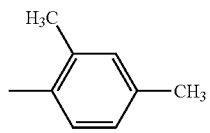 | 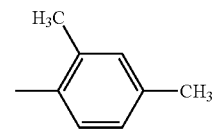 |

-continued
| | | |
|---|---|---|
| a-29 | 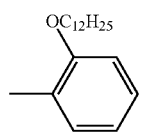 | 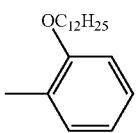 |
| a-30 | 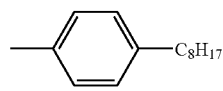 | $C_8H_{17}(t)$ |
| a-31 | 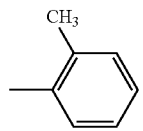 | 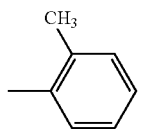 |
| a-32 | 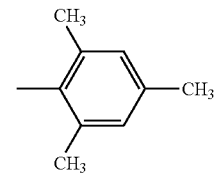 | 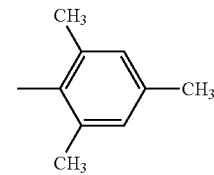 |
| a-33 | 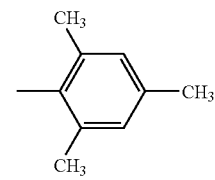 | 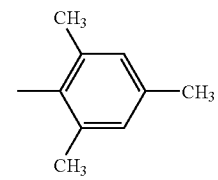 |
| a-34 | 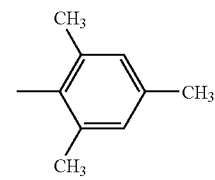 | 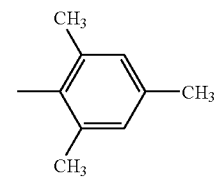 |
| a-35 | 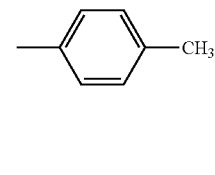 | 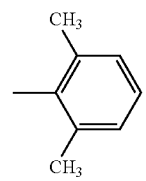 |
| a-36 | 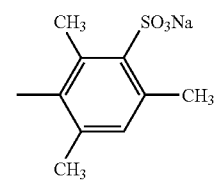 | 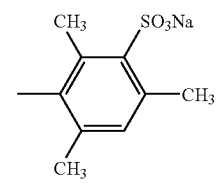 |
| a-37 | 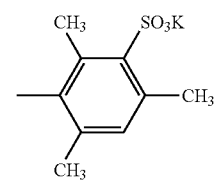 | 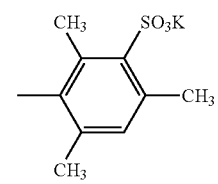 |

-continued
| | | |
|---|---|---|
| a-38 | 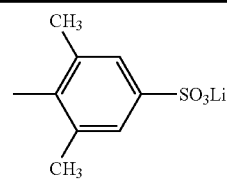 | 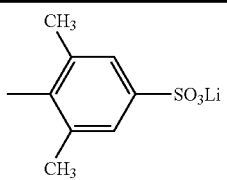 |
| a-39 | 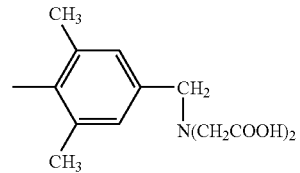 | 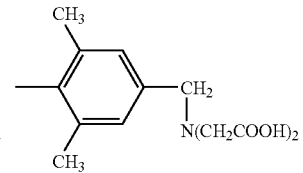 |
| a-40 | 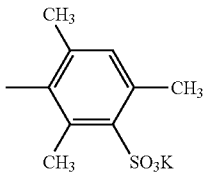 | 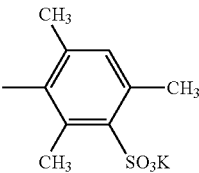 |
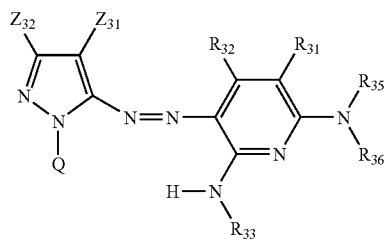
| Dye | $Z_{32}$ | $Z_{31}$ | Q | $R_{32}$ | $R_{31}$ | $R_{35}$ |
|---|---|---|---|---|---|---|
| a-41 | 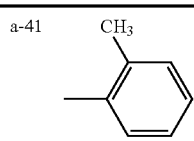 | CN | 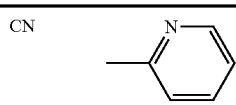 | H | $CONH_2$ | $SO_2CH_3$ |
| a-42 | 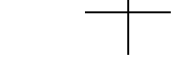 | Br |  | COOEt | H | 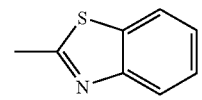 |
| a-43 | 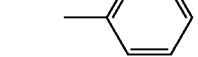 | $SO_2CH_3$ | 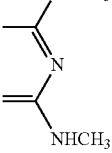 | $CONH_2$ | H | 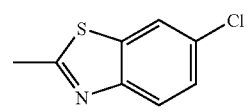 |
| a-44 |  | CN | 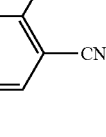 | H | H | 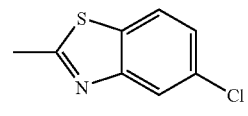 |
| a-45 |  | Br | 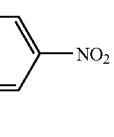 | H | $CONH_2$ |  |

-continued
| | | | | | |
|---|---|---|---|---|---|
| a-46 |  | CN | 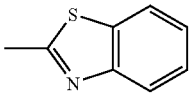 | CH₃ | H | 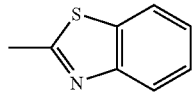 |
| Dye | $R_{36}$ | $R_{33}$ |
|---|---|---|
| a-41 | 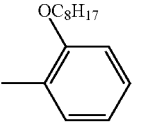 | 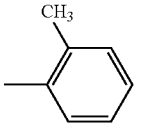 |
| a-42 | $C_8H_{17}(t)$ | $COCH_3$ |
| a-43 | 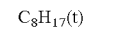 | 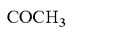 |
| a-44 | 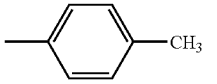 | $SO_2CH_3$ |
| a-45 | 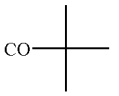 | 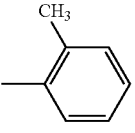 |
| a-46 |  | 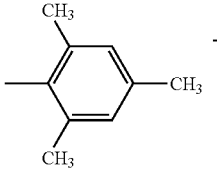 |
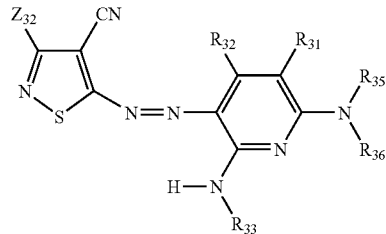
| Dye | $Z_{32}$ | $R_{32}$ | $R_{31}$ | $R_{35}$ | $R_{36}$ | $R_{33}$ |
|---|---|---|---|---|---|---|
| b-1 | CH₃ | CH₃ | CN | H | 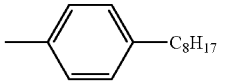 | 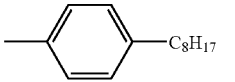 |
| b-2 | CH₃ | CH₃ | CN | H | 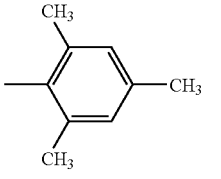 | 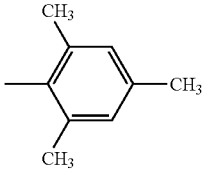 |

-continued

| Dye | | | | | | |
|---|---|---|---|---|---|---|
| b-3 | CH₃ | CH₃ | CONH₂ | H | 4-C₈H₁₇-phenyl | 2,3,5-trimethylphenyl |
| b-4 | CH₃ | CH₃ | H | H | 2,3,5-trimethyl-6-SO₃Li-phenyl | 2,3,5-trimethyl-6-SO₃Li-phenyl |
| b-5 | CH₃ | H | CN | H | 4-SO₃Na-phenyl | 4-SO₃Na-phenyl |

Structure:

R₃₁₁ substituted isothiazole with CN, connected via —N=N— to pyridine ring bearing R₃₂, R₃₁, N(R₃₅)(R₃₆), and —NH—R₃₃

| Dye | R₃₁₁ | R₃₂ | R₃₁ | R₃₅ | R₃₆ | R₃₃ |
|---|---|---|---|---|---|---|
| b-6 | CH₃ | CH₃ | H | 2-benzothiazolyl | 2,3,5-trimethyl-6-CH₂N(CH₂CO₂K)₂-phenyl | 2,3,5-trimethyl-6-CH₂N(CH₂CO₂K)₂-phenyl |
| b-7 | CH₃ | CH₃ | H | 2-benzothiazolyl | 2,3,5-trimethylphenyl | 4-C₈H₁₇-phenyl |
| b-8 | CH₃ | H | H | SO₂CH₃ | 3,4-dimethyl-SO₃Na-phenyl | 3,4-dimethyl-SO₃Na-phenyl |

Structure:

R₃₁₂ substituted 1,2,4-thiadiazole connected via —N=N— to pyridine ring bearing R₃₂, R₃₁, N(R₃₅)(R₃₆), and —NH—R₃₃

| Dye | R₃₁₂ | R₃₂ | R₃₁ | R₃₅ |
|---|---|---|---|---|
| c-1 | —SCH₃ | CH₃ | CN | H |

-continued

| Dye | (col1) | (col2) | (col3) | (col4) |
|---|---|---|---|---|
| c-2 | phenyl (–C₆H₅) | H | CONH$_2$ | H |
| c-3 | CH$_3$–S–CH$_2$CH$_2$–SO$_3$K | CH$_3$ | H | 2-methyl-benzothiazole-6-SO$_3$K |
| c-4 | —CH$_3$ | CH$_3$ | H | 2-methyl-benzothiazole-6-SO$_2$NH–(CH$_2$)$_3$–O–(2,4-di-tert-pentylphenyl) |
| c-5 | phenyl | H | H | 2-methyl-benzothiazole-6-NHSO$_2$–[2-OC$_8$H$_{17}$(n), 5-C$_8$H$_{17}$(t)-phenyl] |

| Dye | R$_{36}$ | R$_{33}$ |
|---|---|---|
| c-1 | C$_8$H$_{17}$(t) | 4-C$_8$H$_{17}$-phenyl |
| c-2 | 4-SO$_3$K-phenyl | 4-SO$_3$K-phenyl |
| c-3 | 4-SO$_3$K-phenyl | 4-SO$_3$K-phenyl |
| c-4 | 2,3,5-trimethylphenyl | 4-C$_8$H$_{17}$-phenyl |
| c-5 | 2,3,5-trimethylphenyl | C$_8$H$_{17}$(t) |

-continued

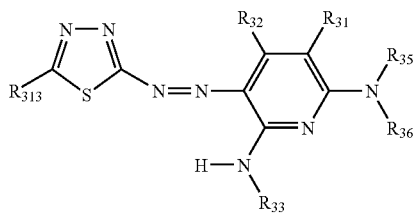

| Dye | R$_{313}$ | R$_{32}$ | R$_{31}$ | R$_{35}$ | R$_{36}$ | R$_{33}$ |
|---|---|---|---|---|---|---|
| d-1 | Me | CH$_3$ | CN | H | 4-SO$_3$K-phenyl | 4-SO$_3$K-phenyl |
| d-2 | Me | CH$_3$ | CN | H | 2,6-diethyl-4-methylphenyl | 2,6-diethyl-4-methylphenyl |
| d-3 | Me | H | H | 2-methylbenzothiazolyl | 2,4,6-trimethyl-3-SO$_3$K-phenyl | 2,4,6-trimethyl-3-SO$_3$K-phenyl |
| d-4 | Ph | CH$_3$ | CONH$_2$ | H | 4-C$_8$H$_{17}$-phenyl | 4-C$_8$H$_{17}$-phenyl |
| d-5 | Ph | CH$_3$ | H | 2-methylbenzothiazol-6-yl-SO$_2$NH(CH$_2$)$_3$O-(2,4-di-tert-amylphenyl) | 4-OC$_4$H$_9$(n)-phenyl | 2,6-diethyl-4-methylphenyl |

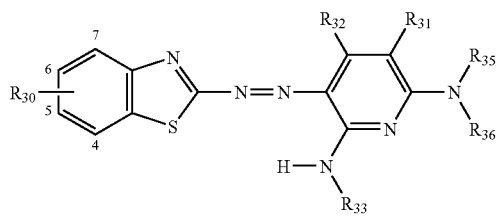

| Dye | R$_{30}$ | R$_{32}$ | R$_{31}$ | R$_{35}$ | R$_{36}$ | R$_{33}$ |
|---|---|---|---|---|---|---|
| e-1 | 5-Cl | CH$_3$ | CONH$_2$ | H | C$_8$H$_{17}$(t) | C$_8$H$_{17}$(t) |
| e-2 | 5,6-diCl | H | H | 2-methylbenzothiazolyl | 4-C$_8$H$_{17}$(t)-phenyl | 4-C$_8$H$_{17}$(t)-phenyl |

-continued

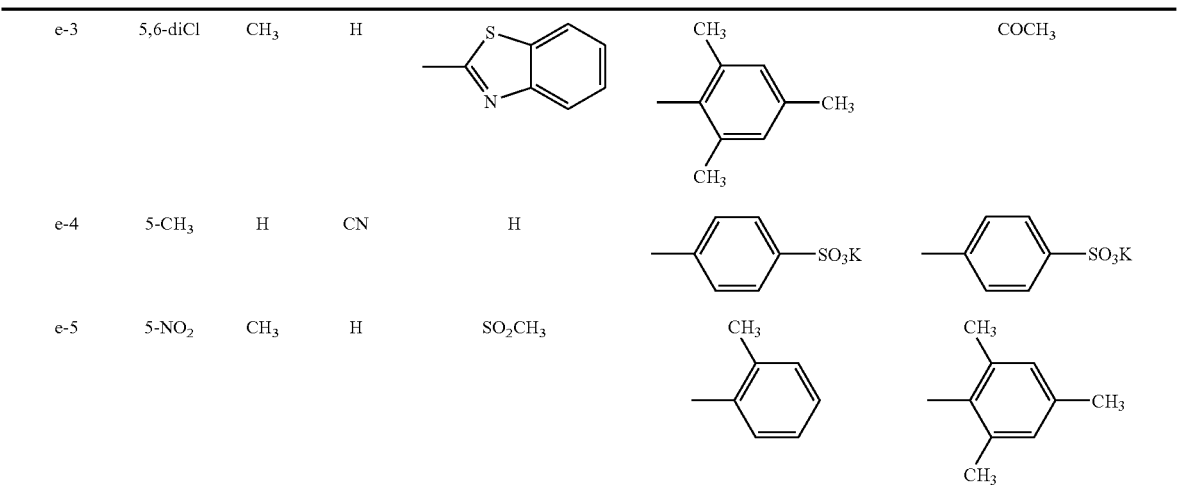

| | | | | | | |
|---|---|---|---|---|---|---|
| e-3 | 5,6-diCl | CH₃ | H | (2-methylbenzothiazole) | (2,4,6-trimethylphenyl with CH₃) | COCH₃ |
| e-4 | 5-CH₃ | H | CN | H | (phenyl-SO₃K) | (phenyl-SO₃K) |
| e-5 | 5-NO₂ | CH₃ | H | SO₂CH₃ | (2-methylphenyl) | (2,4,6-trimethylphenyl) |

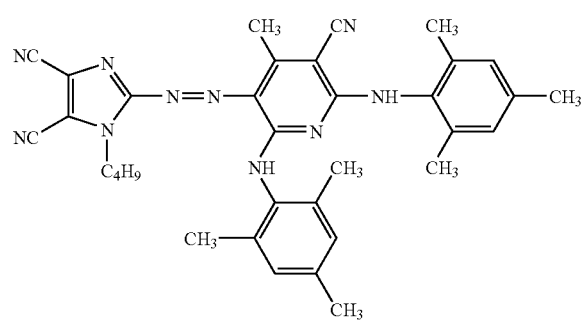

f-1

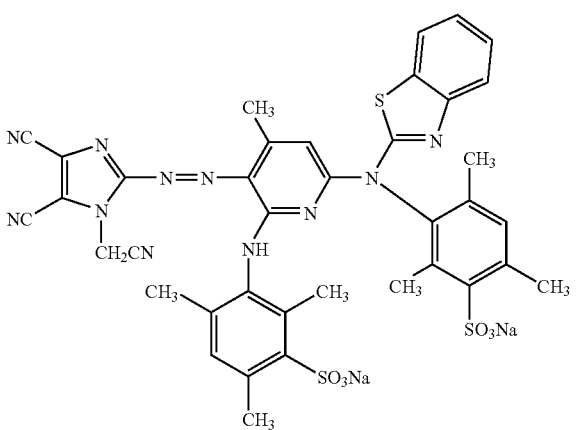

f-2

The azo dye represented by formula (3) preferably has a content in the ink of 0.2 to 20 mass %, more preferably 0.5 to 15 mass %. Also it has a solubility (or dispersibility in stable state) in water at 20° C. preferably of 5 mass % or higher, more preferably 10 mass % or higher.

(Black Dye)

In a black ink to be employed in the invention, there is employed a dye (L) having a wavelength λmax within a range from 500 to 700 nm, and a half-peak width (W$\lambda_{1/2}$), in an absorption spectrum in a dilute solution normalized to an absorbance 1.0, of 100 nm or larger (preferably 120 to 500 nm, more preferably 120 to 350 nm).

Such dye (L) may be singly used as a dye for the black ink, in case it can realize "(deep) black" of high image quality, namely black color scarcely enhancing any of B, G and R regardless of a light source for observation, but the dye is usually used in combination with another dye capable of covering an area where the dye indicates a low absorption. It is usually used in combination preferably with a dye (S) having a main absorption in a yellow range (λmax from 350 to 500 nm). It is also possible to prepare a black ink in combination with still another dye.

In the invention, a black ink is prepared by dissolving or dispersing the aforementioned dye either singly or in a mixture in an aqueous medium, and, there is preferred an ink meeting following conditions in order to satisfy performances preferred for the black ink for inkjet printing, namely 1) an excellent weather resistance, and/or 2) black color is maintained in a well-balanced state even after fading.

At first, a black square code of the JIS code 2223 is printed with a size of 48 points with the black ink, and a reflective density ($D_{vis}$) measured with a status A filter (visual filter) is defined as an initial density. A reflective densitometer provided with the status A filter can be, for example X-Rite densitometer. For "black" density measurement, a measured value by $D_{vis}$ is used as a reflective density for a standard observation. Such print is subjected to a forced fading in an ozone fading tester capable of constantly generating ozone of 5 ppm, and, based on a time (t) required for the reflective density ($D_{vis}$) to reach 80% of the initial reflective density, a forced fading rate constant ($k_{vis}$) is obtained by a relation $0.8 = \exp(-k_{vis} \cdot t)$.

The black ink preferably has the rate constant ($k_{vis}$) of $5.0 \times 10^{-2}$ [hour$^{-1}$] or less, more preferably $3.0 \times 10^{-2}$ [hour$^{-1}$] or less, and particularly preferably $1.0 \times 10^{-2}$ [hour$^{-1}$] or less (condition 1).

Also the black square code of the JIS code 2223 is printed with a size of 48 points with the black ink, and a reflective density measured with a status A filter is defined, as an initial density, by reflective densities ($D_R$, $D_G$, $D_B$) of three colors C (cyan), M (magenta) and Y (yellow) instead of $D_{vis}$. ($D_R$, $D_G$, $D_B$) represents (C reflective density by red filter, M reflective density by green filter, Y reflective density by blue filter). The print is subjected to a forced fading in an ozone fading tester capable of constantly generating ozone of 5 ppm as explained above, and, based on a time required for each of the reflective densities ($D_R$, $D_G$, $D_B$) to reach 80% of the initial density, forced fading rate constants ($k_R$, $k_G$, $k_B$) are determined in a similar manner. A ratio (R) of a maximum value and a minimum value of such three rate constants (for example $k_R$ is largest and $k_G$ is smallest, $R=k_R/k_G$), is preferably 1.2 or less, more preferably 1.1 or less and particularly preferably 1.05 or less (condition 2).

The "print of the black square code of the JIS code 2223 printed with a size of 48 points" is a printed image of a size sufficiently covering an aperture of the tester, in order to provide a sufficient size for density measurement.

Also in the black ink, at least a dye used therein has an oxidation potential, as explained in the foregoing, higher than 1.0 V (vs. SCE), preferably higher than 1.1 V (vs. SCE), further preferably higher than 1.2 V (vs. SCE), and most preferably higher than 1.25 V (vs. SCE), preferably, and at least a dye has λmax at 500 nm or larger (condition 3).

Also the black dye to be employed in the black ink of the invention preferably satisfy following physical properties, in order to attain a hue, a fastness or a storage stability in a preferable range:

property 1: a maximum absorption wavelength λmax (DMF) of absorption spectrum in DMF satisfying a relation 680 nm≧λmax(DMF)≧570 nm;

property 2: an oxidation potential higher than 1.0 V (vs. SCE);

property 3: a maximum absorption wavelength λmax (water) of absorption spectrum in water satisfying a relation |λmax (DMF)–λmax(water)|≧30 nm;

property 4: a molar absorption coefficient ε(DMF) in DMF and a molar absorption coefficient ε(water) in water satisfying a relation ε(water)/ε(DMF)≦0.9; and property 5: an absorbance Abs(association) at a maximum absorption wavelength of an associate in an absorption spectrum measured in water and an absorbance Abs (monomer) at a maximum absorption wavelength of a monomer absorption spectrum measured in DMF satisfying a relation Abs(monomer)/Abs(associate)≦0.75.

These properties are preferred as they provide a black dye having a preferable black hue, excellent light fastness and ozone resistance and an excellent storage stability in the ink. These properties are defined as described in Japanese Patent Application No. 2003-353498.

The black dye satisfying these physical properties include a dye represented by formula (4). In the following, the dye represented by formula (4) will be explained.

formula (4)

In formula (4), $A_{41}$, $A_{42}$ and $A_{43}$ each independently represents an aromatic group that may be substituted or a heterocyclic group that may be substituted ($A_{41}$ and $A_{43}$ being monovalent groups, while $A_{42}$ being a divalent group).

The azo dye represented by formula (4) is particularly preferably a dye represented by the following formula (4-A):

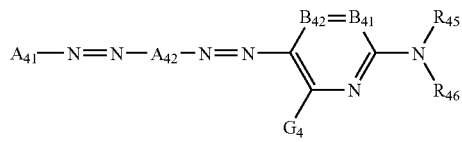

In formula (4-A), $B_{41}$ and $B_{42}$ each represents =$CR_{11}$— or —$CR_{42}$=, or either one represents a nitrogen atom while the other one represents =$CR_{41}$— or —$CR_{42}$=.

$G_4$, $R_{41}$ and $R_{42}$ each independently represent a hydrogen atom, a halogen atom, an aliphatic group, an aromatic group, a heterocyclic group, a cyano group, a carboxyl group, a carbamoyl group, an alkoxycarbonyl group, an aryloxycarbonyl group, a heterocyclic oxycarbonyl group, an acyl group, a hydroxyl group, an alkoxy group, an aryloxy group, a heterocyclic oxy group, a silyloxy group, an acyloxy group, a carbamoyloxy group, an alkoxycarbonyloxy group, an aryloxycarbonyloxy group, an amino group (including an alkylamino group, an arylamino group and a heterocyclic amino group), an acylamino group, an ureido group, a sulfamoylamino group, an alkoxycarbonylamino group, an aryloxycarbonylamino group, an alkyl- or aryl-sulfonylamino group, a heterocyclic sulfonylamino group, a nitro group, an alkyl- or aryl-thio group, a heterocyclic thio group, an alkyl- or aryl-sulfonyl group, a heterocyclic sulfonyl group, an alkyl- or aryl-sulfinyl group, a heterocyclic sulfinyl group, a sulfamoyl group, or a sulfo group, each of which may be further substituted.

$R_{45}$ and $R_{46}$ each independently represents a hydrogen atom, an aliphatic group, an aromatic group, a heterocyclic group, an acyl group, an alkoxycarbonyl group, an aryloxycarbonyl group, a carbamoyl group, an alkyl- or aryl-sulfonyl group, or a sulfamoyl group, which may further have a substituent.

$R_{41}$ and $R_{45}$, or $R_{45}$ and $R_{46}$ may be bonded to form a 5- or 6-membered ring.

$A_{41}$ and $A_{92}$ have the same meaning as in formula (4).

The azo dye represented by formula (4-A) is further preferably a dye represented by the following formula (4-B1) or (4-B2):

(4-B1)
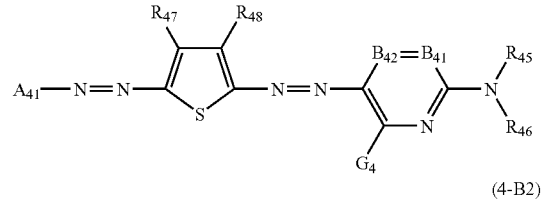

(4-B2)
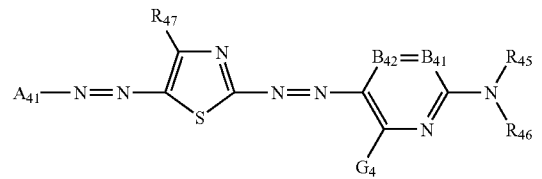

In formulae (4-B1) and (4-B2), $R_{47}$ and $R_{48}$ have the same meaning as $R_{41}$ in formula (4-A). $A_{41}$, $R_{45}$, $R_{46}$, $B_{41}$, $B_{42}$ and $G_4$ have the same meaning as in formula (4-A).

In the following, there will be explained the terms (substituents) to be used in formula (4), formula (4-A) and formula (4-B) (hereinafter formulae (4-B1) and (4-B2) being collectively represented as (4-B)) constituting a subordinate concept thereof. These terms will be used in common in formulae (4-C) and (4-D) to be explained later.

A halogen atom includes a fluorine atom, a chlorine atom and a bromine atom.

An aliphatic group means an alkyl group, a substituted alkyl group, an alkenyl group, a substituted alkenyl group, an akinyl group, a substituted alkinyl group, an aralkyl group or a substituted aralkyl group. The aliphatic group may be branched or may form a ring. The aliphatic group preferably has 1 to 20 carbon atoms, further preferably 1 to 16 carbon atoms. An aryl portion of the aralkyl group or the substituted aralkyl group is preferably a phenyl group or a naphthyl group, particularly preferably a phenyl group. Examples of the aliphatic group include a methyl group, an ethyl group, a butyl group, an isopropyl group, a t-butyl group, a hydroxyethyl group, a methoxyethyl group, a cyanoethyl group, a trifluoromethyl group, a 3-sulfopropyl group, a 4-sulfobutyl group, a cyclohexyl group, a benzyl group, a 2-phenethyl group, a vinyl group and an allyl group.

The monovalent aromatic group means an aryl group or a substituted aryl group. The aryl group is preferably a phenyl group or a naphthyl group, particularly preferably a phenyl group. The monovalent aromatic group preferably has 6 to 20 carbon atoms, further preferably 6 to 16 carbon atoms. Examples of the monovalent aromatic group include a phenyl group, a p-tolyl group, a p-methoxyphenyl group, an o-chlorophenyl group and a m-(3-sulfopropylamino)phenyl group. The divalent aromatic group is forming such monovalent aromatic group into a divalent state, and examples include phenylene, a p-tolylene, p-methoxyphenylene, o-chlorophenylene, m-(3-sulfopropylamino)phenylene and naphthylene.

The heterocyclic group includes a substituted heterocyclic group and a non-substituted heterocyclic group. The heterocyclic group may have a heterocyclic structure to which an aliphatic ring, an aromatic ring or another heterocycle is condensed. The heterocyclic group is preferably a 5- or 6-membered heterocyclic group, and a hetero atom in the heterocycle can be N, O or S. Examples of the substituent include an aliphatic group, a halogen atom, an alkyl- and aryl-sulfonyl group, an acyl group, an acylamino group, a sulfamoyl group, a carbamoyl group, and an ionic hydrophilic group. Examples of the monovalent heterocyclic group include a 2-pyridyl group, a 2-thienyl group, a 2-thiazolyl group, a 2-benzothiazolyl group, a 2-benzoxazolyl group and a 2-furyl group. A divalent heterocyclic group is formed by removing a hydrogen atom in the monovalent heterocycle thereby forming another bond.

The carbamoyl group includes a substituted carbamoyl group and a non-substituted carbamoyl group. Examples of the substituent include an alkyl group. Also examples of the carbamoyl group include a methylcarbamoyl group and a dimethylcarbamoyl group.

The alkoxycarbonyl group includes a substituted alkoxycarbonyl group and a non-substituted alkoxycarbonyl group. The alkoxycarbonyl group preferably has 2 to 20 carbon atoms. Examples of the substituent include an ionic hydrophilic group. Examples of the alkoxycarbonyl group include a methoxycarbonyl group and an ethoxycarbonyl group.

The aryloxycarbonyl group includes a substituted aryloxycarbonyl group and a non-substituted aryloxycarbonyl group. The aryloxycarbonyl group preferably has 7 to 20 carbon atoms. Examples of the substituent include an ionic hydrophilic group. Examples of the aryloxycarbonyl group include a phenoxycarbonyl group.

The heterocyclic oxycarbonyl group includes a substituted heterocyclic oxycarbonyl group and a non-substituted heterocyclic oxycarbonyl group. The heterocyclic oxycarbonyl group preferably has 2 to 20 carbon atoms. Examples of the substituent include an ionic hydrophilic group. Examples of the heterocyclic oxycarbonyl group include a 2-pyridyl oxycarbonyl group.

The acyl group includes a substituted acyl group and a non-substituted acyl group. The acyl group preferably has 1 to 20 carbon atoms. Examples of the substituent include an ionic hydrophilic group. Examples of the acyl group include an acetyl group and a benzoyl group.

The alkoxy group includes a substituted alkoxy group and a non-substituted alkoxy group. The alkoxy group preferably has 1 to 20 carbon atoms. Examples of the substituent include an alkoxy group, a hydroxyl group and an ionic hydrophilic group. Examples of the alkoxy group include a methoxy group, an ethoxy group, an isopropoxy group, a methoxyethoxy group, a hydroxyethoxy group and a 3-carboxypropoxy group.

The aryloxy group includes a substituted aryloxy group and a non-substituted aryloxy group. The aryloxy group preferably has 6 to 20 carbon atoms. Examples of the substituent include an alkoxy group, and an ionic hydrophilic group. Examples of the aryloxy group include a phenoxy group, a p-methoxyphenoxy group and an o-methoxyphenoxy group.

The heterocyclic oxy group includes a substituted heterocyclic oxy group and a non-substituted heterocyclic oxy group. The heterocyclic oxy group preferably has 2 to 20 carbon atoms. Examples of the substituent include an alkyl group, an alkoxy group, and an ionic hydrophilic group. Examples of the heterocyclic oxy group include a 3-pyridyloxy group, and a 3-thienyloxy group.

The silyloxy group is preferably a silyloxy group substituted with an aliphatic group with 1 to 20 carbon atoms or with an aromatic group. Examples of such silyloxy group includes a trimethylsilyloxy group and a diphenylmethylsilyloxy group.

The acyloxy group includes a substituted acyloxy group and a non-substituted acyloxy group. The acyloxy group preferably has 1 to 20 carbon atoms. Examples of the substituent include an ionic hydrophilic group. Examples of the acyloxy group include an acetoxy group and a benzoyloxy group.

The carbamoyloxy group includes a substituted carbamoyloxy group and a non-substituted carbamoyloxy group. Examples of the substituent include an alkyl group. Examples of the carbamoyloxy group include an N-methylcarbamoyl group.

The alkoxycarbonyloxy group includes a substituted alkoxycarbonyloxy group and a non-substituted alkoxycarbonyloxy group. The alkoxycarbonyloxy group preferably has 2 to 20 carbon atoms. Examples of the alkoxycarbonyloxy group include a methoxycarbonyloxy group, and an isopropoxycarbonyloxy group.

The aryloxycarbonyloxy group includes a substituted aryloxycarbonyloxy group and a non-substituted aryloxycarbonyloxy group. The aryloxycarbonyloxy group preferably has 7 to 20 carbon atoms. Examples of the aryloxycarbonyloxy group include a phenoxycarbonyloxy group.

The amino group includes an amino group substituted with an alkyl group, an aryl group or a heterocyclic group, which may further have a substituent. The alkylamino group preferably has 1 to 20 carbon atoms. Examples of the substituent include an ionic hydrophilic group. Examples of the alkylamino group include a methylamino group and a diethylamino group.

The arylamino group includes a substituted arylamino group and a non-substituted arylamino group. The arylamino group preferably has 6 to 20 carbon atoms. Examples of the substituent include a halogen atom, and an ionic hydrophilic group. Examples of the arylamino group include an anilino group and a 2-chlorophenylamino group.

The heterocyclic amino group includes a substituted heterocyclic amino group and a non-substituted heterocyclic amino group. The heterocyclic amino group preferably has 2 to 20 carbon atoms. Examples of the substituent include an alkyl group, a halogen atom and an ionic hydrophilic group.

The acylamino group includes a substituted acylamino group and a non-substituted acylamino group. The acylamino group preferably has 2 to 20 carbon atoms. Examples of the substituent include an ionic hydrophilic group. Examples of the acylamino group include an acetylamino group, a propionylamino group, a benzoylamino group, an N-phenylacetylamino group and a 3,5-disulfobenzoylamino group.

The ureido group includes a substituted ureido group and a non-substituted ureido group. The ureido group preferably has 1 to 20 carbon atoms. Examples of the substituent include an alkyl group and an aryl group. Examples of the ureido group include a 3-methylureido group, a 3,3-dimethylureido group and 3-phenylureido group.

The sulfamoylamino group includes a substituted sulfamoylamino group and a non-substituted sulfamoylamino group. Examples of the substituent include an alkyl group. Examples of the sulfamoylamino group include an N,N-dipropylsulfamoylamino group.

The alkoxycarbonylamino group includes a substituted alkoxycarbonylamino group and a non-substituted alkoxycarbonylamino group. The alkoxycarbonylamino group preferably has 2 to 20 carbon atoms. Examples of the substituent include an ionic hydrophilic group. Examples of the alkoxycarbonylamino group include an ethoxycarbonylamino group.

The aryloxycarbonylamino group includes a substituted aryloxycarbonylamino group and a non-substituted aryloxycarbonylamino group. The aryloxycarbonylamino group preferably has 7 to 20 carbon atoms. Examples of the substituent include an ionic hydrophilic group. Examples of the aryloxycarbonylamino group include a phenoxycarbonylamino group.

The alkyl- and aryl-sulfonylamino groups include substituted alkyl- and aryl-sulfonylamino groups and non-substituted alkyl- and aryl-sulfonylamino groups. The sulfonylamino group preferably has 1 to 20 carbon atoms. Examples of the substituent include an ionic hydrophilic group. Examples of these sulfonylamino groups include a methylsulfonylamino group, an N-phenyl-methylsulfonylamino group, a phenylsulfonylamino group, and a 3-carboxyphenylsulfonylamino group.

The heterocyclic sulfonylamino group includes a substituted heterocyclic sulfonylamino group and a non-substituted heterocyclic sulfonylamino group. The heterocyclic sulfonylamino group preferably has 1 to 12 carbon atoms. Examples of the substituent include an ionic hydrophilic group. Examples of the heterocyclic sulfonylamino group include a 2-thiophenesulfonylamino group, and a 3-pyridinesulfonylamino group.

The heterocyclic sulfonyl group includes a substituted heterocyclic sulfonyl group and a non-substituted heterocyclic sulfonyl group. The heterocyclic sulfonyl group preferably has 1 to 20 carbon atoms. Examples of the substituent include an ionic hydrophilic group. Examples of the heterocyclic sulfonyl group include a 2-thiophenesulfonyl group, and a 3-pyridinesulfonyl group.

The heterocyclic sulfinyl group includes a substituted heterocyclic sulfinyl group and a non-substituted heterocyclic sulfinyl group. The heterocyclic sulfinyl group preferably has 1 to 20 carbon atoms. Examples of the substituent include an ionic hydrophilic group. Examples of the heterocyclic sulfinyl group include a 4-pyridinesulfinyl group.

The alkyl- aryl- and heterocyclic-thio groups include substituted alkyl- aryl- and heterocyclic-thio groups and non-substituted alkyl- aryl- and heterocyclic-thio groups. The alkyl- aryl- or heterocyclic-thio group preferably has 1 to 20 carbon atoms. Examples of the substituent include an ionic hydrophilic group. Examples of the alkyl- aryl- and heterocyclic-thio groups include a methylthio group, a phenylthio group, and a 2-pyridylthio group.

The alkyl- and aryl-sulfonyl groups include substituted alkyl- and aryl-sulfonyl groups and non-substituted alkyl- and aryl-sulfonyl groups. Examples of the alkyl- and aryl-sulfonyl groups respectively include a methylsulfonyl group, and a phenylsulfonyl group.

The alkyl- and aryl-sulfinyl groups include substituted alkyl- and aryl-sulfinyl groups and non-substituted alkyl- and aryl-sulfinyl groups. Examples of the alkyl- and aryl-sulfinyl groups respectively include a methylsulfinyl group and a phenylsulfinyl group.

The sulfamoyl group includes a substituted sulfamoyl group and a non-substituted sulfamoyl group. Examples of the substituent include an alkyl group. Examples of the sulfamoyl group include a dimethylsulfamoyl group, and a di-(2-hydroxyethyl)sulfamoyl group.

In the following, formulae (4), (4-A) and (4-B) will be further explained.

In the following description, the foregoing description is applied to the groups and the substituents.

In formula (4), $A_{41}$, $A_{42}$ and $A_{43}$ each independently represents an aromatic group that may be substituted ($A_{41}$ and $A_{43}$ being monovalent aromatic groups, such as an aryl group; while $A_{42}$ being a divalent aromatic group such as an arylene group), or a heterocyclic that may be substituted ($A_{41}$ and $A_{43}$ being monovalent heterocyclic groups; while $A_{42}$ being a divalent heterocyclic group). Examples of the aromatic ring include a benzene ring and a naphthalene ring, and a hetero atom of the heterocycle can be N, O or S. The heterocycle may be condensed with an aliphatic ring, an aromatic ring or another heterocycle.

The substituent may also be an arylazo group or a heterocyclic azo group. Therefore the dye represented by formula (4) includes a trisazo dye and a tetrakisazo dye.

Also at least two of $A_{41}$, $A_{42}$ and $A_{43}$ are preferably heterocyclic groups.

A preferred heterocyclic group for $A_{43}$ is an aromatic nitrogen-containing 6-membered heterocycle. Particularly preferred is an aromatic nitrogen-containing 6-membered heterocycle in which $A_{43}$ is represented by the following formula (4-C), and, in such case, formula (4) corresponds to formula (4-A).

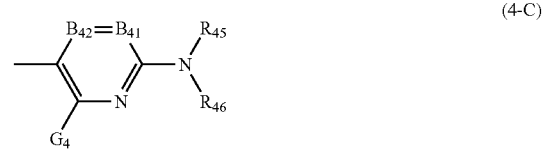

(4-C)

In formula (4-C), $B_{41}$ and $B_{42}$ each represents $=CR_{41}-$ or $-CR_{42}=$, or either one represents a nitrogen atom while the other represents $=CR_{41}-$ or $-CR_{42}=$, but there is more preferred a case where they respectively represent $=CR_{41}-$ and $-CR_{42}=$.

$R_{45}$ and $R_{46}$ each independently represents a hydrogen atom, an aliphatic group, an aromatic group, a heterocyclic group, an acyl group, an alkoxycarbonyl group, an aryloxycarbonyl group, a carbamoyl group, an alkyl- or aryl-sulfonyl group, or a sulfamoyl group, which may further have a substituent.

The substituent represented by $R_{45}$ and $R_{46}$ is preferably a hydrogen atom, an aliphatic group, an aromatic group, a heterocyclic group, an acyl group, or an alkyl- or aryl-sulfonyl group, or a sulfamoyl group, more preferably a hydrogen atom, an aromatic group, a heterocyclic group, an acyl group, or an alkyl- or aryl-sulfonyl group, or a sulfamoyl group, and most preferably a hydrogen atom, an aryl group, or a heterocyclic group. Each group may further have a substituent.

$G_4$, $R_{41}$ and $R_{42}$ each independently represent a hydrogen atom, a halogen atom, an aliphatic group, an aromatic group, a heterocyclic group, a cyano group, a carboxyl group, a carbamoyl group, an alkoxycarbonyl group, an aryloxycarbonyl group, a heterocyclic oxycarbonyl group, an acyl group, a hydroxyl group, an alkoxy group, an aryloxy group, a heterocyclic oxy group, a silyloxy group, an acyloxy group, a carbamoyloxy group, an alkoxycarbonyloxy group, an aryloxycarbonyloxy group, an amino group (including an alkylamino group, an arylamino group and a heterocyclic amino group), an acylamino group, an ureido group, a sulfamoylamino group, an alkoxycarbonylamino group, an aryloxycarbonylamino group, an alkyl- or aryl-sulfonylamino group, a heterocyclic sulfonylamino group, a nitro group, an alkyl- or aryl-thio group, a heterocyclic thio group, an alkyl- or aryl-sulfonyl group, a heterocyclic sulfonyl group, an alkyl- or aryl-sulfinyl group, a heterocyclic sulfinyl group, a sulfamoyl group, or a sulfo group, each of which may be further substituted.

The substituent represented by $G_4$ is preferably a hydrogen atom, a halogen atom, an aliphatic group, an aromatic group, a hydroxyl group, an alkoxy group, an aryloxy group, an acyloxy group, a heterocyclic oxy group, an amino group (including an alkylamino group, an arylamino group and a heterocyclic amino group), an acylamino group, an ureido group, a sulfamoylamino group, an alkoxycarbonylamino group, an aryloxycarbonylamino group, an alkyl- or aryl-thio group, or a heterocyclic thio group, more preferably a hydrogen atom, a halogen atom, an alkyl group, a hydroxyl group, an alkoxy group, an aryloxy group, an acyloxy group, an amino group (including an alkylamino group, an arylamino group and a heterocyclic amino group), or an acylamino group, and most preferably a hydrogen atom, or an acylamino group, and each group may further have a substituent.

The substituent represented by $R_{41}$ and $R_{42}$ is preferably a hydrogen atom, an alkyl group, an aryl group, a heterocyclic group, a halogen atom, an alkoxycarbonyl group, a carboxyl group, a carbamoyl group, a hydroxyl group, an alkoxy group or a cyano group. Each group may further have a substituent. $R_{41}$ and $R_{45}$, or $R_{45}$ and $R_{46}$ may be bonded to form a 5- or 6-membered ring. The substituent, in case the substituent represented by $A_{41}$, $R_{41}$, $R_{42}$, $R_{45}$, $R_{46}$ and $G_4$ further has a substituent, can be those cited for $G_4$, $R_{41}$ and $R_{42}$ in the foregoing. Also an ionic hydrophilic group is preferably provided as a substituent in any position on $A_{41}$, $R_{41}$, $R_{42}$, $R_{45}$, $R_{46}$ and $G_4$.

The ionic hydrophilic group as a substituent can be a sulfo group, a carboxyl group, a phosphono group or a quaternary ammonium group. The ionic hydrophilic group is preferably a carboxyl group, a phosphono group or a sulfo group, particularly preferably a carboxyl group or a sulfo group. The carboxyl group, the phosphono group or the sulfo group may be in a state of a salt, and a counter ion forming the salt can be an ammonium ion, an alkali metal ion (such as lithium ion, sodium ion, or potassium ion), or an organic cation (such as tetramethylammonium ion, tetramethylguanidium ion or tetramethylphosphonium ion).

A heterocyclic ring represented by $A_{42}$ is preferably a thiophene ring, a thiazole ring, an imidazole ring, a benzothiazole ring or a thienothiazole ring. Each heterocyclic group may further have a substituent. Among these, a thiophene ring, a thiazole ring, an imidazole ring, a benzothiazole ring and a thienothiazole ring represented by formulae (h) to (l) are particularly preferable. In case $A_{42}$ is a thiophene ring represented by (h) and $A_{43}$ has a structure represented by formula (4-C), formula (4) corresponds to formula (4-B1), and, in case $A_{42}$ is a thiazole ring represented by (i) and $A_{43}$ has a structure represented by formula (4-C), formula (4) corresponds to formula (4-B2).

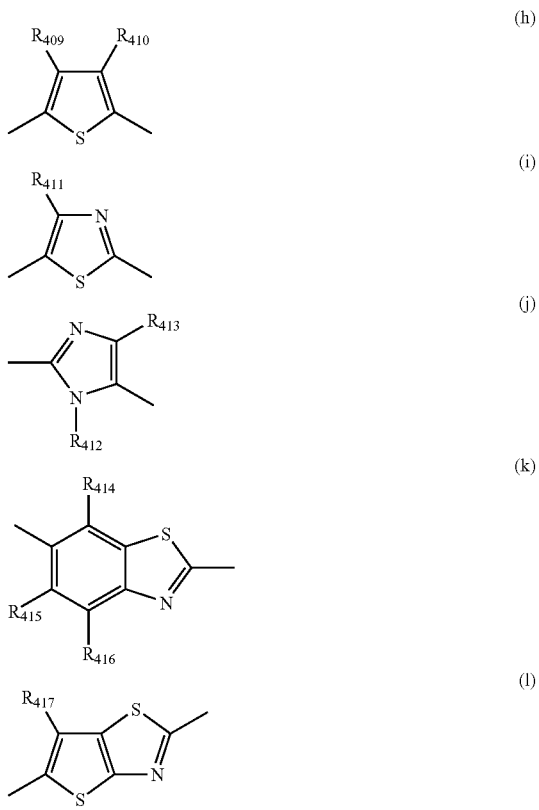

In formulae (h) to (l), $R_{409}$ to $R_{417}$ represent substituents same as $G_4$, $R_{42}$ and $R_{43}$ in formula (4-C).

In the invention, a particularly preferable structure is represented by formula (4-D1) or (4-D2) (formulae (4-D1) and (4-D2) being collectively represented by formula (4-D)).

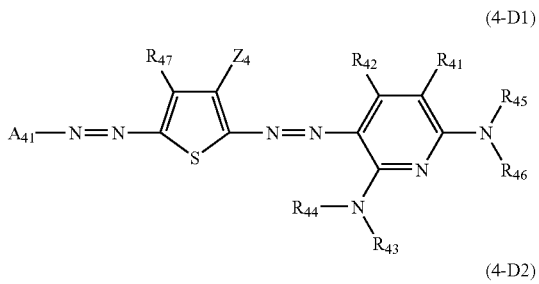

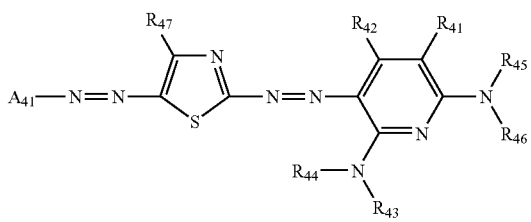

In formula (4-D1) $Z_4$ represents an electron attracting group with Hammett's substituent constant σp of 0.20 or higher. $Z_4$ is preferably an electron attracting group with σp of 0.30 or higher, more preferably an electron attracting group with σp of 0.45 or higher, particularly preferably an electron attracting group with σp of 0.60 or higher, but σp preferably does not exceed 1.0.

More specifically, examples of the electron attracting group with Hammett's substituent constant σp of 0.60 or higher include a cyano group, a nitro group, an alkylsulfonyl group (such as methylsulfonyl group) or an arylsulfonyl group (such as phenylsulfonyl group).

Examples of the electron attracting group with Hammett's substituent constant σp of 0.45 or higher include, in addition to those in the foregoing, an acyl group (such as acetyl group), an alkoxycarbonyl group (such as dodecyloxycarbonyl group), an aryloxycarbonyl group (such as m-chlorophenoxycarbonyl), an alkylsulfinyl group (such as n-propysulfinyl), an arylsulfinyl group (such as phenylsulfinyl), a sulfamoyl group (such as N-ethylsulfamoyl or N,N-dimethylsulfamoyl), and a halogenated alkyl group (such as trifluoromethyl).

Examples of the electron attracting group with Hammett's substituent constant σp of 0.30 or higher include, in addition to those in the foregoing, an acyloxy group (such as acetoxy), a carbamoyl group (such as N-ethylcarbamoyl or N,N-dibutylcarbamoyl), a halogenated alkoxy group (such as trifluoromethyloxy), a halogenated aryloxy group (such as pentafluorophenyloxy), a sulfonyloxy group (such as methylsulfonyloxy group), a halogenated alkylthio group (such as difluoromethylthio), an aryl group substituted with two or more electron attracting groups with σp of 0.15 or higher (such as 2,4-, dinitrophenyl, or pentachlorophenyl), and a heterocycle (such as 2-benzoxazolyl, 2-benzothiazolyl or 1-phenyl-2-benzimidazolyl).

Examples of the electron attracting group with Hammett's substituent constant σp of 0.20 or higher include, in addition to those in the foregoing, a halogen atom.

$Z_4$ is preferably, among those in the foregoing, an acyl group with 2 to 20 carbon atoms, an alkyloxycarbonyl group with 2 to 20 carbon atoms, a nitro group, a cyano group, an alkylsulfonyl group with 1 to 20 carbon atoms, an arylsulfonyl group with 6 to 20 carbon atoms, a carbamoyl group with 1 to 20 carbon atoms or a halogenated alkyl group with 1 to 20 carbon atoms. It is particularly preferably a cyano group, an alkylsulfonyl group with 1 to 20 carbon atoms or an arylsulfonyl group with 6 to 20 carbon atoms, and most preferably a cyano group.

Hammett's substituent constant σp employed herein is described in JP-A-2003-306623, paragraphs 0059-0060.

$R_{41}$, $R_{42}$, $R_{45}$, $R_{46}$ and $R_{47}$ have the same meaning as in formula (4-B). $R_{43}$ and $R_{44}$ each independently represents a hydrogen atom, an aliphatic group, an aromatic group, a heterocyclic group, an acyl group, an alkoxycarbonyl group, an aryloxycarbonyl group, a carbamoyl group, an alkyl- or aryl-sulfonyl group, or a sulfamoyl group. Among these, a hydrogen atom, an aromatic group, a heterocyclic group, an acyl group, or an alkyl- or aryl-sulfonyl group is preferable, and a hydrogen atom, an aromatic group, or a heterocyclic group is particularly preferable.

Each group explained in formula (4-D) may further have a substituent. In case such group further has a substituent, such substituent can be those explained in formula (4-A), groups cited in $G_4$, $G_{45}$ and $G_{46}$, or an ionic hydrophilic group.

$A_{41}$ can be an aromatic ring or a heterocyclic ring, and is preferably a benzene ring, a naphthalene ring, a pyridine ring, an imidazole ring, a pyrazole ring, a thiazole ring, an isothiazole ring, a thiadiazole ring, a benzothiazole ring, or a benzisothiazole ring, more preferably a benzene ring, a naphthalene ring, a pyridine ring, a pyrazole ring, an imidazole ring, an isothiazole ring, or a benzothiazole ring, and most preferably a benzene ring or a naphthalene ring.

The black dye of the invention, for ensuring storage stability in an aqueous solution or in the ink, preferably has an aromatic group or an aromatic heterocyclic group as a substituent in such a manner that the azo dye contain more than 12 conjugate π electrons in total in an aromatic ring not directly bonded to the azo group. An aromatic ring directly bonded to the azo group means all the aromatic rings bonded to the azo group, while an aromatic ring not directly bonded to the azo group means an aromatic ring which is not directly bonded to the azo group but is present as a substituent on a chromophore constituting the azo dye. For example, in case a naphthalene ring is directly bonded to the azo group, not only a benzene ring directly bonded to the azo group within the naphthalene ring but also the entire naphthalene ring is regarded as the aromatic ring directly bonded to the azo group. In case a biphenyl group is bonded to the azo group, a phenyl group bonded to the azo group is regarded as an aromatic ring directly bonded to the azo group but the other phenyl group is regarded as an aromatic ring which is not directly bonded. The aromatic ring includes not only an aryl group but also an aromatic heterocycle. The azo dye employed in the present invention preferably contain more than 12 conjugate π electrons in the aromatic ring not directly bonded to the azo group. The conjugate π electrons are calculated, for example in an azo dye having a benzene ring and a naphthalene ring as aromatic rings not directly bonded to the azo group, as 6+10=16. Also the conjugate π electron in the aromatic ring means a conjugate π electron contained in the aromatic ring (including a heterocyclic ring and not limited to a 6-membered ring). By having such aromatic ring as a substituent, the dye shows a preferable associating property, thereby improving the storage stability. A substituting position for the aromatic ring is preferably $R_{41}$, $R_{42}$, $R_{43}$, $R_{44}$, $R_{45}$, $R_{96}$ or $R_{47}$, particularly preferably $R_{43}$, $R_{44}$, $R_{45}$, $R_{46}$ or $R_{47}$.

For the preferred dye for black ink to be employed in the present invention, in a particularly preferred combination of the substituents, $R_{45}$ and $R_{46}$ each preferably is a hydrogen atom, an alkyl group, an aryl group, a heterocyclic group, a sulfonyl group or an acyl group, more preferably it is a hydrogen atom, an aryl group, a heterocyclic group, or a sulfonyl group, and most preferably it is a hydrogen atom, an aryl group, or a heterocyclic group. However, $R_{45}$ and $R_{46}$ do not become hydrogen atoms at the same time.

$G_4$ is preferably a hydrogen atom, a halogen atom, an alkyl group, a hydroxy group, an amino group, or an acylamino group, more preferably a hydrogen atom, a halogen atom, an amino group, or an acylamino group, and most preferably a hydrogen atom, an amino group, or an acylamino group.

$A_{41}$ is preferably a benzene ring, a naphthalene ring, a pyridine ring, an imidazole ring, or a pyrazole ring, most preferably a benzene ring or a naphthalene ring.

$B_{41}$ and $B_{42}$ each represents =$CR_{41}$— or —$CR_{42}$=, and $R_{41}$ and $R_{42}$ each can preferably be a hydrogen atom, an alkyl group, a halogen atom, a cyano group, a carbamoyl group, a carboxyl group, a hydroxyl group, an alkoxy group, or an alkoxycarbonyl group, more preferably a hydrogen atom, an alkyl group, a carboxyl group, a cyano group or a carbamoyl group.

As to a preferred combination of the substituents in the compound represented by formula (4), there is preferred a compound in which at least one of the various substituents is the aforementioned preferable group, more preferably a compound in which a larger number of the various substituents are the aforementioned preferable groups, and most preferably a compound in which all the substituents are the aforementioned preferable groups.

In the following, specific examples of the azo dye represented by formula (4) are shown, but the azo dye employable in the invention is not limited to such examples. Also the carboxyl group, the phosphono group or the sulfo group may be in a state of a salt, and a counter ion forming the salt can be an ammonium ion, an alkali metal ion (such as lithium ion, sodium ion, or potassium ion), or an organic cation (such as tetramethylammonium ion, tetramethylguanidium ion or tetramethylphosphonium ion). Among these, an ammonium ion, an organic cation or a lithium ion is preferable, and lithium ion is most preferable.

| 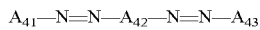 | | |
|---|---|---|
| $A_{41}$ | $A_{42}$ | $A_{43}$ |
| (a-1)  | 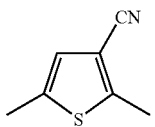 | 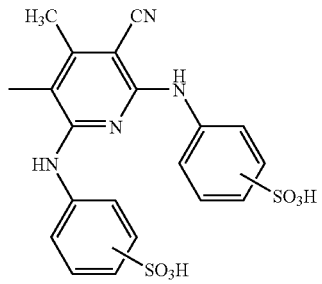 |
| (a-2) 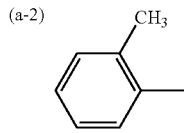 | 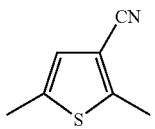 | 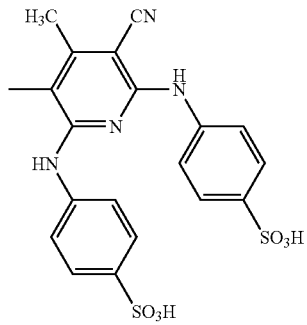 |
| (a-3) 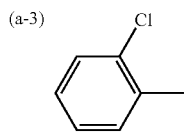 | 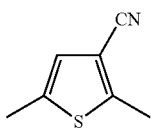 | 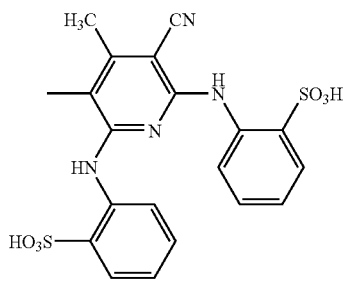 |
| (a-4) 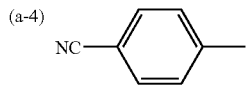 | 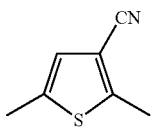 | 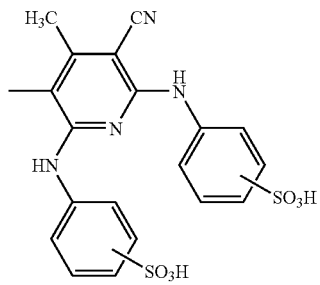 |

-continued
| | | |
|---|---|---|
| (a-5) 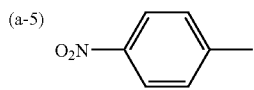 | 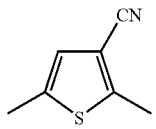 | 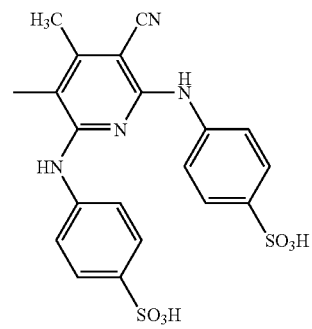 |
| (a-6) 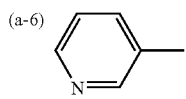 | 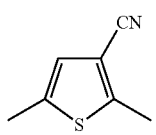 | 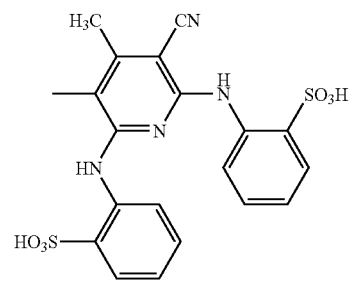 |
| (b-1) 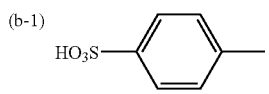 | 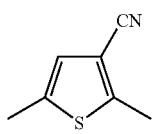 | 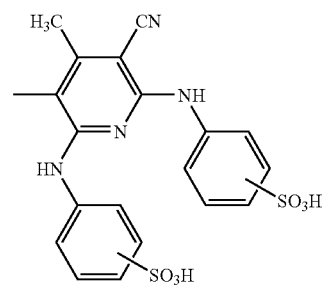 |
| (b-2) 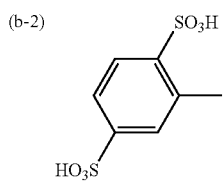 | 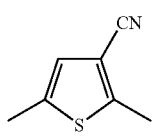 | 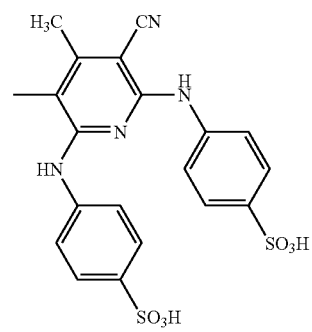 |
| (b-3) 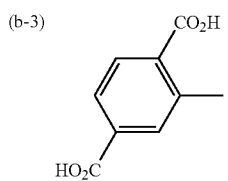 | 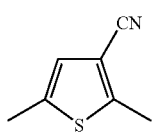 | 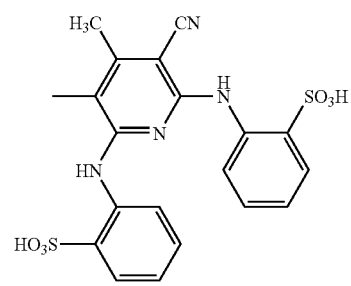 |

-continued
| | | | |
|---|---|---|---|
| (b-4) | 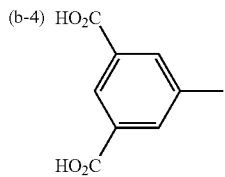 | 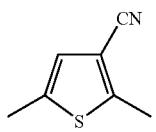 | 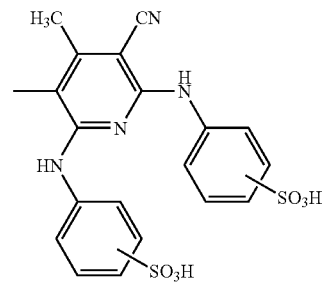 |
| (b-5) | 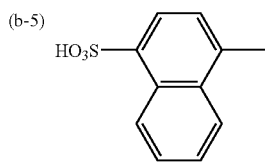 | 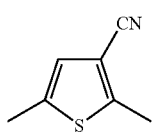 | 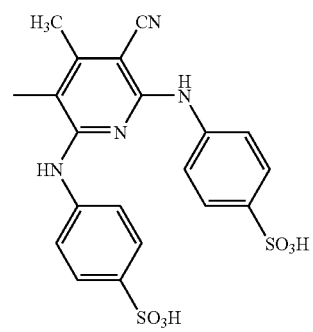 |
| (b-6) | 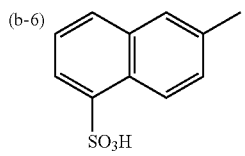 | 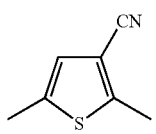 | 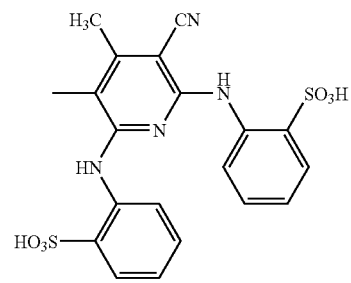 |
| (b-7) | 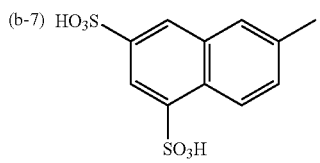 | 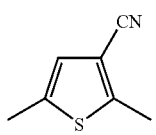 | 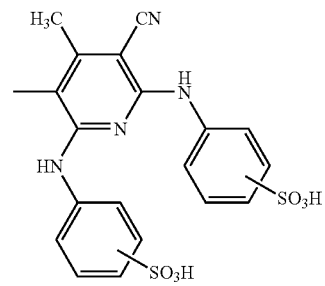 |
| (c-1) | 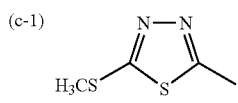 | 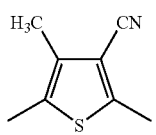 | 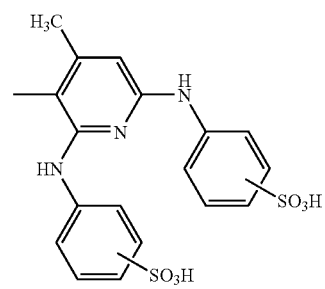 |

| | 131 | | 132 |
|---|---|---|---|
| (c-2) | 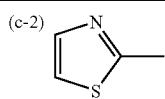 | 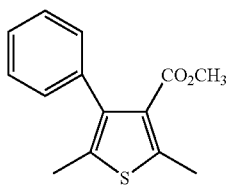 | 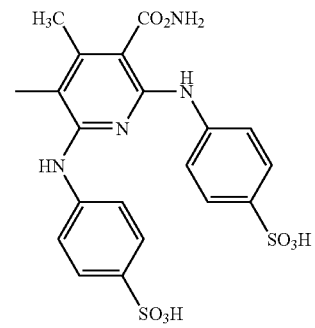 |
| (c-3) | 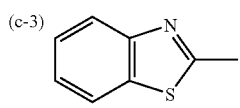 | 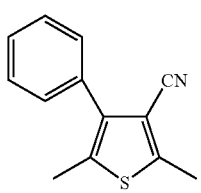 | 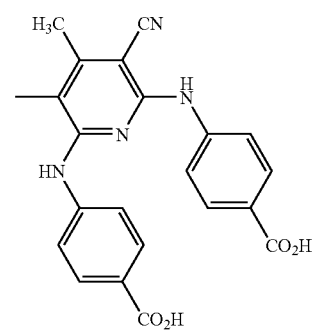 |
| (c-4) | 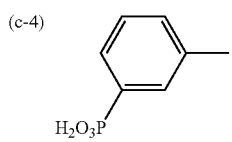 | 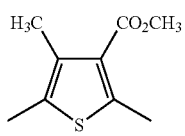 | 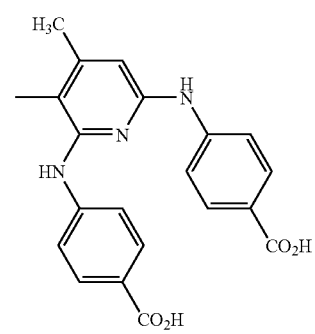 |
| (c-5) | 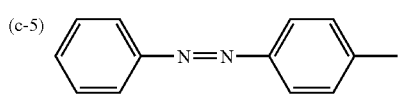 | 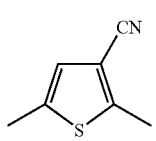 | 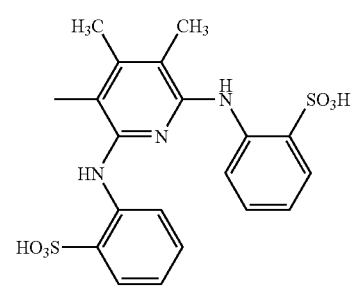 |
| (d-1) | 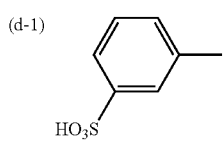 | 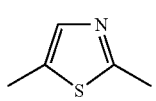 | 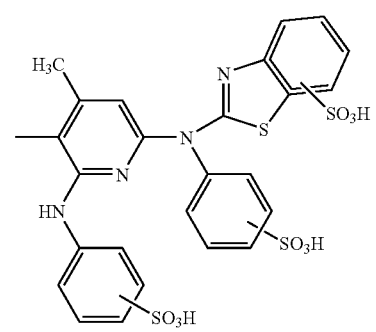 |

| | | |
|---|---|---|
| (d-2) 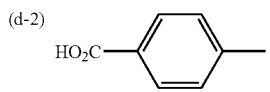 | 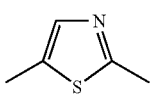 | 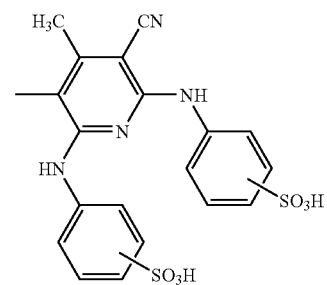 |
| (d-3) 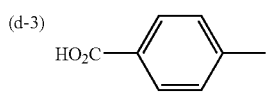 | 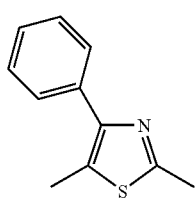 | 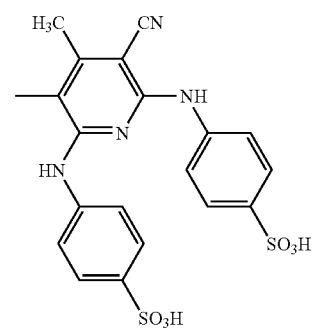 |
| (d-4) 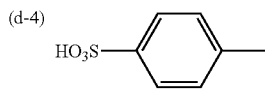 | 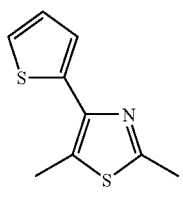 | 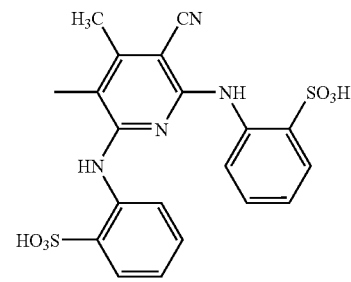 |
| (d-5) 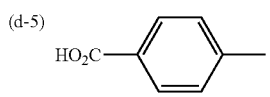 | 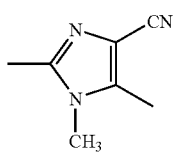 | 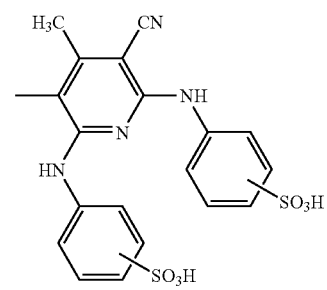 |
| (d-6) 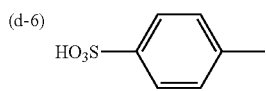 | 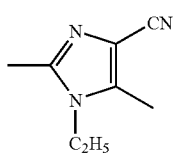 | 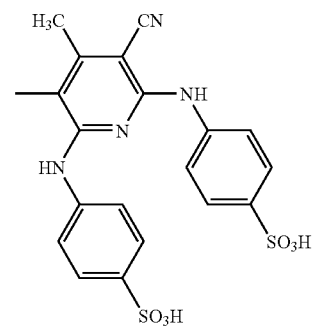 |

| | | |
|---|---|---|
| (e-1) | 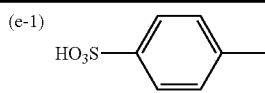 | 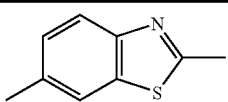 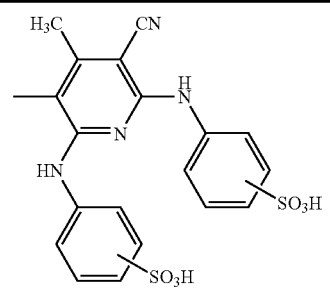 |
| (e-2) | 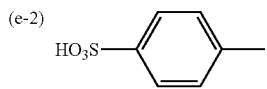 | 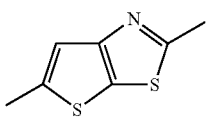 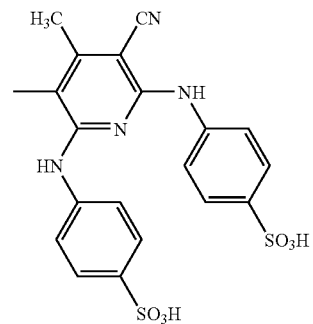 |
| (f-1) | 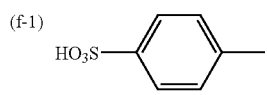 | 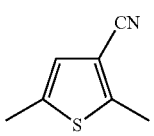 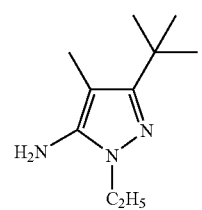 |
| (f-2) | 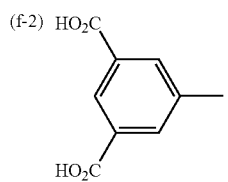 | 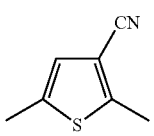 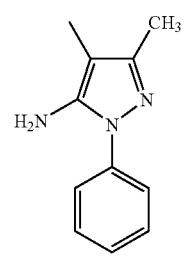 |
| (f-3) | 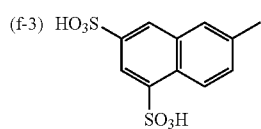 | 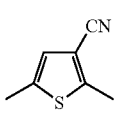 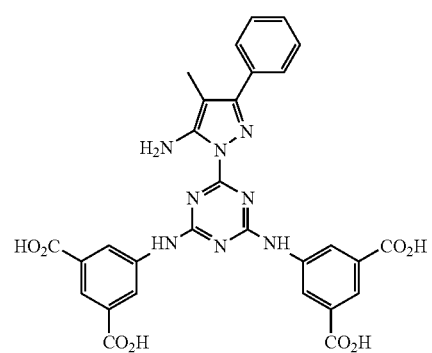 |
| (f-4) | 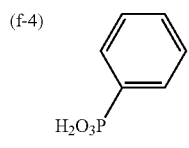 | 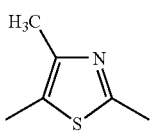 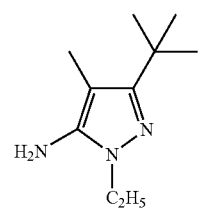 |

| | | | |
|---|---|---|---|
| (g-1) | 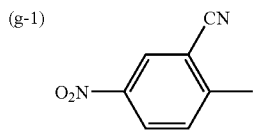 | 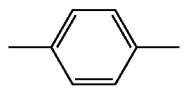 | 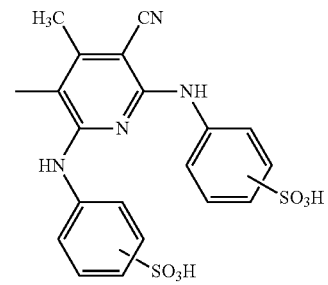 |
| (g-2) | 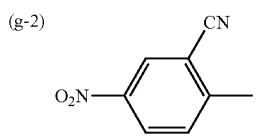 | 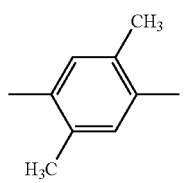 | 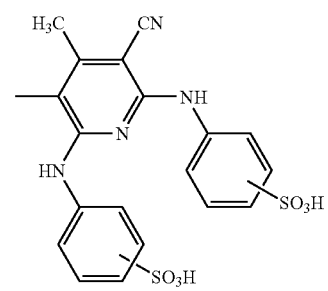 |
| (g-3) | 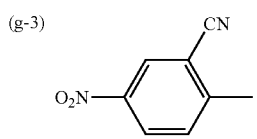 | 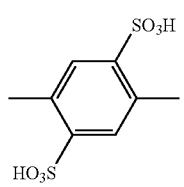 | 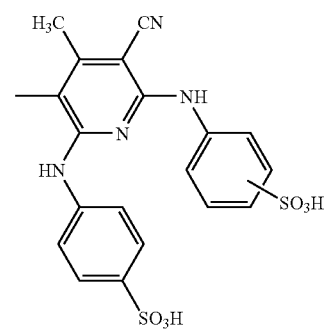 |
| (g-4) | 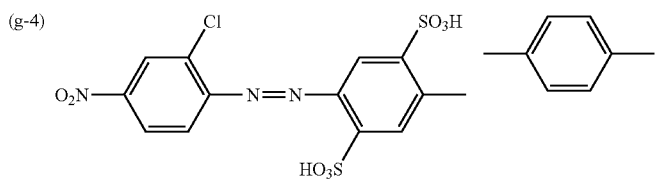 | | 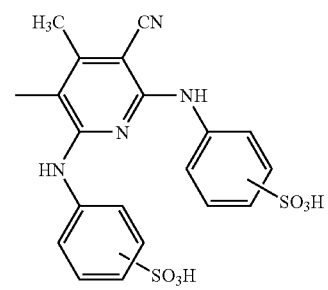 |
| (g-5) | 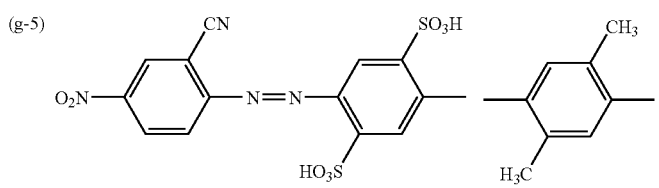 | | 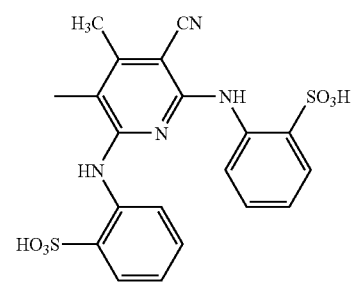 |

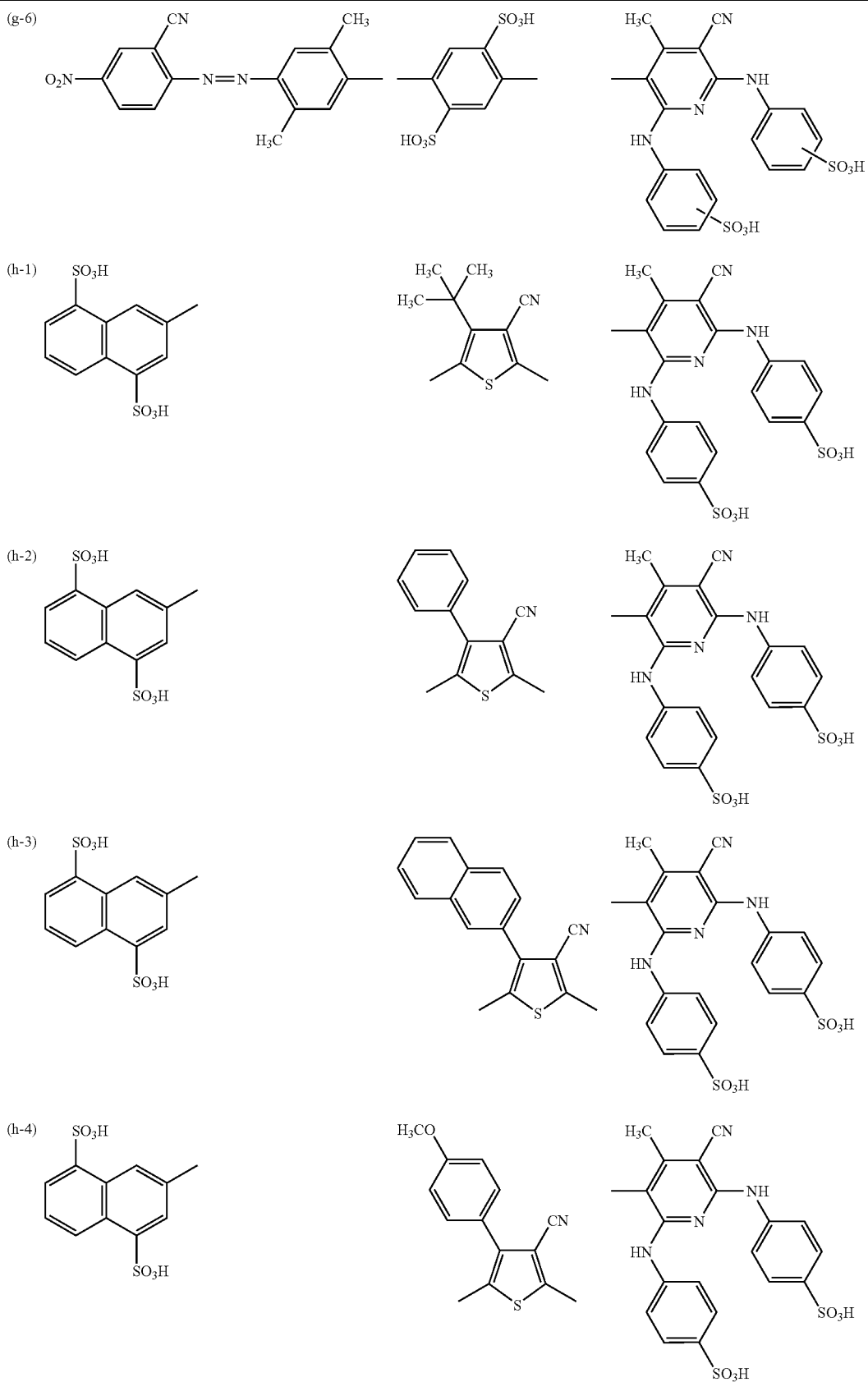

-continued
| | | |
|---|---|---|
| (h-5) 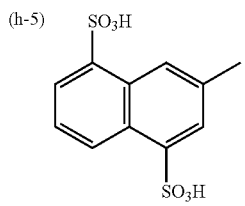 | 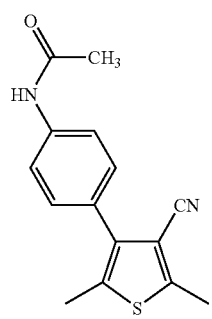 | 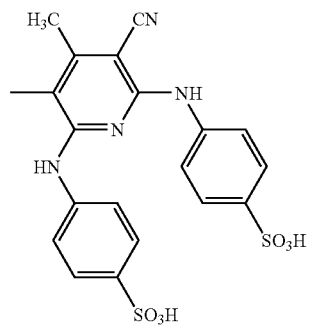 |
| (h-6) 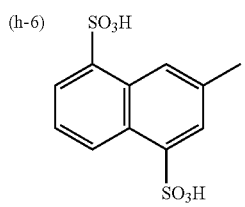 | 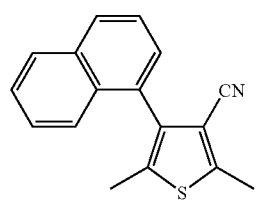 | 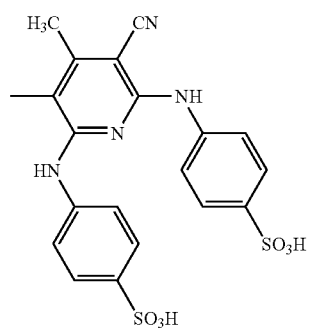 |
| A | B | C |
|---|---|---|
| A$_{41}$ | A$_{42}$ | A$_{43}$ |
| (i-1) 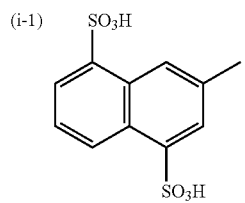 | 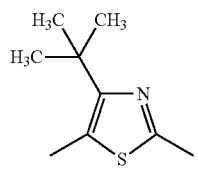 | 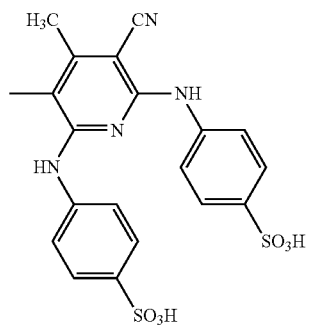 |
| (i-2) 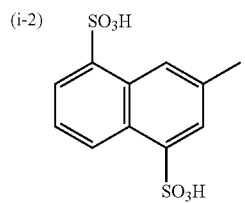 | 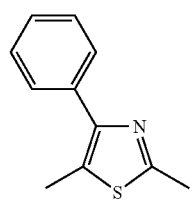 | 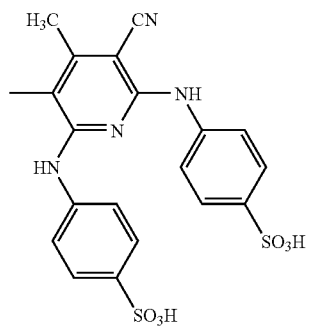 |

| | | |
|---|---|---|
| (i-3) | 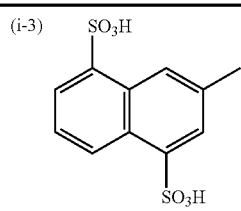 | 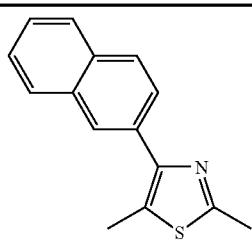 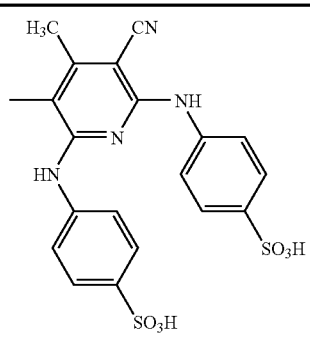 |
| (i-4) | 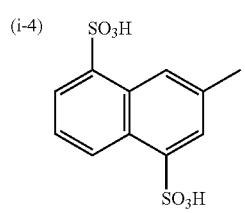 | 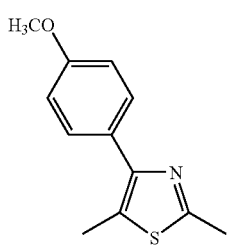 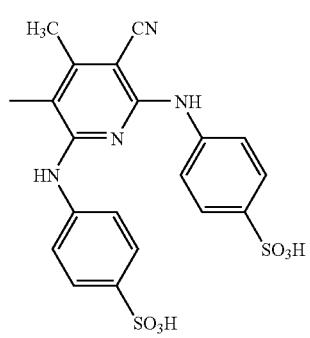 |
| (i-5) | 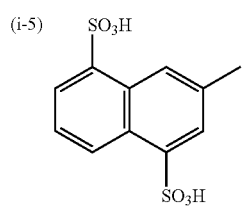 | 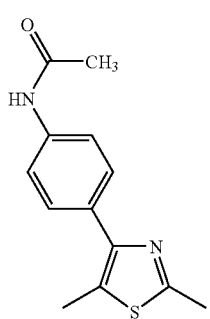 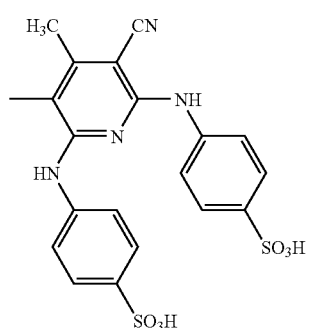 |
| (i-6) | 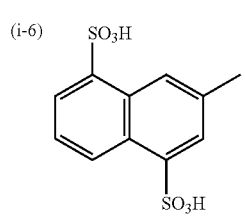 | 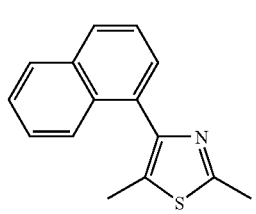 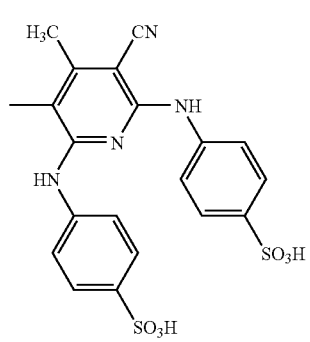 |
| (j-1) | 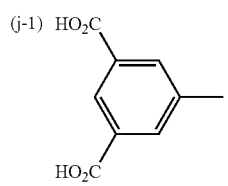 | 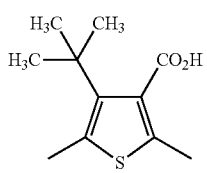 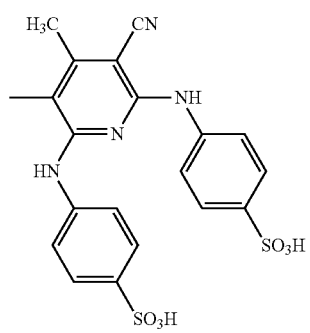 |

-continued
| | | |
|---|---|---|
| (j-1) 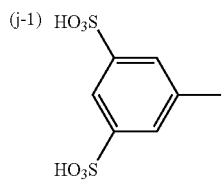 | 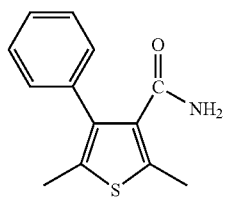 | 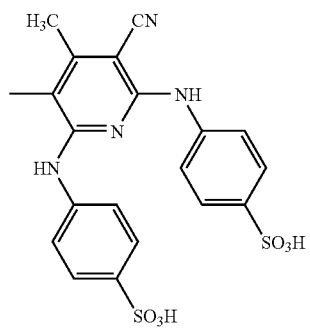 |
| (j-1) 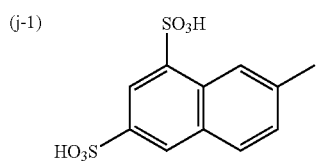 | 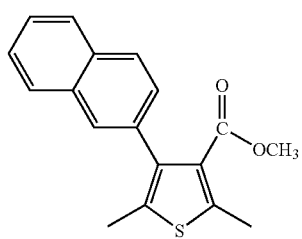 | 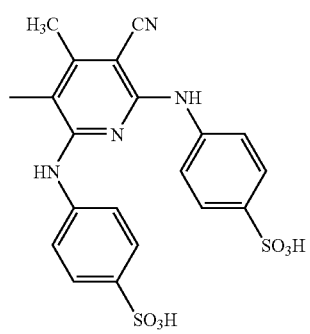 |
| (j-1) 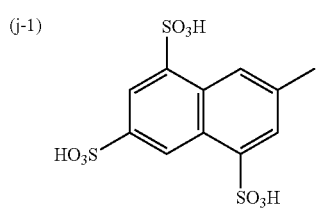 | 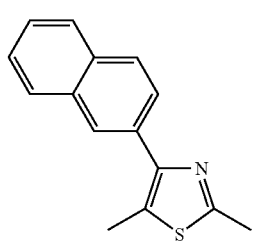 | 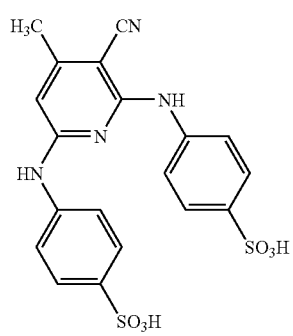 |
| (j-1) 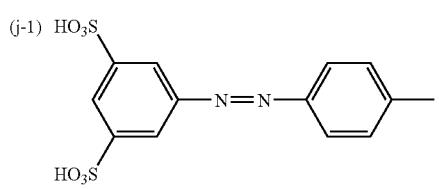 | 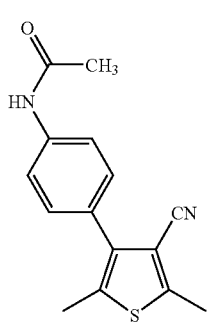 | 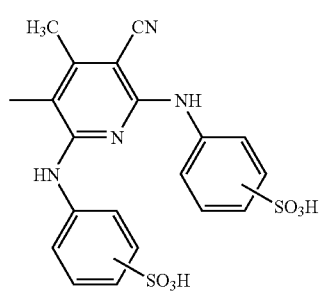 |
| (j-1) 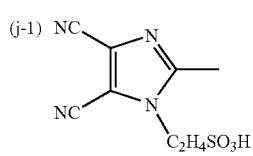 | 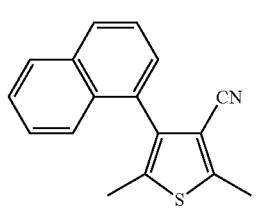 | 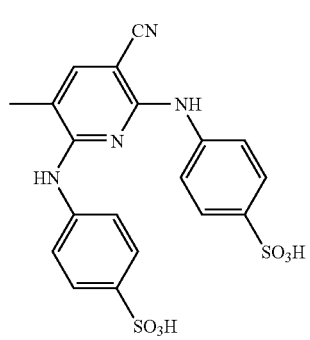 |

(k-1) 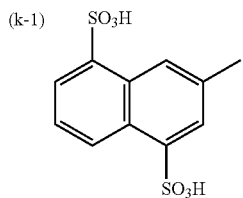 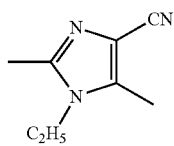 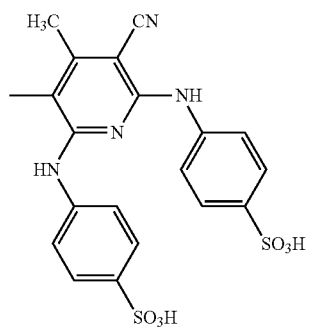
(k-2) 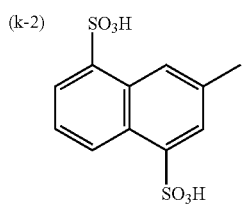 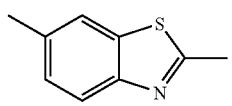 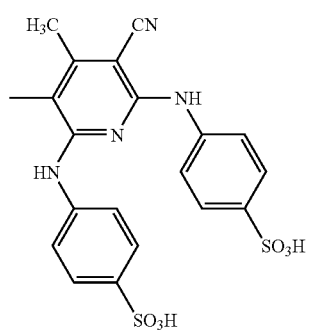
(k-3) 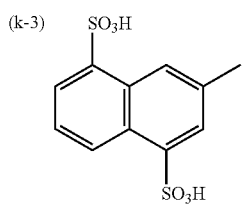 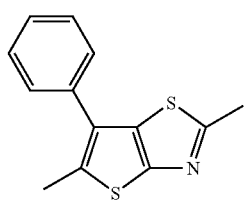 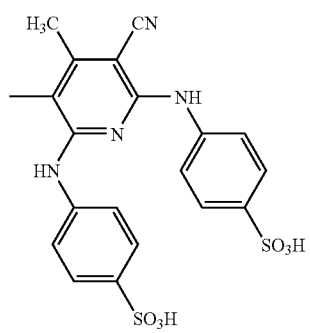
(k-4) 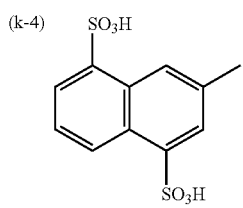 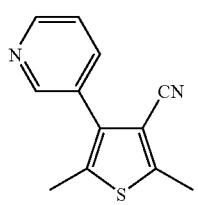 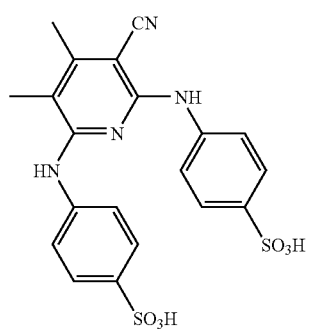

| | | |
|---|---|---|
| (k-5) 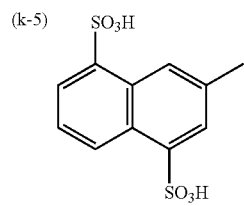 | 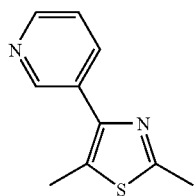 | 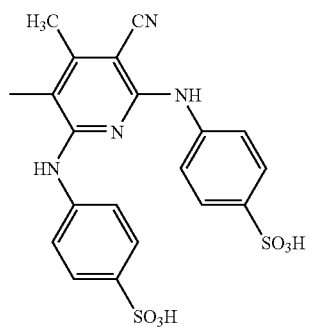 |
| (k-6) 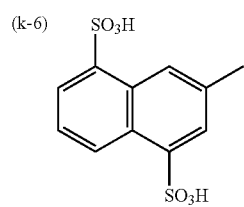 | 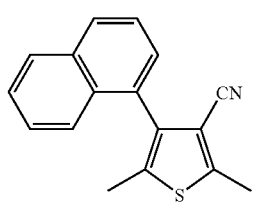 | 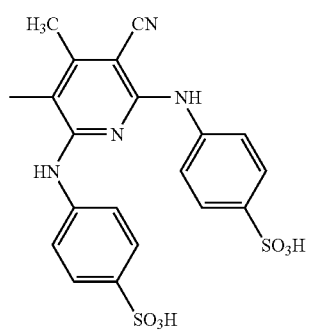 |
| (l-1) 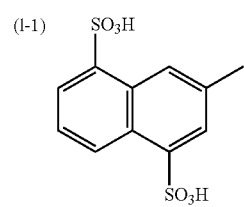 | 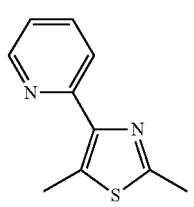 | 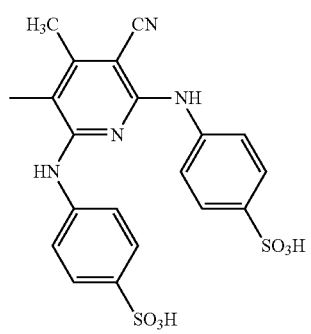 |
| (l-2) 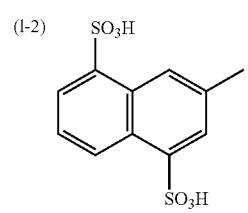 | 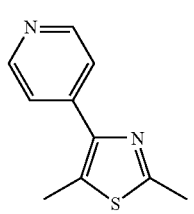 | 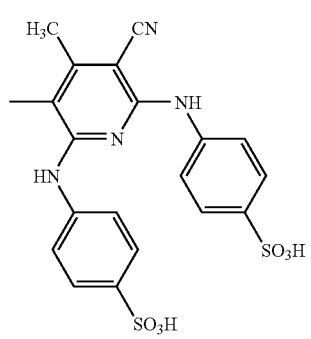 |
| (l-3) 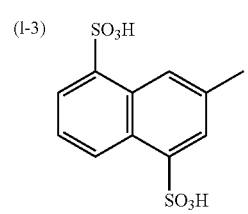 | 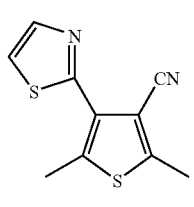 | 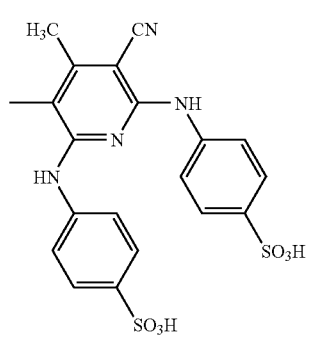 |

-continued (I-4) 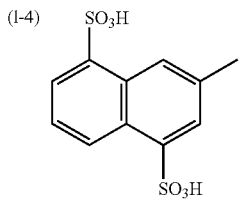   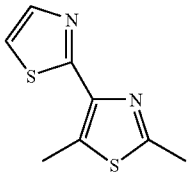   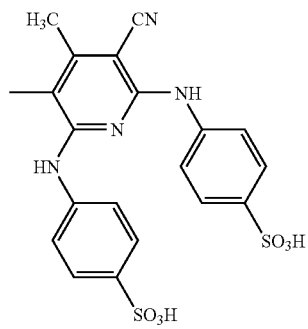

(I-5) 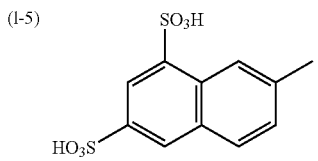   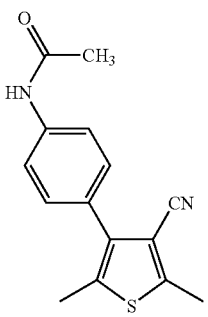   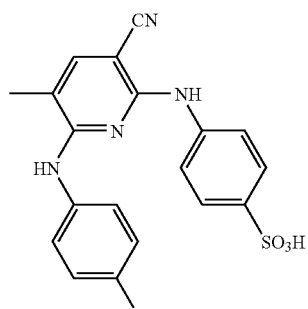

(I-6) 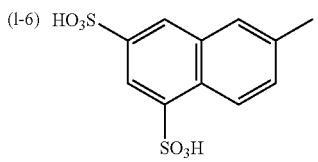   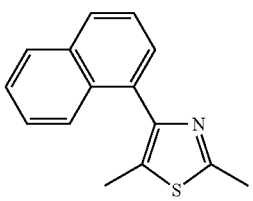   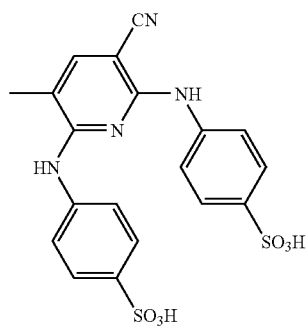

The black dye represented by formula (4) can be synthesized by a coupling reaction of a diazo component and a coupling component. These are described in JP-A-2003-306623 and Japanese Patent Application No. 2003-353498, and synthesis can be achieved by methods described therein.

As a dye (S) having $\lambda_{max}$ within a range of 350 to 500 nm, a yellow dye and a yellow pigment to be explained later can be employed advantageously.

The azo dye represented by formula (4) preferably has a content in the ink of 0.2 to 20 mass %, preferably 0.5 to 15 mass %.

In the ink of the invention, another dye may be used in combination with the aforementioned dyes, in order to obtain a full-color image or to regulate the color hue. Examples of the dye usable in combination are shown in the following.

A yellow dye can be, for example, an aryl or heteryl azo dye having, as a coupling component, a phenol, a naphthol, an aniline, a pirazolone, a pyridone or an open-chain active methylene compound; an azomethine dye having, as a coupling component, an open-chain active methylene compound; a methine dye such as a benzylidene dye or a monomethine oxonol dye; or a quinone dye such as an anthraquinone dye, and other dyes include a quinophthalone dye, a nitro-nitroso dye, an acrylidine dye, an acrylidinone dye etc. Such dye may provide yellow color only after dissociation of a part of the chromophore, and a counter cation in such case may be an inorganic cation such as an alkali metal or an ammonium, an organic cation such as a pyridinium or a quaternary ammonium salt, or a polymer cation having these cations in a partial structure.

A magenta dye can be, for example, an aryl or heteryl azo dye having, as a coupling component, a phenol, a naphthol, or an aniline; an azomethine dye having, as a coupling component, a pirazolone or a pirazolotriazole; a methine dye such as an arylidene dye, a styryl dye, a melocyanine dye, or an oxonole dye; a carbonium dye such as a diphenylmethane dye, a triphenylmethane dye or a xanthene dye; or a quinone dye such as naphthoquinone, anthraquinone or anthrapyridone, and a condensed polycyclic dye such as a dioxadine dye. Such dye may show magenta color only after dissociation of a part of the chromophore, and a counter cation in such case may be an inorganic cation such as an alkali metal or an ammonium, an organic cation such as a pyridinium or a quaternary ammonium salt, or a polymer cation having these cations in a partial structure.

A cyan dye can be, for example, an azomethine dye such as an indoaniline dye, or an indophenol dye; a polymethine dye such as a cyanine dye, an oxonole dye, or a melocyanine dye;

a carbonium dye such as a diphenylmethane dye, a triphenylmethane dye, or a xanthene dye; a phthalocyanine dye; an anthraquinone dye; an aryl or heteryl azo dye having, as a coupling component, a phenol, a naphthol, or an aniline; or an indigo-thioindigo dye. Such dye may show cyan color only after dissociation of a part of the chromophore, and a counter cation in such case may be an inorganic cation such as an alkali metal or an ammonium, an organic cation such as a pyridinium or a quaternary ammonium salt, or a polymer cation having these cations in a partial structure.

Also a black dye such as a polyazo dye may also be employed.

It is also possible to use, in combination, a water-soluble dye such as a direct dye, an acid dye, a good dye, a basic dye, or a reactive dye. Examples of particularly preferred ones include:

C.I. Direct Red 2, 4, 9, 23, 26, 31, 39, 62, 63, 72, 75, 76, 79, 80, 81, 83, 84, 89, 92, 95, 111, 173, 184, 207, 211, 212, 214, 218, 21, 223, 224, 225, 226, 227, 232, 233, 240, 241, 242, 243, 247;

C.I. Direct Violet 7, 9, 47, 48, 51, 66, 90, 93, 94, 95, 98, 100, 101;

C.I. Direct Yellow 8, 9, 11, 12, 27, 28, 29, 33, 35, 39, 41, 44, 50, 53, 58, 59, 68, 86, 87, 93, 95, 96, 98, 100, 106, 108, 109, 110, 130, 132, 142, 144, 161, 163;

C.I. Direct Blue 1, 10, 15, 22, 25, 55, 67, 68, 71, 76, 77, 78, 80, 84, 86, 87, 90, 98, 106, 108, 109, 151, 156, 158, 159, 160, 168, 189, 192, 193, 194, 199, 200, 201, 202, 203, 207, 211, 213, 214, 218, 225, 229, 236, 237, 244, 248, 249, 251, 252, 264, 270, 280, 288, 289, 291;

C.I. Direct Black 9, 17, 19, 22, 32, 51, 56, 62, 69, 77, 80, 91, 94, 97, 108, 112, 113, 114, 117, 118, 121, 122, 125, 132, 146, 154, 166, 168, 173, 199;

C.I. Acid Red 35, 42, 52, 57, 62, 80, 82, 111, 114, 118, 119, 127, 128, 131, 143, 151, 154, 158, 249, 254, 257, 261, 263, 266, 289, 299, 301, 305, 336, 337, 361, 396, 397;

C.I. Acid Violet 5, 34, 43, 47, 48, 90, 108, 126;

C.I. Acid Yellow 17, 19, 23, 25, 49, 40, 42, 44, 49, 60, 64, 76, 79, 110, 127, 135, 151, 159, 169, 174, 190, 195, 196, 197, 199, 218, 219, 222, 227;

C.I. Acid Blue 9, 25, 40, 41, 62, 72, 76, 78, 80, 82, 92, 106, 112, 113, 120, 127:1, 129, 138, 143, 175, 181, 205, 207, 220, 221, 230, 232, 247, 258, 260, 264, 271, 277, 278, 279, 280, 288, 290, 326;

C.I. Acid Black 7, 24, 29, 48, 52:1, 172;

C.I. Reactive Red 3, 13, 17, 19, 21, 22, 23, 24, 29, 35, 37, 40, 41, 43, 45, 49, 55;

C.I. Reactive Violet 1, 3, 4, 5, 6, 7, 8, 9, 16, 17. 22, 23, 24, 26, 27, 33, 34;

C.I. Reactive Yellow 2, 3, 13, 14, 15, 17, 18, 23, 24, 25, 26, 27, 29, 35, 37, 41, 42;

C.I. Reactive Blue 2, 3, 5, 8, 10, 13, 14, 15, 17, 18, 19, 21, 25, 26, 27, 28, 29, 38;

C.I. Reactive Black 4, 5, 8, 14, 21, 23, 26, 31, 32, 34;

C.I. Basic Red 12, 13, 14, 15, 18, 22, 23, 24, 25, 27, 29, 35, 36, 38, 39, 45, 46;

C.I. Basic Violet 1, 2, 3, 7, 10, 15, 16, 20, 21, 25, 27, 28, 35, 37, 39, 40, 48;

C.I. Basic Yellow 1, 2, 4, 11, 13, 14, 15, 19, 21, 23, 24, 25, 28, 29, 32, 36, 39, 40;

C.I. Basic Blue 1, 3, 5, 7, 9, 22, 26, 41, 45, 46, 47, 54, 57, 60, 62, 65, 66, 69, 71; and C.I. Basic Black 8.

It is also possible to use a pigment in combination.

The pigment usable in the ink of the invention can be, in addition to those commercially available, known ones described in various references. The references include "Color Index" (edited by The Society of Dyers and Colourists), "*Kaitei Shimpan Ganryo Binran*" edited by Japanese Pigment Technology Society (1989), "*Saishin Ganryo Ouyou Gijutu*" CMC (1986), "Printing Ink Technology" CMC (1984), and W. Herbst and K Hunger, "Industrial Organic Pigments" (VCH Verlagsgesellschaft, 1993). Specific examples of an organic pigment include an azo pigment (such as azo rake pigment, insoluble azo pigment, condensed azo pigment, and chelate azo pigment), a polycyclic pigment (such as phthalocyanine pigment, anthraquinone pigment, perylene or perynone pigment, indigo pigment, quinachrydone pigment, dioxadine pigment, isoindolinone pigment, quinophthalone pigment and diketopyrrolopyrrole pigment), a mordant rake pigment (such as a rake pigment of acid or basic dye), and an azine pigment, and those of inorganic pigment include a yellow pigment for example C.I. Pigment Yellow 34, 37, 42, 53 etc., a red pigment for example C.I. Pigment Red 101, 108 etc., a blue pigment for example C.I. Pigment Blue 27, 29, 17:1 etc., a black pigment for example C.I. Pigment Black 7 or magnetite, and a white pigment for example C.I. Pigment White 4, 6, 18, 21 etc.

As a pigment having a preferable hue for image formation, preferred ones include, for a blue to cyan pigment, a phthalocyanine pigment, an indanthrone pigment of anthraquinone type (such as C.I. Pigment Blue 60), or a triarylcarbonium pigment of mordant rake pigment, and most preferably a phthalocyanine pigment (preferably a copper phthalocyanine such as C.I. Pigment Blue 15:1, 15:2, 15:3, 15:4, 15:6, a monochloro or low-chloro copper phthalocyanine, an aluminum phthalocyanine pigment described in EP No. 860475, a metal-free phthalocyanine such as C.I. Pigment Blue 16, and a phthalocyanine having a metal center of Zn, Ni or Ti, among which most preferred are C.I. Pigment Blue 15:3, 15:4 and aluminum phthalocyanine).

For a red to violet pigment, preferred ones include an azo dye (preferred examples include C.I. Pigment Red 3, 5, 11, 22, 38, 48:1, 48:2, 48:3, 48:4, 49:1, 52:1, 53:1, 57:1, 63:2, 144, 146, and 184, among which particularly preferred ones are C.I. Pigment Red 57:1, 146 and 184), a quinachrydone pigment (preferred examples include C.I. Pigment Red 122, 192, 202, 207, 209, and C.I. Pigment Violet 19, 42, among which particularly preferred one is C.I. Pigment Red 122), a triarylcarbonium pigment of mordant rake pigment type (preferred examples include xanthene type C.I. Pigment Red 81:1, C.I. Pigment Violet 1, 2, 3, 27, 39 etc.), a dioxadine pigment (for example C.I. Pigment Violet 23, 37 etc.), a diketopyrrolopyrrole pigment ((for example C.I. Pigment Red 254 etc.), a perylene pigment (for example C.I. Pigment Violet 5:1, 31, 33 etc.), and a thioindigo pigment (for example C.I. Pigment Red 38, 88 etc.).

For a yellow pigment, preferred ones include an azo pigment (preferred examples include a monoazo pigment C.I. Pigment Yellow 1, 3, 74, 98, a disazo pigment C.I. Pigment Yellow 12, 13, 14, 16, 17, 83, a composite azo pigment C.I. Pigment Yellow 93, 94, 95, 128, 155, a benzimidazolone C.I. Pigment Yellow 120, 151, 154, 156, 180, among which most preferred ones are those utilizing benzidine as the raw material), an isoindoline-isoindolinone pigment (preferred examples include C.I. Pigment Yellow 109, 110, 137, 139), a quinophthalone pigment (preferred examples include C.I. Pigment Yellow 138) and a flavanthlone pigment (for example C.I. Pigment Yellow 24).

Preferred examples for the black pigment include an inorganic pigment (preferably carbon black or magnetite) or aniline black.

In addition, there may also be employed an orange pigment (such as C.I. Pigment Orange 13, or 16), or a green pigment (such as C.I. Pigment Green 7).

The pigment usable in the ink of the invention may be an unprocessed pigment as described above, or a pigment subjected to a surface treatment. The method of surface treatment can be a method of surfacially coating resin or wax, a method of attaching a surfactant, or a method of coupling a reactive substance (such as a silane coupling agent, an epoxy compound, a polyisocyanate, or a radical generated from a diazonium salt) to the pigment surface, and is described in the following references and patents:

[1] Property and Application of Metal Soaps (Saiwai Shobo);
[2] *Insatsu Ink Insatsu* (CMC, 1984);
[3] *Saishin Ganryo Ouyou Gijutsu* (CMC, 1986);
[4] U.S. Pat. Nos. 5,554,738 and 5,571,311;
[5] JP-A Nos. 9-151342, 10-140065, 10-292143 and 11-166145.

In particular, a self-dispersible pigment prepared by reacting a diazonium salt, described in the U.S. Pat. No. [4] with carbon black, and an encapsulated pigment prepared by a method described in patents [5] are effective as dispersion stability can be obtained without utilizing an additional dispersant in the ink.

In the ink of the invention, the pigment may be dispersed by utilizing a dispersant. The dispersant can be of various known types according to the pigment to be used, such as a low-molecular dispersant of surfactant type, or a high-molecular dispersant. Examples of the dispersant include those described in JP-A No. 3-69949 and EP No. 549486. Also at the use of a dispersant, a pigment derivative called a synergist may be added for promoting adsorption of dispersant to the pigment.

The pigment usable in the ink of the invention preferably has a particle size after dispersion within a range of 0.01 to 10 μm, more preferably 0.05 to 1 μm For dispersing the pigment, there can be utilized a known dispersing technology employed in ink manufacture or toner manufacture. A dispersing apparatus can be a vertical or horizontal agitator mill, an attriter, a colloid mill, a ball mill, a three-roll mill, a pearl mill, a super mill, an impeller, a disperser, a KD mill, a dynatron, or a pressurized kneader. Details are described in *Saishin Ganryo Ouyou Gijutsu* (CMC, 1986).

Examples of the water-miscible organic solvent (including water-soluble organic solvent) to be employed in the invention include an alcohol (such as methanol, ethanol, propanol, isopropanol, butanol, isobutanol, sec-butanol, t-butanol, pentanol, hexanol, cyclohexanol or benzyl alcohol), a polyhydric alcohol (such as ethylene glycol, diethylene glycol, triethylene glycol, polyethylene glycol, propylene glycol, dipropylene glycol, polypropylene glycol, butylenes glycol, hexanediol, pentandiol, glycerin, hexanetriol, or thiodiglycol), a glycol derivative (such as ethylene glycol monomethyl ether, ethylene glycol monoethyl ether, ethylene glycol monobutyl ether, diethylene glycol monomethyl ether, diethylene glycol monobutyl ether, propylene glycol monomethyl ether, propylene glycol monobutyl ether, dipropylene glycol monomethyl ether, triethylene glycol monomethyl ether, ethylene glycol diacetate, ethylene glycol monomethyl ether acetate, triethylene glycol monomethyl ether, triethylene glycol monoethyl ether, or ethylene glycol monophenyl ether), an amine (such as ethanol amine, diethanol amine, triethanol amine, N-methyldiethanol amine, N-ethyldiethanol amine, morpholine, N-ethylmorpholine, ethylenediamine, diethylenetriamine, triethylenetetramine, polyethylenimine, or tetramethylpropylene diamine), and other polar solvents (such as formamide, N,N-dimethylformamide, N,N-dimethylacetamide, dimethyl sulfoxide, sulfolane, 2-pyrrolidone, N-methyl-2-pyrrolidone, N-vinyl-2-pyrrolidone, 2-oxazolidone, 1,3-dimethyl-2-imidazolidine, acetonitrile or acetone). The water-miscible organic solvent may be employed in a combination of two or more kinds. Among these, in the invention, there is preferably employed a water-miscible organic solvent (preferably water-soluble organic solvent) having a boiling point of 150° C. or higher (preferably 200° C. or higher).

In the following, there will be explained other components that can be contained in the ink composition for inkjet printing of the present invention.

The ink (composition) for inkjet printing may contain a surfactant, and a resulting regulation of the physical properties of the ink composition allows to improve discharge stability of the ink composition and to provide excellent effects such as an improvement in the water resistance of the image and a prevention of blotting of the printed ink composition.

As the surfactant, an anionic surfactant such as sodium dodecylsulfonate, sodium dodecyloxysulfonate or sodium alkylbenzenesulfonate, a cationic surfactant such as cetylpyridinium chloride, trimethylcetylpyridinium chloride, or tetrabutylammonium chloride, or a nonionic surfactant such as polyoxyethylenenonyl phenyl ether, polyoxyethylene naphthyl ether, or polyoxyethyleneoctyl phenyl ether is advantageously employed. Among these, a nonionic surfactant is employed preferably.

The surfactant preferably has a content to the ink composition of 0.001 to 15 mass %, preferably 0.005 to 10 mass % and further preferably 0.01 to 5 mass %.

In the ink composition for inkjet printing of the invention, there may be employed, in suitable amounts, additives such as a drying preventing agent for preventing a clogging of an ink discharge port by drying, a penetration promoting agent for enhancing ink penetration in the paper, an ultraviolet absorbing agent, an antioxidant, a defoaming agent, a viscosity regulating agent, a surface tension regulating agent, a dispersant, a dispersion stabilizing agent, an antimold agent, an antirusting agent, and a pH regulating agent.

A drying preventing agent to be employed in the invention is preferably a water-soluble organic solvent having a vapor pressure lower than that of water. Specific examples include a polyhydric alcohol such as ethylene glycol, propylene glycol, diethylene glycol, polyethyelen glycol, thiodiglycol, dithiodiglycol, 2-methyl-1,3-propanediol, 1,2,6-hexanetriol, an acetylene glycol derivative, glycerin, or trimethylolpropane, a lower alkyl ether of a polyhydric alcohol such as ethylene glycol monomethyl (or ethyl)ether, diethylene glycol monomethyl (or ethyl)ether, or triethylene glycol monoethyl (or methyl)ether, a heterocyclic compound such as 2-pyrrolidone, N-methyl-2-pyrrolidone, 1,3-dimethyl-2-imidazolidinone, or N-methylmorpholine, a sulfur-containing compound such as sulfolane, dimethyl sulfoxide or 3-sulfolene, a polyfunctional compound such as diacetone alcohol or diethanolamine, and an urea derivative. Among these, a polyhydric alcohol such as glycerin or diethylene glycol is more preferable. The aforementioned drying preventing agent may be employed singly or in a combination of two or more kinds. Such drying preventing agent is preferably used in a content of 10 to 50 mass % in the ink.

A penetration promoting agent to be employed in the invention can be an alcohol such as ethanol, isopropanol, butanol, di(tri)ethylene glycol monobutyl ether, or 1,2-hexanetriol, sodium laurylsulfonate, sodium oleate or a nonionic surfactant. Such material provides a sufficient effect in a content of 10 to 30 mass % in the ink, and is preferably used within an extent not causing a blotting of print, or a print-through on the paper.

As an ultraviolet absorber to be employed in the invention for improving the storage property of the image, there can be employed a benzotriazole compound described for example in JP-A Nos. 58-185677, 61-190537, 2-782, 5-197075, and 9-34057, a benzophenone compound described for example in JP-A Nos. 46-2784, 5-194483 and U.S. Pat. No. 3,214,463, a cinnamate compound described for example in JP-B Nos. 48-30492, 56-21141 and JP-A No. 10-88106, a triazine compound described for example in JP-A Nos. 4-298503, 8-53427, 8-239368, 10-182621 and JP-T No. 8-501291, a compound described in Research Disclosure No. 24239, or a compound absorbing ultraviolet light and emitting fluorescence, so-called fluorescent whitening agent represented by stilbene and benzoxazole compounds.

As an antioxidant to be used in the invention for improving storability of the image, there can be employed various antifading agents of organic type and metal complex type. The organic antifading agent includes a hydroquinone, an alkoxyphenol, a dialkoxyphenol, a phenol, an aniline, an amine, an indane, a chroman, an alkoxyaniline, and a heterocyclic compound, and the metal complex includes a nickel complex and a zinc complex. More specifically, there can be employed compounds described in patents cited Research Disclosure No. 17643, VII, items I to J, No. 15162, No. 18716, page 650, left column, No. 36544, page 527, No. 307105, page 872, and No. 15162, and compounds contained in formulae of representative compounds and compound examples described in JP-A No. 62-215272, pages 127-137.

A defoaming agent to be employed in the invention is a copolymer of dimethylpolysiloxane and polyalkylene oxide, which is present in a pendant type, a terminal denatured type and an NBA type, among which the pendant type is preferred. Such copolymer is available as FZ-2203, -2207, -2222 and -2166 (trade names; manufactured by Nippon Unicar Co.).

An antimold agent to be employed in the invention can be sodium dehydroacetate, sodium benzoate, sodium pyridinethione-1-oxide, ethyl p-hydroxybenzoate, 1,2-benzisothiazolin-3-one and a salt thereof. Such material is preferably used in an mount of 0.02 to 5.0 mass % in the ink.

Details of these materials are described for example in *Bokin-bokunzai Jiten* (edited by Japan Antibacterial-antimold Society, Dictionary Editing Committee).

Also an antirusting agent can be, for example, an acidic sulfite salt, sodium thiosulfate, ammonium thioglycollate, diisopropylammonium nitrite, tetranitrate pentaerythritol, dicyclohexylammonium nitrite, or benzotriazole. Such material is preferably used in an amount of 0.02 to 5.00 mass % in the ink.

A pH regulating agent to be used in the invention can be advantageously used for regulating pH and for providing dispersion stability, and the pH of the ink is preferably regulated at 8 to 11 at 25° C. A pH value less than 8 reduces the solubility of dye thereby tending to cause nozzle clogging, while a pH value exceeding 11 tends to deteriorate the water resistance. The pH regulating agent can be an organic base or an inorganic alkali as a basic substance, or an organic acid or an inorganic acid as an acidic substance.

The organic base can be triethanolamine, diethanolamine, N-methyldiethanolamine, or dimethylethanolamine. The inorganic alkali can be an alkali metal hydroxide (such as sodium hydroxide, lithium hydroxide, or potassium hydroxide), a carbonate salt (such as sodium carbonate, or sodium hydrogencarbonate), or ammonium. Also the organic acid can be acetic acid, propionic acid, trifluoroacetic acid, or alkylsulfonic acid. The inorganic acid can be hydrochloric acid, sulfuric acid or phosphoric acid.

In the invention, in addition to the betaine compound including the aforementioned surfactant, a nonionic, cationic or anionic surfactant may be used as a surface tension regulating agent. The anionic surfactant can be a fatty acid salt, an alkylsulfonate ester salt, an alkylbenzenesulfonate salt, an alkylnaphthalenesulfonate salt, a dialkylsulfosuccinate salt, an alkylphophate ester salt, a naphthalenesulfonic acid-formaline condensate, or a polyoxyethylenealkylsulfonate ester salt. The nonionic surfactant can be polyoxyethylene alkyl ether, polyoxyethylene alkylallyl ether, a polyoxyethylene fatty acid ester, a sorbitan fatty acid ester, a polyoxyethylene-sorbitan fatty acid ester, polyoxyethylene alkylamine, a glycerin fatty acid ester, an oxyethylene-oxypropylene copolymer etc. There is also preferably employed Surfynols (Air Products & Chemicals Co.) which are acetylene-type polyoxyethylene oxide surfactants.

In the following, a inkjet recording material of the invention will be explained.

The inkjet recording material of the invention includes at least an ink receptive layer on a substrate, and the ink receptive layer contains a compound of formula (A). The ink receptive layer preferably further contains a water-soluble resin, more preferably further contains fine particles, and further preferably a mordant agent. In case the water-soluble resin is contained, it is more preferable to contain a crosslinking agent capable of crosslinking the water-soluble resin.

(Substrate)

A substrate for the inkjet recording material of the invention can be a transparent substrate comprising a transparent material such as plastics, or an opaque substrate comprising an opaque material such as paper. For exploiting the advantage of transparency of the ink receptive layer, there is preferred a transparent substrate or an opaque substrate or a high luster.

As a material usable for the transparent substrate, there is preferred a material capable of withstanding heat of radiation when used in an overhead projection or a back-lit display. Such material can for example be a polyester such as polyethylene terephthalate, polysulfone, polypohenylene oxide, polyimide, polycarbonate, or polyamide. Among these, a polyester is preferable, and polyethylene terephthalate is particularly preferable.

A thickness of the transparent substrate is not particularly restricted, but is preferably within a range of 50 to 200 μm in consideration of ease of handling.

An opaque substrate of a high luster preferably has a luster of 40% or higher on a surface on which the ink receptive layer is provided. The luster mentioned above is determined according to a method described in JIS P-8142 (test method for 75° mirror surface luster of paper and board). More specifically, following substrates can be employed.

Examples include a paper substrate of high luster, such as art paper, coated paper, cast coated paper, or baryta paper employed for a substrate for silver halide-based photograph; a film of high luster (that may be surface calendered) formed by including a white pigment in a plastic film for example of polyester such as polyethylene terephthalate (PET), a cellulose ester such as nitrocellulose, cellulose acetate, or cellulose acetate butyrate; polysulfone, polyphenylene oxide, polyimide, polycarbonate, or polyamide; and a substrate having a polyolefin coating layer with or without white pigment on a surface of the aforementioned paper substrate, the aforementioned transparent substrate or a high-luster film containing white pigment.

Also a foamed polyester film containing white pigment (for example formed PET in which polyolefin fine particles are contained and pores are formed by extending) is advantageous, and a resin coated paper use for a photographic paper for silver halide-based photograph is also advantageous.

A thickness of the aforementioned opaque substrate is not particularly restricted but is preferably 50 to 300 μm in consideration of the handling property.

Also the surface of the substrate may be subjected, for improving wetting property and adhesion property, to a corona discharge, a glow discharge, a flame treatment, or an ultraviolet irradiation.

In the following, there will be given a detailed explanation on base paper to be employed in the resin coated paper.

Such base paper is milled principally with a wood pulp, and, if necessary, employing a synthetic pulp such as of polypropylene or synthetic fibers such as of nylon or polyester in addition to the wood pulp. The wood pulp can be any of LBKP, LBSP, NBKP, NBSP, LDP, NDP, LUKP, and NUKP, but it is preferable to employ LBKP, NBSP, LBSP, NDP or LDP rich in short fibers in a large proportion.

However a proportion LBSP and/or LDP is preferably from 10 to 70 mass %.

As the aforementioned pulp, there is preferably employed chemical pulp of low impurity content (such as sulfate pulp or sulfite pulp), and a pulp improved in whiteness by bleaching is also useful.

In the base paper, it is possible to suitably add a sizing agent such as a higher fatty acid or an alkylketene dimmer, a white pigment such as calcium carbonate, talc, or titanium oxide, a paper strength improving agent such as starch, polyacrylamide or polyvinyl alcohol, a fluorescent whitening agent, a moisture retaining agent such as polyethylene glycol, a dispersant, a softening agent such as a quaternary ammonium salt etc.

The pulp used for papermaking preferably has a water filtration degree of 200 to 500 ml in CSF standard, and a fiber length after beating of 30 to 70% in a sum in mass % of a 24-mesh residue and a 42-mesh residue defined in JIS P-8207. Also a 4-mesh residue is preferably 20 mass % or less.

The base paper preferably has a basis weight of 30-250 g/m$^2$, particularly preferably 50 to 200 g/m$^2$. A thickness of the base paper is preferably 40 to 250 μm. The base paper can be given a high smoothness by a calendering process at or after the papermaking. A density of the base paper is generally 0.7 to 1.2 g/m$^2$ (JIS P-8118).

Also a stiffness of the base paper is preferably 20 to 200 g under a condition defined in JIS P-8143.

The base paper may be surfacially coated with a surface sizing agent, which can be same as the sizing agent added in the base paper.

The base paper preferably has a pH of 5 to 9, measured by a hot water extraction method defined in JIS P-8113.

Polyethylene used for coating a top surface and a rear surface of the base paper is principally low density polyethylene (LDPE) and/or high density polyethylene (HDPE), but LLDPE, polypropylene etc. may also be employed partially.

In particular, a polyethylene layer on the side where the ink receptive layer is formed is preferably improved in opaqueness, whiteness and hue, as commonly executed in the photographic paper, by adding a lutile or anatase titanium oxide, a fluorescent whitening agent, or Prussian blue to polyethylene. A content of titanium oxide to polyethylene is preferably about 3 to 20 mass %, more preferably 4 to 13 mass %. The polyethylene layer is not particularly restricted in thickness, but is preferably 10 to 50 μm both in the top layer and the rear layer. On the polyethylene layer, an undercoat layer may be provided for providing an adhesive property to the ink receptive layer. Such undercoat layer is preferably formed by aqueous polyester, gelatin or PVA. The undercoat layer preferably has a thickness of 0.01 to 5 μm.

A polyethylene-coated paper may be used as a paper of high luster or, by a pressing operation at the extrusion coating of polyethylene on the surface of the base paper, may be formed into a matted surface or a silk surface utilized in the ordinary photographic papers.

The substrate may also be provided with a back coating layer, and components that can be added to such back coating layer include a white pigment, an aqueous binder, etc.

Examples of the white pigment contained in the back coating layer include an inorganic white pigment such as light calcium carbonate, heavy calcium carbonate, caolin, talc, calcium sulfate, barium sulfate, titanium dioxide, zinc oxide, zinc sulfide, zinc carbonate, satin white, aluminum silicate, diatomaceous earth, calcium silicate, magnesium silicate, synthetic amorphous silica, colloidal silica, colloidal alumina, pseudo boehmite, aluminum hydroxide, alumina, lithopone, zeolite, hydrated halloycite, magnesium carbonate, or magnesium hydroxide, and an organic pigment such as a styrenic plastic pigment, a acrylic plastic pigment, polyethylene, microcapsules, urea resin, or melamine resin.

An aqueous binder to be employed in the back coating layer can be, for example, a water-soluble polymer such as a styrene/maleate salt copolymer, a styrene/actylate salt copolymer, polyvinyl alcohol, silanol-denatured polyvinyl alcohol, starch, caolinated starch, casein, gelain, carboxymethyl cellulose, hydroxyethyl cellulose, or polyvinylpyrrolidone, and a water-dispersible polymer such as styrene-butadiene latex or acryl emulsion.

Other components that can be contained in the back coating layer include a defoaming agent, an antifoaming agent, a dye, a fluorescent whitening agent, an antiseptic, and a water resistant agent.

In the recording material of the present invention, the ink receptive layer thereof preferably contains a water-soluble resin.

Examples of the water-soluble resin include a polyvinyl alcohol resin which includes a hydroxyl group as a hydrophilic structural unit [such as polyvinyl alcohol (PVA), acetacetyl-denatured polyvinyl alcohol, cation-denatured polyvinyl alcohol, anion-denatured polyvinylk alcohol, silanol-denatured polyvinyl alcohol, or polyvinyl acetal], a cellulose resin [such as methyl cellulose (MC), ethyl cellulose (EC), hydroxyethyl cellulose (HEC), carboxymethyl cellulose (CMC), hydroxypropyl cellulose (HPC), hydroxyethylmethyl cellulose, or hydroxypropylmethyl cellulose], a chitin, a chitosan, starch, an ether bond-containing resin [polyethylene oxide (PEO), polypropylene oxide (PPO), polyethylene glycol (PEG), or polyvinyl ether (PVE)], and a resin having carbamoyl group [such as polyacrylamide (PAAM), polyvinylpyrrolidone (PVP) or polyacrylic acid hydrazide].

Also included are a polyacrylic acid salt having a carboxyl group as a dissociable group, a maleic acid resin, an alginate salt, and gelatin.

Among these, polyvinyl alcohol resin is particularly preferable. Examples of the polyvinyl alcohol resin include those described in JP-B Nos. 4-52786, 5-67432, and 7-29479, Japanese Patent No. 2537827, JP-B No. 7-57553, Japanese Patents Nos. 2502998 and 3053231, JP-A No. 63-176173, Japanese Patent No. 26-4367, JP-A Nos. 7-276787, 9-207425, 11-58941, 2000-135858, 2001-205924, 2001-287444, 62-278080 and 9-39373, Japanese Patent No. 2750433, JP-A Nos. 2000-158801, 2001-213045, 2001-328345, 8-324105, and 11-348417.

Also examples of water-soluble resin other than polyvinyl alcohol resin include those described in JP-A No. 11-165461, paragraphs 0011-0014.

Such water-soluble resins may be employed singly or in a combination of two or more kinds.

The water-soluble resin of the invention preferably has a content, with respect to all solid mass of the ink receptive layer, of 9 to 40 mass %, more preferably 12 to 33 mass %.

(Fine Particles)

In the recording material of the invention, the ink receptive layer further preferably includes fine particles.

Presence of fine particles in the ink receptive layer provides a porous structure, thereby improving ink absorbing ability. In particular, in case such fine particles preferably have a solid content in the ink receptive layer equal to or higher than 50 mass %, more preferably higher than 60 mass %, an even better porous structure can be formed to provide a recording material with a sufficient ink absorbing property. The solid content of the fine particles in the ink receptive layer is calculated, based on components, other than water, of a composition constituting the ink receptive layer.

The fine particles in the invention can be organic fine particles or inorganic fine particles, but preferably inorganic fine particles in consideration of ink absorbing ability and image stability.

The organic fine particles are preferably polymer particles obtained for example by emulsion polymerization, microemulsion polymerization, soap-free polymerization, seed polymerization, dispersion polymerization, or suspension polymerization, and can be polymer particles in powder, latex or emulsion state of polyethylene, polypropylene, polystyrene, polyacrylate, polyamide, silicone resin, phenolic resin or a natural polymer.

The inorganic fine particles can be inorganic white pigment powder such as silica powder, colloidal silica, titanium dioxide, barium sulfate, calcium silicate, zeolite, caolinite, halloysite, mica, talc, calium carbonate, magnesium carbonate, calium sulfate, pseudo boehmite, zinc oxide, zinc hydroxide, alumina, aluminum silicate, calcium silicate, magnesium silicate, zirconium oxide, zirconium hydroxide, cerium oxide, lanthanum oxide, or yttrium oxide. Among these, silica fine particles, colloidal silica, alumina fine particles or pseudo boehmite is preferred from the standpoint of forming a satisfactory porous structure. The fine particles may be employed in a state of primary particles or in a state of forming secondary particles. Such fine particles preferably have an average primary particle size of 2 μm or less, more preferably 200 nm or less.

There are further preferred silica fine particles with an average primary particle size of 20 nm or less, colloidal silica with an average primary particle size of 30 nm or less, alumina fine particles with an average primary particle size of 20 nm or less, or pseudo boehmite with an average pore radius of 2 to 15 nm, particularly silica fine particles, alumina fine particles or pseudo boehmite.

The silica fine particles are generally classified, according to the producing method, into wet process particles and dry process (gaseous process) particles. The wet process generally executes acidolysis of a silicate salt to obtain active silica, which is suitably polymerized and precipitated to obtain hydrous silica. On the other hand, the gaseous phase process generally employs a method of high-temperature gaseous hydrolysis of silicon halide (flame hydrolysis), or a method of reduction gasifying silicon oxide and cokes under heating with an arc in an electric oven followed by oxidation with air (arc process), and "gaseous process silica" means anhydrous silica particles obtained by such gaseous process. The silica fine particles to be employed in the invention are particularly preferably gaseous process silica fine particles.

The gaseous process silica is different from hydrous silica in the density of surfacial silanol groups, presence/absence of pores etc., thus showing different properties and are suitable for forming a three-dimensional structure with a high pore rate. The reason for such behavior is not clear, but it is estimated that the hydrous silica has a density of silanol groups on the particle surface as high as 5 to $8/nm^2$ and easily forms dense aggregates of the fine particles, while the gaseous process silica has a lower density of silanol groups on the particle surface of 2 to $3/nm^2$, thus forming less dense flocculates, thereby leading to a structure of a higher pore rate.

The gaseous process silica has features of a particularly high specific surface area, leading to a high ink absorbing property and a high ink holding efficiency, and a low refractive index which provides the ink receptive layer with transparency when dispersed to an appropriate particle size, thereby providing a high color density and a satisfactory color developing property. The transparency of the ink receptive layer is important not only in an application requiring transparency such as an OHP sheet, but also in an inkjet recording material such as a photo-like luster paper, for obtaining a high color density and a satisfactory color developing property and luster.

The gaseous process silica preferably has an average primary particle size of 30 nm or less, more preferably 20 nm or less, particularly preferably 10 nm or less and most preferably 3 to 10 nm. The gaseous process silica, owing to a tendency of mutual adhesion of particles by hydrogen bonding based on silanol groups, can form a structure with a high pore rate in case of an average primary particle size of 30 nm or less, thereby effectively improving the ink absorbing property.

The silica fine particles may be used in combination with other fine particles mentioned above. In case of using such other fine particles and the silica fine particles in combination, a content of the gaseous process silica in all the fine particles is preferably 30 mass % or higher, more preferably 50 mass % or higher.

As the inorganic fine particles of the invention, there are also preferred alumina fine particles, alumina hydrate, a mixture or a composite thereof. Among these, alumina hydrate is preferable in its ability to satisfactorily absorb and fix ink, and pseudo boehmite ($Al_2O_3.nH_2O$) is particularly preferable. The alumina hydrate can be employed in various forms, but it is preferable to employ boehmite in sol state as a raw material because a smooth layer can be easily obtained.

As to the pore structure of pseudo boehmite, it preferably has an average pore radius of 1 to 30 nm, more preferably 2 to 15 nm. Also a pore volume is preferably 0.3 to 2.0 ml/g, more preferably 0.5 to 1.5 ml/g. The pore radium and pore volume are measured by a nitrogen adsorption-desorption method, for example with a gas adsorption-desorption analyzer (for example Omnisorp 369 (trade name), manufactured by Coulter Inc.).

Among the alumina fine particles, gaseous process alumina fine particles are preferred because of a large specific surface area. Such gaseous process alumina preferably has an average primary particle size of 30 nm or less, more preferably 20 nm or less.

In case of employing the aforementioned fine particles in a recording material, modes described for example in JP-A Nos. 10-81064, 10-119423, 10-157277, 10-217601, 11-348409, 2001-138621, 2000-43401, 2000-211235, 2000-

309157, 2001-96897, 2001-137¥8627, 11-91242, 8-2087, 8-2090, 8-2091, 8-2093, 8-174992, 11-192777 and 2001-301314 may be employed advantageously.

In the ink receptive layer of the invention, each of the water-soluble resin and the fine particles may a single material or a mixture of plural materials. For the purpose of maintaining transparency, a type of the water-soluble resin to be combined with the fine particles, particularly silica fine particles, is important. In case of employing gaseous process silica, the water-soluble resin is preferably a polyvinyl alcohol resin, more preferably a polyvinyl alcohol resin with a saponification degree of 70 to 100%, particularly preferably a polyvinyl alcohol resin with a saponification degree of 80 to 99.5%.

The polyvinyl alcohol resin has a hydroxyl group in a structural unit thereof, and such hydroxyl group forms a hydrogen bond with the surfacial silanol group the silica fine particles, thereby promoting formation of a three-dimensional network structure in which a secondary particle of the silica fine particles constitutes a network chain unit. It is estimated that such three-dimensional network structure allows to form an ink receptive layer of a porous structure with a high pore rate and a sufficient strength.

In the inkjet recording, a porous ink receptive layer thus obtained can rapidly absorb ink by a capillary phenomenon, and can form a dot of satisfactory circularity without ink blotting.

Also the polyvinyl alcohol resin may be used in combination with the aforementioned other water-soluble resin. In case such other water-soluble resin and the polyvinyl alcohol resin are used in combination, a content of the polyvinyl alcohol resin in the entire water-soluble resins is preferably 50 mass % or higher, more preferably 70 mass % or higher.

<Content Ratio of Fine Particles and Water-soluble Resin>

A mass content ratio [PB ratio (x/y)] of the fine particles (x) and the water-soluble resin (y) affects significantly also a film structure and a film strength of the ink receptive layer. More specifically, a larger mass content ratio (PB ratio) increases a pore rate, a pore volume and a surface area (per unit mass), but tends to deteriorate a density and a strength.

The ink receptive layer of the invention preferably has a mass content ratio [PB ratio (x/y)] within a range of 1.5:1 to 10:1, in order to prevent a loss in the film strength or a cracking in drying, resulting from an excessively high PB ratio, and to prevent a clogging of pores with the resin and a lowered pore rate leading to a deteriorated ink absorbing property, resulting from an excessively low PB ratio.

The ink receptive layer is required to have a sufficiently high film strength, since a stress may be applied to the inkjet recording material in passing a transporting system in an inkjet printer. A sufficient film strength in the ink receptive layer is also required in order to prevent cracking or peeling thereof at a cutting operation into a sheet. In consideration of these requirements, the mass ratio (x/y) is more preferably 5:1 or less, and it is more preferably 2:1 or more in order to secure a high-speed ink absorbing property on the inkjet printer.

For example, by coating a substrate with a coating liquid in which gaseous process silica fine particles of an average primary particle size of 20 nm or less and a water-soluble resin are completely dispersed in an aqueous solution with a mass ratio (x/y) of 2:1-5:1 and by drying the coating layer, a three-dimensional network structure is formed with a secondary particle of the silica fine particles as a network chain, and there can be easily obtained a translucent porous film with an average pore size of 30 nm or less, a pore rate of 50-80%, a specific pore volume of 0.5 ml/g or more and a specific surface area of 100 m²/g or more.

(Crosslinking Agent)

In the recording material of the invention, it is preferred that the ink receptive layer, constituted of a coating layer including fine particles and a water-soluble resin, further includes a crosslinking agent capable of crosslinking the water-soluble resin, and constitutes a porous layer which is cured by a crosslinking reaction of the crosslinking agent and the water-soluble resin.

A boron compound is preferred for crosslinking the water-soluble resin, particularly polyvinyl alcohol. Examples of the boron compound include borax, boric acid, a borate salt for example an orthoborate salt (such as $InBO_3$, $ScBO_3$, $YBO_3$, $LaBO_3$, $Mg_3(BO_3)_2$, or $Co_3(BO_3)_2$), a diborate salt (such as $Mg_2B_2O_5$ or $CO_2B_2O_5$), a metaborate salt (such as $LiBO_2$, $Ca(BO_2)_2$, $NaBO_2$, or $KBO_2$), a tetraborate salt (such as $Na_2B_4O_7 \cdot 10H_2O$), and a pentaborate salt (such as $KB_5O_8 \cdot 4H_2O$, $Ca_2B_6O_{11} \cdot 7H_2O$ or $CsB_5O_5$). Among these, borax, boric acid or borate salt is preferable in inducing the crosslinking reaction rapidly, and boric acid is particularly preferable.

Also, following compounds, other than the boron compounds, may be used as a crosslinking agent for the water-soluble resin.

Examples include an aldehyde compound such as formaldehyde, glyoxal, or glutaraldehyde; a ketone compound such as diacetyl or cyclopentanedion; an active halogen compound such as bis(2-chloroethylurea)-2-hydroxy-4,6-dichloro-1,3,5-triazine, or 2,4-dichloro-6-S-triazine sodium salt; an active vinyl compound such as divinylsulfonic acid, 1,3-vinylsulfonyl-2-propanol, N,N'-ethylenebis(vinylsulfonylacetamide) or 1,3,5-triacryloyl-hexahydro-S-triazine; an N-methylol compound such as dimethylolurea or methyloldimethylhydantoin); a melamine resin (such as methylolmelamine or alkylated methylolmelamine); an epoxy resin; an isocyanate compound such as 1,6-hexamethylene diisocyanate; an aziridin compound described in U.S. Pat. Nos. 3,017,280 and 2,983,611; a carboxyimide compound described in U.S. Pat. No. 3,100,704; an epoxy compound such as glycerol triglycidyl ether; an ethyleneimino compound such as 1,6-hexamethylene-N,N'-bisethyleneurea; a halogenated carboxyaldehyde compound such as mucochloric acid or mucophenoxychloric acid; a dioxane compound such as 2,3-dihydroxydioxane; a metal-containing compound such as titanium lactate, aluminum sulfate, chromium alum, potassium alum, zirconyl acetate or chromium acetate; a polyamine compound such as tetraethylenepentamine; a hydrazide compound such as adipate dihydrazide; and a low-molecular compound or a polymer containing two or more oxazoline groups.

These crosslinking agents may be employed singly or in a combination of two or more kinds.

The crosslinking agent may be preferably provided in the following manner, for example in case of a boron compound. This is achieved, in case the ink receptive layer is a layer formed by curing a coating layer by a crosslinking reaction, the coating layer being formed by applying a coating solution (hereinafter also called first coating solution) containing fine particles, a water-soluble resin including polyvinyl alcohol and a boron compound, and the curing by crosslinking is executed (1) at the same time as applying the coating solution, or (2) in the course of drying a coating layer (called coating film) formed by applying the aforementioned coating solution and before the coating layer starts to show a falling drying rate, by applying a basic solution of a pH of 8 or higher (hereinafter also called a second coating liquid) to such coating layer or coating film.

The crosslinking agent is preferably used in an amount, with respect to the water-soluble resin, of 1 to 50 mass %, more preferably 5 to 40 mass %.

(Mordant)

In the invention, the ink receptive layer preferably contains a mordant in order to improve water resistance and resistance to blotting in time of a formed image.

The mordant is preferably a cationic polymer (cationic mordant) as an organic mordant, or an inorganic mordant. Such mordant present in the ink receptive layer causes an interaction with a liquid ink including an anionic dye as a colorant, thereby stabilizing the colorant and improving the water resistance and the resistance to blotting in time. The organic mordant and the inorganic mordant may be employed singly or in combination.

The mordant may be added in the coating liquid containing the fine particles and the water-soluble resin (first coating liquid), or, in case of a fear for coagulation with the fine particles, added in the second coating liquid and coated.

As the cationic mordant, a polymer mordant having a primary to tertiary amino group or a quaternary ammonium salt group as a cationic group is employed advantageously, but a cationic non-polymer mordant can also be employed.

The polymer mordant is preferably a homopolymer of a monomer (mordant monomer) having a primary to tertiary amino group, a salt thereof or a quaternary ammonium salt group, or a copolymer or a condensation polymer of such mordant monomer and another monomer (hereinafter called "non-mordant monomer"). Also such polymer mordant may be used in a state of water-soluble polymer or a water-dispersible latex particles.

Examples of the monomer (mordant monomer) include trimethyl-p-vinylbenzylammonium chloride, trimethyl-m-vinylbenzylammonium chloride, triethyl-p-vinylbenzylammonium chloride, triethyl-m-vinylbenzylammonium chloride, N,N-dimethyl-N-ethyl-N-p-vinylbenzylammonium chloride, N,N-diethyl-N-methyl-N-p-vinylbenzylammonium chloride, N,N-dimethyl-N-n-propyl-N-p-vinylbenzylammonium chloride, N,N-dimethyl-N-n-octyl-N-p-vinylbenzylammonium chloride, N,N-dimethyl-N-benzyl-N-p-vinylbenzylammonium chloride, N,N-diethyl-N-benzyl-N-p-vinylbenzylammonium chloride, N,N-dimethyl-N-(4-methyl)benzyl-N-p-vinylbenzylammonium chloride, N,N-dimethyl-N-phenyl-N-p-vinylbenzylammonium chloride, trimethyl-p-vinylbenzylammonium bromide, trimethyl-m-vinylbenzylammonium bromide, trimethyl-p-vinylbenzylammonium sulfonate, trimethyl-m-vinylbenzylammonium sulfonate, trimethyl-p-vinylbenzylammonium acetate, trimethyl-m-vinylbenzylammonium acetate, N,N,N-triethyl-N-2-(4-vinylphenyl)ethylammonium chloride, N,N,N-triethyl-N-2-(3-vinylphenyl)ethylammonium chloride, N,N-diethyl-N-methyl-N-2-(4-vinylphenyl)ethylammonium chloride, N,N-diethyl-N-methyl-N-2-(4-vinylphenyl)ethylammonium acetate;

a quaternary compound formed by N,N-dimethylaminoethyl (meth)acrylate, N,N-diethylaminoethyl (meth)acrylate, N,N-dimethylaminopropyl (meth)acrylate, N,N-diethylaminopropyl (meth)acrylate, N,N-dimethylaminoethyl (meth)acrylamide, N,N-diethylaminoethyl (meth) acrylamide, N,N-dimethylaminopropyl (meth) acrylamide, or N,N-diethylaminopropyl (meth) acrylamide, with methyl chloride, ethyl chloride, methyl bromide, ethyl bromide, methyl iodide or ethyl iodide, and a sulfonate salt, an alkylsulfonate salt, an acetate salt or an alkylcarboxylate salt formed by substituting an anion thereof.

Specific examples include monomethyldiallylammonium chloride, trimethyl-2-(methacryloyloxy)ethylammonium chloride, triethyl-2-(methacryloyloxy)ethylammonium chloride, trimethyl-2-(acryloyloxy)ethylammonium chloride, triethyl-2-(acryloyloxy)ethylammonium chloride, trimethyl-3-(methacryloyloxy)propylammonium chloride, triethyl-3-(methacryloyloxy)propylammonium chloride, trimethyl-2-(methacryloylamino)ethylammonium chloride, triethyl-2-(methacryloylamino)ethylammonium chloride, trimethyl-2-(acryloylamino)ethylammonium chloride, triethyl-2-(acryloylamino)ethylammonium chloride, trimethyl-3-(methacryloylamino)propylammonium chloride, triethyl-3-(methacryloylamino)propylammonium chloride, trimethyl-3-(acryloylamino)propylammonium chloride, triethyl-3-(acryloylamino)propylammonium chloride, N,N-dimethyl-N-ethyl-2-(methacryloyloxy)ethylammonium chloride, N,N-diethyl-N-methyl-2-(methacryloyloxy)ethylammonium chloride, N,N-dimethyl-N-ethyl-3-(acryloylamino)propylammonium chloride, trimethyl-2-(methacryloyloxy)ethylammonium bromide, trimethyl-3-(acryloylamino)propylammonium bromide, trimethyl-2-(methacryloyloxy)ethylammonium sulfonate, and trimethyl-3-(acryloyloxy)propylammonium acetate.

Other copolymerizable monomers include N-vinylimidazole, and N-vinyl-2-methylimidazole.

There can also be utilized allylamine, diallylamine, a derivative or a salt thereof. Examples of such compound include allylamine, allylamine hydrochlorate salt, allylamine acetate salt, allylamine sulfate salt, diallylamine, diallylamine hydrochlorate salt, diallylamine acetate salt, diallylamine sulfate salt, diallylmethylamine and a salt thereof (such as hydrochlorate salt, acetate salt, or sulfate salt), diallylethylamine and a salt thereof (such as hydrochlorate salt, acetate salt, or sulfate salt), and diallyldimethylammonium salt (counter ion being chloride, acetate ion or sulfate ion). Such derivatives of allylamine or diallylamine, showing inferior polymerizing property in an amine state, is generally polymerized in a salt state and is desalted if necessary.

There can also be utilized a vinylamine unit formed by polymerizing a unit of N-vinylacetamide or N-vinylformamide followed by a hydrolysis, or a salt of such unit.

The aforementioned non-mordant monomer means a monomer not including a basic or cationic portion such as a primary to tertiary amino group, a salt thereof, or a quaternary ammonium salt group and free from or substantially free from an interaction with the dye in the ink for inkjet printing.

Examples of the non-mordant monomer include a (meth) acrylate alkyl ester; a (meth)acrylate cycloalkyl ester such as cyclohexyl (meth)acrylate; a (meth)acrylate aryl ester such as phenyl (meth)acrylate; an aralkyl ester such as benzyl (meth) acrylate; an aromatic vinyl compound such as styrene, vinyltoluene, or α-methylstyrene; a vinyl ester such as vinyl acetate, vinyl propionate, or vinyl versatate; an allyl ester such as allyl acetate; a halogen-containing monomer such as vinylidene chloride or vinyl chloride; a vinyl cyanide such as (meth)acrylonitrile; and an olefin such as ethylene or propylene.

The (meth)acrylate alkyl ester is preferably a (meth)acrylate alkyl ester with 1 to 18 carbon atoms in an alkyl portion, such as methyl (meth)acrylate, ethyl (meth)acrylate, propyl (meth)acrylate, isopropyl (meth)acrylate, n-butyl (meth) acrylate, isobutyl (meth)acrylate, t-butyl (meth)acrylate, hexyl (meth)acrylate, octyl (meth)acrylate, 2-ethylhexyl (meth)acrylate, lauryl (meth)acrylate, or stearyl (meth)acrylate. Among these, methyl acrylate, ethyl acrylate, methyl methacrylate, ethyl methacrylate and hydroxyethyl methacrylate are preferred.

Also such non-mordant monomer can be employed singly or in a combination of two or more kinds.

Furthermore, preferred examples of the polymer mordant include polydiallyldimethylammonium chloride, polymethacryloyloxyethyl-β-hydroxyethyldimethylammonium chloride, polyethylenimine, polyallylamine and derivatives thereof, polyamide-polyamide resin, cationized starch, dicyandiamide-formalin condensate, dimethyl-2-hydroxypropylammonium salt polymer, polyamidine, polyvinylamine, a dicyan cationic resin represented by dicyandiamide-formalin polycondensate, a polyamine cationic resin represented by dicyanamide-diethyltriamine polycondensate, an epichlorohydrin-dimethylamine addition polymer, a dimethyldiallylammonium chloride-$SO_2$ copolymer, a diallylamine salt-$SO_2$ copolymer, a (meth)acrylate-containing polymer having an alkyl group substituted with a quaternary ammonium salt group in an ester portion, and a styryl polymer having an alkyl group substituted with a quaternary ammonium salt group.

Specific examples of the polymer mordant are described for example in JP-A Nos. 48-28325, 54-74430, 54-124726, 55-22766, 55-142399, 60-23850, 60-23851, 60-23852, 60-23853, 60-57836, 60-60643, 60-118834, 60-122940, 60-122941, 60-122942, 60-235134, and 1-161236, U.S. Pat. Nos. 2,484,430, 2,548,564, 3,148,061, 3,309,690, and 4,115,124, 4,124,324, JP-A Nos. 1-161236, 10-81064, 10-119423, 10-157277, 10-217601, 11-348409, 2001-138621, 2000-4301, 2000-211235, 2000-309157, 2001-96897, 2001-138627, 11-91242, 8-2087, 8-2090, 8-2091, 8-2093, 8-174992, 11-192777, and 2001-301314, JP-B Nos. 5-35162, 5-35163, 5-36164, and 5-88846, JP-A Nos. 7-118333 and 2000-344990, and Japanese Patents Nos. 2648847 and 2661677. Among these, polyallylamine and derivatives thereof are particularly preferred.

As the organic mordant in the invention, polyallyl amine and derivatives thereof with a weight-averaged molecular weight of 100,000 or less are particularly preferable for preventing blotting over time.

As polyallylamine or a derivative to be employed in the invention can be various known allylamine polymers and derivatives thereof. Such derivatives include a salt of polyallylamine and an acid (acid can be an inorganic acid such as hydrochloric acid, sulfuric acid, phosphoric acid or nitric acid, an organic acid such as methanesulfonic acid, toluenesulfonic acid, acetic acid, propionic acid, cinnamic acid or (meth)acrylic acid, or a combination thereof, or a salt formed only in a part of polyallylamine), a derivative formed by a polymer reaction of polyallylamine, and a copolymer of polyallylamine and another copolymerizable monomer (such monomer can for example be a (meth)acrylate ester, a styrene, a (meth) acrylamide, acrylonitrile or a vinylester).

Specific examples of polyallylamine and derivatives thereof include compounds described in JP-B Nos. 62-31722, 2-14364, 63-43402, 63-43403, 63-45721, 63-29881, 1-26362, 2-56365, 2-57084, 4-41686, 6-2780, 6-45649, 6-15592, and 4-68622, Japanese Patents Nos. 3199227 and 3008369, JP-A Nos. 10-330427, 11-21321, 2000-281728, 2001-106736, 62-256801, 7-173286, 7-213897, 9-235318, 9-302026, and 11-21321, WO Nos. 99/21901 and 99/19372, JP-A No. 5-140213 and JP-T No. 11-506488.

As the mordant of the invention, an inorganic mordant can also be employed, which can be a polyvalent water-soluble metal salt or a hydrophobic metal salt compound. Specific examples of the inorganic mordant include a salt or a complex of a metal selected from magnesium, aluminum, calcium, scandium, titanium, vanadium, manganese, iron, nickel, copper, zinc, gallium, germanium, strontium, yttrium, zirconium, molybdenum, indium, barium, lanthanum, cerium, praseodymium, neodymium, samarium, europium, gadolinium, dysprosium, erbium, ytterbium, hafnium, tungsten and bismuth.

More specific examples include calcium acetate, calcium chloride, calcium formate, calcium sulfate, barium acetate, barium sulfate, barium phosphate, manganese chloride, manganese acetate, manganese formate dihydrate, manganese ammonium sulfate hexahydrate, cupric chloride, copper (II) ammonium chloride dihydrate, copper sulfate, cobalt chloride, cobalt thiocyanate, cobalt sulfate, nickel sulfate hexahydrate, nickel chloride hexahydrate, nickel acetate tetrahydrate, nickel ammonium sulfate hexahydrate, nickel amidesulfate tetrahydrate, aluminum sulfate, aluminum alum, basic aluminum polyhydroxide, aluminum sulfite, aluminum thiosulfate, aluminum polychloride, aluminum nitrate nanohydrate, aluminum chloride hexahydrate, ferrous bromide, ferrous chloride, ferric chloride, ferrous sulfate, ferric sulfate, zinc phenolsulfonate, zinc bromide, zinc chloride, zinc nitrate hexahydrate, zinc sulfate, titanium tetrachloride, tetraisopropyl titanate, titanium acetylacetonate, titanium lactate, zirconium actylacetonate, zirconyl acetate, zirconyl sulfate, zirconium ammonium carbonate, zirconyl stearate, zirconyl octylate, zirconyl nitrate, zirconium oxychloride, zirconium hydroxychloride, chromium acetate, chromium sulfate, magnesium sulfate, magnesium chloride hexahydrate, magnesium citrate nanohydrate, sodium phosphotungstenate, sodium tungsten citrate, dodecatungstophosphoric acid n hydrate, dodecatungstosilicic acid 26 hydrate, molybdenum chloride, dedecamolybdophosphoric acid n hydrate, gallium nitrate, germanium nitrate, strontium nitrate, yttrium acetate, yttrium chloride, yttrium nitrate, indium nitrate, lanthanum nitrate, lanthanum chloride, lanthanum acetate, lanthanum benzoate, cerium chloride, cerium nitrate, cerium octylate, praseodymium nitrate, neodymium nitrate, samarium nitrate, europium nitrate, gadrinium nitrate, dysprosium nitrate, erbium nitrate, ytterbium nitrate, hafnium chloride, and bismuth nitrate.

The inorganic mordant in the invention is preferably an aluminum-containing compound, a titanium-containing compound, a zirconium containing compound, or a metal compound (salt or complex) of a group IIIB of the periodic table.

In the invention, an amount of the mordant contained in the ink receptive layer is preferably 0.01 to 5 $g/m^2$, more preferably 0.1 to 3 $g/m^2$.

(Other Components)

The recording material of the invention may further contain various known additives such as an acid, an ultraviolet absorber, an antioxidant, a fluorescent whitening agent, a monomer, a polymerization initiator, a polymerization inhibitor, an antiblotting agent, an antiseptic, a visocity stabilizer, a defoamer, a surfactant, an antistatic, a matting agent, a curl preventing agent, a water resistant agent etc. according to the necessity.

In the invention, the ink receptive layer may include an acid. An acid addition regulates the surface pH of the ink receptive layer to 3-8, preferably 5-7.5. Such addition is preferable as it improves a yellowing resistance of a white background. The surface pH is measured by a method A for surface pH measurement, determined by J.TAPPI. Such measurement can be executed for example with a paper surface pH measurement set "Form MPC" manufactured by Kyoritsu Rikagaku Kenkyusho, according to the method A.

Specific examples of the acid include formic acid, acetic acid, glycolic acid, oxalic acid, propionic acid, malonic acid, succinic acid, adipic acid, maleic acid, malic acid, tartaric acid, citric acid, benzoic acid, isophthalic acid, glutaric acid, gluconic acid, lactic acid, aspartic acid, glutamic acid, methanesulfonic acid, itaconic acid, benzenesulfonic acid, toluenesulfonic acid, trifluoromethanesulfonic acid, styrenesulfonic acid, trifluoroacetic acid, barbituric acid, acrylic acid, methacrylic acid, cinnamic acid, 4-hydroxybenzoic acid, aminobenzoic acid, naphthalenedisulfonic acid, hydroxybenzenesulfonic acid, toluenesulfinic acid, benzenesulfinic acid, sulfanylic acid, sulfamic acid, α-resorcic acid, β-resorcic acid, γ-resorcic acid, gallic acid, fluoroglycine, sulfosalicylic acid, ascorbic acid, erythorbic acid, bisphenolic acid, hydrochloric acid, nitric acid, sulfuric acid, phosphoric acid, polyphosphoric acid, boric acid, and boronic acid. An amount of addition of such acid can be determined so as to obtain an surface pH of the ink receptive layer within a range of 3 to 8.

The acid mentioned above may be used in a state of a metal salt (for example of sodium, potassium, calcium, cesium, zinc, copper, iron, aluminum, zirconium, lanthanum, yttrium, magnesium, strontium, or cerium), or an amine salt (for example of ammonia, triethylamine, tributylamine, piperadine, 2-methylpiperadine, or polyallylamine).

In the invention, the ink receptive layer preferably includes a storability improving agent such as an ultraviolet absorber, an antioxidant, or an antiblotting agent.

Examples of such ultraviolet absorber, antioxidant, and antiblotting agent include an alkylated phenol compound (including hindered phenol compound), an alkylthiomethylphenol compound, a hydroquinone compound, an alkylated hydroquinone compound, a tocopherol compound, a thiodiphenylether compound, a compound having two or more thioether bonds, a bisphenol compound, an O-, N- or S-benzyl compound, a hydroxybenzyl compound, a triazine compound, a phosphonate compound, an acylaminophenol compound, an ester compound, an amide compound, ascorbic acid, an amine antioxidant, a 2-(2-hydroxyphenyl)benzotriazole compound, a 2-hydroxybenzophenone compound, an acrylate, a water-soluble or hydrophobic metal salt, an organometallic compound, a metal complex, a hindered amine compound (including TEMPO compound), a 2-(2-hydroxyphenyl)-1,3,5-triazine compound, a metal deactivating agent, a phosphit compound, a phosphonite compound, a hydroxylamine compound, a nitron compound, a peroxide scavenger, a polyamide stabilizer, a polyether compound, a basic auxiliary stabilizer, a nucleating agent, a benzofuranone compound, an indolinone compound, a phosphin compound, a polyamine compound, a thiourea compound, an urea compound, a hydrazide compound, an amidine compound, a sugar compound, a hydroxybenzoic acid compound, a hydroxybenzoic acid compound, and a trihydroxybenzoic acid compound.

Among these, there are preferred an alkylated phenolic compound, a compound having two or more thioether bonds, a bisphenol compound, ascorbic acid, an amine antioxidant, a water-soluble or hydrophobic metal salt, an organometallic compound, a metal complex, a hindered amine compound, a hydroxylamine compound, a polyamine compound, a thiourea compound, a hydrazide compound, hydroxybenzoic acid compound, a dihydroxybenzoic acid compound and a trihydroxybenzoic acid compound.

Specific examples of the compounds are described in Japanese Patent Application No. 2002-13005, JP-A Nos. 10-182621 and 2001-260519, JP-B Nos. 4-34953 and 4-34513, JP-A No. 11-170686, JP-B No. 4-34512, EP No. 1138509, JP-A Nos. 60-67190, 7-276808, 2001-94829, 47-10537, 58-111942, 58-212844, 59-19945, 59-46646, 59-109055, and 63-53544, JP-B Nos. 36-10466, 42-26187, 48-30492, 48-31255, 48-41572, 48-54965, and 50-10726, U.S. Pat. Nos. 2,719,086, 3,707,375, 3,754,919 and 4,220, 711, JP-B Nos. 45-4699 and 54-5324, EP-A Nos. 223739, 309401, 309402, 310551, 310552, and 459-416, DP-A No. 3435443, JP-A Nos. 54-48535, 60-107384, 60-107383, 60-125470, 60-125471, 60-as5472, 60-287485, 60-287486, 60-287487, 60-287488, 61-160287, 61-185483, 61-211079, 62-146678, 62-146680, 62-146679, 62-282885, 62-262047, 63-051174, 63-89877, 63-88380, 66-88381, 63-113536, 63-163351, 63-203372, 63-224989, 63-251282, 63-267594, 63-182484, 1-239282, 2-262654, 2-71262, 3-121449, 4-291685, 4-291684, 5-61166, 5-119495-188687, 5-188686, 5-110490, 5-1108437, and 5-170361, JP-B Nos. 48-43295 and 48-33212, and U.S. Pat. Nos. 4,814,262 and 4,980,275.

Other components mentioned above may be used singly or in a combination of two or more kinds. Such other components may be added in an aqueous solution, a dispersion, a polymer dispersion, an emulsion or oil drops, or may be incorporated in microcapsules. In the recording material of the invention, such other components preferably have an amount of addition of 0.01 to 10 g/m$^2$.

Also for improving the dispersibility of inorganic fine particles, surface thereof may be treated with a silane coupling agent. Such silane coupling agent preferably has, in addition to a portion for coupling reaction, an organic functional group (such as a vinyl group, an amino group (primary to tertiary amino group, or a quaternary ammonium salt group), an epoxy group, a mercapto group, a chloro group, an alkyl group, a phenyl group or an ester group).

In the invention, the coating liquid for the ink receptive layer preferably includes a surfactant. Such surfactant can be cationic, anionic, nonionic, fluorinated or silicone type.

Examples of the nonionic surfactant include a polyoxyalkylene alkyl ether and a polyoxyalkylene alkylphenyl ether (such as diethylene glycol monoethyl ether, diethylene glycol diethyl ether, polyoxyethylene lauryl ether, polyoxyethylene stearyl ether, or polyoxyethylene nonylphenyl ether), an oxyethylene-oxypropylene block copolymer a sorbitan fatty acid ester (such as sorbitan monolaurate, sorbitan monooleate, or sorbitan trioleate), a polyoxyethylenesorbitan fatty acid ester (such as polyoxyethylenesorbitan monolaurate, polyoxyethylenesorbitan monooleate, or polyoxyethylenesorbitan trioleate), a polyoxyethylenesorbitol fatty acid ester (such as polyoxyethylenesorbit tetraoleate), a polyoxyethyleneglycerin fatty acid ester (such as polyoxyethyleneglycerin monostearate, or polyoxyethyleneglycerin monooleate), a polyoxyethylene fatty acid ester (such as polyethylene glycol monolaurate, or polyethylene glycol monoleate), a polyoxyethylene alkylamine, and an acetylene glycol (such as 2,4,7,9-tetramethyl-5-decyl-4,7-diol, an ethylene oxide addition product thereof, or a propylene oxide addition product), and an polyoxyalkylene alkyl ether is preferred. Such nonionic surfactant can be used in the first coating liquid and the second coating liquid. Also such nonionic surfactant may be used singly or in a combination of two or more kinds.

The anionic surfactant can be a fatty acid salt (such as sodium stearate, or potassium oleate), an alkylsulfonate ester salt (such as such as sodium laurylsulfonate or triethanolamine laurylsulfonate), a sulfonate salt (such as sodium dioctylsulfosuccinate), an alkyldiphenylether disulfonate salt, or an alkylphosphonate salt.

The cationic surfactant can be an alkylamine salt, a quaternary ammonium salt, a pyridinium salt, or an imidazolium salt.

The fluorinated surfactant can be a compound derived through an intermediate having a perfluoroalkyl group, utilizing electrolytic fluorination, telomerization, or oligomerization.

Examples include a perfluoroalkylsulfonate salt, a perfluoroalkylcarboxylate salt, a perfluoroalkylethylene oxide addition product, a perfluoroalkyltrialkylammonium salt, a perfluoroalkyl group-containing oligomer, and a perfluoroalkylophosphate ester.

The silicone surfactant is preferably silicone oil denatured with an organic group, and may have a structure in which a side chain of a siloxane structure is denatured with an organic group, a structure in which both ends are denatured or a structure in which an end is denatured. The organic group denaturing can be amini denaturing, polyether denaturing, epoxy denaturing, carboxyl denaturing, carbinol denaturing, alkyl denaturing, aralkyl denaturing, phenol denaturing, or fluorine denaturing.

In the invention, the surfactant preferably has a content, with respect to the coating liquid for the ink receptive layer, of 0.001 to 20%, more preferably 0.01 to 1.0%. In case of using two or more liquids as the coating liquids for the ink receptive layer, the surfactant is preferably added to each coating liquid.

In the invention, the ink receptive layer preferably includes a high boiling organic solvent for curl prevention. Such high boiling organic solvent is a water-soluble or hydrophobic organic compound having a boiling point of 150° C. or higher under a normal pressure. Such compound may be liquid or solid at the room temperature and may be of a low molecular weight or a high molecular weight.

Specific examples include an aromatic carboxylate ester (such as dibutyl phthalate, diphenyl phthalate or phenyl benzoate), an aliphatic carboxylate ester (such as dioctyl adipate, dibutyl sebacate, methyl stearate, dibutyl maleate, dibutyl fumalate, or triethyl acedtylcitrate), a phosphorate ester (such as trioctyl phosphate, or tricresyl phosphate), an epoxy compound (such as epoxylated soybean oil, or epoxylated fatty acid methyl ester), an alcohol (such as stearyl alcohol, ethylene glycol, propylene glycol, diethylene glycol, triethylene glycol, glycerin, diethylene glycol monobutyl ether (DEG-MBE), triethylene glycol monobutyl ether, glycerin monomethyl ether, 1,2,3-butanetriol, 1,2,4-butanetriol, 1,2,4-pentanetriol, 1,2,6-hexanetriol, thiodiglycol, triethanolamine, or polyethylene glycol), vegetable oil (such as soybean oil or sunflower oil), and a higher aliphatic carboxylic acid (such as linoleic acid or oleic acid).

(Preparation of Recording Material)

In the recording material of the invention, the ink receptive layer is preferably formed by a method (wet-on-wet method) of coating, on a substrate surface, a first coating liquid (or solution) (hereinafter called "coating liquid (A)") including at least fine particles, a water-soluble resin and a crosslinking agent, then applying a second coating liquid which is a basic solution having a pH of 8 or higher (hereinafter called "coating liquid (B)"), either (1) simultaneously with the coating, or (2) in the course of drying of a coating layer formed by the coating and before the coating layer starts to show a falling drying rate, to the coating layer (in case (1)) or to the coated film (in case (2)), and curing by crosslinking the coating layer or the coated film to which the second coating liquid is applied.

The compound represented by formula (A) of the invention is preferably included in at least either of the coating liquid (A) and the coating liquid (B) mentioned above. Also a crosslinking agent capable of crosslinking the water-soluble resin is preferably included in at least either of the coating liquid (A) and the coating liquid (B).

Presence of such ink receptive layer hardened by crosslinking is preferable for ink absorbing property and for prevention of film cracking.

In the above-mentioned manner and in case a mordant solution is employed as the coating liquid (B), such mordant is present in a large amount in the vicinity of the surface of the ink receptive layer, thereby sufficiently mordanting the colorant (coloring agent) of the ink and favorably improving the water resistance of the character or the image after printing. A part of the mordant may be contained in the coating liquid (A), and, in such case, the mordant may be the same or different in the coating liquids (A) and (B).

The coating liquid (B) is preferably a mordant solution formed by dissolving a mordant in a solvent, and pH value can be regulated by suitably selecting the mordant.

In the invention, the coating liquid for the ink receptive layer (coating liquid (A)), including at least fine particles (such as gaseous process silica), a water-soluble resin (such as polyvinyl alcohol) and a crosslinking agent (such as boric acid), can be prepared for example in the following manner.

It can be prepared by adding gaseous process silica particles and a dispersant to water (for example the silica particles being 10 to 20 mass % in water), executing dispersion utilizing a high-speed rotary wet colloid mill (for example Clearmix manufactured by M-Technic Co.) under a high-speed rotating condition for example of 10,000 rpm (preferably 5,000 to 20,000 rpm) and for example for 20 minutes (preferably 10 to 30 minutes), then adding a crosslinking agent (such as boron compound) and an aqueous solution of polyvinyl alcohol (PVA) (for example PVA constituting a mass of about ⅓ of gaseous process silica), also, in case a compound represented by formula (A) is added to the coating liquid (A), adding such compound and executing the dispersion under the same rotating condition as above. The obtained coating liquid is in a uniform sol state, and by coating and drying such coating liquid on a substrate by a following coating method, there can be obtained a porous ink receptive layer having a three-dimensional network structure.

In the preparation of the aqueous dispersion including the gaseous process silica and the dispersant, it is possible to prepare an aqueous dispersion of gaseous process silica in advance and to add such aqueous dispersion to an aqueous solution of a dispersant, or to add an aqueous solution of dispersant to an aqueous dispersion of gaseous process silica, or to mix both at the same time. Also gaseous process silica in powder state, instead of aqueous dispersion of gaseous process silica, may be added to the aqueous solution of dispersant.

After the mixing of the gaseous process silica and the dispersant, the mixed liquid is made finer with a disperser to obtain an aqueous dispersion with an average particle size of 50 to 300 nm.

For obtaining the aqueous dispersion, there can be employed various dispersers known in the art, such as a high-speed rotary disperser, a medium agitating disperser (such as ball mill or sand mill), an ultrasonic disperser, a colloid mill disperser, or a high pressure disperser, but an agitating disperser, a colloid mill disperser, or a high-pressure disperser is preferable for efficiently dispersing granulate particles.

Also as a solvent in these steps, there can be employed water, an organic solvent or a mixed solvent thereof. An organic solvent usable for coating can be, for example, an alcohol such as methanol, ethanol, n-propanol, i-propanol or methoxypropanol, a ketone such as acetone or methyl ethyl ketone, tetrahydrofuran, acetonitrile, ethyl acetate or toluene.

As the dispersant, a cationic polymer can be employed. The cationic polymer can be those cited for the aforementioned mordant. Also a silane coupling agent is preferably employed as the dispersant.

The dispersant is preferably added in an amount, to the fine particles, of 0.1 to 30%, more preferably 1 to 10%.

The coating liquid for the ink receptive layer can be coated with a known coating method, such as an extrusion die coating, an air doctor coating, a blade coating, a rod coating, a knife coating, a squeeze coating, a reverse roll coating, or a bar coating.

Simultaneous with or after the coating of the coating liquid for the ink receptive layer (coating liquid (A)), the coating liquid (B) is applied to the coating layer, and the coating liquid (B) may be applied before the coating layer after the coating starts to show a falling drying rate. More specifically, a preferred manufacture can be attained by introducing the mordant after the coating of the coating liquid for the ink receptive layer (coating liquid (A)) and while the coating layer shows a constant drying rate.

"Before the coating layer starts to show a falling drying rate" means a period of usually several minutes from immediately after the coating of the coating liquid for the ink receptive layer, and, during such period, there is shown a "constant drying rate" phenomenon in which the content of the solvent (dispersing medium) in the coating layer decreases in proportion to time. The period of such "constant drying rate" is described for example in Chemical Engineering Handbook (pp. 707-712, published by Maruzen, Oct. 25, 1980).

As described above, after the coating of the first coating liquid, the coating layer is dried until it shows a falling drying rate, and such drying is generally executed at 50 to 180° C. for 0.5 to 10 minutes (preferably 0.5 to 5 minutes). Such drying time is naturally variable depending on the coating amount, but is generally executed within the aforementioned range.

A method of application before the first coating layer starts to show a falling drying rate can be [1] a method of coating the coating liquid (B) on the coating layer, [2] a method of spraying for example with a spray, or [3] a method of immersing the substrate bearing the coating layer in the coating liquid (B).

In the method [1], the coating liquid (B) can be coated with a known coating method, such as with a curtain flow coating, an extrusion die coating, an air doctor coating, a blade coating, a rod coating, a knife coating, a squeeze coating, a reverse roll coating, or a bar coating. However, it is preferable to employ a method in which the coater does not contact directly with the already formed first coating layer, such as extrusion die coating, curtain flow coating or bar coating.

After the application of the mordant solution (coating liquid (B)), drying and hardening are executed generally by heating at 40 to 180° C. for 0.5 to 30 minutes. It is preferable to execute heating at 40 to 150° C. for 1 to 20 minutes.

Also in case the mordant solution (coating liquid (B)) is applied simultaneously with the coating of the coating liquid for the ink receptive layer (coating liquid (A)), the ink receptive layer can be formed by coating the coating liquid for the ink receptive layer (coating liquid (A)) and the mordant solution (coating liquid (B)) simultaneously (superposed coating) on the substrate in such a manner that the coating liquid for the ink receptive layer (coating liquid (A)) comes into contact with the substrate, followed by drying and hardening.

The simultaneous coating (superposed coating) can be achieved by a coating method utilizing for example an extrusion die coater or a curtain flow coater. After the simultaneous coating, the coating layers are dried, and such drying is generally executed by heating the coating layers for 0.5 to 10 minutes at 40 to 150° C., preferably for 0.5 to 5 minutes at 40 to 100° C.

In case the simultaneous coating (superposed coating) is executed for example with an extrusion die coater, the simultaneously discharged two coating liquids are formed into superposed layers in the vicinity of a discharge port of the extrusion die coater, namely before transfer onto the substrate, and are coated in superposed manner in such state onto the substrate. The coating liquids of two layers superposed before coating tends to cause, at the transfer to the substrate, a crosslinking reaction at the interface of the two liquids, thereby resulting in a mixing of the discharged two liquids and an increase in the viscosity, thus hindering the coating operation. Therefore, in case of the simultaneous coating as explained above, it is preferable, together with the coating liquid for the ink receptive layer (coating liquid (A)) and the mordant solution (coating liquid (B)), to provide a barrier layer liquid (intermediate layer liquid) between the two liquids, thus simultaneously coating three layers.

Such barrier layer liquid can be selected without any particular restriction. For example it can be an aqueous solution containing a trace amount of a water-soluble resin, or water. Such water-soluble resin is used for example as a viscosity increasing agent in consideration of the coating property, and can be a cellulose resin (such as hydroxypropylmethyl cellulose, or hydroxyethylmethyl cellulose), or a polymer such as polyvinylpyrrolidone or gelatin. The aforementioned mordant may also be present in the barrier layer liquid.

After the ink receptive layer is formed on the substrate, such ink receptive layer may be subjected to a calendering process by passing through a roll nip under heat and pressure in a super calender or a gloss calender for improving the surface smoothness, transparency and coated film strength. Such calendering process, however, may cause a decrease in the pore rate (namely a decrease in the ink absorbing property) and has to be executed under such a condition as not to cause a significant decrease in the pore rate.

In the calendering process, a roll temperature is preferably 30 to 150° C., more preferably 40 to 100° C.

Also a linear pressure between the rolls at the calendering process is preferably 50 to 400 kg/cm, more preferably 100 to 200 kg/cm.

A thickness of the ink receptive layer has to be determined in relation to the pore rate in the layer since inkjet recording required an absorbing capacity for absorbing all the liquid droplets. A layer thickness of about 15 µm or larger is required in case of an ink amount of 8 nL/mm$^2$ and a pore rate of 60%.

In consideration of this point, a thickness for the ink receptive layer for inkjet printing is preferably 10 to 50 µm.

Also the ink receptive layer preferably has a pore size in median diameter of 0.005 to 0.030 µm, more preferably 0.01 to 0.025 µm.

The pore size and the pore median diameter can be measured with a mercury porosimeter (Poresizer 9320-PC2™, manufactured by Shimadzu Mfg. Co.).

Also the ink receptive layer preferably has an excellent transparency, and a measure thereof is given by a haze value, when the ink receptive layer is formed on a transparent film substrate, of 30% or less, more preferably 20% or less.

The haze value can be measured with a haze meter (HGM-2DP, manufacturede by Suga Shikenki Co.).

The recording material of the invention may also be provided with a back coating layer, and components that can be added to such back coating layer include a white pigment, an aqueous binder, and other components.

Examples of the white pigment contained in the back coating layer include an inorganic white pigment such as light calcium carbonate, heavy calcium carbonate, caolin, talc, calcium sulfate, barium sulfate, titanium dioxide, zinc oxide, zinc sulfide, zinc carbonate, satin white, aluminum silicate, diatomaceous earth, calcium silicate, magnesium silicate, synthetic amorphous silica, colloidal silica, colloidal alumina, pseudo boehmite, aluminum hydroxide, alumina, lithopone, zeolite, hydrated halloycite, magnesium carbonate, or magnesium hydroxide, and an organic pigment such as a styrenic plastic pigment, an acrylic plastic pigment, polyethylene, microcapsules, urea resin, or melamine resin.

An aqueous binder to be contained in the back coating layer can be, for example, a water-soluble polymer such as a styrene/maleate salt copolymer, a styrene/actylate salt copolymer, polyvinyl alcohol, silanol-denatured polyvinyl alcohol, starch, caolinated starch, casein, gelatin, carboxymethyl cellulose, hydroxyethyl cellulose, or polyvinylpyrrolidone, and a water-dispersible polymer such as styrene-butadiene latex or acryl emulsion. Other components that can be contained in the back coating layer include a defoaming agent, an antifoaming agent, a dye, a fluorescent whitening agent, an antiseptic, and a water resistant agent.

A layer constituting the recording material of the invention (for example the ink receptive layer or the back layer) may include a polymer fine particle dispersion (polymer latex). Such polymer fine particle dispersion is used for improvements of physical properties, such as stabilization of dimension, curl prevention, prevention of adhesion and prevention of film cracking. The polymer fine particle dispersion is described in JP-A Nos. 62-245258, 62-1316648, and 62-110066. An addition of a polymer fine particle dispersion of a low glass transition temperature (40° C. or lower) to a layer containing mordant allows to prevent cracking or curling of the layer. Also an addition of a polymer fine particle dispersion of a high glass transition temperature to the back allows to prevent curling.

Also the recording material of the invention can be prepared by methods described in JP-A Nos. 10-81064, 10-119423, 10-157277, 10-217601, 11-348409, 2001-138621, 2000-43401, 2000-211235, 2000-309135, 2001-96897, 2001-138627, 11-91242, 8-2087, 8-2090, 8-2091 and 8-2093.

In the invention, the inkjet recording method is not limited, and can be any known method such as a charge control method in which an electrostatic attractive force is utilized for discharging ink, a drop-on-demand method in which an oscillation pressure of a piezo element is utilized, an acoustic inkjet method in which an electrical signal is converted into an acoustic beam which irradiates the ink to discharge the ink by an irradiation pressure, or a thermal inkjet (bubble jet (trade name)) in which an ink is heated to generate a bubble for utilizing a resulting pressure.

The inkjet recording method includes a method of discharging a plurality of a low-density ink called photo ink with a small volume, a method of improving the image quality utilizing plural inks of a substantially same hue having different densities, and a method of utilizing a colorless transparent ink.

The ink of the invention for inkjet printing may also be utilized for an application other than inkjet recording. It can be used for example as a material for a display image, a material for forming an image for indoor decoration, and a material for forming an image for outdoor decoration.

An image display includes a poster, a wallpaper, a decorative article (ornament or doll), a commercial advertising pamphlet, a packaging paper, a wrapping material, a paper bag, a plastic bag, a packaging material, a sign board, an image drawn or attached on a side wall of a traffic vehicle (automobile, bus or train), clothes with a logo, etc. In case the dye of the invention is used as a material for forming a display image, such image includes all the patterns recognizable by human being, not only an image of narrow sense, but also an abstract design, a character, a geometrical pattern etc.

An indoor decoration material includes a wallpaper, a decorative article (ornament or doll), a component of an illuminating instrument, a component of a furniture, a design component of a floor or a ceiling, etc. In case the dye of the invention is used as a material for indoor decoration, such image includes all the patterns recognizable by human being, not only an image of narrow 6 sense, but also an abstract design, a character, a geometrical pattern etc.

An outdoor decoration material includes a wall material, a roofing material, a sign board, a gardening material, an outdoor decorative article (ornament or doll), a component of an illuminating instrument etc. In case the dye of the invention is used as a material for outdoor decoration, such image includes all the patterns recognizable by human being, not only an image of narrow sense, but also an abstract design, a character, a geometrical pattern etc.

In these applications, media on which a pattern is formed include paper, fiber, cloth (including non-woven cloth), plastics, metal, ceramics etc. The dyeing can be achieved by mordanting, pattern dyeing or by fixing the dye in the form of a reactive dye by introducing a reactive group. Among these, dyeing by mordanting is preferable.

In the following, the present invention will be explained by examples, but the invention is not limited by such examples.

EXAMPLE 1

Deionized water of a resistance of 18 megaΩ or higher was added to following components to make 1 liter, and was agitated for 1 hour under heating at 30 to 40° C. Then the mixture was filtered under a reduced pressure with a microfilter of an average pore size of 0.25 μm to obtain a light magenta ink LM-101.

(Formulation of Light Magenta Ink LM-101)

| (solids) | |
| --- | --- |
| magenta dye a-36 | 10 g/l |
| urea | 17 g/l |
| (liquid components) | |
| triethylene glycol (TEG) | 110 g/l |
| glycerin (GR) | 150 g/l |
| triethylene glycol monobutyl ether (TGB) | 120 g/l |
| triethanol amine (TEA) | 8 g/l |
| Sufrinol STG (SW) | 10 g/l |

Also a magenta ink M-101 was prepared by increasing the magenta dye in the aforementioned formulation.

(Formulation of Magenta Ink M-101)

| (solids) | |
| --- | --- |
| magenta dye a-36 | 30 g/l |
| urea | 37 g/l |
| (liquid components) | |
| triethylene glycol (TEG) | 120 g/l |
| glycerin 8gr9 | 150 g/l |
| triethylene glycol monobutyl ether (TGB) | 130 g/l |
| triethanol amine (TEA) | 6.9 g/l |
| Sufrinol STG (SW) | 10 g/l |

Also inks LM-102 to 110 and M-102 to 110 were prepared with the identical formulations except that the following additives were added to LM-101 and M-101.

TABLE 1

| | Additive |
|---|---|
| LM-101, M-101 (comparative example) | none |
| LM-102, M-102 (comparative example) | POEP-1 10 g/l to LM-101, M-101 |
| LM-103, M-103 (comparative example) | POEN-1 10 g/l to LM-101, M-101 |
| LM-104, M-104 (present invention) | X-1 10 g/l to LM-101, M-101 |
| LM-105, M-105 (present invention) | X-3 10 g/l to LM-101, M-101 |
| LM-106, M-106 (present invention) | X-7 10 g/l to LM-101, M-101 |
| LM-107, M-107 (present invention) | X-10 10 g/l to LM-101, M-101 |
| LM-108, M-108 (present invention) | X-13 10 g/l to LM-101, M-101 |
| LM-109, M-109 (present invention) | X-1 15 g/l to LM-101, M-101 |
| LM-110, M-110 (present invention) | X-3 10 g/l to LM-101, M-101 |

POEP-1: polyoxyethylene nonylphenyl ether (PEO chain average 30)
POEN-1: polyoxyethylene naphtyl ether (PEO chain average 50)

These inks, filled in a cartridge for magenta ink/light magenta ink of an EPSON inkjet printer PM-980-C, and other inks of PM-980-C, were used to print a magenta single-color image. An inkjet photo luster paper "Kassai" manufactured by Fuji Photo Film Co. Ltd. was used as an image receiving sheet to print an image, and image fastness including ozone resistance was evaluated.

(Evaluation Test)

[1] Light fastness was evaluated by measuring an image density Ci immediately after printing with X-rite 310, then irradiating the image with a xenon light (85,000 lux) for 25 days with a weather meter manufactured by Atlas Co., then measuring the image density Cf again and calculating a dye remaining rate Cf/Ci×100. The dye remaining rate was measured in three points with a reflective density of 1, 1.5 and 2, and the result was evaluated as A in case the dye remaining rate was 70% or higher in all the densities, B in case the dye remaining rate was less than 70% in two points, and C in case the dye remaining was less than 70% in all the points.

[2] Heat fastness was evaluated by measuring densities with X-rite 310 before and after storing a sample for 10 days under a condition of 80° C. and 70% RH, determining a dye remaining rate. The dye remaining rate was measured in three points with a reflective density of 1, 1.5 and 2, and the result was evaluated as A in case the dye remaining rate was 90% or higher in all the densities, B in case the dye remaining rate was less than 90% in two points, and C in case the dye remaining was less than 90% in all the points.

[3] Ozone resistance was evaluated as a dye remaining rate, by causing a photo luster paper bearing an image to stand in a box set at an ozone gas concentration of 5 ppm, measuring the image density before and after the standing in the ozone gas with a reflective densitometer (X-Rite 310TR) and determining a dye remaining rate. The dye remaining rate was measured in three points with a reflective density of 1, 1.5 and 2. The ozone gas concentration in the box was set with an ozone gas monitor (model OZG-EM-01, manufactured by APPLICS Co.).

The result was evaluated in levels, as A in case the dye remaining rate was 80% or higher in all the densities, B in case the dye remaining rate was less than 80% in two points, and C in case the dye remaining was less than 70% in all the points.

TABLE 2

| | light fastness | heat fastness | ozone resistance |
|---|---|---|---|
| EPSON ink (PM-950C) | C | B | C |
| LM-101, M-101 (comp. ex.) | B | A | B |
| LM-102, M-102 (comp. ex.) | B | A | B |
| LM-103, M-103 (comp. ex.) | B | A | B |
| LM-104, M-104 (present invention) | A | A | A |
| LM-105, M-105 (present invention) | A | A | A |
| LM-106, M-106 (present invention) | A | A | A |
| LM-107, M-107 (present invention) | A | A | A |
| LM-108, M-108 (present invention) | A | A | A |
| LM-109, M-109 (present invention) | A | A | A |
| LM-110, M-110 (present invention) | A | A | A |

From the results shown in Table 2, it is identified that systems utilizing the ink set of the present invention are superior in the image storability of M dye to all the comparative examples.

EXAMPLE 2

Deionized water of a resistance of 18 megaΩ, or higher was added to following components to make 1 liter, and was agitated for 1 hour under heating at 30-40° C. Then the mixture was filtered under a reduced pressure with a microfilter of an average pore size of 0.25 μm to obtain a photo magenta ink LM-201.

(Formulation of Photo Magenta Ink LM-201)

| (solids) | |
|---|---|
| magenta dye a-36 | 7 g/l |
| urea | 22 g/l |
| (liquid components) | |
| triethylene glycol (TEG) | 40 g/l |
| glycerin (GR) | 100 g/l |
| triethylene glycol monobutyl ether (TGB) | 50 g/l |
| 1,5-pentanediol | 40 g/l |
| isopropanol | 20 g/l |
| triethanol amine (TEA) | 8 g/l |
| Sufrinol STG (SW) | 10 g/l |

Also a magenta ink M-201 was prepared by increasing the magenta dye in the aforementioned formulation.

(Formulation of Magenta Ink M-201)

| (solids) | |
|---|---|
| magenta dye a-36 | 24 g/l |
| urea | 37 g/l |
| (liquid components) | |
| triethylene glycol (TEG) | 40 g/l |
| glycerin (GR) | 110 g/l |
| triethylene glycol monobutyl ether (TGB) | 50 g/l |
| 1,5-pentanediol | 50 g/l |
| isopropanol | 20 g/l |
| triethanol amine (TEA) | 6.9 g/l |
| Sufrinol STG (SW) | 10 g/l |

Also inks LM-202 to 208 and M-202 to 208 were prepared with the identical formulations except that the following additives were added to LM-201 and M-201.

TABLE 3

| | Additive |
|---|---|
| LM-201, M-201 (comparative example) | none |
| LM-202, M-202 (comparative example) | POEP-1 10 g/l to LM-201, M-201 |
| LM-203, M-203 (comparative example) | POEN-1 10 g/l to LM-201, M-201 |
| LM-204, M-204 (present invention) | X-1 10 g/l to LM-201, M-201 |
| LM-205, M-205 (present invention) | X-4 10 g/l to LM-201, M-201 |
| LM-206, M-206 (present invention) | X-8 10 g/l to LM-201, M-201 |
| LM-207, M-207 (present invention) | X-9 10 g/l to LM-201, M-201 |
| LM-208, M-208 (present invention) | X-12 10 g/l to LM-201, M-201 |

POEP-1: polyoxyethylene nonylphenyl ether (PEO chain average 30)
POEN-1: polyoxyethylene naphtyl ether (PEO chain average 50)

These inks, filled in a cartridge for magenta ink/photo magenta ink of a CANON inkjet printer PIXUS-950i, and other inks of PIXUS-950i, were used to print a magenta single-color image. An inkjet photo luster paper "Kassai" manufactured by Fuji Photo Film Co. Ltd. was used as an image receiving sheet to print an image, and image fastness including ozone resistance was evaluated in the same manner as in example 1.

Results are shown in the following.

TABLE 4

| | light fastness | heat fastness | ozone resistance |
|---|---|---|---|
| CANON ink (PIXUS 950i) | C | B | C |
| LM-201, M-201 (comp. ex.) | B | A | B |
| LM-202, M-202 (comp. ex.) | B | A | B |
| LM-203, M-203 (comp. ex.) | B | A | B |
| LM-204, M-204 (present invention) | A | A | A |
| LM-205, M-205 (present invention) | A | A | A |
| LM-206, M-206 (present invention) | A | A | A |
| LM-207, M-207 (present invention) | A | A | A |
| LM-208, M-208 (present invention) | A | A | A |

From the results shown in Table 4, it is identified that systems utilizing the ink set of the present invention are superior in the image storability of M dye to all the comparative examples.

EXAMPLE 3

(Preparation of Coating Liquid A for Ink Receptive) Layer

In the following formulation, [1] gaseous process silica fine particles, [2] ion-exchanged water and [3] PAS-M-1 were mixed, dispersed with KD-P (manufactured by Shinmaru Enterprises Co.) for 20 minutes at a revolution of 10,000 rpm, then added with a solution containing [4] polyvinyl alcohol, [5] boric acid, [6] polyoxyethylene lauryl ether and [7] ion-exchanged water, and dispersed again for 20 minutes at a revolution of 10,000 rpm to obtain a coating liquid A for the ink receptive layer.

A mass ratio of the silica fine particles and the water-soluble resin (PB ratio=[1]:[4]) was 4.5:1, and the coating liquid A for the ink receptive layer was acidic with pH=3.5.

(Formulation of Coating Liquid A for Ink Receptive Layer)

| [1] gaseous process silica fine particles (inorganic fine particles) "Leoseal QS-30, manufactured by Tokuyama Co., average primary particle size 7 nm | 10.0 parts by weight |
|---|---|
| [2] ion-exchanged water | 51.7 parts by weight |
| [3] PAS-M-1 (60% aqueous solution) (dispersant, manufactured by Nittobo Co.) | 0.83 parts by weight |
| [4] polyvinyl alcohol (water-soluble resin) 8% aqueous solution (PVA124, manufactured by Kuraray Co., saponification degree 98.5%, polymerization degree 2400) | 27.8 parts by weight |
| [5] boric acid (crosslinking agent) | 0.4 parts by weight |
| [6] polyoxyethylenelauryl ether (surfactant) (Emergen 109P, manufactured by Kao Inc.) | 1.2 parts by weight |
| [7] ion-exchanged water | 33.0 parts by weight |

(Preparation of Inkjet Recording Material)

A substrate was subjected, on a front surface thereof, to a corona discharge treatment, and the aforementioned coating liquid A for the ink receptive layer was coated by an extrusion die coater with a coating amount of 200 ml/m² on the front surface of the substrate (coating step) and dried in a hot air dryer at 80° C. (air speed 3 to 8 m/sec) until the coating layer reached a solid concentration of 20%. The coating layer showed a constant drying rate during such period. Immediately thereafter, it was immersed in a mordant coating liquid B of a following composition for 30 seconds to apply the solution by 20 g/m² on the coating layer (mordant coating liquid applying step), and was dried for 10 minutes at 80° C. (drying step) thereby preparing an inkjet recording material R-1 of the invention, having an ink receptive layer of a dry thickness of 32 μm.

(Formulation of Mordant Coating Liquid B)

| [1] boric acid (crosslinking agent) | 0.65 parts by weight |
|---|---|
| [2] polyallylamine PAA-10C, 10% aqueous solution (mordant, manufactured by Nittobo Co.) | 25 parts by weight |
| [3] ion-exchanged water | 59.7 parts by weight |
| [4] ammonium chloride (surface pH regulating agent) | 0.8 parts by weight |
| [5] polyoxyethylenelauryl ether (surfactant) (Emergen 109P, manufactured by Kao Inc.) | 10 parts by weight |
| [6] Megafac F1405, 10% aqueous solution, fluorinated surfactant manufactured by Dai-Nippon Inks and Chemicals Ltd. | 2.0 parts by weight |

Also inkjet recording sheets R-2 to R-8 were prepared with the identical formulation as R-1 except that the following additives were added to the inkjet recording sheet R-1.

Mordant coating liquids used for preparing sheets R-1 to R-9 each independently had a pH of 8.0 or more.

TABLE 5

| | additive |
|---|---|
| R-1 (comp. example) | none |
| R-2 (comp. example) | POEP-1 2.5 parts by weight in liquid B for R-1 |
| R-3 (present invention) | POEN-1 2.5 parts by weight in liquid B for R-1 |
| R-4 (present invention) | X-1 2.5 parts by weight in liquid B for R-1 |
| R-5 (present invention) | X-3 2.5 parts by weight in liquid B for R-1 |
| R-6 (present invention) | X-9 2.5 parts by weight in liquid B for R-1 |
| R-7 (present invention) | X-11 2.5 parts by weight in liquid B for R-1 |
| R-8 (present invention) | X-12 2.5 parts by weight in liquid B for R-1 |

POEP-1: polyoxyethylene nonylphenyl ether (PEO chain average 30)
POEN-1: polyoxyethylene naphtyl ether (PEO chain average 50)

These inkjet recording sheets were set in a sheet feeding unit of an EPSON inkjet printer PM-980C and a standard chart of Gazou Denshi Gakkai was printed with an ink set of PM-980C. The obtained was used for evaluating the image fastness.

Also similar experiments were executed with a CANON inkjet printer PIXUS-950i.

(Evaluation Test)

[1] Light fastness was evaluated by measuring an image density Ci immediately after printing with X-rite 310, then irradiating the image with a xenon light (85,000 lux) for 25 days with a weather meter manufactured by Atlas Co., then measuring the image density Cf again and calculating a dye remaining rate Cf/Ci×100. The dye remaining rate was measured in three points with a reflective density of 1, 1.5 and 2, and the result was evaluated as A in case the dye remaining rate was 70% or higher in all the densities, B in case the dye remaining rate was less than 70% in two points, and C in case the dye remaining was less than 70% in all the points.

[2] Heat fastness was evaluated by measuring densities with X-rite 310 before and after storing a sample for 10 days under a condition of 80° C. and 70% RH, determining a dye remaining rate. The dye remaining rate was measured in three points with a reflective density of 1, 1.5 and 2, and the result was evaluated as A in case the dye remaining rate was 90% or higher in all the densities, B in case the dye remaining rate was less than 90% in two points, and C in case the dye remaining was less than 90% in all the points.

[3] Ozone resistance was evaluated as a dye remaining rate, by causing a photo luster paper bearing an image to stand in a box set at an ozone gas concentration of 5 ppm, measuring the image density before and after the standing in the ozone gas with a reflective densitometer (X-Rite 310TR) and determining a dye remaining rate. The dye remaining rate was measured in three points with a reflective density of 1, 1.5 and 2. The ozone gas concentration in the box was set with an ozone gas monitor (model OZG-EM-01, manufactured by APPLICS Co.).

The result was evaluated in levels, as A in case the dye remaining rate was 80% or higher in all the densities, B in case the dye remaining rate was less than 80% in two points, and C in case the dye remaining was less than 70% in all the points.

Obtained results are shown in tables.

TABLE 6

Experiments with EPSON inks

| | light fastness | heat fastness | ozone resistance |
|---|---|---|---|
| EPSON PM photo paper | B | B | B |
| R-1 (comparative example) | B | B | B |
| R-2 (comparative example) | B | B | B |
| R-3 (comparative example) | B | B | B |
| R-4 (present invention) | A | A | A |
| R-5 (present invention) | A | A | A |
| R-6 (present invention) | A | A | A |
| R-7 (present invention) | A | A | A |
| R-8 (present invention) | A | A | A |

TABLE 7

Experiments with CANON inks

| | light fastness | heat fastness | ozone resistance |
|---|---|---|---|
| CANON photo paper | B | B | B |
| R-1 (comparative example) | B | B | B |
| R-2 (comparative example) | B | B | B |
| R-3 (comparative example) | B | B | B |
| R-4 (present invention) | A | A | A |
| R-5 (present invention) | A | A | A |
| R-6 (present invention) | A | A | A |
| R-7 (present invention) | A | A | A |
| R-8 (present invention) | A | A | A |

The effects of the invention are evident from these results.

The present invention has been explained in detail and by referring to specific embodiments, but it will be apparent for those skilled in the art that various modification and alterations can be added within the scope and spirit of the invention.

This application is based on Japanese Patent, Application (2003-336992) filed on Sep. 29, 2003 and Japanese Patent Application (2003-337852) filed on Sep. 29, 2003, and this application includes contents thereof as reference.

INDUSTRIAL APPLICABILITY

The invention is applicable to inkjet recording methods without any particular restriction. The invention can be used in any known method such as a charge control method in which an electrostatic attractive force is utilized for discharging ink, a drop-on-demand method in which an oscillation pressure of a piezo element is utilized, an acoustic inkjet method in which an electrical signal is converted into an acoustic beam which irradiates the ink to discharge the ink by an irradiation pressure, or a thermal inkjet (bubble jet) in which an ink is heated to generate a bubble for utilizing a resulting pressure. Also the inkjet recording method includes a method of discharging a plurality of a low-density ink called photo ink with a small volume, a method of improving the image quality utilizing plural inks of a substantially same hue having different densities, and a method of utilizing a colorless transparent ink, and the invention is applicable to any of these methods.

The invention claimed is:

1. An inkjet recording material, which comprises: a substrate; and an ink receptive layer on the substrate, wherein the ink receptive layer includes a compound represented by formula (A):

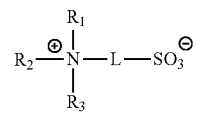

wherein $R_1$, $R_2$ and $R_3$ each represents an alkyl group, an aryl group or a heterocyclic group, and at least two of $R_1$, $R_2$ and $R_3$ are mutually connected to form a cyclic structure; L represents a divalent connecting group; and at least one of $R_1$, $R_2$, $R_3$ and L is a group having 8 or more carbon atoms, wherein L represented in the formula (A) is an unsubstituted alkylene group.

2. The inkjet recording material according to claim 1, wherein the ink receptive layer further contains a water-soluble resin.

3. The inkjet recording material according to claim 2, wherein the water-soluble resin is at least one selected from the group consisting of a polyvinyl alcohol resin, a cellulose resin, a resin including an ether bond, a resin including a carbamoyl group, a resin including a carboxyl group, and a gelatin.

4. The inkjet recording material according to claim 3, wherein the ink receptive layer includes a crosslinking agent capable of crosslinking the water-soluble resin.

5. The inkjet recording material according to claim 2, wherein the ink receptive layer includes a crosslinking agent capable of crosslinking the water-soluble resin.

6. The inkjet recording material according to claim 1, wherein the ink receptive layer further includes a fine particle.

7. The inkjet recording material according to claim 6, wherein the fine particle is at least one selected from the group consisting of a fine silica particle, a colloidal silica, a fine alumina particle and a pseudo-boehmite.

8. The inkjet recording material according to claim 1, wherein the ink receptive layer further includes a mordant agent.

9. The inkjet recording material according to claim 1, wherein the ink receptive layer is a cured layer formed by: applying a first solution on a substrate to form a coating layer, the first solution containing a fine particle, a water-soluble resin, and a crosslinking agent; and applying a second solution on the coating layer, the second solution having a pH of 8 or more, so that the coating layer is cured by a crosslinking reaction to form the cured layer, wherein the applying of the second solution is performed one of: (1) at the same time as the applying of the first solution; and (2) in the course of drying the coating layer and before the coating layer starts to show a falling drying rate.

10. An inkjet recording method, which comprises discharging a droplet of an ink on an inkjet recording material according to claim 1, so as to form an image or a character.

11. An inkjet recording method according to claim 10, wherein at least one ink contains a betaine compound.

12. The inkjet recording method according to claim 11, wherein the betaine compound is a compound represented by formula (A):

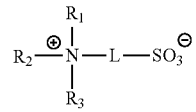

wherein $R_1$, $R_2$ and $R_3$ each represents an alkyl group, an aryl group or a heterocyclic group, and at least two of $R_1$, $R_2$ and $R_3$ are mutually connected to form a cyclic structure; L represents a divalent connecting group; and at least one of $R_1$, $R_2$, $R_3$ and L is a group having 8 or more carbon atoms.

13. The inkjet recording method according to claim 11, wherein at least one ink is an ink for inkjet printing which comprises:
at least one of water and a water-miscible organic solvent;
a dye; and
a compound represented by formula (A):

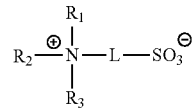

wherein $R_1$, $R_2$ and $R_3$ each represents an alkyl group, an aryl group or a heterocyclic group, and at least two of $R_1$, $R_2$ and $R_3$ are mutually connected to form a cyclic structure; L represents a divalent connecting group; and at least one of $R_1$, $R_2$, $R_3$ and L is a group having 8 or more carbon atoms.

14. A method for producing an inkjet recording material, which comprises: applying a first solution on a substrate to form a coating layer, the first solution containing a fine particle, a water-soluble resin, and a crosslinking agent; and applying a second solution on the coating layer, the second solution having a pH of 8 or more, so that the coating layer is cured by a crosslinking reaction to form a ink receptive layer, wherein the applying of the second solution is performed one of: (1) at the same time as the applying of the first solution; and (2) in the course of drying the coating layer and before the coating layer starts to show a falling drying rate, and wherein the method produces an inkjet recording material of claim 1.

* * * * *